US011106794B2

(12) United States Patent
Chow

(10) Patent No.: US 11,106,794 B2
(45) Date of Patent: Aug. 31, 2021

(54) TRUST NETWORK EFFECT

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 0 days.

(21) Appl. No.: 15/795,102

(22) Filed: Oct. 26, 2017

(65) Prior Publication Data

US 2018/0047072 A1 Feb. 15, 2018

Related U.S. Application Data

(63) Continuation of application No. 14/604,458, filed on Jan. 23, 2015, now abandoned, which is a continuation-in-part of application No. 13/663,366, filed on Oct. 29, 2012, now Pat. No. 9,626,405, and a continuation-in-part of application No. 13/631,465, filed on Sep. 28, 2012, now Pat. No. 9,015,166, which is a continuation-in-part of application No. 13/615,079, filed on Sep. 13, 2012, now abandoned, said application No. 14/604,458 is a continuation-in-part of application No. 13/631,465, and a continuation-in-part of application No. 14/498,866, filed on Sep. 26, 2014, now Pat. No. 9,967,256, and a continuation-in-part of application No. 13/269,553, filed on Oct. 7, 2011, now Pat. No. 8,881,268, said application No. 14/604,458 is a continuation-in-part of application No. 13/893,329, filed on May 13, 2013, now abandoned, and a continuation-in-part of application No. 13/436,326, filed on Mar. 30, 2012, now abandoned, and a continuation-in-part of application No. 13/175,021, filed on Jul. 1, 2011, now Pat. No. 8,943,046, and a continuation-in-part of application No. 13/161,155, filed on Jun. 15, 2011, now abandoned.

(60) Provisional application No. 61/551,929, filed on Oct. 27, 2011, provisional application No. 62/053,233, filed on Sep. 22, 2014, provisional application No.
(Continued)

(51) Int. Cl.
*G06F 21/00* (2013.01)
*G06F 21/57* (2013.01)
*G06Q 30/02* (2012.01)
*H04L 29/08* (2006.01)
*H04L 29/06* (2006.01)
*G06Q 50/00* (2012.01)

(52) U.S. Cl.
CPC ......... *G06F 21/57* (2013.01); *G06Q 30/0263* (2013.01); *G06Q 30/0282* (2013.01); *H04L 63/20* (2013.01); *H04L 67/02* (2013.01); *G06Q 50/01* (2013.01)

(58) Field of Classification Search
CPC ......... G06F 17/30424; G06F 17/30876; G06F 21/57; G06F 67/02; G06F 67/20; H04L 63/0209; H04L 63/105; H04L 63/20; G06Q 30/0282; G06Q 30/0263; G06Q 30/01
USPC ..................... 707/741, 769, 770; 726/1, 2, 3
See application file for complete search history.

(56) References Cited

U.S. PATENT DOCUMENTS 5,606,668 A 2/1997 Shwed
5,850,446 A 12/1998 Berger et al.
(Continued)

*Primary Examiner* — Vincent F Boccio

(57) ABSTRACT

An invention is disclosed for systems, methods, processes, and products of providing computing and online services. An embodiment of such a system, method, process, or product, among other things, may provide a more reliable, accurate, or otherwise effective way of determining and presenting relevant information to users, consumers, and the like.

26 Claims, 76 Drawing Sheets

Related U.S. Application Data

61/391,033, filed on Oct. 7, 2010, provisional application No. 61/645,642, filed on May 11, 2012, provisional application No. 61/786,427, filed on Mar. 15, 2013, provisional application No. 61/486,242, filed on May 14, 2011, provisional application No. 61/469,800, filed on Mar. 30, 2011, provisional application No. 61/361,384, filed on Jul. 3, 2010, provisional application No. 61/354,702.

(56) References Cited

U.S. PATENT DOCUMENTS

| | | | | |
|---|---|---|---|---|
| 5,941,954 | A | 8/1999 | Kalajan | |
| 5,983,199 | A * | 11/1999 | Kaneko | G06Q 30/0253 705/14.51 |
| 6,904,408 | B1 | 6/2005 | McCarthy | |
| 7,069,322 | B2 * | 6/2006 | Itoh | G06F 17/30876 707/E17.112 |
| 7,185,073 | B1 * | 2/2007 | Gai | H04L 41/0893 709/221 |
| 7,315,830 | B1 | 1/2008 | Wirtz et al. | |
| 7,584,194 | B2 | 9/2009 | Tuttle et al. | |
| 7,610,484 | B2 | 10/2009 | Kapoor | |
| 7,698,398 | B1 | 4/2010 | Lai | |
| 8,069,435 | B1 | 11/2011 | Lai | |
| 8,127,008 | B2 | 2/2012 | Manning et al. | |
| 8,146,134 | B2 | 3/2012 | Bechtel et al. | |
| 8,239,915 | B1 * | 8/2012 | Satish | G06F 21/00 713/166 |
| 8,321,300 | B1 | 11/2012 | Bockius et al. | |
| 8,527,629 | B2 | 9/2013 | Manning et al. | |
| 8,566,461 | B1 * | 10/2013 | Jun | G06F 21/10 709/225 |
| 8,763,074 | B2 | 6/2014 | Bechtel et al. | |
| 9,697,019 | B1 * | 7/2017 | Fitzgerald | H04L 41/08 |
| 2002/0112152 | A1 | 8/2002 | Vanheyningen | |
| 2002/0144156 | A1 | 10/2002 | Copeland | |
| 2004/0003290 | A1 * | 1/2004 | Malcolm | H04L 63/0263 726/14 |
| 2004/0088571 | A1 * | 5/2004 | Jerrim | G06F 21/552 726/1 |
| 2005/0078668 | A1 | 4/2005 | Wittenberg | |
| 2006/0056317 | A1 | 3/2006 | Manning | |
| 2006/0059092 | A1 | 3/2006 | Burshan | |
| 2006/0265417 | A1 | 11/2006 | Amato | |
| 2008/0201326 | A1 | 8/2008 | Cotter | |
| 2008/0294890 | A1 * | 11/2008 | Lee | G06F 21/10 713/153 |
| 2010/0107115 | A1 * | 4/2010 | Sareen | G06F 3/0481 715/783 |
| 2010/0107215 | A1 * | 4/2010 | Bechtel | H04L 63/105 726/1 |

* cited by examiner

Current Offers (Trust Effect OFF):

Sorted by Time (most recent first): Offer(T12, S2, U2), Offer(T11, S1, U3), Offer(T10, S3, U3), Offer(T6, S4, U3)

Sorted by Price (cheapest first): Offer(T10, S3, U3) = $3, Offer(T11, S1, U3) = $4, Offer(T12, S2, U2) = $5, Offer(T6, S4, U3) = $6

Current Offers (Trust Effect ON):

Sorted by Time (most recent first): Offer(T12, S2, U2), Offer(T9, S1, U1), Offer(T4, S3, U2)

Sorted by Price (cheapest first): Offer(T12, S2, U2) = $5, Offer(T4, S3, U2) = $6, Offer(T9, S1, U1) = $7

Hi Jane:

The following is what you have in your "Ad Group 1":

Campaign: Pepsi Seattle Marathon     Remove

Seller: Pepsi Downtown Seattle Mega Store     Remove

Add More Here

Your budget and limits for "Ad Group 1" as of July 1, 2011 3:45:12 pm PST are:

| | | |
|---|---|---|
| Total Budget: | $1,000 | Change |
| Remaining Balance: | $570 | Change |
| Expiry (Last Day): | August 1, 2011 PST | Change |
| Daily Limit: | $100 | Change |
| Cost Limit (CPM): | $0.50 | Change |
| Minimum Position: | 3 | Change |

< Prev    Brand: Coca Cola [SELECTED!] Change    Next >

Charges (per CPM):

| | U.S.A. | Seattle | Around here | 47°36'35"N 122°19'59"W |
|---|---|---|---|---|
| Feb. 14, 2012 | | | | |
| 5 to 8 pm | | | | Distance 2 Km |
| Change | Change | Change | | Change |
| Position 1 | $0.5000 | $1.000 | $2.000 | |
| Position 2 | 0.1000 | 0.2000 | 0.4000 | |
| Position 3 | 0.0500 | 0.1000 | 0.2000 | |
| Position 4 | 0.0100 | 0.0200 | 0.0400 | |
| Position 5 | 0.0050 | 0.0100 | 0.0200 | |
| Position 6 | 0.0020 | 0.0040 | 0.0080 | |
| Position 7 | 0.0005 | 0.0010 | 0.0020 | |
| Position 8 | 0.0003 | 0.0006 | 0.0012 | |
| Position 9 | 0.0002 | 0.0004 | 0.0008 | |
| Position 10 | 0.0001 | 0.0002 | 0.0004 | |

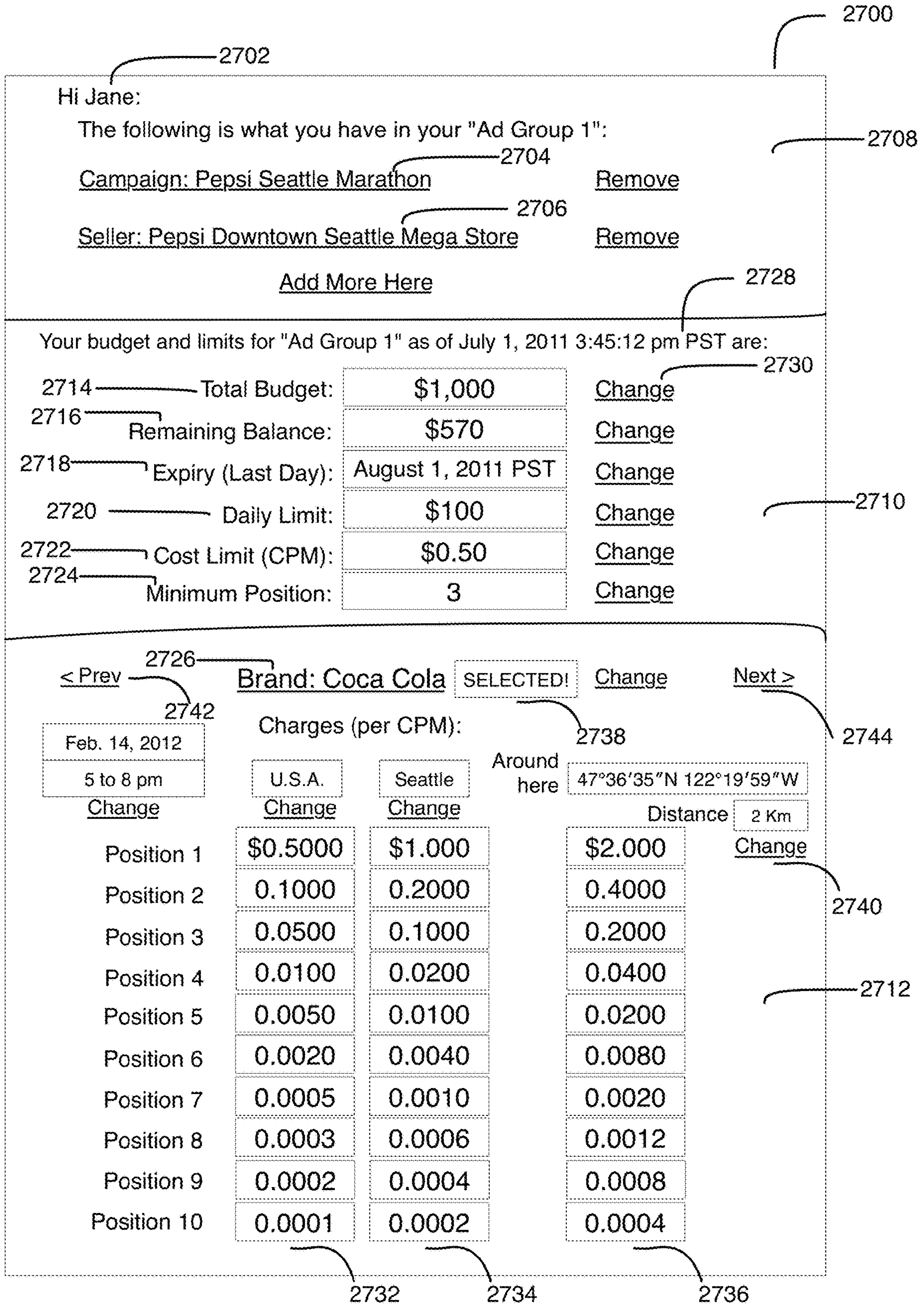

FIG. 27

| Rank | Hub1 | Hub2 | Hub3 | Hub4 | Hub5 | Provider-Wide |
|---|---|---|---|---|---|---|
| 1 | Resource 234 | Resource 234 | Resource 343 | Resource 432 | Resource 12333 | Resource 234 |
| 2 | Resource 334 | Resource 3542 | Resource 432 | Resource 23343 | Resource 442243 | Resource 432 |
| 3 | Resource 23343 | Resource 432 | Resource 3233 | Resource 334 | Resource 2323 | Resource 334 |

3506

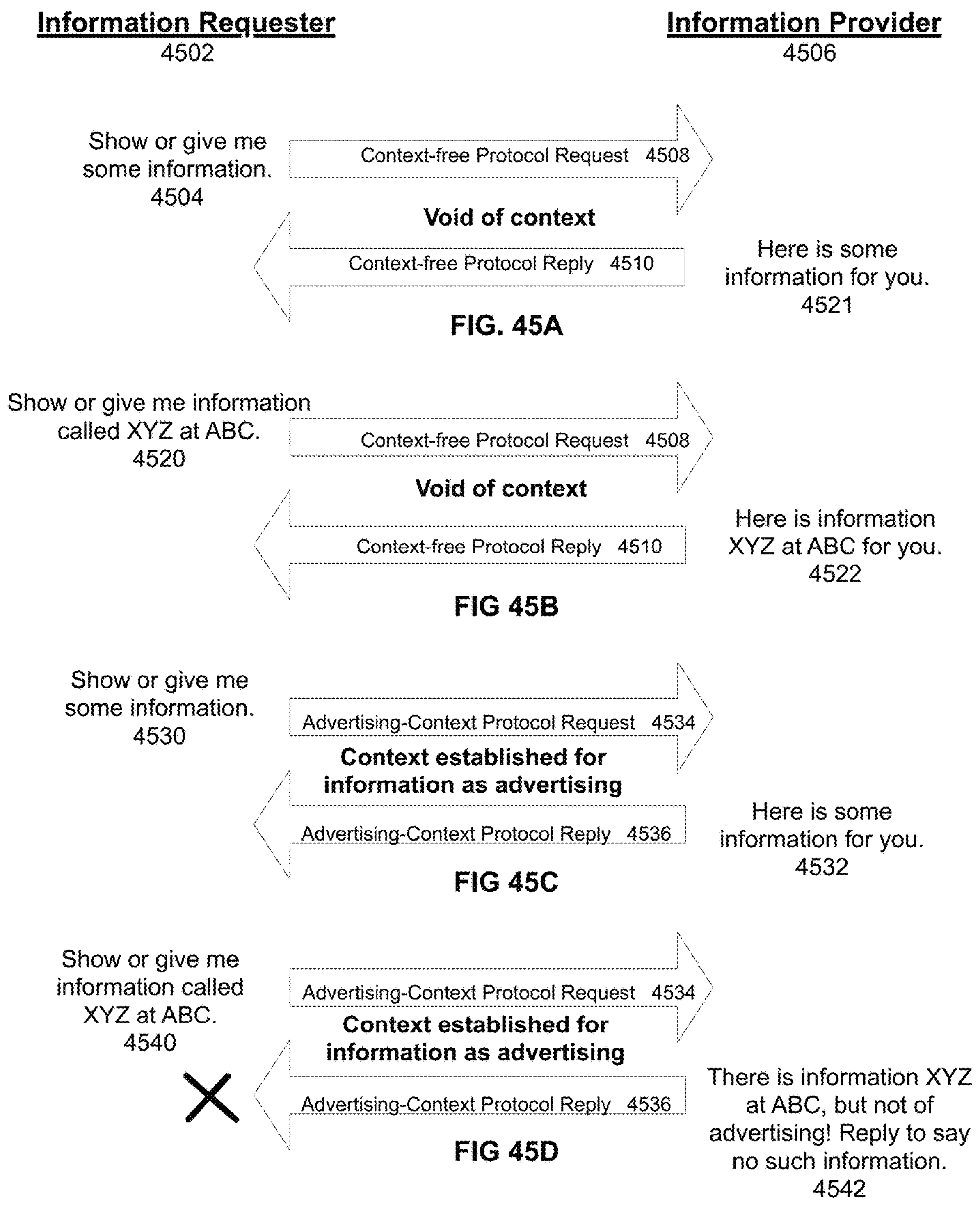

FIG. 45

Information Requester
4502

Information Provider
4506

Show or give me
some information.
4504

Context-free Protocol Request 4508 →

Void of context

← Context-free Protocol Reply 4510

Here is some
information for you.
4521

Show or give me information
called XYZ at ABC.
4520

Context-free Protocol Request 4508 →

Void of context

← Context-free Protocol Reply 4510

Here is information
XYZ at ABC for you.
4522

Show or give me
some information.
4530

Advertising-Context Protocol Request 4534 →

**Context established for
information as advertising**

← Advertising-Context Protocol Reply 4536

Here is some
information for you.
4532

Show or give me
information called
XYZ at ABC.
4540

Advertising-Context Protocol Request 4534 →

**Context established for
information as advertising**

← Advertising-Context Protocol Reply 4536

There is information XYZ
at ABC, but not of
advertising! Reply to say
no such information.
4542

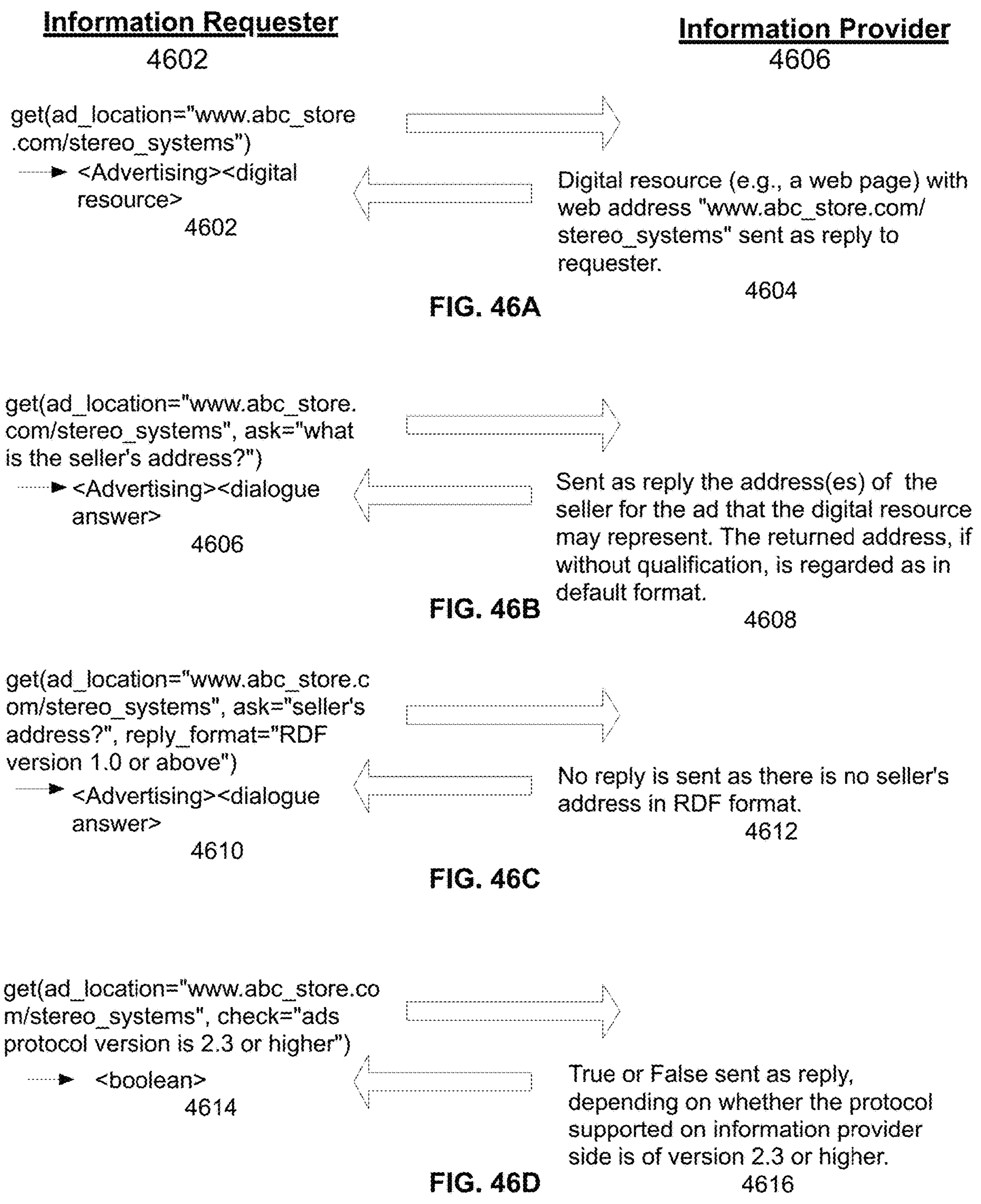

FIG. 46

Information Requester
4602

Information Provider
4606 get(ad_location="www.abc_store.com/stereo_systems")
→ <Advertising><digital resource>
4602

Digital resource (e.g., a web page) with web address "www.abc_store.com/stereo_systems" sent as reply to requester.
4604 get(ad_location="www.abc_store.com/stereo_systems", ask="what is the seller's address?")
→ <Advertising><dialogue answer>
4606

Sent as reply the address(es) of the seller for the ad that the digital resource may represent. The returned address, if without qualification, is regarded as in default format.
4608 get(ad_location="www.abc_store.com/stereo_systems", ask="seller's address?", reply_format="RDF version 1.0 or above")
→ <Advertising><dialogue answer>
4610

No reply is sent as there is no seller's address in RDF format.
4612 get(ad_location="www.abc_store.com/stereo_systems", check="ads protocol version is 2.3 or higher")
→ <boolean>
4614

True or False sent as reply, depending on whether the protocol supported on information provider side is of version 2.3 or higher.
4616

| Content Access Directive Template | | |
|---|---|---|
| **Data Item:** | **Description:** | **Example value:** |
| Creation Timestamp | The creation time of this directive and by what entity, if applicable | TS=Monday, 2008-05-19 09:09:05 UTC; ByEntityType=UCR |
| Last Modified Timestamp | The last modification time of this directive and by what entity, if applicable | TS=Tuesday, 2008-05-20 08:11:34 UTC; ByEntityType=UCD |
| Content Location | The location of access, such as a URL, a file path, or some initiating metadata. | Video/1234.avi |
| Authentication Location | The location where authentication of access, if applicable, would take place | www.abcd.net |
| Access Protocol | The protocol for retrieving or receiving the content if applicable | ftp |
| Content Format | The content format if known | H.264 |
| Recommended Content Handler | The content player or handler recommended, if any, to render the content | quicktime |
| Credential Reference | A unique reference to authentication credential, such as a logon name and password pair. A reference is assigned to a credential when being made available to UCR for the first time. Subsequent use of the credential may then be referred to by this reference. | CR010 (i.e., credential reference $10^{th}$.) |
| Logon name | Logon name for access authentication. | User123 |
| Logon password | Logon password for the logon name | mypassword |
| Availability | The date and time when the content would become available if not immediate | Monday, 2008-05-19 09:09 UTC |
| Expiry | The date and time when the content is no longer for access if known | Monday, 2008-06-19 09:09 UTC |
| Continuous Feed | Whether the content is on-going in real time | false |
| Standing Retrieval | Whether this content retrieval should continue on its own without further notification, until some external request, content expiry, or meeting some criteria specified herein. The rules governing such autonomous retrieval are also specified herein. | isAutonomous=true; Polling=true; PollFrequencyMins=60; PollTimeOutSecs=5; MetadataOnly=true |
| Maximum Size | The maximum total file size or playback time for all constituent files or content. This prevents an unreasonably large content file from hogging up computing resources. | maxDownloadLimit=true; maxDlLtByFileSize=true; maxDlLtKBytes=1000000; maxStreamLimit=false (e.g., continuous feed) |
| Supplement | Any supplementary information needed in addition to what has already been provided in order to retrieve or otherwise receive the | ContentLocationValueType =isMetadata; MetadataType=torrent |

| Content Header Template (Part 1 of 2) | | |
|---|---|---|
| **Data Item:** | **Description:** | **Example value:** |
| Creation Timestamp | The creation time of this directive and by what entity, if applicable | TS=Monday, 2008-05-19 09:09:05 UTC; ByEntityType=UCR |
| Last Modified Timestamp | The last modification time of this directive and by what entity, if applicable | TS=Tuesday, 2008-05-20 08:11:34 UTC; ByEntityType=UCD |
| Header Reference 6201 | The primary reference to this header | 2008-05-19_09:09:05-UTC-UCD464114;UCR1213289; A=John_May@def.org;R=Michael@xyz.com;I=32432 |
| Secondary Reference 6202 | A unique reference to content headers sharing the same primary header reference (e.g., an individual piece of content from a content access directive of standing retrieval) | 2008-05-20_09:09:05-UTC-Show2 32042 |
| Referer 6203 | The name/ID of referrer of content of interest | Name=Michael Luk |
| Addressee 6204 | The addressee (group or individual, or their aliases) the content of interest is sent to | John_May@abcdef.org |
| Parental Guidelines | The specification of audience that the content of interest is or is not suitable for. | ParentalGuidelines= TV_G |
| Content Type 6205 | The primary media type of the content of interest, such as video, audio, photo or text. (Example of secondary media type is audio annotation or background music for photo.) | PrimaryContentType=Photo |
| Content Privacy 6206 | Whether the content may be made available to unaddressed UCRs: no (private); only UCR groups of which addressed UCRs are member (group); or unconditionally yes (public) | public |
| Content Primary Title 6207 | The 1st title either explicitly given as part of the content or derived from the subject of a content notification message or through other means | John Flowler's Blog |
| Content Secondary Title 6208 | The 2nd title either explicitly given as part of the content or derived from the subject of a content notification message or through other means | Weekend picnic |
| Content Availability 6209 | The time & date of content availability for play-back & delivery mode (on-demand, broadcast) | Time=2008-05-21 08:00 UTC; DeliveryMode=OnDemand |
| Content Expiry 6210 | The time and date, the number of playbacks, or some criteria that define the availability expiry | ExpiryType=ByTime; ExpiryTime=2008-07-21 08:00 UTC |

| Content Header Template (Part 2 of 2) | | |
|---|---|---|
| **Data Item:** | **Description:** | **Example value:** |
| Retrieval Mode 6211 | Whether the content of interest is to download or stream-receive upon availability or upon user request | Recv=stream When=user |
| Operational Capabilities 6212 | The operations that may be applied to the content through UCR or other means of control, such as saving content locally at UCR, rewind and fast forward, and so on. | SaveContent=No; PlaybackPause=Yes; Rewind=Yes; Forward=No |
| Size 6213 | The duration or quantity of the content if known and applicable | 2h23m15s |
| Playback Schedule 6214 | The schedule that governs the playback of content; it may also be specified in relation to other content of interest. | Weekly=Monday; Start=2008-05-21 08:00 UTC |
| Destination List 6215 | The destination list to which the content (or its header) be categorized | Rental |
| Pre-Show Content 6216 | The series of header references (as well as secondary references if applicable) of content to be shown before the content of interest starts | S1= 2008 -02 -12_0 9:32:0 5-Ad-A=ad_src@1234.com;R=http://www.1234.com/ad_group1232/food543.avi;I=5352 |
| Post-Show Content 6217 | The series of header references (as well as secondary references if applicable) of content to be shown when the content of interest ends | S1= 2008 -03 -16_0 9:29:0 4-Ad-A=ad_src@gg feed .co m;R=http://www.ggfeed.com/ad_group14555/finance0950452.avi;I=009892 |
| Intra-Show Content 6218 | The series of header references (as well as secondary references if applicable) of content to be shown amid playback of the content of interest. | S1= 2008 -04 -07_0 9:12:4 2-Ad-A=ad_src@vdwew.com;R=http://www.vdwew.com/ad_group124/travel5453.avi;I=888443; S2= S1=2008-02-12_09: 32:05-Ad-A=ad_src@1234.com;R=http://www.1234.com/ad_group1232/food543.avi;I=5352 |

From: John Doe
Date: Thu 7/3/2007 3:51 PM EST
Subject: Our team won!
Message Body:
The last inning is incredible. Peter hit a home run followed by Paul doing another one! Check this out:
ftp://www.myownstorages123.info/jdoe123/game07022008.wmv
login: jdoe
password: abcabc Cheers, John

7201

```
<item>
   <title>Our team won!</title>
   <addmeta:from>John Doe</addmeta:from>
   <addmeta:date>Thu 7/3/2007 3:51 PM EST</addmeta:date>
   <link>ftp://www.myownstorages123.info/jdoe123/game07022008.wmv</link>
   <description>The last inning is incredible. Peter hit a home run followed by[...
14   more word in message]</description>
   <addmeta:logon>jode</addmeta:logon>
   <addmeta:passwd>abcabc</addmeta>
</item>
```

7202

From: John Doe
Date: Thu 7/4/2007 6:11 PM EST
Subject: Check this out!
Message Body:

http://www.sharewonderfulmoments.info/watch?video=wewewewe

It's very funny.

7203

```
<item>
   <title>Check this out!</title>
   <addmeta:from>John Doe</addmeta:from>
   <addmeta:date>Thu 7/4/2007 6:11 PM EST</addmeta:date>
   <link>http://www.sharewonderfulmoments.info/video/wewewewe</link>
   <description>[*link-1*] It's very funny.</description>
   <addmeta:originalurl>http://www.sharewonderfulmoments.info/watch?
video=wewewewe</originalurl>
</item>
```

TRUST NETWORK EFFECT

CROSS-REFERENCES TO RELATED APPLICATIONS

This application is a continuation of U.S. application Ser. No. 14/604,458, filed Jan. 23, 2015, and entitled "Trust Network Effect," which is hereby incorporated by reference in its entirety.

U.S. application Ser. No. 14/604,458 is a continuation-in-part of U.S. application Ser. No. 13/663,366, filed Oct. 29, 2012, and entitled "Trust Network Effect" (issued as U.S. Pat. No. 9,626,405 on Apr. 18, 2017), which claims benefit under 35 U.S.C. § 119(e) of U.S. Provisional Patent Application No. 61/551,929, filed Oct. 27, 2011, and entitled "Trust Network Effect," and which is a continuation-in-part of U.S. application Ser. No. 13/631,465, filed Sep. 28, 2012, and entitled "Methods and Systems for Annotation of Digital Information" (issued as U.S. Pat. No. 9,015,166 on Apr. 21, 2015), which is a continuation-in-part of U.S. application Ser. No. 13/615,079, filed Sep. 13, 2012, and entitled "Methods and Systems for Annotation of Digital Information." Content of each of all of the above applications is incorporated herein by reference in its entirety.

U.S. application Ser. No. 14/604,458 is also a continuation-in-part of U.S. application Ser. No. 13/631,465, filed Sep. 28, 2012, and entitled "Methods and Systems for Annotation of Digital Information" (issued as U.S. Pat. No. 9,015,166 on Apr. 21, 2015), which is a continuation-in-part of U.S. application Ser. No. 13/615,079, filed Sep. 13, 2012, and entitled "Methods and Systems for Annotation of Digital Information," which is a continuation-in-part of U.S. application Ser. No. 12/505,328, filed Jul. 17, 2009, and entitled "Methods and Systems for Annotation of Digital Information" (issued as U.S. Pat. No. 8,301,631 on Oct. 30, 2012), which claims benefit under 35 U.S.C. § 119(e) of U.S. Provisional Patent Application No. 61/182,693, filed May 30, 2009, and entitled "Comparative Annotation." Content of each of all of the above applications is incorporated herein by reference in its entirety.

U.S. application Ser. No. 14/604,458 is also a continuation-in-part of U.S. application Ser. No. 14/498,866, filed Sep. 26, 2014, which claims benefit under 35 U.S.C. § 119(e) of U.S. Provisional Patent Application No. 62/053,233, filed Sep. 22, 2014, and entitled "Secure Area for Apps," and which is a continuation-in-part of U.S. application Ser. No. 13/269,553, filed Oct. 7, 2011, and entitled "Secure Area for Apps" (issued as U.S. Pat. No. 8,881,268 on Nov. 4, 2014), which claims benefit under 35 U.S.C. § 119(e) of U.S. Provisional Patent Application No. 61/391,033, filed Oct. 7, 2010, and entitled "Secure Designation for Apps." Content of each of all of the above applications is incorporated herein by reference in its entirety.

U.S. application Ser. No. 14/604,458 is also a continuation-in-part of U.S. application Ser. No. 13/893,329, filed May 13, 2013, and entitled "Digital Content Delivery," which claims benefit under 35 U.S.C. § 119(e) of U.S. Provisional Patent Application No. 61/645,642, filed May 11, 2012, and entitled "Automatic Content Retrieval," and of U.S. Provisional Patent Application No. 61/786,427, filed Mar. 15, 2013, and entitled "Automatic Content Retrieval," and which is a continuation-in-part of U.S. application Ser. No. 12/538,688, filed Aug. 10, 2009, and entitled "Methods and Systems for Automatic Content Retrieval and Organization" (issued as U.S. Pat. No. 9,135,363 on Sep. 15, 2015), which claims benefit under 35 U.S.C. § 119(e) of U.S. Provisional Patent Application No. 61/185,270, filed Jun. 9, 2009, and entitled "Automatic Content Retrieval and Organization." Content of each of all of the above applications is incorporated herein by reference in its entirety.

U.S. application Ser. No. 14/604,458 is also a continuation-in-part of U.S. application Ser. No. 13/436,326, filed Mar. 30, 2012, and entitled "Method and System for Advertising Information Items," which claims benefit under 35 U.S.C. § 119(e) of U.S. Provisional Patent Application No. 61/486,242, filed May 14, 2011, and entitled "Method and System for Advertising Information Items," and U.S. Provisional Patent Application No. 61/469,800, filed Mar. 30, 2011, and entitled "Method and System for Advertising Information Items." Content of each of all of the above applications is incorporated herein by reference in its entirety.

U.S. application Ser. No. 14/604,458 is also a continuation-in-part of U.S. application Ser. No. 13/175,021, filed Jul. 1, 2011, and entitled "Resource Hubs for Heterogeneous Groups" (issued as U.S. Pat. No. 8,943,046 on Jan. 27, 2015), which claims benefit under 35 U.S.C. § 119(e) of U.S. Provisional Patent Application No. 61/361,384, filed Jul. 3, 2010, and entitled "Resource Hubs for Heterogeneous Groups." Content of each of all of the above applications is incorporated herein by reference in its entirety.

U.S. application Ser. No. 14/604,458 is also a continuation-in-part of U.S. application Ser. No. 13/161,155, filed Jun. 15, 2011, and entitled "Context Level Protocols and Interfaces," which claims benefit under 35 U.S.C. § 119(e) of U.S. Provisional Patent Application No. 61/354,702, filed Jun. 15, 2010, and entitled "Context Level Protocols and Interfaces." Content of each of all of the above applications is incorporated herein by reference in its entirety.

TECHNICAL FIELD

The present invention relates to systems, methods, processes, and products of providing computing and online services.

BACKGROUND

There are systems that enable consumers to post entries or digital resources about a particular subject matter, such as retail offers, sellers and items. Some of these systems also allow users to sort or filter these entries or digital resources based on attributes of the subject matter to which the entries or digital resources pertain, such as price and distance for retail offer entries. Since user-generated entries or digital resources may contain wrong information, intentional or otherwise, system administrators or providers may review the posts or submissions before making them available to other members or users in the system. However, such manual intervention is not scalable to large volume of posts or submissions, and may impact adversely the timely availability of the posts or submissions. A system may allow users to rate entries so that the entries may be sorted or filtered based on such ratings, so to improve the relevancy of entries to the users. However, according to one study, many top user reviewers are given incentives to provide reviews, and many of these user reviewers might have provided positive reviews due to such incentives. And it is generally taken that only a small portion of consumers would provide ratings, especially when there is no need to voice any complaint, thereby under-reporting otherwise satisfactory goods or services, for instance. Meanwhile, a small group of proactive users can game the system by providing positive ratings to boost up the visibility of entries pertaining to items that they have vested interests in.

In addition, as the use of the Internet proliferates, it is increasingly being used as a vehicle for buying and selling of goods and services. The vendors who sell their goods or services on the Internet are often referred to as "online merchants." These online merchants primarily use a website to advertise their products and services and secure orders from consumers for their offerings. For instance, a typical online merchant webpage may display relevant information about a product including but not limited to its price, sales tax, shipping and warranty information and details about the product. The information displayed on a website is often encoded in a digital form. Such information may be generally referred to as "digital information." One of the most difficult tasks for a consumer is to determine which online merchant is offering the best bargain for a particular product or service. To this effect, consumers often engage in bargain hunting where they may visit online merchants and bookmark the webpage displaying information about the product or service of interest to them. In some instances, the consumer may add some information e.g., metadata, of his own to each product web page so bookmarked. This activity of adding additional information is sometimes referred to as "annotation" or "tagging."

The idea of tagging is not limited to textual information. Any type of digital information e.g., audio, video, graphics, etc. may be tagged. For example, a person watching or having watched a video online may provide annotation against the video or the location of the video.

However, the conventional techniques for gathering and analyzing such digital information often involves manual processing of the tags and annotations. For example, a webpage or a Web resource on the World Wide Web ("Web") is most often identified by a Uniform Resource Identifier (URI). Other digital information available on a storage medium or a network may be identified by a "recall handle" similar to a URI. Like the URI, each recall handle is unique and is associated with only one item or page of information. Conventional techniques allow use of associating relevant keywords and phrases with a webpage, which is otherwise contextually uncertain. A user may be able to group contextually related web pages for later use. However, in some instances, web pages that share the same or similar annotation keywords and phrases may be grouped together even if they are contextually different. In addition, if the number of related web pages in a group lack specific information of interest to the user, it becomes difficult for the user to judge the relevancy of the web pages in light of the desired data to be analyzed. For example, a user may bookmark several web pages during his research, which he believes provide the information of his interest. The user may group these pages together as relating to the same item of interest. However, these bookmarked pages may not contain information that is actually relevant to what the user is searching. Subsequently, if the user attempts to extract relevant information from each of these bookmarked pages, he will have difficulty in evaluating the merits and relevancy of the information contained in the bookmarked web pages. The level of difficulty encountered by the user is directly proportional to the number of web pages being bookmarked.

Therefore, there is a need in the art for a method for efficient annotation of digital information.

In addition, to market or advertise a particular entity of commercial, professional, or public interest, such as a product, service, seller, brand, offer, event, website, charity, URL (Uniform Resource Locator), and so on, information items such as textual, audio, visual, multi-media, or interactive notices or ads are often placed alongside with, or in-between, some other contents, so to attract public attention or patronage for that particular entity. Examples of such information items include radio announcements, electronic billboards, banner ads, and sponsored URLs. In an interactive digital environment such as the World Wide Web (i.e., the Web), consumers have control to select some information items over other information items for consumption and can change their interests or selections anytime. While it is believed that the most effective ads are those deemed relevant to the interest of their target audience at any moment, it has been difficult to reliably present ads that sellers or advertisers deem relevant to the consumers based on their changing interests.

It is equally difficult, if not more so, for the sellers or advertisers to identify specific information items in a vast online repository of information items (such as those digital resources available on the Web or through a search engine), and have their ads presented in connection with these information items when a user has shown interest in one of these information items. For example, a seller may associate his ad with keywords provided by a search service, so that when a user sends the search service a query comprising those keywords, the search service would present the user with the ad along with the search results. There are many problems with current online advertising, some of which are well known.

In addition, the World Wide Web (or simply called the Web) has made dissimilation and publication of digital resources (e.g., webpages, news, blogs, statements, photos, opinions, offers, music, videos, applications) so easy that a pyramid of digital resources of various kinds are available online. It has become difficult for many online users to decide what to read or consider, or to uncover digital resources of interest to him or her.

There are systems that allow an online user to positively or negatively rate a certain piece of news, article, opinion, or some other information item of a certain topic. Such a system displays, advertises, or otherwise publishes these information items that are deemed by the system as the most recommended or the more favorable based on such user recommendations. These selected information items are herein collectively referred to as prize digital resources. Digital resources such as news items may be made popular through resource sharing or social networking websites. Substantial online content that attracts advertising revenues or becomes widely known have originated or otherwise receive recommendation via these websites and systems.

However, the current art treats the membership population of these websites and systems as homogeneous, where members having diverse or heterogeneous interests may not easily be able to discover or share their content of interest more efficiently or widely, while contributing to the overall relevancy of such content to the population as a whole. For instance, the prize digital resources so determined in accordance to the current art purportedly represent the interest of the whole population or community, when in fact the online users are heterogeneous (by nature or otherwise, such as age, nationality, gender, religion, and so on). This simplistic approach does not facilitate information dissemination of interest to relevant parties. In addition, it might encourage an online user to game or manipulate the systems or their ranking/rating methods so that the articles, news, opinions, and information items of other kinds that they have a vested interest in promoting would become prize digital resources. Other online users who want to see their favorite digital resources unsuppressed by the prize ones would either do their own counter gaming or manipulation, or simply be regarded not as a group of people whose interests are not "important" enough to be heard or seen.

In addition, a computing apparatus or device may be equipped with a means to authenticate a user for access. However, there may be applications or functions (herein referred to as apps) on the device that a user would access or use often but not wanting the need for device-level authentication every time he wishes to do so. On the other hand, some apps may provide their own authentication (optional or otherwise), so that a user may disable authentication for the device, and rely on such app-specific authentication. In this case, the user needs to be authenticated individually by these apps, and manage the credentials (e.g., user name and password) for all these apps. In addition, when a device communicatively coupled to a user lacks network connectivity, the user who is using the same online service as another user would not be able to access the service, even though a device of the other user has network connectivity to communicate with the service and the device of the user is communicatively linked to the device of the other user.

In addition, in the recent years, people are increasingly receiving information using electronic communication technologies like email, Short Message Service (SMS), Really Simple Syndication (RSS), etc. Various devices, e.g., computers, cellular phones, and other mobile communication devices, can be used to send and receive digital information using these electronic means. The improved affordability and portability of these devices have also contributed to this growing trend. As a result, more information is being shared using these electronic communication technologies than ever before. The information being shared includes digital information such as text messages, audio messages, videos, etc. A person who wishes to use these and other emerging communication technologies needs to possess some amount of technical knowledge about the operation of these technologies. The setup or configuration of the devices that can operate with these technologies can be challenging and assistance from knowledgeable users or system administrators may be needed. For example, a person may need to possess the knowledge about subscribing to and configuring a user account for a particular messaging system.

One example of such a communications technology is email. Emails are increasingly being used to exchange content between users. For example, user A may send an email to user B. The email may include a link to some digital information or content, e.g., a video clip, that user A would like to share with user B. Conventionally, user B would have to retrieve the email message using an email client, e.g., Microsoft® Outlook, open the email message, and physically click on the link to access the digital information associated with the link. As the number of such email messages, and other types of electronic messages, increase, it can get very difficult or time consuming for a recipient of such messages to manage and enjoy the content that is being shared. Moreover, a user may have difficulty in retrieving and organizing all the information being sent to him via these communications technologies and it is likely that the user may be overwhelmed with all the digital information that is sent or referred to him. The need for manual intervention or action in the retrieval of digital information referenced or otherwise mentioned in the electronic messages has limited the growth of information sharing.

The manual retrieval process can be difficult for an average user. For instance, a user may receive an email message on his mobile phone and the message may include a uniform resource locator (URL) for downloading a video file that is 100 MB in size. Considerations such as download speeds and bandwidth costs may deter the user from retrieving the video file using his mobile phone. Further, even after the video file is downloaded, the on-device media player may not be compatible with the video format or type of the downloaded video file. The user would then need to retrieve the message and the corresponding video file at a later time, e.g., when he is home where he has a faster download speed, or may need a device with a compatible media player. In addition, every message that the user receives, which includes one or more external referrals to digital information, would require a certain degree of manual intervention or action on the user's part that is repetitive at best, and may often need substantial time investment on the part of the user. In addition, complications involving conversion from one media type to another or from a streamed media to a stored or downloaded media may deter the user from actually accessing the digital information.

SUMMARY

According to one embodiment, a method is provided for accepting a plurality of posts (or entries or digital resources) for a subject matter from a plurality of users in a system. Each user is associated with a user account in the system, and each post is associated with a relationship score maintained in the system. One or more of the posts are presented to one or more of the users, such as in response to a user query or request relative to the subject matter, a notification in connection with some prior user registration, or unsolicited content in part of electronic communication. For each of these posts, it is determined if the one or more users have established a positive relationship with the post, where they had no prior positive relationships with the post before. If there are such new positive relationships, the relationship score of the post is incremented for each new positive relationship. An ordered list of posts including at least one of the one or more posts is generated based at least in part on the relationship score of the one or more posts. According to one embodiment, the relationship score is displayed along with each of the post in the ordered list. According to another embodiment, the relationship score is one of the criteria for sort order of the ordered list. The criteria include time, distance range, location, and price range. According to yet another embodiment, the timestamp of the positive relationship between a user and a post may be updated when the user performs an activity that renews or reinforces their existing positive relationship.

According to one embodiment, only operational relationships will constitute a positive relationship between a user and an entry or digital resource. Activities that may constitute an operational relationship between an entry or digital resource and a user include but not limited to: the user submitting the entry or digital resource, submitting another entry or digital resource adding to, referring to, or including the entry or digital resource, the user purchasing the entity associated with the entry or digital resource, the user requesting information in connection with the entry or digital resource, and the user forwarding the entry or digital resource, or a reference to it, to another user. Activities that may constitute a non-operational relationship between an entry or digital resource and a user include but not limited to: the user submitting a rating for the entry or digital resource, and the user bookmarking the entry or digital resource, or marking it as favorite. According to another embodiment, a positive relationship may include user ratings only if the ratings are not negative. According to yet another embodiment, a positive relationship may be removed when a certain period of time has expired since the latest positive relationship establishment between a user and an entry or digital resource, or when there is deemed a negative relationship between the user and the entry or digital resource, such as a negative review against the entry or digital resource by the user.

According to another embodiment, a method is provided for presenting one or more digital resources to a user in relation in a request, interest, or subject matter, the method comprising: associating one or more participants with a user; accepting a plurality of digital resources; receiving a request from the user, the request relative to a subject matter; identifying a subset of the digital resources based at least in part on the request; determining one or more relationships between the subset of the digital resources and the one or more participants; and presenting the subset of the digital resources to the user based at least in part on the one or more relationships.

According to other embodiments, the method's accepting the plurality of digital resources may include receiving the plurality of digital resources from the one or more participants, and storing in a database the plurality of digital resources. The one or more participants may include the user, information providers and other users. The one or more relationships may include relationships between activities relative to the subset of the digital resources, and the one or more participants performing the activities. The activities may include reviews, recommendations, or updates. The digital resources may include references to the digital resources, the references including URLs (Uniform Resource Locators) and URNs (Uniform Resource Names). The one or more digital resources may include entries in an ordered list of digital resources. The method's presenting the subset of the digital resources to the user based at least in part on the one or more relationships may comprises: ignoring entries in the ordered list of digital resources based at least in part on the one or more relationships; and presenting the ordered list of digital resources to the user, wherein each entry in the ordered list of digital resources is not ignored.

According to one embodiment, the method may further comprise determining the ordered list of digital resources based in least in part on a score, wherein the score includes a relevance score or a ranking. Each of the one or more digital resources may include location information, and the one or more digital resources may include a list of digital resources, ordered by the location information in relation to a location reference. The location information may include distances or GPS coordinates. The location reference may include the position selected by the user, or the position of a device coupled to the user.

According to another embodiment, each of the one or more digital resources may include time information, and the one or more digital resources may include a list of digital resources, ordered by the time information. The method's presenting the subset of the digital resources may comprise: ignoring entries in the ordered list of digital resources based at least in part on the one or more relationships; and presenting the latest entry in the ordered list of digital resources, wherein the latest entry is not ignored. According to one embodiment, the one or more digital resources may include offer entries, each comprising item information, seller information, and price information.

According to yet another embodiment, a non-transitory computer-readable storage medium bears computer-readable instructions that, when executed on a computer, cause the computer to: associate a participant with a user; associate a setting with the user, receive a request from the user; determine a first set of digital resources and a second set of digital resources based on the request; determine that the first set of digital resources is not associated with the participant; and present a third set of digital resources to the user based on the second set of digital resources. In addition, the first set of digital resources and the second set of digital resources may comprise entries, each entry being associated with an entity, and a first attribute associated with the entity, and a second attribute associated with the entity, the entity including an offer from a particular seller for a retail item, the first attribute including a submission time, and the second attribute including a price. The non-transitory computer-readable storage medium bears computer-readable instructions may also cause the computer to: select for each entity in the second set of digital resources an entry, the entry whose first attribute is associated with a value deemed more relevant than values being associated with first attributes of other entries, the other entries being associated with the entity; generate a list of digital resources based on the selected entries, the list of digital resources being sorted based on the second attribute; and present the list of digital resources to the user.

In addition, embodiments of this invention may provide methods and systems for annotating digital information. In an embodiment, method includes receiving a search term, presenting a plurality of search results based at least in part on the search term, the search results being presented by providing a plurality of unique identifiers, wherein at least one of the search result is associated with one of the unique identifiers, receiving input indicative of a selection of a first unique identifier. The method further includes providing a list of one or more attributes to be associated with the first unique identifier, receiving data to be associated with the one or more attributes, annotating the first unique identifier with the one or more attributes, which include data from the one or more pages, and saving, in a storage medium, the annotated first unique identifier.

Other embodiments of the present invention provide a method for sharing of annotated digital information. In an embodiment, the method includes presenting a user with information that matches a search term, wherein each page is identified by a unique identifier, identifying one or more attributes to be associated with a first unique identifier from the unique identifiers for the pages, receiving data to be assigned to the one or more attributes, annotating the first unique identifier by associating the one or more attributes with the first unique identifier, and communicating the annotated first unique identifier to an external system, the external system configured to store the annotated first unique identifier in a database.

Still other embodiments of the present invention provide a system for performing annotations to digital information. In an embodiment, the system may include a client computer configured to execute a search query based on a search term. The client computer may further include a user interface module configured to accept the search term and present search results to a user and an annotation collection module configured to communicate with the user interface and one or more search engines to provide search results to the user interface. The system may further include an annotation collection service. The annotation collection service may include a database module configured to store annotated URIs and information associated with the annotated URIs, an annotation engine configured to communicate with the annotation collection module to exchange annotation information, a retrieval module configured to receive queries from the client computer and provide information about annotated URIs to the client computer, and a fetching module communicably coupled to the annotation engine for receiving caching requests and providing cached information to the annotation engine.

Some embodiments of the present invention provide a user interface that includes a first section for accepting a search term, a second section for selecting a search engine to execute the search term, a third section for displaying a unique identifier for a webpage or website identified by the search engine, a fourth section for displaying at least a portion of information included on the identified webpage or website, a fifth section for selecting an attribute to be associated with the unique identifier, and a sixth section for entering data to be associated with the selected attribute.

The following detailed description, together with the accompanying drawings will provide a better understanding of the nature and advantages of the present invention.

In addition, one problem with current online advertising is that keywords in such a query do not provide enough information to identify the information items of interest of a user, and the seller often does not want its ads to be associated or presented along with search results that merely contain matching keywords and no relevant content of interest.

The present invention addresses these difficulties, and provides other benefits.

In accordance with one aspect of the invention, there is provided a method for advertising a set of information items based at least in part on another set of information items. The method involves receiving a submission or selection of a set of information items, identifying another set of information items based at least in part on user input, receiving a selection of an information item, determining if the selected information item matches the other set of information items, and presenting a response based at least in part on the set of information items if the selected information item matches the other set of information items, wherein the response includes one or more information items in the set of information items, or a reference or means of access to one or more information items in the set of information items. Examples of criteria on whether the selected information item is deemed matching the other set of information items include that the other set of information items comprises or refers to the selected information item or part thereof, that the selected information item comprises or refers to at least one information item in the other set of information items, and that an information item in the other set of information items and the selected information item comprise or refer to the same information item, or an equivalent or comparable information item. The method may further involve inserting at least one information item in the set of information items into the selected information item or place the at least one information item between parts of the selected information items.

In accordance with another aspect of the invention, there is provided a method for advertising an offer. The method involves receiving a submission or selection of an offer entry, identifying information parts in the offer entry, receiving a selection of an information item, the information item including another offer entry, a webpage, an article, a sound track, an image, or video, determining if the selected information item comprises or refers to at least one of the information parts, and presenting the offer entry or otherwise making it a candidate offer entry for advertising if the selected information item comprises or refers to at least one of the information parts.

In accordance with another aspect of the invention, there is provided a method for prioritizing a plurality of sets of candidate information items for advertising in a response having a limited number of positions. The method involves selecting an unassigned position in the response, the unassigned position associated with the highest advertising charge among all available positions; determining the highest cost limit associated with the plurality of sets of candidate information items, each of the sets of candidate information items including an information item not assigned to any position in the response and having target position criteria met by the unassigned position, and a remaining balance sufficient for the highest cost limit or charge, whichever is lower; selecting a set of candidate information items from the plurality of sets of candidate information items based at least in part on some specific criteria including round robin, highest remaining balance first, highest budget first, and so on; assigning an information item in the set of candidate information items to the unassigned row position, the information item not yet assigned to any position in the response; deducting from the remaining balance associated with the set of candidate information items an amount equal to the highest cost limit, or the highest charge associated with the unassigned row position, whichever is lower; and repeating from the above step of selecting an unassigned position in the response associated with the highest charge, until there is no more unassigned position in the response, or no more candidate information item that is not assigned to any position in the response and has target position criteria met by the unassigned position.

In accordance with another aspect of the invention, there is provided a method for determining a set of popular information items. The method involves associating information items in a database each with a popularity score; receiving a request to associate an information item with another information item; increasing the popularity score associated with the other information item; and determining a set of popular information items among the information items, each in the set of popular information items having a higher popularity score than information items not in the set of popular information items. The method may further involve presenting at least one popular information item in the set of popular information items. Each of the at least one popular information item may be associated with one or more advertising costs. The method may then further involve adjusting the one or more advertising costs associated with each of the at least one popular information item based at least in part on the popularity score associated with each of the at least one popular information item.

In accordance with another aspect of the invention, there is provided a method for advertising an information item, the method including presenting a set of information items to a first user, the first user being associated with an account, and the set of information items including one or more information items and being relative to a subject matter, wherein the one or more information items are each associated with cost information; receiving from the first user an indication of a first information item, the first information item being relative to the set of information items; receiving an indication of a second information item, the second information item being associated with the account; associating the first information item with the second information item; determining rate information relative to the cost information;

presenting another set of information items to a second user; detecting an indication of a third information item, the third information item being relative to the other set of information items; determining that the third information item matches the first information item; presenting a response to the second user, the response being based at least in part on a representation or indication of the second information item, or part thereof; determining a charge relative to the rate information; and applying the charge in association with the account. In accordance with yet another aspect of the invention, there is provided a method for promoting an advertisement or ad, the method including presenting a first set of information items that may be associated with an advertisement to a first user, the first user being associated with an account, the set of information items comprising a first information item, the first information item being related a subject matter and having a cost information; receiving from the first user an indication of selecting the first information item; in relation to receiving the indication of selecting the first information item, receiving an indication of a second information item from the first user, the second information item being associated with the account, the second information item comprising an advertisement to be associated with the first information item; in response to receiving the indication of the second information item, and to receiving the indication of selecting the first information item, associating the first information item with the second information item; determining a rate information for presenting the second information item with the first information item based on the first information item's cost information; presenting a second set of information items to a second user, the second set of information items comprising a third information item, the second set of information items comprising content requested by the second user; receiving an indication of selecting the third information item for the second user; in response to determining that the third information item matches the first information item, and to associating the first information item with the second information item, presenting a response to the second user, the response comprising a representation or indication of at least a part of the second information item; determining a charge for presenting the response based on the rate information; and applying the charge to the first user's account.

Other aspects and features of the present invention will become apparent to those ordinarily skilled in the art upon review of the following description of specific embodiments of the invention in conjunction with the accompanying figures.

In addition, the present invention may solve some of the above problems and related issues by providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

Disclosed are techniques for rating a digital resource among heterogeneous groups of users in hubs. In embodiments, a hub provider makes available the digital resource to a first hub and a second hub, the first hub comprising a first plurality of members and the second hub comprising a second plurality of members, the first plurality of members differing from the second plurality of members, each member having a member account. In embodiments, one member may be a group of both the first and second pluralities of members, though the sets of members in the first and second pluralities of members differ. The hub provider may then receive a first rating for the digital resource from a first member of the first hub, and receive a second rating for the digital resource from a second member of the second hub. The hub provider may then determine a first hub-level score for the first hub based on the first rating; determine a second hub-level score for the second hub based on the second rating; and determine an overall score for the digital resource based on the first hub-level score and the second hub-level score. The hub provider may store an indication of the first hub-level score, second hub-level score, and overall score in a memory.

Disclosed are methods and systems for distributing digital resources and identifying prize resources and their contributors among heterogeneous users. For instance, a method for selecting more than one set of digital resources among a plurality of digital resources is described, the method comprising: making available a plurality of digital resources in a plurality of hubs, each hub having a plurality of members, wherein each member may be associated with a home hub; presenting the plurality of digital resources to the plurality of members in the plurality of hubs; accepting a member rating from the plurality of members against the plurality of digital resources, wherein the member rating includes a favorable rating or an unfavorable rating; determining a hub-level score for each of the plurality of hubs against one or more digital resources of the plurality of digital resources based at least in part on the member rating; determining an overall score against each of the one or more digital resources based at least in part on the hub-level score; and selecting more than one set of digital resources, a set based at least in part on the overall score and another set based at least in part on the hub-level score in relation to one of the plurality of hubs, wherein the set and the other set include an ordered list of references to digital resources.

In relation to this method, the plurality of digital resources may include one or more digital resources being available in two or more hubs of the plurality of hubs. Each of the more than one set of digital resources may include one digital resource or one or more references to digital resources, and the plurality of members may include a plurality of email addresses. In addition, the making available a plurality of digital resources may include storing the plurality of digital resources, hubs, and user accounts in a database, and selecting the more than one set of digital resources may include storing the more than one set of digital resources in the database. The making available may also include receiving submissions from the plurality of members, the submissions including digital resources or references to the digital resources and member ratings, wherein the references may include URLs. The selecting may also include presenting the set of digital resources to the plurality of members and the other set of digital resources to members of the hub having the other set of digital resources associated with the hub-level score. Furthermore, the accepting a member rating may include considering the member rating only for the home hub. Each of the plurality of members may belong to only one of the plurality of hubs. The method may further comprise: determining eligibility of a user for membership of a hub, wherein the determining includes what the user is, where the user claims to reside or is located, what the user claims to believe, what the user can do, or what digital resources the user has given a favorable rating against; accepting the user as a member if the user is determined to be eligible; rejecting the user as a member if the user is determined to be not eligible; determining if a member should be removed from a hub; and removing the member from the hub, if the member is determined to be removed; and keeping the member in the hub, if the member is determined not to be removed.

Moreover for the method, the determining if a member should be removed may include detecting a certain number of prize digital resources in the hub receiving an unfavorable rating from the member over a period of time or among a number of prize digital resources, and detecting a plurality of digital resources each receiving a favorable rating from the member and not becoming a prize digital resource in the hub over a period of time or among a number of digital resources available in the hub.

The method may further comprise: determining a prize user based at least in part on the set of digital resources, wherein the prize user has submissions comprising one or more resources in the set; determining a prize member based at least in part on the other set of digital resources, wherein the prize member has submissions comprising one or more resources in the other set; and determining a prize hub based at least in part on the set of digital resources, wherein the prize hub has a hub-level score for one or more resources in the set.

The present invention also includes a system for generating a plurality of selections of resources from a plurality of resources, comprising: a hub storage medium for storing a plurality of hubs in a database; a user storage medium for storing a plurality of user accounts in a database; a resource storage medium for storing a plurality of resources in a database; a relationship storage medium for storing a plurality of relationships in a database; a communication interface component configured to send and receive data to and from a user via a user device over a network, the user having a user account in the user storage medium, the user having a membership relationship between the user account and one or more of the plurality of hubs in the relationship storage medium, and the data including one or more submissions, each having a recommended resource or a rating, the recommended resource comprising a reference to a resource, and the rating comprising a target resource, wherein the target resource includes a recommended resource; a user interface component configured to interact with the user or the user device, the interacting including receiving the one or more resource submissions, and presenting a selection of digital resources to the user or the user device; a submission handler component configured to receive one or more recommended resources and ratings; a resource analyzer component configured to determine if each of the one or more recommended resources exists in the resource storage medium, and add the recommended resource to the resource storage medium if the recommended resource does not already exist in the resource storage medium, the recommended resource including an overall score, a user account, and a timestamp; a resource distributor component is configured to determine if an availability relationship between the recommended resource and each of the one or more hubs exists in the relationship storage medium, and add an availability relationship between the recommended resource and the hub in the relationship storage medium if the availability relationship does not already exist in the relationship storage medium, the availability relationship including a hub-level score, a user account, and a timestamp; a score generator component is configured to determine if an availability relationship between each of the one or more target resources and each of the one or more hubs exists in the relationship storage medium, and update the hub-level score in the availability relationship based at least in part on the rating if the availability relationship exists in the relationship storage medium, and to update the overall score in the target resource in the resource storage medium based at least in part on the hub-level score; and a list maker component configured to generate a plurality of selections of digital resources, one selection based at least in part on the overall scores of the digital resources in the resource storage, and the other selections based at least in part on the hub-level scores of the digital resources for the one or more hubs, the generating including presenting the plurality of selections to the user via the user device, wherein the one selection includes the overall scores, and the other selections include the hub-level scores.

The system may also include a membership controller component configured to: check if an activity relationship between the user account in relation to the user and the one of the one or more hubs exists in the relationship storage medium within a period of time, wherein the activity relationship includes but not limited to submission of a resource to the one hub, or rating of a resource in the one hub, and wherein the period of time comprises three months, and is modifiable by an authority of the one hub; assert that the user be removed from the one hub if the activity relationship does not exist in the relationship storage medium within the period of time; and remove in the relationship storage medium the membership relationship between the user account in relation to the user and the one hub if the user should be removed from the one hub.

In addition, the World Wide Web (the Web) is an open distributed online repository of digital resources available through the Internet, mostly in form of web pages linked to one another through hypertext (or more broadly, hypermedia) links. Publication or retrieval of digital resources on the Web may be made by anyone via a server capable of accepting and handling HTTP (HyperText Transport Protocol) requests at a specific TCP/IP (Transport Control Protocol/Internet Protocol) port over the Internet. (The default or well-known TCP port for the Web is port 80, a network port number.) Because of the vast amount of digital resources available on the Web, tools are available for online users or consumers to locate relevant digital resources quickly, such as via a search engine. These tools may mostly be automated (e.g., crawling and indexing webpages) to collect information useful for this purpose. However, the accuracy of such effort has so far been met with limited success, because despite both digital resources (such as webpages) and requests for information (e.g., queries for digital resources relevant to a certain interest) may often belong to or otherwise be associated with a certain primary semantic context, there lacks reliable and effective tools or schemes to establish contexts of digital resources and match them against requests consistent with their contexts.

For instance, one type of information pervasive on the Web is advertising. An ad may appear on the same webpage whose primary content may be regarded as belonging to another type or context, such as a journalistic article about health in relation to an ad about a mobile phone. In general, websites may exhibit third-party ads for revenue paid for, for example, by ad sponsors. An ad sponsor is one who is responsible for the cost of an ad placement. In comparison, an ad exhibitor is one that presents ads, such as an ad-carrying website. An ad content provider is one that prepares and produces ad content. On the other hand, a digital resource (or simply a resource) such as a webpage may comprise primarily content of advertising nature, such as those made available by a shopping website.

A user or consumer may often use search engines to research or otherwise discover information of some specific interest, such as looking up medical studies or research publications, shopping for a car, or planning for a trip. A search engine may be regarded as having three components: (a) a component that combs or crawls the Web for content, and indexes the content for suitable storage and optimal lookup; (b) a component that stores and maintains the indexed content; and (c) a component that accepts user queries, such as search words or phrases, and performs lookup against the indexed content, and returns search results to the users. (Often these search results comprise indications of digital resources, such as URLs (Uniform Resource Locators) of webpages and URIs (Uniform Resource Identifiers) of resources. Indications of digital resources may also be regarded as digital resources.) The last component may be available to a user in form of a webpage. In contrast, there may be websites that collect online resources of some specific interest, and allow users to provide queries against or submissions to these collections. For example, a shopping website may allow a seller to submit its individual products and their prices based on some data formats via a submission portal. Yet these seemingly more context-certain websites do not replace the use of search engines for context-specific information dissemination and discovery, because the former may only capture a small portion of the relevant resources that the Web would have, while the latter not only have the Web as their target for information capture, but also impose no website-specific formats or interfaces on content providers as pre-requisite for making resources available to such information capture. For instance, any digital resources accessible via HTTP (HyperText Transport Protocol) may be made available on the Web.

However, because the Web is context ignorant, any kind of information may be published, including but not limited to political news, personal blogs and entertainments. In addition, a single webpage may comprise content of possibly incompatible contexts, such as a news report about a political election with an ad about a product or service for travel. Such contextual uncertainty or ambiguity poses a substantial challenge to search engines that comb the Web for resources consistent with a certain interest or specific to a certain semantic context, such as ads of products and services. For example, a search for a particular product or service could result in web pages that simply contain the search words but are totally irrelevant to the user's intent. In addition, some content provider may deliberately put popular but contextually inconsistent terms or content in their digital resources (e.g., on their webpages) so to increase their relevancy to queries that may otherwise find them irrelevant.

Embodiments of the present invention would not only provide remedies to the above problems, but also make possible context-aware communications for dissemination and retrieval of digital resources.

In addition, according to one embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful. According to another embodiment, an authorized user may send and receive messages via another device that belongs to another user based on identification of the user by the other user.

In an embodiment, a method for retrieval of digital content is provided. The method includes accessing a message sent to a user message account, the message including information related to digital content, analyzing the message to identify the information related to the digital content, retrieving the digital content based at least in part on the information related to the digital content, and storing at least a portion of the digital content on a storage medium. In this method, the accessing, the analyzing, and the retrieving are performed substantially free from user interaction.

In another embodiment, a computer-readable storage medium storing a plurality of instructions for controlling a processing unit of a computer system to obtain digital content is provided. The processing unit may access a message sent to a user account, analyze the message to identify information referring to a location of digital content, access the digital content based at least in part on the information referring to the location of the digital content, obtain the digital content, and store at least a portion of the digital content on a machine-readable storage medium.

In yet another embodiment, a universal content manager (UCM) is provided. The UCM may include a message retrieval module configured to communicate with a messaging system and retrieve one or more messages from the messaging system, the one or more messages being associated with one or more user accounts and including one or more pieces of information related to one or more items of digital information, a message analysis module configured to analyze the retrieved one or more messages and obtain the one or more pieces of information related to the one or more items of digital information, a notice generation module configured to generate a notification, the notification including the one or more pieces of information related to the one or more items of digital information, and a communication interface configured to communicate the notification to an external system.

In still another embodiment, a universal content receiver (UCR) is provided. The UCR may include a communications interface module configured to receive a notification from an external system, the notification including information for accessing an item of digital information, a content retrieval module configured to obtain the item of digital information, substantially free of user interaction, based at least in part on the information for accessing the item of digital information included in the notification, a data interface module configured to communicate the item of digital information to a device, and a content processing module configured to prepare the item of digital information for playback on a device.

In an embodiment, a computerized system for automated retrieval of digital content is provided. The system may include a message retrieval unit configured to obtain a message sent to a user message account, the message including information related to a location of the digital content, a message analysis unit configured to parse the message and identify the information related to the location of the digital content, a content retrieval unit configured to obtain the digital content based at least in part on the information related to the location of the digital content, and a storage unit configured to store at least a portion of the digital content.

In an embodiment, a server system for obtaining digital content is provided. The server system may include a processing unit that may accept authentication information associated with a user account configured to receive a message, the authentication information being used to access the user account, access the user account using the authentication information and obtain the message, analyze the message and identify one or more sources of digital content included in the message, generate one or more uniform resource identifiers (URIs), wherein the one or more URIs are associated with the one or more sources of digital content, generate a listing of digital content, the listing including information for locating the digital content, and provide the listing of digital content to an external system.

In another embodiment, a method for communicating digital content is provided. The method may include accessing one or more user message accounts and obtaining a message from the one or more user message accounts, the message including information about one or more sources of digital content, generating a uniform resource identifier (URI), the URI being associated with a listing having information about the one or more sources of the digital content, providing the URI to an external system, the external system supporting one or more subscriber accounts and the URI being accessible by the one or more subscriber accounts, receiving authentication information for a subscriber account, from among the one or more subscriber accounts, to access the listing via the URI, and providing the subscriber account access to the listing.

In yet another embodiment, a method for communicating digital content is provided. The method includes accessing one or more user message accounts, obtaining a plurality of messages from the one or more user message accounts, each of the plurality of messages identifying one or more sources of digital content, generating a plurality of unique uniform resource identifiers (URIs), each of the plurality of URIs being associated with a listing having information about the one or more sources of digital content identified in one or more messages from among the plurality of messages, the one or more messages obtained from a user message account from among the one or more user message accounts, providing the plurality of unique URIs to an external system, each URI, from among the plurality of URIs, being accessible only by a single subscriber account, from among a plurality of subscriber accounts managed by the external system, receiving a request from a first subscriber account, from among the plurality of subscriber accounts, to access the listing via a first unique URI, from among the plurality of URIs, and providing the first subscriber account access to the listing via the first unique URI.

In one embodiment, a computer-implemented method for retrieval of digital content is provided. The method includes accessing a message sent to a first user account, the message including information related to digital content, and the first user account being associated with a first user, wherein the sending of the message is attributed to a second user not associated with the first user account, and at least a part of the digital content is available at a first storage medium, the part of the digital content not being available in the message; analyzing the message to identify the information related to the digital content, wherein the information includes an indication of access to the digital content; analyzing the message to identify the information related to the digital content, wherein the information includes an indication of access to the digital content; retrieving from the first storage medium the digital content based at least in part on the information related to the digital content; and storing at least a part of the digital content on a second storage medium wherein the accessing, the analyzing, the retrieving, and the storing are performed substantially free from interaction with the first user. In another embodiment, a computer-implemented method for delivery of digital content is provided. The method includes obtaining a registration with a server; causing a first user to be authenticated by the server in relation to the registration; in response to the first user having been successfully authenticated, receiving an authorization for access to a storage medium, the storage medium being associated with the first user; receiving a request from a second user, the request identifying a digital content and the first user; in response to receiving the request from the second user, determining a location of the digital content; accessing the digital content based at least in part on the location of the digital content; and storing the digital content on the storage medium based at least in part on the authorization, wherein the determining, the accessing, and the storing are performed substantially free from interaction with the first user and the second user.

In still another embodiment, a computer-implemented method for retrieval of digital content is provided. The method includes receiving from a first user a request identifying a digital content and a second user, the request not having the digital content, wherein the second user includes a group of users; determining that a storage destination is associated with the second user; and in response to determining that the storage destination is associated with the second user, storing at least a part of the digital content on the storage destination wherein the determining and the storing are performed substantially free from interaction with the first user and the second user. The method may further comprise receiving from the first user a request identifying another digital content and a third user; determining that no destination is associated with the third user; and in response to determining that no destination is associated with the third user, generating a location reference to the other digital content, and sending a message to the third user, the message comprising the location reference, wherein the determining, the generating, and the sending are performed substantially free from interaction with the first user and the third user. In yet another embodiment, a computer-implemented method for transfer of digital content is provided. The method includes receiving from a device a digital content, the digital content being associated with a first user; storing the digital content on a storage medium in relation to a first user account, the storage medium not being part of the device and the first user account being associated with the first user; receiving a request for associating the first user with a second user, wherein the second user includes a group of users; determining that a storage destination is associated with the second user; and in response to determining that the storage destination is associated with the second user, copying at least a part of the digital content on the storage medium to the storage destination wherein the storing, the determining, and the copying are performed substantially free from interaction with the first user and the second user. The method may further comprise associating the digital content on the device with the digital content on the storage medium, wherein the associating is performed substantially free from interaction with the first user and the second user; and wherein receiving the request for associating the first user with the second user comprises receiving the request from the first user, the request indicating the second user and the digital content.

In yet another embodiment, a computer-implemented method for delivery of digital content is provided. The method includes receiving via a device a request from a user, the request indicating a location of a digital content and identifying a recipient, wherein the location of the digital content is not part of the device; retrieving the digital content based at least in part on the location of the digital content, wherein the retrieving is performed by another device; generating a message based at least in part on the request, the message comprising the digital content; and sending the message to the recipient wherein the retrieving, the generating, and the sending are performed substantially free from interaction with the first user and the second user. The method may further comprise analyzing the request to identify the location of the digital content and a body text; determining that the request comprises an indication to include the digital content in the message; and wherein generating the message based at least in part on the request comprises generating the message based at least in part on the request, the message comprising the body text and the digital content. Such an indication to include the digital content in the message may include an instruction from the user, wherein the instruction from the user is part of the body text. The method may further comprise removing the instruction from the body text.

The following detailed description, together with the accompanying drawings will provide a better understanding of the nature and advantages of the present invention.

Objects and Advantages

An embodiment of the present invention promotes or otherwise selects subject-matter entries or digital resources based on their relationships with members in a social network without the need of the members to explicitly rate or review the entries or digital resources, while taking into account such ratings or reviews if available. Such relationships include operations that a member may have performed on, for, or with the entries or digital resources. For example, a member may use a seller entry to compose an offer entry, thereby establishing a relationship between the member and the seller entry for the purpose of contributing to the visibility of the seller entry to other members, without the seller entry receiving explicitly a positive rating from the member. Another embodiment promotes or otherwise selects subject-matter entries based on their relationships with select members or groups of members relative to a member. Yet another embodiment replaces a list of entries with another list based on attribute values of those entries so promoted or otherwise selected for inclusion on the other list, both the list and the other list being sorted per some subject-matter attribute(s), thereby generating a more reliable ordered list of entries (i.e., the other list).

In addition, embodiments of the present invention may also provide methods, systems, processes and products that would greatly reduce problems of irrelevant content retrieval or search results that have been plaguing the Web or other information systems. For instance, a consumer who may be looking for scholastic and research literature on some health issues would often receive for his queries to a search engine a listing of webpages containing mostly advertising that are of no relevance to his intent or interest. Alternatively, he may be looking for advertising of products, services, or offers but instead receiving among the results many personal blogs that happen to include his query text. Yet, in embodiments of the invention, an online content system (e.g., the Web) would enable a digital resource or information provider to furnish or otherwise declare its resources or content in a context-aware manner. For instance, online consumers would be able to ascertain with ease and confidence that a given digital resource is of advertising nature, as determined or otherwise indicated by a contextualizing interface or protocol via which the digital resource may be obtained or otherwise presented. Existing web-based tools and technologies could readily be re-used to create greater value for both web advertisers and consumers. For example, a context-ignorant but otherwise unbiased search engine may be instructed to look for the query or search words or phrases only in web pages of advertising nature as determined or otherwise indicated by a contextually advertising protocol or interface. Such a search engine could easily outperform a very sophisticated search engine in ridding search results of contextually irrelevant webpages. An ad sponsor would be able to make available context-aware online advertisement to their most valued target audience (i.e., online shoppers who are attracted to unbiased search results and maximum content coverage and accuracy). Embodiments of the invention comprising a system, method or process would provide effective contextualization of digital resources (e.g., advertising webpages) without undue effort imposed on content production (e.g., ad production).

According to one embodiment, the present invention provides flexible and progressive interpretation of context-level inquiries and responses, comprising dialogue questions and answers respectively. It may lower the barrier to and enable incremental approach for providing effective dissemination of digital resources or online information. For instance, an ad content provider could simply type up an ad that is free of any special syntax needed for declaring and denoting the written content as advertisement, and the ad in its entirety may then be published online and made accessible via an advertising-context protocol or interface. An online ad with an unambiguous advertising context may therefore be established. The ad content provider may also choose to provide answers to a context-level protocol's set of dialogue questions relevant to the product or service his ad represents. These answers augment the online ad and may be regarded as either its data or metadata. They become readily available when the protocol is looking for answers from the ad in response to some dialogue questions. As preciseness of a dialogue response becomes more and more important for a successful advertising campaign, and therefore justifying its cost and effort, more tools and support may in turn become available to ad content providers and ad exhibitors. Subsequently, the cost to providing preciseness of dialogue responses, and of specification of product and service offers in general, would then become more affordable and usable to advertisers, large and small. Yet all this potential development may co-exist with yet the simplest form of ads (e.g., in unstructured pure-text format), affording the same unambiguous advertising context to ads of such simplicity.

According to another embodiment, the present invention makes possible a globally distributed open system for advertising, where ads may be placed online with a proper context. Given its simplicity, efficiency and transparency, this system could become the de facto advertising platform of choice for making offers of goods and services known locally and beyond, as Internet access, devices and applications become more and more ubiquitous and user friendly. This may also help discipline the Web at large to rid itself of a systematic exuberant advertising frenzy that is degenerative to the content integrity of its resources. Such advertising frenzy in large part results from the lack of better alternatives to the current status quo, online advertising on a context-free Web that offers the potential of global reach with seemingly low cost of entry.

Embodiments of the present invention make possible many useful features through its ability to establish a reliable and recognizable context without undue effort from content providers (e.g., a scholastic and academic context for researchers or an advertising context for advertisers and consumers). Further objects and advantages of embodiments of the present invention will become apparent from consideration of the other parts of the specification herein.

In addition, embodiments of the present invention may also provide access control to a collection of apps, and access to them needs not be individually authenticated. These apps may also be made invisible or opaque for privacy purposes. Different levels of app availability may also be made available so that only a subset of apps is visible and accessible to a user. For example, one level may be configured to make visible and accessible apps intended for children, while hiding other apps.

BRIEF DESCRIPTION OF THE DRAWINGS

FIG. 27 illustrates an example presentation or screenshot that an information retrieval system equipped with the present invention may present to a user through a device to which she is coupled.

FIG. 45 shows context-level interaction between an information requester and provider in accordance with an embodiment.

FIG. 46 shows context-level requests and responses between an information requester and provider in accordance with an embodiment.

FIG. 61 is an illustration of a content access directive according to an embodiment of the present invention.

FIGS. 62A and 62B illustrate structure of a content header according to an embodiment of the present invention.

FIG. 72 illustrates sample listing of digital content that may be used in the embodiment of FIG. 13.

DETAILED DESCRIPTION OF ILLUSTRATIVE EMBODIMENTS

Figure 1:
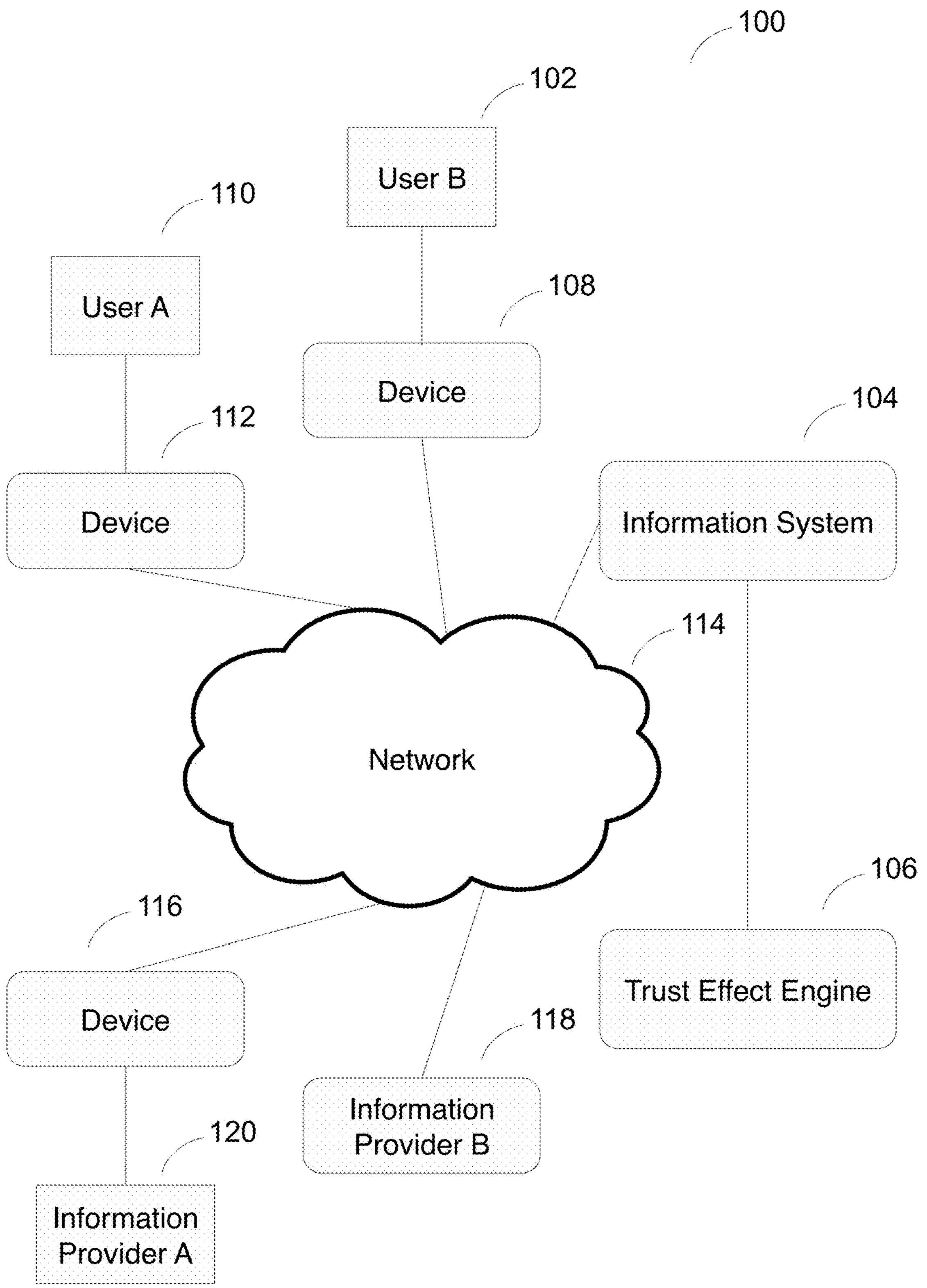
FIG. 1 illustrates an example environment for an embodiment of the present invention.

Disclosed are methods, systems, processes, and products for presenting information to or for a user in an environment based at least in part on the user's relationships with other participants in the environment. For instance, a method for presenting one or more digital resources (herein also referred to as entries) in relation to a request, interest or subject matter to or for a user in a system is described. Such a method may associate in a system one or more participants with a user, where the one or more participants may or may not include the user. The one or more participants may include information providers (e.g., authors, publishers, reporters, news agencies, websites, and so on), and other users. The method may accept in the system a plurality of entries, such as storing in a database the entries and identification of sources of the entries. Such an entry may include or be a reference to a digital resource (e.g., URLs—Uniform Resource Locators), and such a source of an entry may include or be URLs, URNs (Uniform Resource Names), and user IDs. The method may then receive in the system a request from the user, where the request may include a text, image, audio, and so on, and may be associated with a subject matter. The method may identify one or more of the entries based at least in part on the request (e.g., search results in response to a query), and determine one or more relationships between the one or more of the entries and the one or more participants. The method may establish or otherwise determine such a relationship based on identification of users (e.g., user IDs) being associated with the entries, identification of the entries (e.g., URLs) being associated with users, data or metadata relating users to entries (and vice versa). Such data or metadata may include the request, or part thereof; they may include a score, rank, flag, marker, indicator, or value; a vector of scores, ranks, flags, markers, indicators, or values; and a matrix of scores, ranks, flags, markers, indicators, or values. The method may then present the one or more of the entries to the user based at least in part on the one or more relationships. In another embodiment, a computer system equipped with the present invention may associate a set of participants with a user, receive a request from the user about a subject matter, determine a plurality of digital resources based on the request, determining that a relationship exists between a member of the plurality of digital resources and the set of participants, and then present a set of digital resources to the user based on the relationship, wherein the set of digital resources may comprise the member of the plurality of the digital resources.

The set of participants or the one or more participants may comprise the user, members, or information providers in or via other systems. The user may be associated with a multiple groups of participants, where each group as a whole may also be regarded as an individual participant. A Trust Network herein refers to a collection, group, or set of participants or a membership in or via one or more systems whose activities and/or behavior in the systems may affect entries that the one or more systems may present to a user, for example, in response to his query or request. The activities or behavior may include (but not limited to) a submission, review, rating, and usage of entries in the systems. The user may be associated with more than one Trust Network. More than one user may collectively be associated with one or more Trust Networks. Accepting one or more entries in a system equipped with the present invention may include acquiring one or more entries from users in the system, or from automated means such as Web crawling. Such accepting may also include indexing the one or more entries. Storing one or more entries may include indexing the entries in accordance to some criteria or parameters, the criteria or parameters including identification of one or more users in the system having an association or relationship, if any, with each of the entries. Such an association or relationship may include a submission, usage, review, or rating relationship. In one embodiment, such an association or relationship may assume different degrees or levels of relevancy or importance. For example, repeated usage of an entry by a user or the duration of an entry on a user's favorite or bookmark list may constitute a higher degree or level of relationship between the entry and the user. In another embodiment, such a relationship may also be characterized as positive, negative, non-positive, non-negative, or neutral. For example, a user providing a negative rating or a rating below a certain threshold against an entry may constitute a negative relationship between the entry and the user. In an embodiment, a neutral or positive relationship may cause the entry in question to be considered for presentation or comparison, whereas a negative relationship may cause the entry to be omitted or ignored even though the entry may have been deemed relevant to the user request in question. In yet another embodiment, a relationship between an entry and a user may change over time, for example, from existent (e.g., on the user's bookmark list) to non-existent (e.g., off the user's bookmark list), and then back to existent (e.g., the user's bookmarking the entry again), or from positive (e.g., the user's associating a positive rating with the entry) to negative (e.g., the user's associating a negative rating with the entry).

A source of the entries may include identification of users that provide or otherwise make available the entries in the system. The subject matter may include a retail offer, a collection of offers, a news item, a collection of news items, an event, a collection of events, an announcement, a collection of announcements, and so on. A request from the user may include a user-provided query, a system-generated query, or a combination thereof. In one embodiment, Such a request may also include an indication to activate a step of determining of one or more relationships between the entries and the participants, and a step of presenting the one or more of the entries to the user based at least in part on the one or more relationships, so to replace a step of presenting the one or more of the entries to the user based at least in part on the request. In another embodiment, such an indication may be received additionally before or after the request, or independently from the request. In yet another embodiment, a request from the user may include an indication to reverse or switch between these two processes. Such an effect or impact on the presentation to a user of the one or more entries based at least in part on the one or more relationships between the one or more of the entries and a set of participants, and/or between the user and a set of participants, is herein referred to as Trust Network Effect™, or simply Trust Effect™.

In an information system, such as a search engine or social network, a multitude of digital resources or discrete information units (e.g., webpages, news items, retail offers, performance show times, photos, songs, videos), herein also referred to as entries, are available to users whose one of the primary challenges is to discover, receive, or otherwise access relevant entries as quickly as possible. In response or relation to a user's query or interest for information, an information system equipped with the present invention may, for instance, be capable of selecting for presentation entries based at least in part on relationships between the entries and one or more participants in the system, and/or between the user and one or more participants in the system. In one embodiment, a relationship between a user and a digital resource may be established or otherwise construed based on a submission, usage, review, or rating by the user in relation to the digital resource. A relationship between a user and another user, or between a user and a participant in a system, may be established or otherwise indicated statically by the user, participant, or the system. In another embodiment, such a relationship may be established or otherwise determined dynamically by the system, for example, based on users' identity visibility, logon statuses, privacy settings, trustworthiness scores, and so on.

The one or more participants whose association with a user may be considered as part of the selection criteria of entries in relation to the user's request or interest may be regarded as member of a Trust Network for the user in question. Such capability or functionality may also be referred to as Trust Network Effect, or simply Trust Effect. More than one user may share the same Trust Network, while a user may be associated with more than one Trust Network. The user or system may choose a subset of multiple Trust Networks or individual members in a Trust Network for consideration of Trust Effect, whether individually (e.g., the logical OR relationship) or as a series or union of criteria (e.g., the logical AND relationship). The one or more participants may include users in the information system, as well as providers of information to the system. According to an embodiment, a Trust Network for a given user may not include the given user. The membership in a Trust Network may be explicitly stated or otherwise indicated by the user or his group to which the Trust Network is applicable. Or it may be established, dynamically or otherwise, via the user's direct or indirect associations or affiliations with other users or groups. One or more of these other users or groups may make up a Trust Network. Any manner or type of association in creating or constituting a Trust Network is within the scope of various embodiments. For instance, in one embodiment, a user may be deemed being associated with another user when the other user has configured his account to follow the activities or submissions of the user, or to mark the user as his favorite. In another embodiment, all users whose identities are known (e.g., via logon) to the system or the users may by system default belong to a Trust Network with respect to each other, whereas users whose identities are not known (e.g., a user of the system without logging on) are considered outside the Trust Network.

In some embodiments, entries are related by time or space to one another for or via a subject matter. For example, prices for an item at a seller may represent individual entries, where the item and/or price availability at the specific seller may be regarded as the subject matter. Each price entry may also be an update to an older price entry for the same item at the same seller. Sellers available in a given geographical area (whether for a particular item or not) may be related to one another in reference to a geographical point or center in the area. Their corresponding entries may then be compared or otherwise presented in accordance to their locations. In this case, the subject matter of these seller entries may be that of available sellers in the given geographical area. Likewise, entries for parties, shows, or performances available in a given city may also be related to one another by distance to a point of geographical reference, by start time, or by ticket price. Entries for events or news in a country (or organization), of a specific interest (e.g., science and technology), or for a celebrity, may be related by time. Some embodiments may remove, suppress, or otherwise omit entries for presentation or comparison that may have otherwise been included for such operation if without consideration of associations or relationships between users in a system and their associated or related Trust Networks. Some other embodiments may add or otherwise include entries for presentation or comparison that may have otherwise been omitted if without consideration of such associations or relationships.

FIG. 1 illustrates an exemplary environment 100 for presenting digital resources or entries to a user with consideration to his Trust Network(s). User A 110, user B 102, information provider A 120, and information provider B 118 are communicatively coupled to an information system 104 via a network 114, and are participants in the system. As depicted, information provider A 120 is connected to network 114 via device 116. Information providers such as information providers A 120 and B 118 may be sources of digital resources or entries available in or via the information system. Users such as users A 110 and B 102 may be consumers of these resources or entries. For example, they may search, request, or otherwise retrieve entries (including references to entries) from the information system 104. In some embodiments, users may also submit or otherwise contribute to the information or database (not shown) available through or maintained by the system. They may therefore be regarded as information providers. Users and information providers (esp. human ones) often use a device, e.g., a mobile phone, tablet computer, desktop computer, (such as device 108 or 112), for access or communication to an information system (such as the information system 104), while machine users (not shown) and information providers (e.g., information provider B 118) may communicate directly with the information system without such an intermediary. According to one embodiment, the information system 104 may interact with a plurality of users at their device via a website or an application running on the device. Entries or references to entries (e.g., URLs, which may also be considered as entries themselves) may be created or edited via the information system 104, or submitted or otherwise transmitted individually or as a batch to the system 104 via the network 114. According to some embodiments, a user associated with a device (e.g., users A 110 and B 102) may submit an entry to the information system 104. An example entry is an offer entry, which may comprise information for an item, seller and price. The information system 104 may also accept or retrieve information for an entry (e.g., an offer or offer entry) from information providers (e.g., information providers A 120 and B 118).

A trust effect engine 106 is coupled to the information system 104. The trust effect engine 106 may process entries in relation to Trust Networks for a user or a group of users who may share the same Trust Networks or their equivalents. It may manage the Trust Networks and determine direct or indirect relationships, if any, between the entries and the Trust Networks. It may revise, advise, or otherwise cause in relation to these relationships the selection of entries for presentation to the user or group of users in question. For example, the information system 104 may present to a user via his associated device an entry older than another entry for the same subject matter in response to his request for the latest entry for the subject matter, if a Trust Effect setting, or something similar or equivalent, is enabled for the user in general or for this particular request, and the information provider of the entry is a member of the user's Trust Network whereas the information provider of the other (albeit more recent) entry is not. The trust effect engine 106 may also cause the information system 104 to remove, suppress, omit, or otherwise downgrade for presentation some entries against a subject matter (e.g., updates to an event or opinions to a topic) that lack relationships with a user's Trust Networks. According to one embodiment, the trust effect engine 106 may comprise a module associated with the information system 104. According to another embodiment, an entry may be deemed relevant to a user's request only if a minimum number of distinct members in the user's Trust Network have a positive, relevant or applicable relationship, direct or indirect, with the entry. Such positive, relevant or applicable relationships include (but not limited to) a positive rating for the entry, or usage of the entry for a request or as part of another entry that these members may make or submit.

In one embodiment, user A 110 may indicate to the information system 104 that user B 102 is his friend or favorite. As a result, the information system 104 (or the trust effect engine 106 coupled to the information system 104) adds user B 102 to user A's Trust Network. User A 110 may also explicitly mark user B 102 as trusted, thereby adding user B 102 to his Trust Network, even when user B 102 is neither his friend nor favorite (the information system 104 may provide an option for User B 102 to opt out of being a member of user A's Trust Network). After user B submits an offer entry for item ABC (not shown) available at seller XYZ (not shown), another user (not shown) submits an offer entry for the same item and seller, thereby updating the price information for item ABC available at seller XYZ. With the Trust Effect setting (or herein simply Trust Effect) enabled by or for user A (on a per request basis, or an on on-going basis) thereby engaging the trust effect engine 106 or metadata (e.g., attributes in indexes of offer entries in the system) that the trust effect engine 106 may produce or otherwise contribute, the information system 104 may be configured to present to user A 110 the offer entry submitted by user B 102 as the current offer for item ABC at seller XYZ instead of the one submitted by the other user, if the other user is not a member of user A's Trust Network in effect or consideration. That is, without Trust Effect enabled, when user A searches or otherwise requests the current offer information for item ABC, the information system may present him via his associated device the offer information (e.g., the price) as submitted by the other user when seller XYZ or its latest offer is deemed relevant to user A's search or request (e.g., within a price or distance range, or in certain locations).

Figure 2:
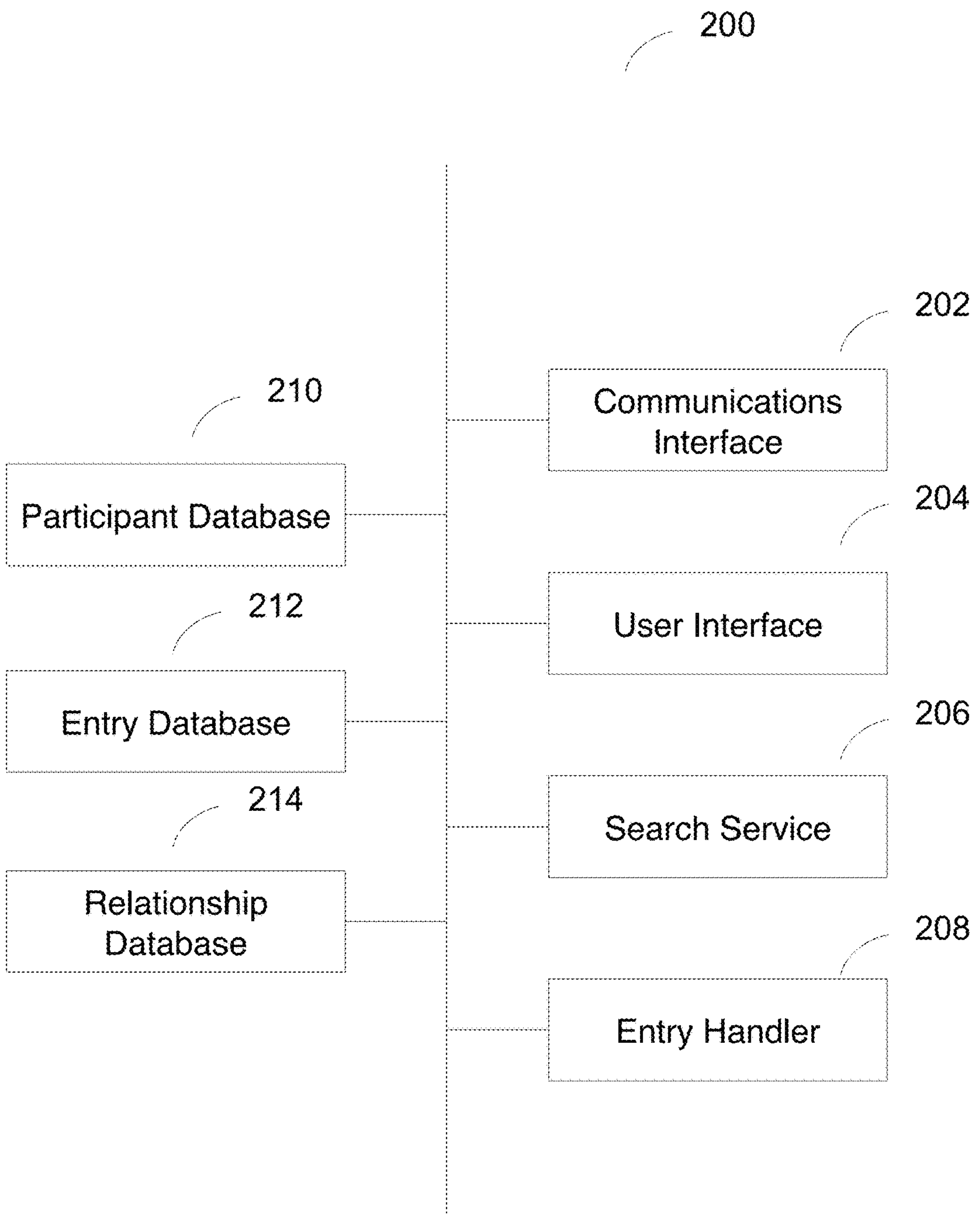
FIG. 2 illustrates an example block diagram for an information system in accordance with an embodiment of the present invention.

FIG. 2 shows a block diagram of an exemplary information system 200, such as the information system 104 shown in FIG. 1. A communications interface 202 is provided for communicating with devices, information providers, and users over a network, such as user A 110, information provider A 120, and the devices 112 and 108 shown in FIG. 1. Through the communications interface 202, entries may be retrieved from (e.g., Web crawling) or submitted by information providers, and requests for entries may be received from users. Other types of data or directives, e.g., a Trust Effect setting for individual requests or users, may also be transmitted via the communication interface 202. Any type of communications interface is within the scope of various embodiments.

A user interface 204 is provided for interacting with users and their coupled or associated devices, and it may include the logic or procedures for user identification or authentication, submission of requests and entries (or references to entries), management of user data, and presentation of entries. Any layout, format, mode (e.g., audio), policy, scheme, or rules pertaining to these activities including but not limited to submission, creation, acquisition, selection, and presentation of entries and related data or metadata such as entry dates, identification of information providers and users, trust network relationships and the like are within the scope of various embodiments.

A search service 206 (or engine or module) is provided for maintaining (such as indexing entries) and searching (such as accepting queries from users) data and metadata available in or via the information system 200, such as those pertaining to various entities such as information providers, users, entries, relationships, and so on. Data and metadata (e.g., indexes of the entities available in or via the system) may be stored and maintained in databases for entities of interest (e.g., participant database 210, entry database 212, and relationship database 214), or some other databases (not shown). For example, a participant database 210 may be divided into an information provider database (not shown) and a user database (not shown). The search service 206 may interact with the trust effect engine 106 for further processing of its selection of entries, for example, in response to a user's query or request.

An entry handler 208 is provided for processing and retrieving entries from information providers (including users), as well as for interacting with users when they create or edit entries via their coupled or associated device. It may cause the search service 206 to store entries and related data and metadata in their respective databases or some other databases. According to one embodiment, the storing may include indexing the entries, or interacting with the trust effect engine 106, for example, to cause the trust effect engine 106 to determine relationships between the entries and Trust Networks that the information system 200 may maintain and to update such relationships in databases.

A relationship database 214 is provided for storing relationships among entities available at or via the information system 200, including but not limited to relationships between entries and participants such as information providers and users, those between entries and users' requests, those among users (e.g., following and followed), those between users and user categories (e.g., qualification for participation in Trust Networks), and those between entries and Trust Networks. Example relationships include memberships of information providers in users' Trust Networks, and submissions, usages or recommendations of entries by information providers. Any type of inter-entity type relationship is within the scope of various embodiments for the relationship database 214. Intra-entity type relationships may also be stored in the relationship database 214, their respective entity-type databases (not shown), or some other databases (not shown).

An entry database 212 is provided for storing entries and/or references to entries including identification of their sources (e.g., information providers), as well as other related data or metadata (e.g., submission time, cached copies of entries, tags, keywords). Relationships among entries (or their equivalent data or metadata) may also be stored in the entry database 212. For instance, entries may be related to one another by subject matter, time or geographical space or distance. According to one embodiment, the search service 206 may retrieve a plurality of entries against some relationship criteria with respect to the entries in the entry database 212. For example, for a database of offer entries or offers, the search service 206 may obtain the latest price information for an item for a particular quantity at a specific seller, the historical price information for the same item for the same quantity at the same seller, or all current offers for the same item from sellers within some geographical designation, distance, or perimeters.

A participant database 210 is provided for storing information about participants (including information providers and users) in the information system 200. There may be different types of categories of participants and the information pertaining to each type may differ. For instance, a user record in the participant database 210 may comprise an identifier, display name, logon credential, and so on. An information provider record may comprise an identifier, display name, location, logon credential, entry retrieval policies, and so on.

Although the information system 200 is described as being comprised of various components (the communications interface 202, user interface 204, search service 206, entry handler 208, relationship database 214, entry database 212, and participant database 210), fewer or more components may comprise the information system 200, or the information system 104 shown in FIG. 1, and still fall within the scope of various embodiments. For instance, the search service 206 may include modules, components or functions for or equivalent to the entry handler 208. The search service 206 or entry handler 208 may include modules, components or functions for or equivalent to the trust effect engine 106 coupled to the information system 104 shown in FIG. 1.

Figure 3:
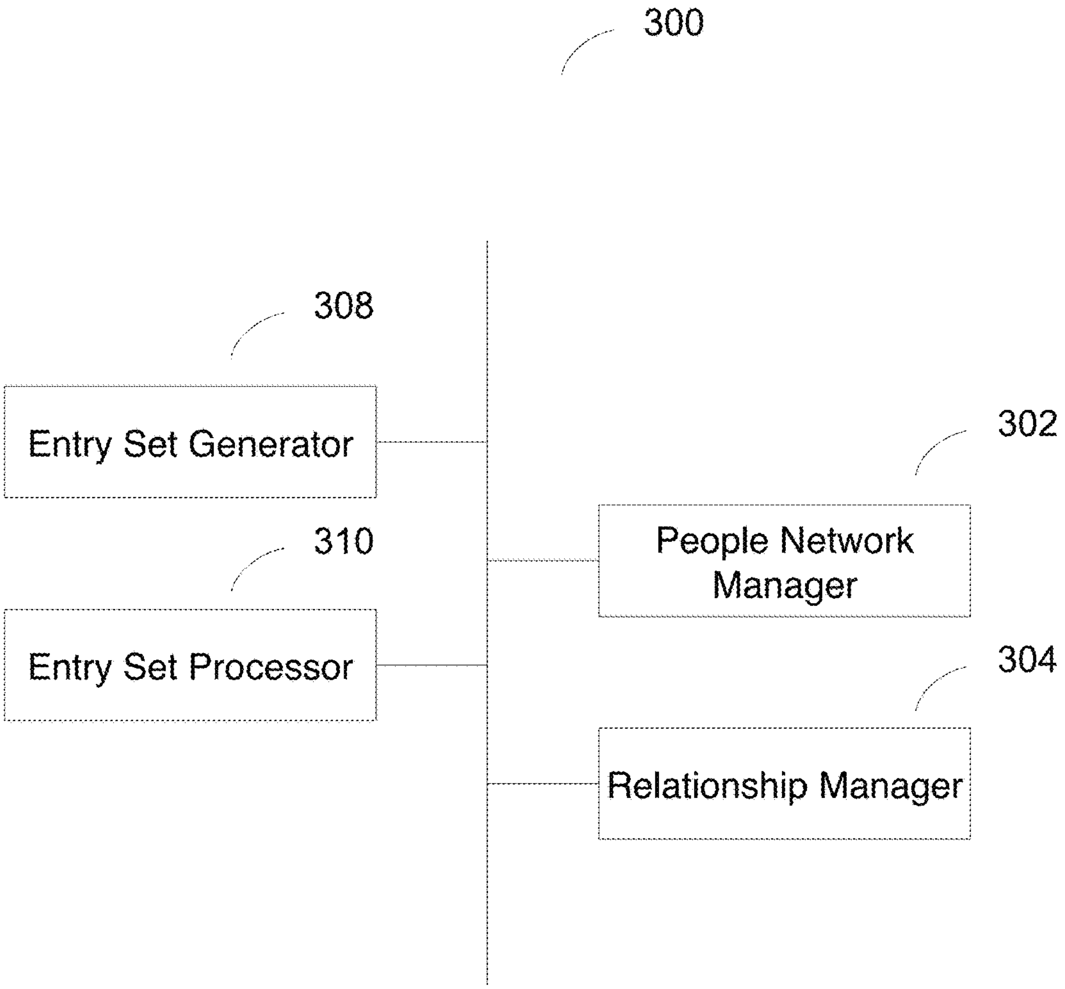
FIG. 3 illustrates an example block diagram for a trust effect engine in accordance with an embodiment of the present invention.

FIG. 3 shows a block diagram of an exemplary embodiment of a trust effect engine 300, such as the trust effect engine 106 shown in FIG. 1. The trust effect engine 300 comprises a people network manager 302, relationship manager 304, entry set processor 310, and entry set generator 308.

The people network manager 302 is provided for establishing, maintaining, and accessing membership information in a Trust Network for a user or group of users stored in the participant database 210. Such membership information may be created explicitly by the user (e.g., via the user interface), or by his association with other users, such as their being his friends or favorites. (Such membership information, associations, or relationships may be stored in the relationship database 214.) The people network manager 302 may receive requests and/or notifications from components in the information system 104, or otherwise monitor their activities so to create, update and destroy Trust Networks accordingly.

The relationship manager 304 is provided for establishing and maintaining relationships stored in the relationship database 214 or its equivalent, such as those between entries stored in the entry database 212 and Trust Networks maintained in or otherwise derivable from the relationship database 214. Such relationships may include (but not limited to) submission, usage, reference, review, or rating relationships between entries and members in Trust Networks. For example, a member in a Trust Network may use an existing item entry to construct a new offer entry before submitting the latter to the information system 104. This may be regarded as a relevant, applicable or positive relationship (e.g., of usage) between the item entry and the Trust Network in question. Such relationships may be stored in the relationship database 214, or entry database 212 (e.g., in fields that are part of an index of entries in the entry database 212). Alternatively, the relationship manager 304 may provide the relevant relationship information directly to the entry set processor 310 upon request or on demand.

The entry set processor 310 is provided for determining what entries in a set of entries, and/or other entries related to the set, as provided by the search service 206 (e.g., in response to a user's query or chosen interest) should be selected, included, or otherwise promoted in relation to relationships, if any, for example, between the entries in the set and a Trust Network in question, or otherwise establishing data or metadata for the same (e.g., in the entry database 212, relationship database 214, and/or some other databases (not shown)). Such relationships may include submission, usage, reference, review, or rating relationships between entries and members in the Trust Network, or any relationship types such as those described earlier, as may be determined by the relationship manager 304. According to some embodiments, the size of the set of entries may be bounded so that entries that may otherwise be deemed relevant by the search service 206 for the user or his request, but excluded from the set of entries due to this size limit, would not be considered by the entry set processor 310 in its determination of relevancy of entries in relation to the user's Trust Network for the user or his request.

The entry set generator 308 is provided for generating an entry set based at least in part on the entries so selected, included or otherwise promoted by the entry set processor 310. The entry set generator 308 may, for instance, apply to these entries some presentation rules or criteria associated with or otherwise intended for the original, initial, or input entry set as received or otherwise worked on by the entry set processor 310. For example, the entry set processor 310 may receive a set of current offer entries at various sellers from the search service 206 whose intent or criterion is to order the offer entries by time or distance for selection or presentation. The entry set processor 310 may replace some of the current offer entries with older ones for the same sellers given the latter are provided by members in a Trust Network in question, and remove a few offer entries because none of the offer entries for their corresponding sellers is provided by any member in the Trust Network. The entry set generator 308 may therefore apply or re-apply the time or distance ordering to the resultant set of entries as provided by the entry set processor 310. In this case, for instance, the search service 206 may then select the top ten entries from the resultant set and present them as initial results to the user via his coupled device. In some embodiments, the entry set generator 308 may be configured to select and present entries to users via the user interface 204.

Although the trust effect engine 300 is described as being comprised of various components (the people network manager 302, relationship manager 304, entry set processor 310, and entry set generator 308), fewer or more components may comprise the trust effect engine 300 or the trust effect engine 106 shown in FIG. 1, and still fall within the scope of various embodiments. For instance, the people network manager 302 and the relationship manager 304 may be combined into a single functional component, while the entry set processor 310 and the entry set generator 308 may be combined into another one. The entry set processor 310 may be configured to provide the function or module for or equivalent to the relationship manager 304. According to some embodiments, the entry set generator 308 may be optional. In addition, any of these components of the trust effect engine 300 may be incorporated into the information system 200, and the components of the information system 200 may assume the role or function of any of these components of the trust effect engine 300. That is, the trust effect engine 300 or its functions or components may be embedded into the information system 200, or its entire functionality be realized as part of the search service 206 or distributed into the various components in the information system 200. For example, the search service 206 may provide the function or module for or equivalent to the entry set processor 310 and/or entry set generator 308, while the user interface 204 may provide the function or module for or equivalent to the people network manager 302 and/or relationship manager 304.

Figure 4:
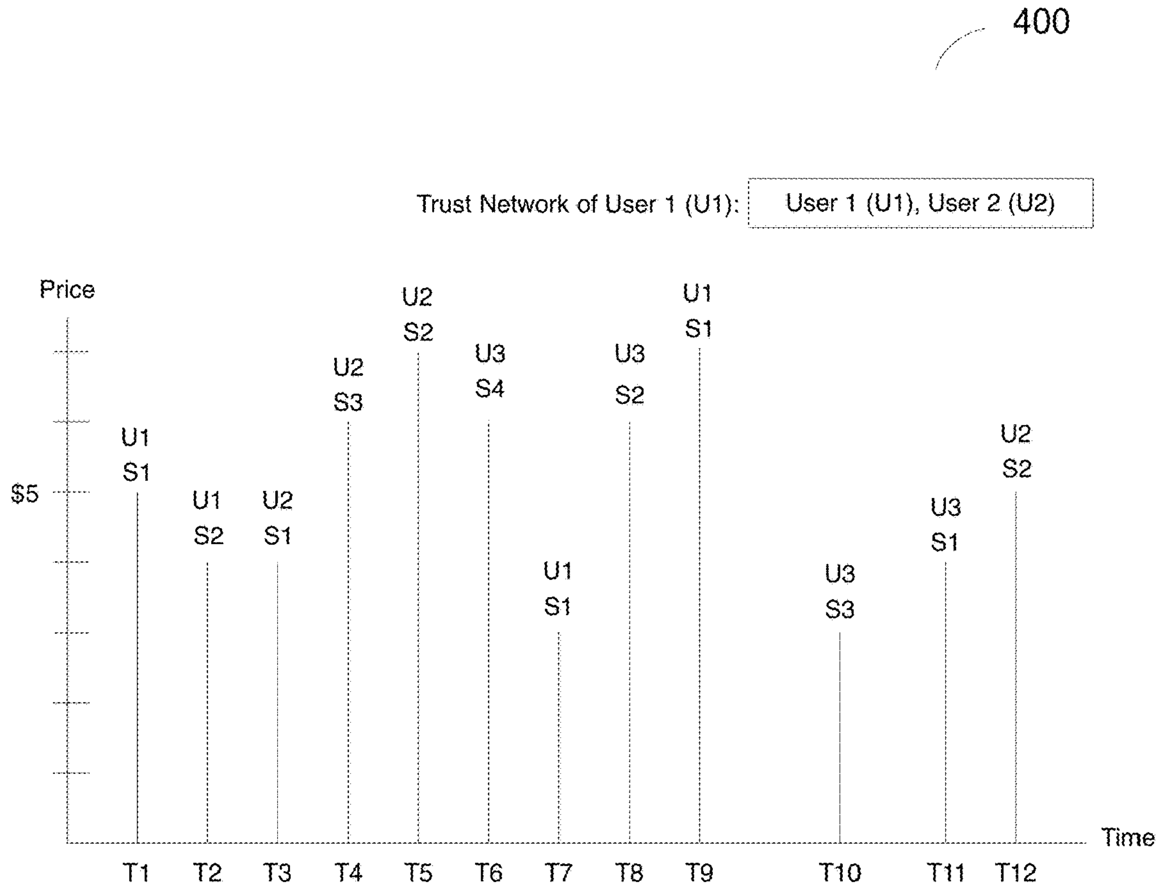
FIG. 4 provides an illustration for an example system, process, or product result in accordance with an embodiment of the present invention.

FIG. 4 provides an illustration 400 of an operational effect by an embodiment (a method, system, process, or product) in an exemplary environment (such as the environment 100 shown in FIG. 1). In relation to this illustration, there are three users (namely, U1, U2, and U3) and four sellers (namely S1, S2, S3, and S4). The embodiment, which may be an offer repository system (not shown) equipped with the present invention, may comprise both an information system (such as the information system 200 shown in FIG. 2) and a trust effect engine (such as the trust effect engine 300 shown in FIG. 3). It may identify and interact with these users or their coupled devices via the user interface 204. Such identification, among many options or mechanisms in the art, may be based on prior user authentication using logon credentials stored in the participant database 210.

Via the user interface 204, U1 identifies U2 as his friend in the system, thereby causing the people network manager 302 to add U2 to U1's Trust Network, and store this association or membership in the relationship database 214. For this particular embodiment, a user is by default also a member of his own Trust Network (e.g., U1 is a member of U1's Trust Network).

The entry handler 208 receives via the user interface 204 or communications interface 202 a plurality of offer submissions for a particular item. Over time, these users have together submitted or sent twelve offer submissions for the item available at the various sellers, as illustrated in FIG. 4. For each offer submission, the entry handler 208 creates an offer entry in the entry database 212, along with identification of its submitter or provider. Each offer entry comprises a time (i.e., one of the 12 submission times, namely T1 to T12), seller information or its identification (i.e., for one of 4 sellers, namely S1 to S4), and price information (e.g., currency and amount). The submitter or provider information (i.e., for U1 to U3) may be stored as part of the offer entry, or as separate data associated with the offer entry in question.

Then U1 or his coupled device sends the system via the communications interface 202 a query for the current offer information in relation to the item. The user interface 204 receives the request and directs it to the search service 206. By default or configuration in the system, Trust Effect for U1 is disabled. As such, the search service 206 retrieves from the entry database 212 the offer entries representing the current offers at the four sellers, namely: offer of $4 at time T11 for seller S1 as submitted by user U3 (i.e., Offer(T11, S1, U3)=$4), offer of $5 at T12 for S2 by U2 (i.e., Offer(T12, S2, U2)=$5), offer of $3 at T10 for S3 by U3 (i.e., Offer(T10, S3, U3)=$3), and offer of $6 at T6 for S4 by U3 (i.e., Offer(T6, S4, U3)=$6), and returns them to the user or his device via the user interface 204 or directly via the communications interface 202. Either by the system's preference or upon U1's request, the search results may also be ordered by time (e.g., the most recent first) or price (e.g., the lowest price first). In this case, the result list may be as follows: if sorted by time (most recent first): Offer(T12, S2, U2), Offer(T11, S1, U3), Offer(T10, S3, U3), Offer(T6, S4, U3); if sorted by price (cheapest first): Offer(T10, S3, U3)=$3, Offer(T11, S1, U3)=$4, Offer(T12, S2, U2)=$5, Offer(T6, S4, U3)=$6. This scenario is depicted in FIG. 4.

With Trust Effect turned on for U1 (e.g., as part of his query request, a user profile setting stored in the participant database 210, or as determined by any component in the information system 200 and/or trust effect engine 300), a query from the user for current offers in the system would cause the search service 206 to invoke the entry set processor 310 to select entries from either the entry database 212 and/or directly from the search service 206 in accordance to their relationships with U1's Trust Network(s), wherein the entries may differ from those that would otherwise fulfill the selection criteria of the user query or request. For instance, the entry set processor 310, based on input (e.g., that U1 and U2 are in the Trust Network in effect) from the relationship manager 304 (either directly, or indirectly such as having pre-computed metadata stored in the entry database 212 or relationship database 214), may identify Offer(T6, S4, U3), Offer(T8, S2, U3), Offer(T10, S3, U3), and Offer(T11, S1, U3) as irrelevant to the request of U1. The search service 206 or entry set processor 212 may then return the following as results to the user or his device: Offer(T9, S1, U1)=$7, Offer(T12, S2, U2)=$5, and Offer(T4, S3, U2)=$6. If the results are to be sorted by time (e.g., most recent first) or price (e.g., lowest price first), then the entry set generator 308 (whose function may also be embedded in or otherwise realized by the search service 206 or the entry set processor 310) may generate the following result list: if sorted by time (most recent first): Offer(T12, S2, U2), Offer(T9, S1, U1), and Offer(T4, S3, U2); if sorted by price (cheapest first): Offer(T12, S2, U2)=$5, Offer(T4, S3, U2)=$6, and Offer (T9, S1, U1)=$7. This scenario is depicted in FIG. 4.

Figure 5:
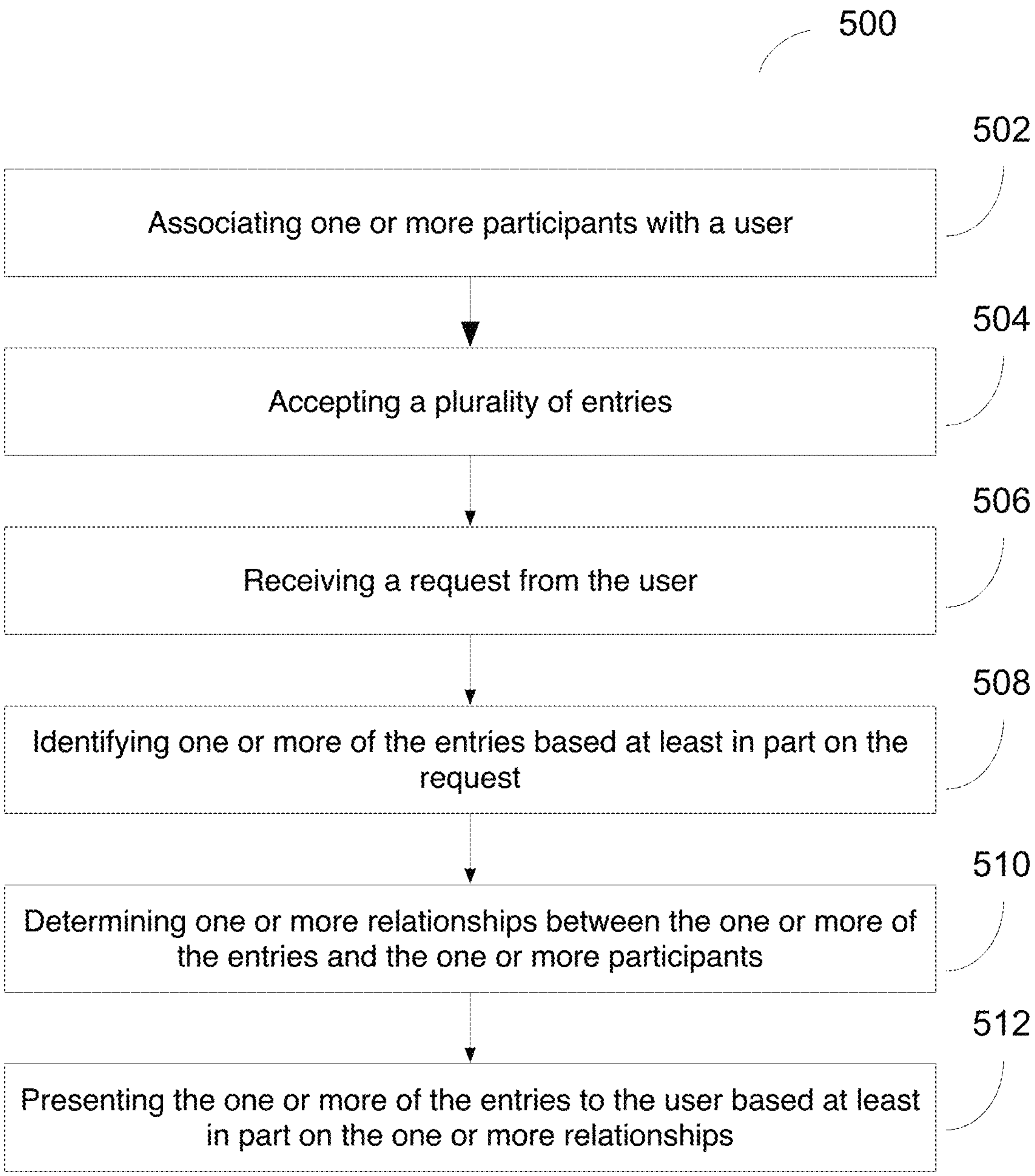
FIG. 5 illustrates a flow diagram of an example process for an embodiment of the present invention.

FIG. 5 shows a flow diagram of an exemplary process 500 for presenting entries to a user based at least in part on relationships between the entries and the user's Trust Network(s). A device or system embodying the present invention or otherwise equipped with the present invention, such as the one shown in FIG. 1, FIG. 2, or FIG. 3, may carry out, implement, or otherwise effect this exemplary process. Per the example process 500, one or more participants (including users and information providers) may be associated with a user in a system (502), where such association may constitute a Trust Network having the user and the one or more participants as members of the Trust Network. For example, the people network manager 302 shown in FIG. 3 may use a list of friends or favorite users or information providers established by the user as the association for creating such a Trust Network for the user in question. Per the example process 500, the system may accept or otherwise retrieve a plurality of entries from one or more participants (504). For example, the entry handler 208 may examine (e.g., by Web crawling) the Web for entries of interest, and store these entries and/or references (e.g., URLs) to these entries, as well as receive submissions from users and other information providers. The identification of sources or submitters of the resulting entries are also recorded, for example, in the entry database 212. Per the example process 500, the system is also capable of receiving a request for information from the user (506), the information comprising one or more entries available in or via the system, and being subject to the Trust Effect setting in relation to the user's Trust Network(s). For example, the user or his device may send a text query via the communications interface 202 to the user interface 204 of the system. The user interface 204 may in turn pass the query to the search service 206. Per the example process 500, the system identifies one or more of the entries available in or via the system in relation to the request (508). For example, the search service 206 may retrieve in the entry database 212 the entries that it considers as relevant to the query based at least in part on the text in the query. Per the example process 500, the system may also determine any relevant relationships between the one or more of the entries and the one or more participants (e.g., in the Trust Network(s) associated with the user) (510), and present the one or more of the entries (or a subset of them) to the user based at least in part on these relevant, applicable or positive relationships (512). For example, the search service 206 may identify in response to a user's request for the top 10 items the 100 most popular items from the entry database 212 among a system or community of users. The relationship manager 304 may determine the relationships between these 100 entries and the Trust Network(s) of the user sending the request. Based on these relationships (e.g., a submission or purchase relationship), the entry set processor 310 may decide 77 out of these 100 item entries are irrelevant to the user's request (e.g., all the other 23 items have either been submitted or purchased by members in the user's Trust Network(s)). The entry set generator 308 may create a new result list of top 10 item entries based on these other 23 item entries in the entry database 212. The search service may then return this result list to the user via the user interface 204. As another example, the search service 206 may identify in response to a user's request for a sorted-by-price list of current offers for a particular item. Without yet having these offer entries sorted by price, the search service 206 may cause the entry set processor 310 to omit or replace any of these current offer entries with one in the entry database 212 containing an older price for the same item and seller, if there is no applicable or relevant relationship between the current offer entry in question and the user's Trust Network, while there is one between the older price offer entry and the Trust Network, the relationship being determined by the relationship manager 304, either prior to or after the user interface 204 receiving the user's request. The entry set generator 308 may sort by price the applicable or relevant offer entries as determined by the entry set processor 310 and provide the corresponding list of offer entries to the user via the search service 206 or user interface 204. A scenario similar to the one in this example is depicted in FIG. 4. In addition, a maximum limit on the size of the initial entry set as determined by the search service 206 in response to a user's request may be set, so that only those entries in the initial entry set are considered by the entry set processor 310 in relation to their relationships with the user's Trust Network. For example, a user may request for a list of seller locations within 100 meters of his current position, with the closest sellers appearing first on the list. If such a maximum limit is set to 50, then only the entries of the 50 closest sellers would be passed to the entry set processor for further processing, even if there are more than 50 sellers within the 100 meter perimeters. A user and/or system may set or otherwise impose such a limit. Furthermore, according to one embodiment, the search service 206 may combine into one the functions or steps of identifying entries in the entry database 212 in response to a user's request, determining relationships between the entries and the user's Trust Network, and presenting to the user one or more of the entries based at least in part on the relationships. For example, the search service 206 may identify the relevant entries based on both the user's request and relationships between the entries in the entry database 212 and the user's Trust Network in a single batch or sequence of operations, or via a single query to the entry database 212 or another database. Data, metadata, or fields for determination of relevancy to a user's request and of relationships between entries and the user's Trust Network(s) may be stored or otherwise made available in the entry database 212 or some other database(s).

It should be appreciated that the specific steps illustrated in FIG. 5 provide a particular method of presenting entries to a user based at least in part on relationships between the entries and the user's Trust Network(s) according to an embodiment of the present invention. Other sequences of steps may also be performed according to alternative embodiments. For instance, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives. For example, the step of accepting a plurality of entries (504) may be omitted or otherwise replaced by a step of crawling an information repository (e.g., the Web) or combined into the step of identifying one or more of the entries based on the request (508). The step of determining one or more relationships between the one or more of the entries and the one or more participants (510) may combine with the step of determining one or more of the entries based on the request (508) so that, for example, only entries that are determined to be associated with the one or more participants would be considered for relevancy to the request. These combined steps may further be enhanced or otherwise modified to take into consideration of the request from the user in relation to the one or more participants, for example, whether these participants have submitted similar requests, and if so, what entries were deemed more preferred to these participants (e.g., that they have bookmarked the entries) in relation to these similar requests. The step of determining one or more relationships between the one or more of the entries and the one or more participants (510) may also comprise determining the degree or level of the relationships and/or whether they are deemed positive, negative, or neutral. The step of presenting one or more of the entries to the user based on the one or more relationships (512) may further comprising considering if a certain set of criteria is met for choosing the one or more of the entries, such as a minimum number of users in a Trust Network having a non-negative relationship with the entries, or for ignoring an entry when someone in a Trust Network has a negative relationship with the entry within the last 60 days. Either the user or system may specify the criteria. And there may be more than one set of criteria, for example, with a Trust Effect score associated with each set.

Figure 6:
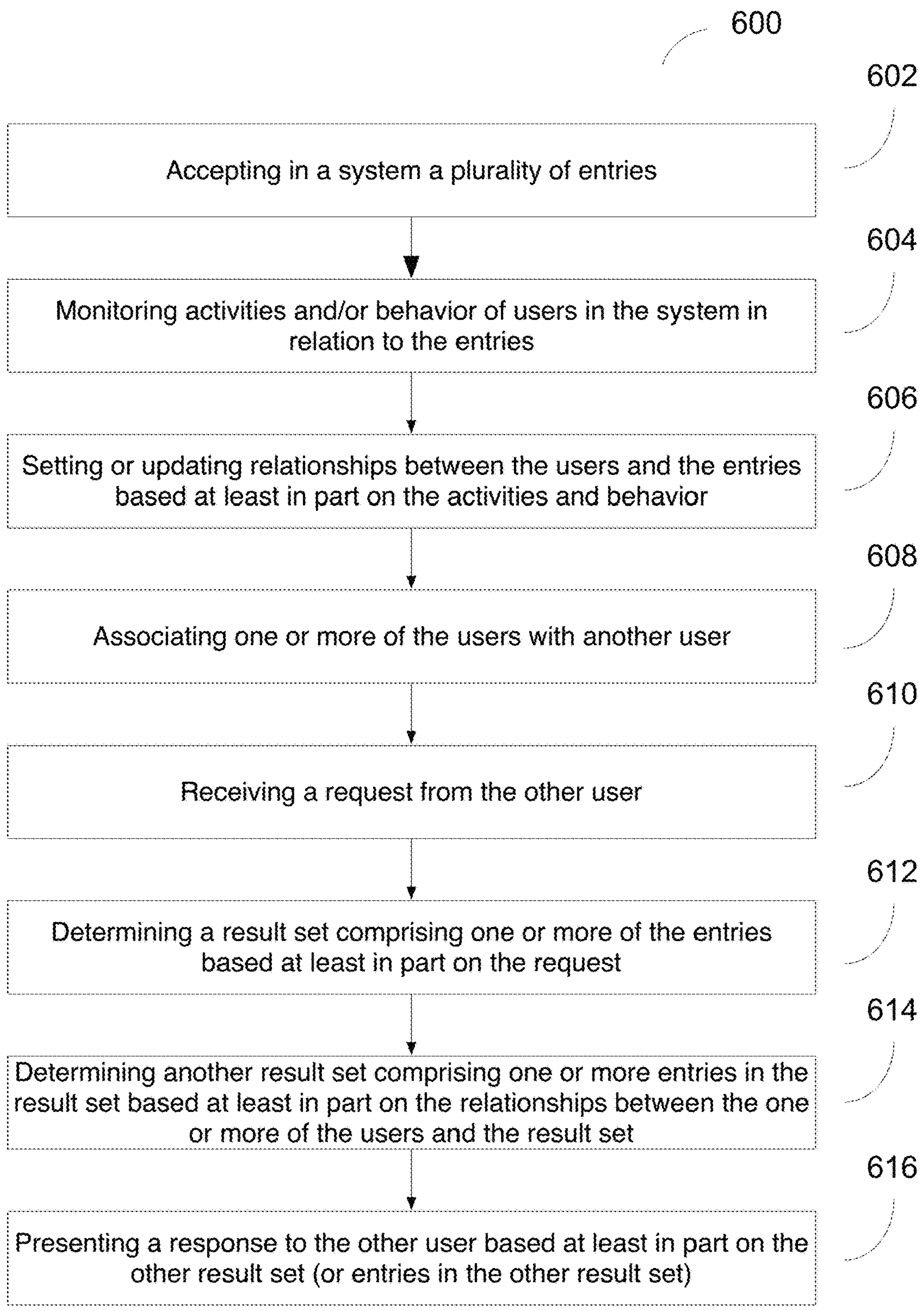
FIG. 6 illustrates a flow diagram of another example process for an embodiment of the present invention.

FIG. 6 shows a flow diagram of an exemplary process 600 that may be implemented, carried out, realized, or otherwise effected by an embodiment of the present invention, such as a search engine, apparatus, component, or system. For instance, per the example process 600, the user interface 204 in a search system comprising the information system 200 and trust effective engine 300 may accept a plurality of entries, the accepting including acquiring URLs from the system's users or administrators, or from within some existing entries in the system, and retrieving webpages as entries based at least in part on the URLs, wherein the retrieving includes crawling and fetching the webpages from the World Wide Web and other digital resources, and indexing them (602). Per the example process 500, the entry handler 208 or search service 206 may monitor activities and/or behavior of the users in relation to entries available in or via the system (604), wherein the activities and/or behavior include the users' selecting or not selecting via the user interface 204 the entries when presented by the search service 206 via the user interface 204, the users' reviewing or rating positively or negatively the entries, the users' incorporating or referencing the entries when creating, submitting, or modifying other entries, the users' bookmarking the entries, and so on. Per the example process 600, the relationship manager 304 may set or update relationships, if any, between the users and the entries based at least in part on the activities and/or behavior, and stores the relationships in the relationship database 214 and/or entry database 212, wherein the relationships include identification of the users (e.g., user IDs), identification of the entries (e.g., URLs), data or metadata relating the users or their activities (e.g., individual queries) to the entries, the data or metadata including a query text, image, an audio input, and so on, and/or a score, rank, flag, marker, indicator, value, a vector of scores, ranks, flags, markers, indicators, or values, or a matrix of scores, ranks, flags, markers, indicators, or values. Per the example process 600, the people network manager 304 may associate one or more of the users with another user (608), for example, when the other user creates a social network or user group to which the one or more of the users are a member, or when the other user marks the one or more of the users as favorite or trusted. Per the example process 600, the user interface 204 may receive a request such as a search request or query from the other user (610), and cause the search service 206 to determine a result set comprising one or more of the entries based at least in part on the request (612), the determining including querying an index of entries stored in the entry database 212 against the request, wherein the result set includes a search result comprising one or more URLs to the entries. Per the example process 600, the entry set processor 310 may determine another result set comprising one or more entries in the result set based at least in part on the relationships, if any, between the one or more of the users and the result set (or entries in the result set) (614), the determining including ranking the relationships (e.g., according to some scores, ratings, or values maintained in or otherwise associated with the relationships) and selecting entries in the result set whose relationships with the one or more of the users have higher scores than other entries in the result set, wherein the other result set includes a set of ranked or ordered URLs and/or images referring to one or more of the entries in the other result set. (According to another embodiment, the search service 206 may determine both the result set and the other result set in a single operation, a sequence of operations, or a multiple sequences of operations.) Per the example process 600, the user interface 204 may present to the other user via the communications interface 202 a response based at least in part on the other result set (or entries in the other result set) (616), wherein the response may include an audio or visual search result list or page of URLs or images (ordered, ranked, or otherwise) referring to a subset of the entries in the other result set. According to some embodiments, participants may opt out or disable (temporarily or otherwise) the associations or relationships between entries and themselves or between a Trust Network and themselves for future activities such as their entry submissions or usage (including but not limited to use of anonymity), or suspend or remove associations or relationships between existing entries and themselves.

It should be appreciated that the specific steps illustrated in FIG. 6 provide a particular method of presenting a response to a user based on his relationship with other users. For instance, the step of accepting a plurality of entries (602) may further receive subject matter information and specification in relation to the plurality of entries, e.g., the search term associated with the URLs (i.e., the plurality of entries) being bookmarked by a user in connection to a research session. The step of accepting a plurality of entries (602), the step of monitoring activities and/or behavior of users in the system in relation to the entries (604), and the step of setting or updating relationships between the users and the entries based on the activities and behavior (606) may take place concurrently and iteratively. For example, a search engine or bookmarking service equipped with the present invention may receive, store, and track URLs bookmarked or saved by each user. One embodiment may allow the user to add ratings or attributes to each bookmarked or saved URL, or create an ordered list of URLs relative to a subject matter of interest. Another embodiment may enable the user to explicitly associate a search session with a set of bookmarks, the search session corresponding to a title or a search term. As individual users create, archive, and abort a search session and its corresponding set of bookmarks, the system may monitor these activities, and establish and maintain relationships among the users, the subject matters or search terms of interest, and the search results that have been bookmarked (and for what and by whom). As part of accepting entries, monitoring activities, and maintaining relationships among users and entries, the system may also determine, periodically or real-time, a popularity or relevancy score for each bookmarked or saved entry against a search term or subject matter of interest.

The step of determining a result set comprising one or more of the entries based on the request (612) and the step of determining another result set comprising one or more entries in the result set based at least in part on the relationships between the one or more of the users and the result set (614) may be combined or otherwise modified so to determine a final set of results based on (a) the request from a user, in its consideration with previously or currently bookmarked results (by other users) deemed relevant (by the other users or the system) to the request; (b) the relationships between the request and the earlier requests from the other users; and/or (c) the relationships between the user and the other users.

For example, upon receiving a search request from a user, the system may determine that the search request or subject matter of interest matches with earlier ones from other users, and identify the common or popular search results or URLs bookmarked, saved, or otherwise identified for these requests. The system may then determine an ordered list of results comprising one or more of these entries, and present the ordered list to the user as part of a response to his search request.

In one embodiment, the system may refine or otherwise generate such an ordered list of results based on the user's relationship with the other users who bookmarked or saved those entries in connection with the similar search requests or subject matters of interest. The user may then select an entry from the ordered list for view or add it to his own set of bookmarks for his current search session (e.g., relative to a subject matter of interest). In one embodiment, this action would contribute to the relationship, popularity, and/or relevancy score for the chosen entry.

In another embodiment, each entry may have multiple relationship, popularity and relevancy scores, one for each subject matter or set of search terms known to be associated with the entry. In addition, the relevancy of a frequently bookmarked or saved entry in connection with a search request could be the same to any user in a group who shares his search results with others in the group, or to any user who has logged on, for example, per some system setup or configuration.

In yet another embodiment, the relevancy of a frequently bookmarked or saved entry in connection with a search request could vary for different users, such as when one user only allows another specific user to access or have visibility to his search results, for example, due to privacy concern. In one embodiment, the system may associate users who bookmarked or saved an entry in relation to a search term, and present a popularity or relevancy score in connection to this association. The system may also present indications of photos or profiles for these users.

A plurality of embodiments are specifically illustrated and/or described herein. However, it will be appreciated that modifications and variations are covered by the above teachings and within the scope of the present invention without departing from the spirit and intended scope thereof. For instance, any type of subject matter in relation to entries is within the scope of various embodiments. For example, a price announcement system may provide price entries for an item at various sellers in various cities. The system may store or reference item entries, seller entries, price entries, city entries, and so on, whose relevancy to a user's request or interest may be enhanced or otherwise determined by a Trust Effect setting. An event or news reporting system may support event or news entries in various cities in different states of a country, or event or news entries about people or celebrities in a group, organization, social network, or region.

An embodiment may also help contextualizing items of interest for a user in an information system that supports query for items. For example, only items submitted, referenced or referred to by members in the user's Trust Network may be included or otherwise given higher relevancy rankings in the results to the user's queries. Hence two different users sending the same query to the system for items may see two different sets of item results, each corresponding to the interests of their respective Trust Networks. And there needs not be a specific subject matter associated with entries in an embodiment. For instance, a general search engine accepts a user's query without any explicit reference to a subject matter or topic. Two entries that may have otherwise been of equal or close rank to a user's query could have one of them being promoted to a distinctively higher rank for relevancy if there is a favorable or positive relationship (e.g., of submission, usage, recommendation) between the entry and the user's Trust Network, while the other entry does not. For example, a user may be given results about Uniform Resource Names (URNs) for his query of "urn", while another user may be given results about urns, a type of vase or vessel, for the same query, because of the previous or historical selections of entries by their respective Trust Networks (or members in their respective Trust Networks) as determined by the search engine equipped with the present invention.

In addition, the impact of Trust Effect on one entry or entry type may affect the relevancy of another entry or entry type in response to a user's query or request. For example, for a user's request for available offers of an item, he may first begin his search for the item in question. If there is no offer entry that satisfies the criteria of Trust Effect for relevancy or inclusion, then an embodiment may suppress or otherwise omit the item entry in its response to the item search request, even though the item search itself may not be subject to Trust Effect per se, or even if the item may otherwise pass the criteria for item relevancy or inclusion.

Another embodiment may, on the other hand, isolate such item search from the impact of a Trust Effect setting enabled for the subsequent offer search, either as a user option or system configuration. Trust Effect on multiple entries or entry types may also be combined, logically or otherwise. For example, when identifying items that may be relevant to a user's search request under the influence of a Trust Effect setting or configuration, an information system may include all items having an applicable or relevant relationship with the user's Trust Network, as well as those available at sellers having an applicable or relevant relationship with his Trust Network. Furthermore, there may be a threshold or criteria for the number of applicable relationships between entries (or their related data or metadata) and a user's Trust Network before the entries in question may be regarded as relevant or selectable for presentation for or to the user. For example, an item entry may be considered relevant under Trust Effect for a user only if more than three distinct members in the user's Trust Network have used the item entry for their entry creation (e.g., of offer entries) or submission or have purchased the item.

According to one embodiment, a Trust Effect setting may always be enabled. According to another embodiment, a user may toggle his Trust Effect setting, and the results will change accordingly without the user initiating the same or another request. According to yet another embodiment, results of entries under an active Trust Effect setting may be presented in addition to those without Trust Effect, with the former assuming higher rankings, or the former and latter arranged in parallel views, or some other arrangements. According to yet another embodiment, Trust Networks for a user or group of users may be established by the system, without any direct relationship between the user or group of users and the members in the Trust Networks. For example, the system may identify according to some criteria the top 10% of its participant base and associate the participant base with or otherwise make available to them a Trust Network comprising these select participants. In one embodiment, a user may also specify a Distrust Network, thereby creating an effective or virtual Trust Network comprising users not in the Distrust Network.

According to another embodiment, the step of associating one or more of the users with another user (608) and/or the step of determining another result set comprising one or more entries in the result set based on the relationships between the one or more of the users and the result set (614) may be omitted or otherwise made optional. For instance, a system equipped with the present invention may accept an entry from a user, and associate it with a subject matter, wherein the subject matter may be defined or specified by the system, the user, or another user. By accepting other entries from other users and associating the entries with their individual submitting users for a common subject matter, the system may determine a set of or an ordered list of most popular entities in connection with those entries for a given subject matter, for example, by the number of submissions, the longevity of the entries' association with the individual users (e.g., the time the entries being on a user's bookmarks for a particular search session), the number of individual submitters or bookmarking users, and so on. The system may then present such a list to a user who may indicate (e.g., via a request to the system) his interest in the subject matter even when the user has never submitted the system any entry in relation to the subject matter.

For example, such a system may accept URL submissions as bookmarking entries for individual users (e.g., after the users have first logged on with the system) in connection with a subject matter (e.g., a retail product or offer, or a query or search term pertaining to a retail product or offer) from Web browsers to which the users are coupled. The subject matter may be specified by the system, or by a user. In one embodiment, the subject matter may be a question (e.g., what is the best microwave oven?) whose user feedback or answers (i.e., user-submitted entries) may each in turn be a subject matter (e.g., how much is this microwave oven and where to get that?). Answers or user-submitted entries to this latter subject matter may be links to the webpages showing the prices of a particular microwave oven, which may be represented by an entry being associated with the former subject matter. Either a subject matter and/or a user-submitted entry may further be qualified by a refining attribute, such as geopolitical location for a subject matter and a language indicator for a submitted URL. A subject matter may also be determined by combining various information types, such as "camera model ABC" and "review", and "camera model ABC" and "price", as in "Where to find the best reviews for the camera model ABC?", and "Where to find the best prices for the camera model ABC?" In one embodiment, the system may support a hierarchy of subject matters, where a system-wide subject matter is predefined, and a subject matter subordinate to or otherwise belonging to the system-wide subject matter may be defined by users. For instance, a search engine system or social network may be declared for or otherwise associated mainly with shopping information or activities. Such a shopping system or network may further provide, for example, two types of contexts for queries: (i) the best product for a particular category, and (ii) the best price for a particular product. The two example contexts may serve as a template for creating user-defined subject matters, such as "the best vacuum cleaner" and "the best price for vacuum cleaner XYZ." In accordance with this approach, users may create and collaborate on various common subject matters of interest all of which belong to shopping. In addition, the system may provide the users with a user interface to browse or search existing questions or subject matters, and create new ones. The users may then associate his search result entries or bookmarking entries with a question or subject matter. For example, the system may accept or use the question or subject matter as, or otherwise associate it with, an initial search or search term for searching the Web or a specific Internet domain or website.

User-submitted entries may or may not comprise a URL. Entities in connection with the user-submitted entries for a given subject matter may include a specific product, service, offer, location, event, server, domain, and so on. The system may enable a user to discover an entry originated by the user or another user, and to associate the entry with himself as a separate submitter or new submission of the entry to the system, for example, against a particular subject matter or one of his research or bookmarking sessions. A user may trigger, for example, via a hypertext link or icon on a webpage a submission of an entry to the system with which the user has already authenticated. An entry may comprise information or attributes that help match or refine a subject matter in question, or generate another subject matter. For example, an entry may include a product name, a brand name, dimensions and weight of the product, and so on. The subject matter in question may have been to find the best product for a particular product category. The brand name information may cause the system to generate or otherwise recognize the subject matter of what is the best product for this brand name for this particular product category. The system may also be able to reduce or otherwise refine the possible results that match users' queries involving attributes related to subject matters, such as location, language, and brand.

In one embodiment, a user-submitted entry may be associated with an entity, where different entries may refer to a common entity. For example, an Internet server or domain name (e.g., www.xvz-abd-149.com) may comprise a plurality of URLs (e.g., www.xvz-abd-149.com/a/b, and www.xvz-abd-149.com/a/c). Each user-submitted entry may comprise a URL identifying a specific webpage on an Internet server or domain. As such, different URLs may map to or otherwise refer to a common Internet server or domain (which may in fact comprise a plurality of computers or servers in deployment). The system may then determine, e.g., continuously, periodically or on demand, which Internet servers or domain names are responsible for or otherwise associated with the most entries for a particular subject matter, and present a set or list of these names or their representations (e.g., an icon such as a favicon) to a user.

For example, a Web browser coupled to the system may display a banner or list of domain names (or favicons, which may be obtained over the Internet), each showing or otherwise being accompanied by the number of past bookmark submissions, and/or the number of current bookmark submissions that refer to the corresponding domain for a given subject matter. The order or ranking of each domain may change or update in real time, periodically, or on demand, as the system monitors and tracks the bookmarking entry submissions in relation to one or more subject matters, or a user-selected or system-selected subject matter. The system may perform such change or update for entries related to an individual user, a group of users, or all users of the system. In one embodiment, the system may also display sponsored domain names next to or otherwise close to such a merit-based list or group of domains. In another embodiment, the system may also display an indication of the popular entities based on the entries submitted by users in relation to a particular subject matter. One advantages of this domain-level discovery feature is that users can discover Internet domains (or herein also referred to as websites) that may specialize in providing certain information.

For example, a popular website for providing retail offers for digital cameras may be different from a popular website for providing reviews for digital cameras. Hence the rankings of websites for the subject matter "Where can I find reviews for digital cameras?" may be different than those for the subject matter "Where can I find the best prices for digital cameras?" In addition, the reputation or expertise of a website so determined enables a user to discover a possible information source for a new entity where there may yet to be an entry submitted to the system for the entity against the website. For example, even though there is no URL ever bookmarked for a particular camera in connection with a popular camera-review site, the fact that the site has been very popular with its URLs being bookmarked for reviews of many other cameras, a user can quickly visit the web site and look for review information for that camera. Furthermore, some webpages may have dynamically been generated, so that there is no a static URL one can re-use to reach the same webpage or content. A user may specify the server or domain name in connection with his bookmarking entry, and provide or otherwise associate specific information of interest so that he, another user, or the system may recall the same or equivalent webpage or content based on the information. For instance, a user may include a retail product name in a bookmarking entry, whereby the system may initiate a request to the server based on the product name.

For example, the system may use a Web service interface provided by the domain to conduct the request, or may cause a search engine or service independent of the domain to do so, the search engine or service, for instance, having previously indexed the contents on the domain or the servers associated with the domain. In one embodiment, in response to a query from a user, the system may perform or cause to perform searches against system-determined top domains (e.g., via another system or search service, or the domains' Web services API) for a particular subject matter, the query being associated with the particular subject matter, and the searches being performed in connection with URLs or contents of URLs that comprise the domain names. In one embodiment, the system may provide an interface (e.g., a hypertext link or button) for a user to initiate a search, and if applicable, include a search term with the search, against the top domains, with an option to select or deselect the specific domains, and add addition domains for the search. The search may result in, for example, additional display areas (e.g., UI windows) being shown to the user, with each display area comprising results for each domain, or one display area comprising results for all domains of interest. In one embodiment, a browser coupled to the system and a user may display a banner of icons each representing a system-determined top domain, whereby the user may click on an icon on the banner to visit the domain directly (e.g., on the same browser page, or a new browser tab or window), or interact with that domain alone via the system. The browser may also provide the user an user interface by which the user may have more than one session active, each session corresponding to one subject matter. The user may switch between sessions while submitting entries to the system, thereby associating the entries with one subject matter at a time. The browser may also allow the user to explicitly specify or otherwise identify the subject matter in connection with each entry being submitted to the system.

According to another embodiment, a domain or website of interest may provide, or cause another system or computer to provide, feedback to the system in relation to a specific activity, so that the system may determine a ranking in relation to the activity or based on the frequency or count of the activity. For example, a website or a customer's device may indicate to the system that a user has bought an item at the website. This indication acts as an entry submitted to the system. Depending on the information available at the indication, the entry may be associated with the subject matter of "Where did people buy this item or type of item from?" (if it has location information), and/or the subject matter of "How much did people pay for this item or type of item?" (if it has price information). The system may also generate other statistics of interest based on entries submitted by either users or websites.

According to one embodiment, a webpage or website that sells retail goods may advertise, publish, or otherwise make available to users, visitors, or customers the quantity sold of a particular good. For instance, the quantities sold of a product and another product over a period of time or up to the present time may be presented to a user, wherein the product and the other product are a competing or related product to each other. In another embodiment, such quantities sold of a product and another product may be qualified or otherwise advertised with information that indicates the number of buyers who belong to, are classified as, or otherwise are associated with a group that excludes other buyers. For example, users who or whose reviews have received a certain number or level of positive votes or feedback may be considered by the webpage or website as such a group. Users who are identified as trusted or who belong to a user-created or user-organized list or group may also be considered as such a group. In another embodiment, reviews or a quantity of reviews for one or more products may be qualified or otherwise advertised with information that indicates the number of reviewers who belong to, are classified as, or otherwise are associated with a group that excludes other reviewers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders or in parallel. Various embodiments of the invention include logic stored on computer readable media, the logic configured to perform methods of the invention. The examples provided herein are exemplary and are not meant to be exclusive.

For instance, while the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of the following claims.

In additional, certain embodiments of the present invention may provide a method and system for annotating digital information and sharing the annotated digital information among multiple users. In the present application, the information to be annotated is referred to as "digital information." Digital information may be any information that is available in a digital format. For example, digital information may include textual information, audio information, video information, or graphical information. Further, a single unit of digital information may include multiple units. For example, a common unit of digital information available on the Web is a website or a webpage, and a website may include multiple webpages. A unit or page of the digital information may be represented by a unique recall handle that provides a reference or link to that unit or page of the digital information—for example, a URI of a webpage or a file pathname for a video clip. In addition, a single unit or page of digital information may include one or more subunits or sub-pages, each subunit or sub-page having its own unique recall handle. A network may be an intranet, Internet or any other network that includes one or more devices that are communicating over the network. Furthermore, the network may include any type of wired or wireless medium.

Figure 7:
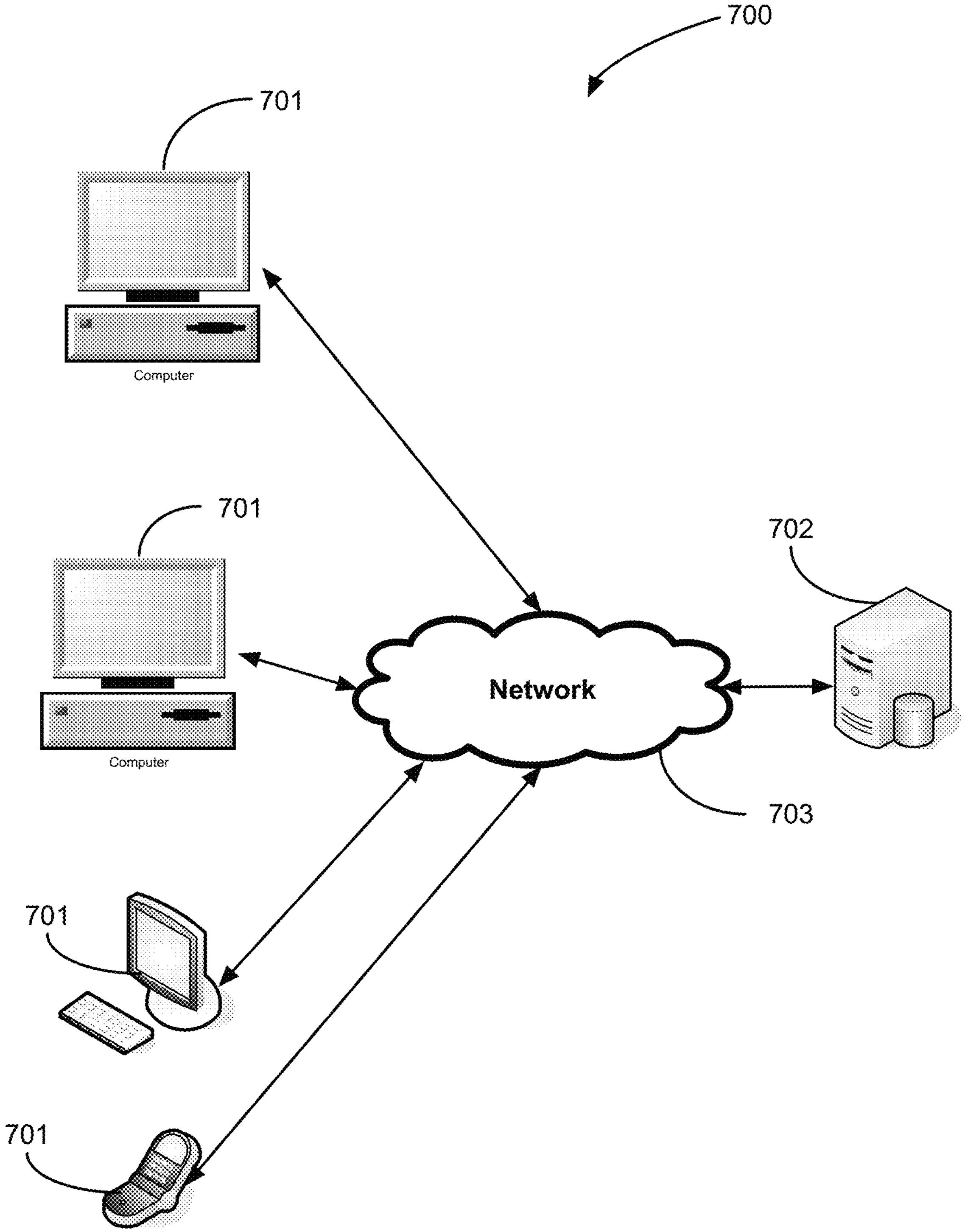
FIG. 7 illustrates a system for performing annotations according to an embodiment of the present invention.

FIG. 7 is a simplified schematic of a system 700 for performing and sharing annotations according to an embodiment of the present invention. System 700 may include one or more client computers 701. Client computer 701 is any general-purpose computer that may communicate with other computers over a network and has the capability of connecting to the Internet. In one embodiment, client computer 701 may be a portable or mobile communications device having the requisite functionality, e.g., cellular phone or a personal digital assistant (PDA). System 700 may also include a database server 702. Database server 702 may be any general-purpose computer capable of hosting a database and communicating with multiple client computers over network 703. Network 703 may be an Intranet, Internet, or any other network, either closed or open. Client computer 701 and database server 702 may communicate using a wired or wireless medium. Each client computer 701 may include a web browser for accessing and browsing the Internet. In addition, client computer 701 may also include an application resident in its memory (not shown) that may provide a user interface through which a user may perform annotations. In some embodiments, the user interface may reside as a toolbar and may be integrated into a web browser resident of client computer 701.

In some embodiments, annotation includes creating an annotation entity by associating data or metadata to a particular anchor information. This anchor information may be the uniform resource identifier (URI) or the recall handle that identifies the digital information. An annotating entry or annotation entity may comprise one or more attributes. An annotation entity may also include a description or specification of an object or item to which the attributes are associated. An attribute may include a name, a value, and a measurement unit for the value. The value of an attribute may be scalar or vector. For comparing attributes, they must be compatible with each other. For example, an attribute is compatible with another attribute if the values of the attributes may be compared in an analysis, whether numerical, contextual, or otherwise. Attributes having the same or equivalent names or meanings (e.g., language, synonym, abbreviation, matching code) are compatible with one another by declaration. The determination of compatibility between two attributes includes but is not limited to orthographical, semantic, and manually assigned equivalence between attribute names. In some embodiments, an attribute may be customized, e.g., its meaning, valid value ranges and possible measurement units may be determined and given a name or code for reference.

An attribute is a characteristic trait or property that serves to define or describe an object of interest and is free of ambiguity or subjective interpretation. An object of interest may be a thing, an idea, a product, an offer, an activity, a purpose, a context, etc. For example, the price included in an offer to sell a book is an attribute of the offer. A user provided rating of the book on a website is not an attribute of the book per se, because the same book may have an entirely different rating on another website since rating is a subjective assessment of a book and may vary enormously between different users. In the other words, an attribute of rating without further qualification is ambiguous and may not be used for meaningful comparison with another attribute that may also offer rating information. Hence, such a rating alone is not an attribute of the book. In contrast, a rating qualified by its source, e.g., the name of the website where the rating is obtained and the "as of" date, may be regarded as an attribute of the book. For example, the rating of a particular program or episode on television when it was first aired is an attribute for the particular program or episode.

Comparative analysis such as relational comparison may be performed on compatible attributes. The results obtained from the analysis may be sorted, filtered, and searched. In some embodiments, numerical weights and score generating formulas may also be associated with the individual attributes during a comparative analysis to determine the desirability of one resource over another resource among resources having one or more compatible attributes in common.

In some embodiments, the anchor information that is used for the annotation is the recall handle of the digital information. All the annotations are associated with this unique recall handle regardless of the location of the data being used for annotation.

Figure 8:
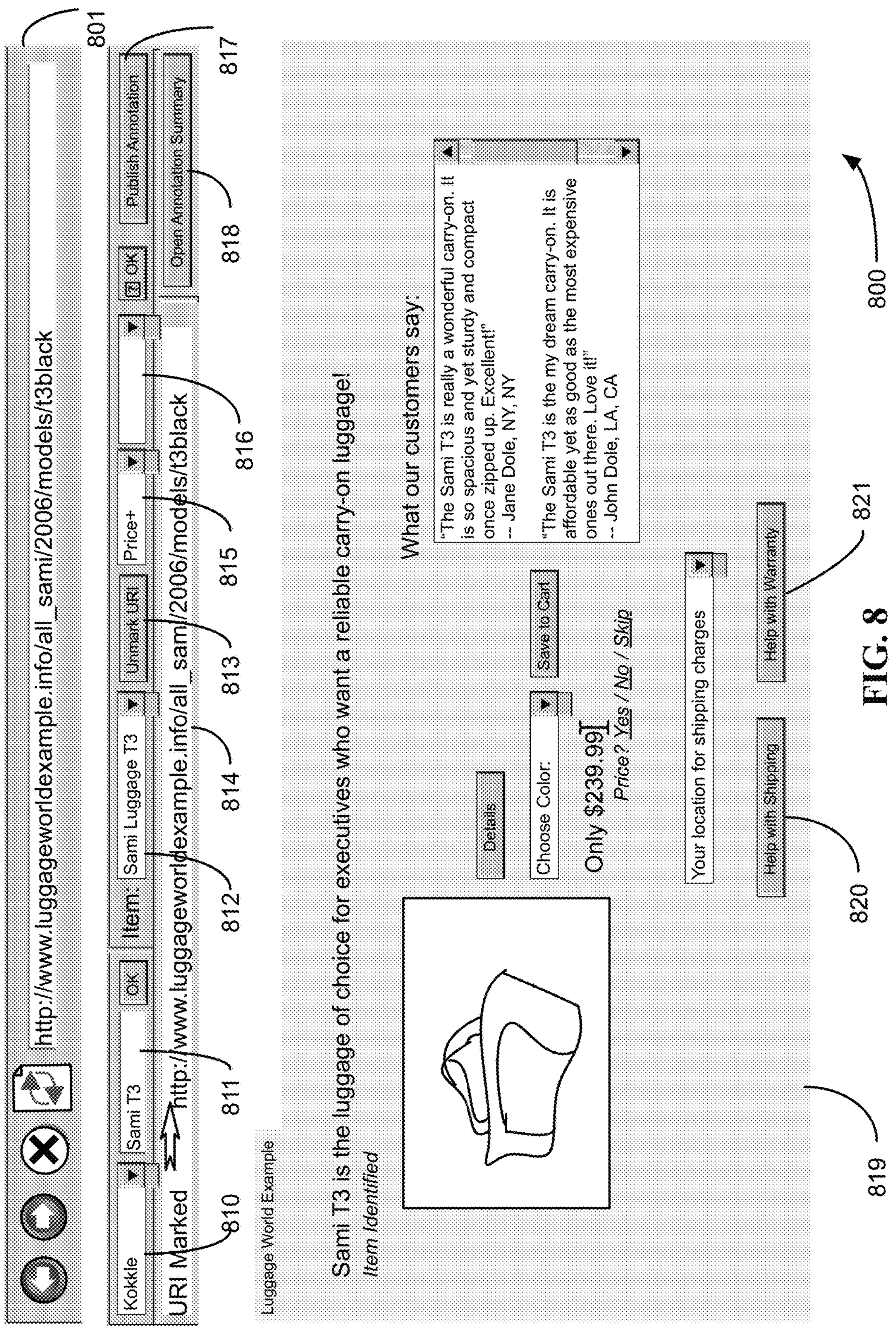
FIG. 8 is a sample user interface that may be used to perform annotations according to an embodiment of the present invention.

FIG. 8 is a simplified illustration of an user interface (UI) 800 that may be used by the computer system to perform the annotation according to an embodiment of the present invention. UI 800 may be presented on a computer monitor in the form of a toolbar, which is embedded in a web browser resident on client computer 701 or may be a stand-alone application that is resident on client computer 701 described above. UI 800 may be activated by clicking a designated button on the browser or by selecting the UI application from the memory of the client computer. UI 800 includes a display screen 801. Display screen 801 includes section 810 for selecting a search engine. The search engine may be employed to perform an initial search for locating the item of interest. Section 811 provides a location for the user to enter a search term for the subject matter of interest. A search term may include one or more words or phrases, graphics, audio, or video. Section 812 is a pull down menu that provides descriptions or specifications about items of interest that the user has previously created. For example, a user may be interested in buying a piece of luggage belonging to a specific brand, book a flight to New York City, and buy travel insurance. The user may proceed to provide input to the computer system to create three items: "Sami Luggage T3", "Flight to New York", and "Travel Insurance". These created items may appear in section 812. An item may also include additional information or data to further qualify the item, e.g., the minimum and maximum dimensions and weights of the luggage, the origin of the flight to New York, the duration of travel insurance, etc. The item information may also provide or otherwise serve as an initial search term for entry into section 811.

Figure 16:
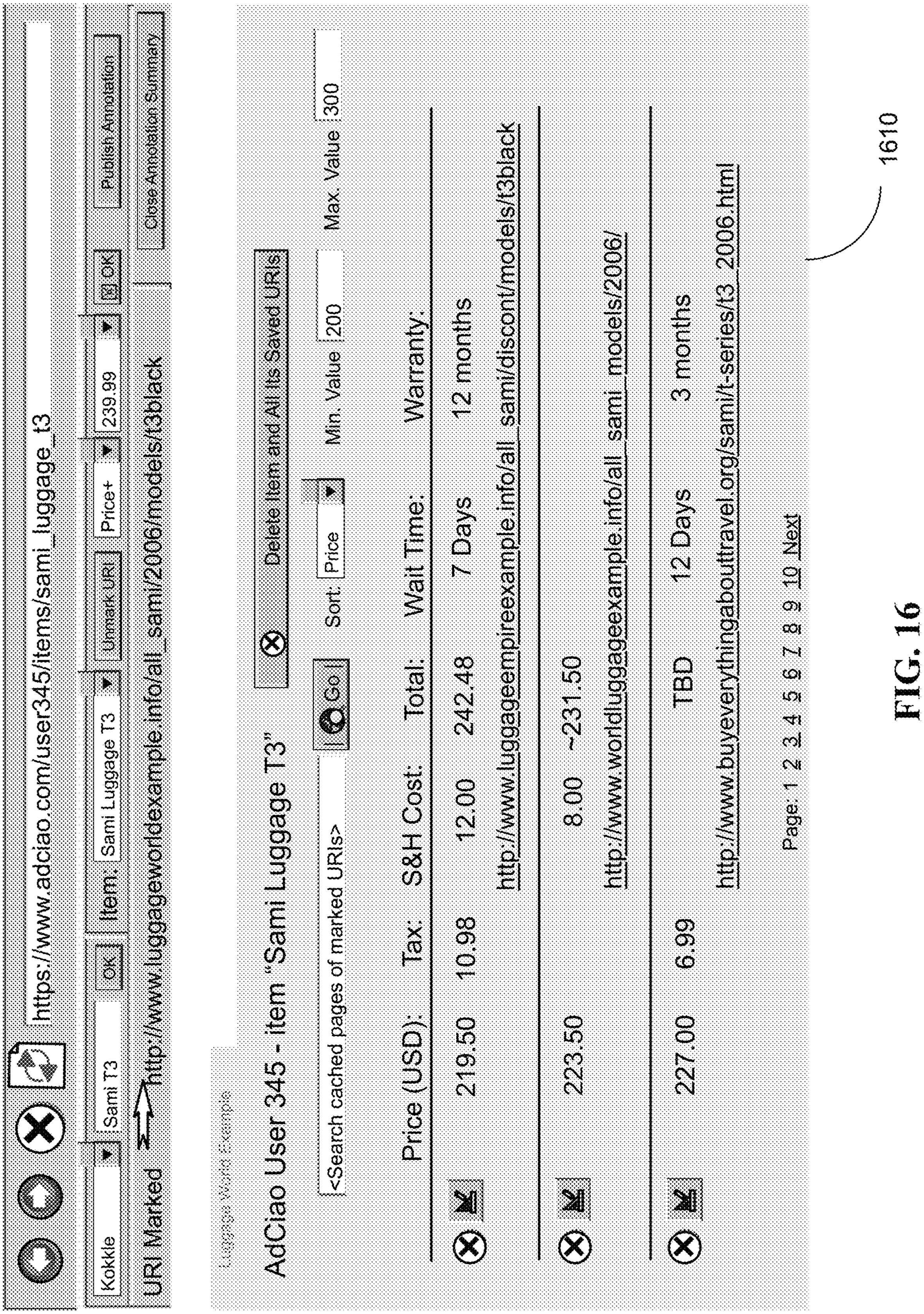
FIG. 16 illustrates a sample annotation summary user interface screen according to an embodiment of the present invention.

Screen button 813 allows a user to mark (or unmark) a particular recall handle for annotation. The recall handle may be the URI associated with one of the search results delivered when the user executes a search query based on a search term. In one embodiment, the 'marked' recall handle is the recall handle whose webpage is currently on display in section 819. Once a recall handle is marked using screen button 813, the recall handle appears in section 814. In section 815, the user may select from among a plurality of attributes to be associated with the marked recall handle. Alternatively, the user may define his own attributes by entering them in the client computer. In section 816, the user may enter a value to be associated with the selected attribute. In an embodiment, this section may be automatically populated by the client computer based on the information displayed in section 819. Section 819 displays contents of the websites that the user may visit using UI 800. In yet another embodiment, the application may scan the contents displayed in section 819 and suggest values to be populated in section 816. Screen button 817 allows the user to communicate his annotation to an external system or designate the annotated information for sharing with other users on a network. Screen button 818 may allow the user to display a listing of previously annotated recall handles. The listing may be displayed on a separate page and may additionally provide query, filtering, sorting, editing, and navigation facilities for operating and manipulating these recall handles and their annotation data. FIG. 16 shows a sample listing of previously annotated recall handles that may be displayed upon selection of screen button 818.

Figure 9:
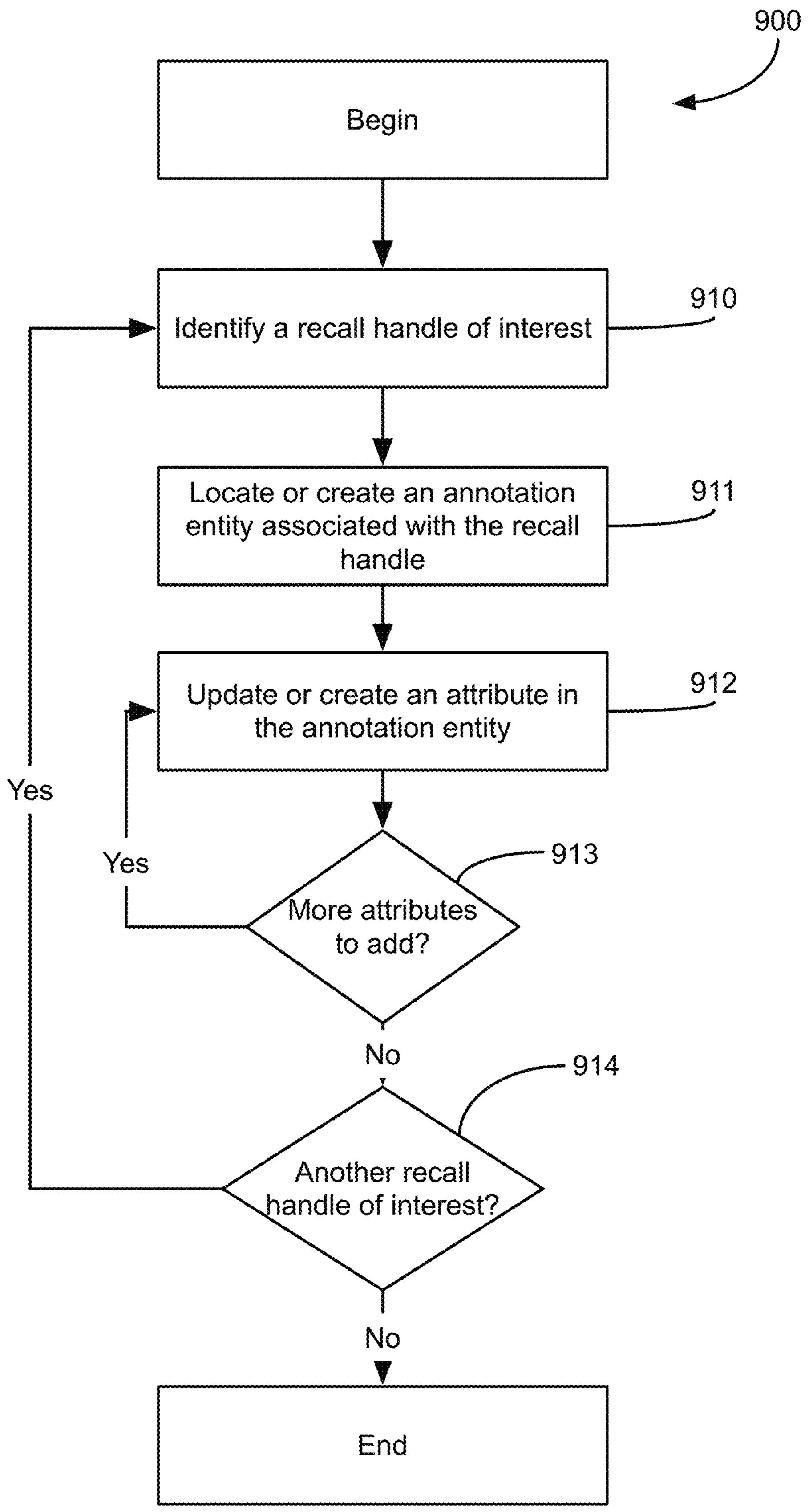
FIG. 9 is a flow diagram of a process for assigning attributes to a URI according to an embodiment of the present invention.

FIG. 9 is a high level flow diagram of a process 900 for assigning attributes to a URI or recall handle associated with digital information according to an embodiment of the present invention. At step 910, the URI associated with particular digital information (or some online resource such as those available on the Web) is identified. For example, the URI identified may be the one provided by the search engine based on a search term. In some embodiments, the user may enter a URI manually e.g., file path information of the location of a video clip on the user's computer. At step 911, an annotation entry is created for that URI, e.g., by using UI application 800. In an embodiment, prior to creating an annotation entry, the system may search for any existing annotations for that URI. At step 912, the user adds data to the selected attribute, e.g., the user may add a purchase price in dollars for an attribute "price" associated with the item of interest. In an embodiment, if there is already an existing attribute with data associated with it, the user may be given an option to update the attribute with the new data. At step 913, it is determined whether additional attributes for the selected item of interest are to be added. If there are more attributes to be added, the process returns to step 912 to allow user to enter additional attributes. If at step 913 it is determined that, no additional attributes are to be added, the system may check for a new URI to be annotated at step 914. If there is no new URI to be annotated, the process ends. If there is a new URI to be annotated, the process returns to step 910.

It will be appreciated that process 900 described herein is illustrative and that variations and modifications are possible. Acts described as sequential may be executed in parallel, order of acts may be varied, and acts may be modified or combined.

Figure 10:
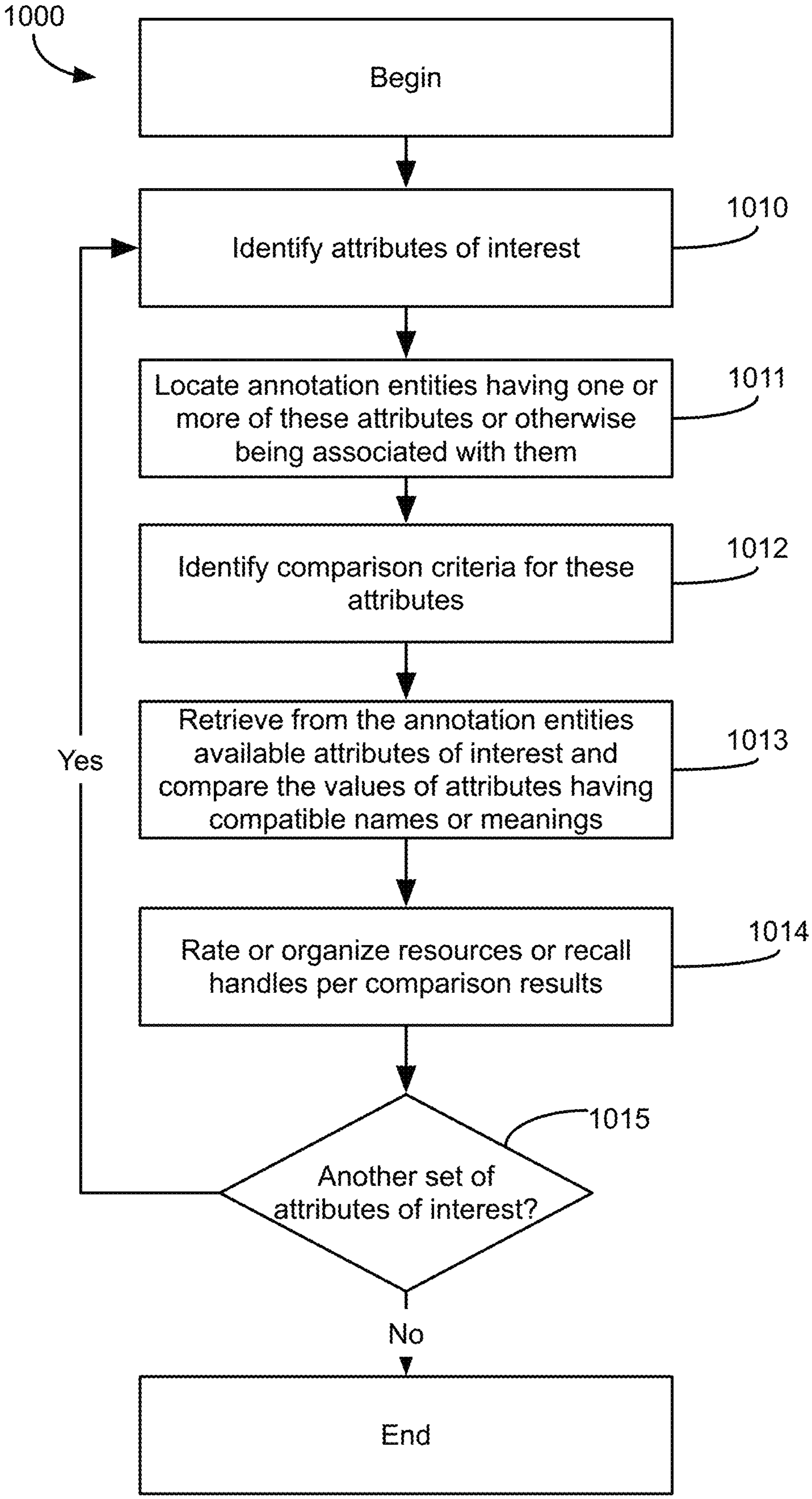
FIG. 10 is a flow diagram of a process for comparing attributes of various annotated URIs according to an embodiment of the present invention.

FIG. 10 is a high-level flow diagram of a process 1000 for comparing attributes of various annotated URIs or recall handles according to an embodiment of the present invention. At step 1010, the attributes to be compared are identified, e.g., price and warranty period. Next, at step 1011, the annotated URIs or recall handles that include the identified attributes are located. As described previously, the annotated URIs/recall handles may be stored on an internal storage medium of client computer 701 or on the remote database server 702. Once the annotation entries that are associated with the URIs of interest are identified, comparison criteria for the attributes are determined at step 1012. The comparison criteria may specify a priority of one attribute over another to be considered during comparison and subsequent presentation of the comparison results. For example, the attribute ‘warranty period’ may be more important than the attribute ‘price’. In addition, the comparison criteria may also specify desirability of relation order for each attribute. For example, for ‘price’, a lower number is more desirable whereas for ‘warranty period’ a higher number is more desirable. At step 1013, the data associated with the identified attributes for all the selected URIs is retrieved and compared. At step 1014, results of the comparison are presented to the user. The results may be presented in the form of a rating or a score with the respective URIs listed per the comparison criteria. For instance, a request to locate the cheapest price for an item would result in a list of URIs/recall handles whose “price” attribute has one of the lowest values. In some embodiments, if the price is provided in different currencies, the differences in the currency exchange rates may be reconciled automatically and results provided in the currency of user’s choice. At step 1015, the system may check to see if another set of attributes is to be compared. If at step 1015, it is determined that no other attribute is to be compared, the process ends. On the other hand, if there are more attributes to be compared, the process returns to step 1010.

It will be appreciated that process 1000 described herein is illustrative and that variations and modifications are possible. Acts described as sequential may be executed in parallel, order of acts may be varied, and acts may be modified or combined.

Figure 11:
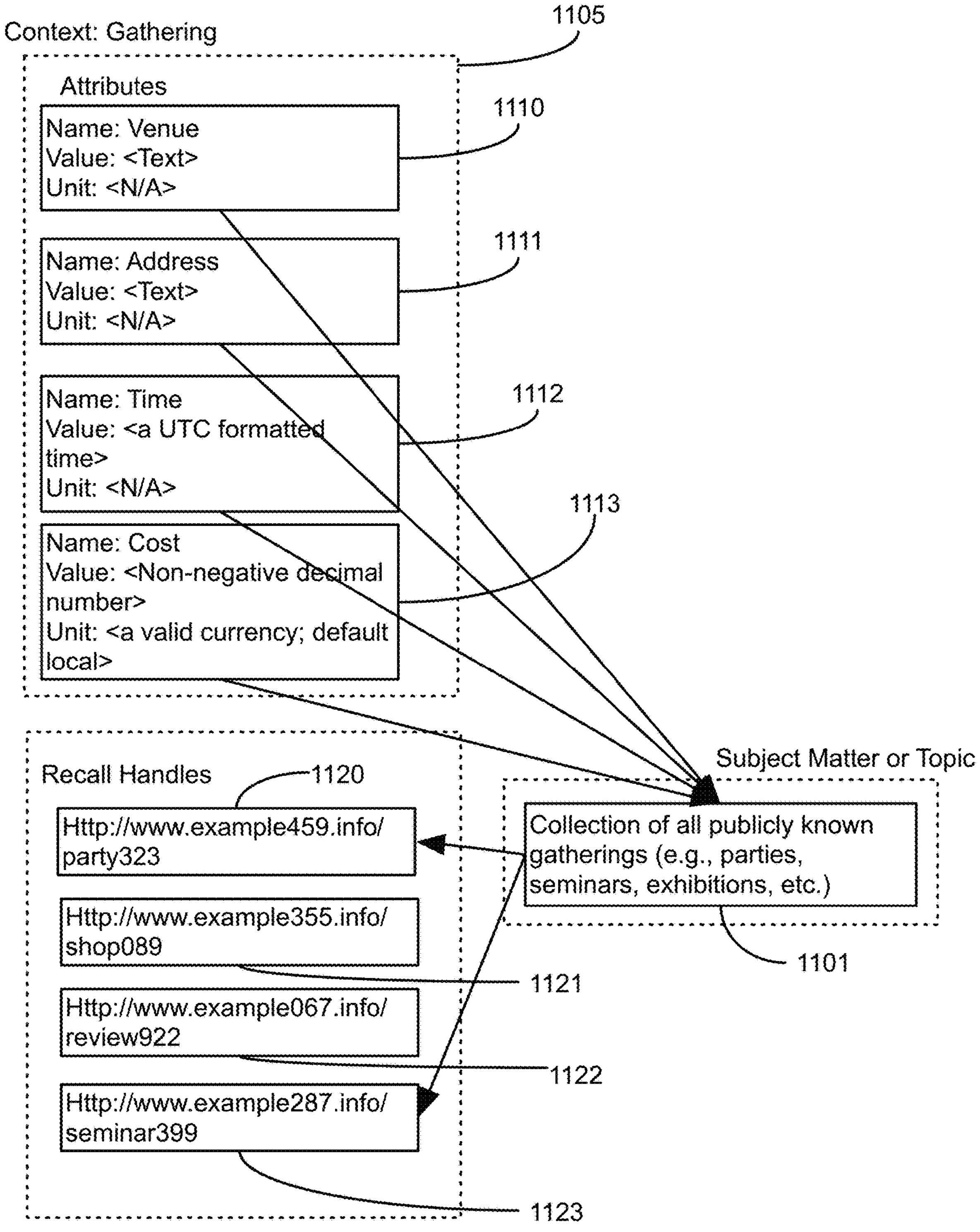
FIG. 11 is a block diagram illustrating subject matter annotation according to an embodiment of the present invention.

Another embodiment of the present invention allows a user to perform subject matter specific annotations. FIG. 11 illustrates subject matter specific annotation according to an embodiment of the present invention. In this illustration, subject matter 1101 of interest is ‘collection of all publicly known gatherings’, e.g., seminar, exhibition, party, etc. Subject matter 1101 is related to an overall context of gathering 1105. Another subject matter of interest in the gathering context may be ‘collection of all scheduled sports events’. The context of scheduled sports events may be a sub-set or sub-context of context 1105. Attributes 1110 1113 are defined for context 1105. For example, for a gathering, several attributes such as venue 1110, address 1111, time 1112, and cost to attend 1113 may be defined. It is to be noted that the attributes mentioned above are for illustrative purposes only and one skilled in the art will realize that any number of attributes may be defined for a particular context or subject matter. In addition, for subject matter 1101, there may be multiple URIs/recall handles 1120 1123 available for annotation. The user may use the client computer to annotate any number of the available URIs with one or more of the attributes. For example, recall handles 1120 and 1123 may be annotated with attributes 1110-1113. One skilled in the art will recognize that a number of permutations and combination may be achieved between the attributes and the recall handles.

Figure 12:
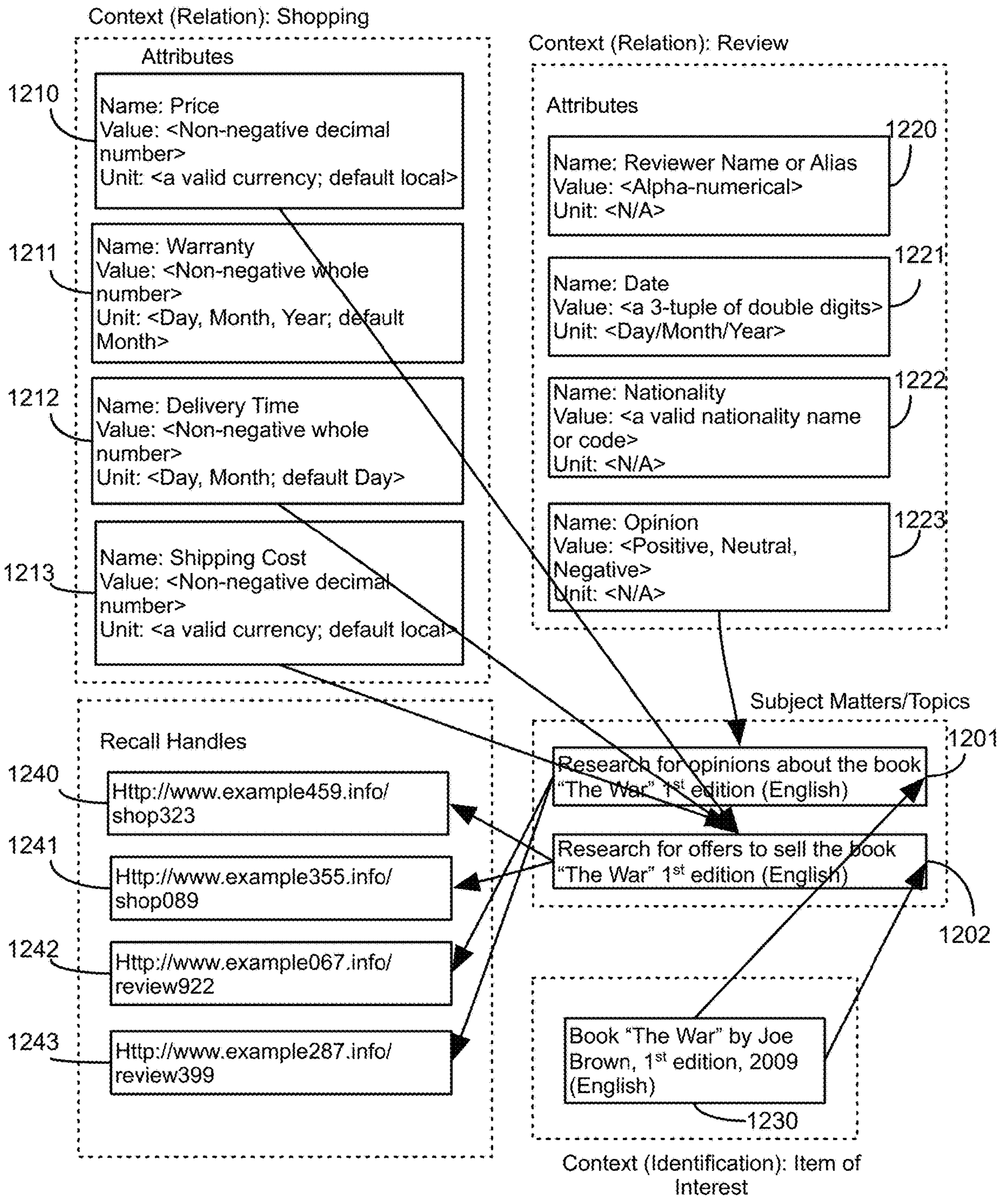
FIG. 12 is a block diagram illustrating subject matter annotation according to another embodiment of the present invention.

FIG. 12 illustrates an example of performing annotations where a subject matter, activity, or topic of interest may have more than one context associated with it according to an embodiment of the present invention. In this embodiment, an item of interest is a book titled “The War.” There may be several subject matter/activities/topics associated with this item of interest, e.g., purchasing the book (1201) and finding out reviews (1202) of the book. It is possible that relevant information for annotation is available at the same URI or at different URIs. Attributes such as price (1210), warranty (1211), delivery time (1212), and shipping cost (1213) are defined for the ‘shopping’ context with which subject matter 1202 is associated. Attributes such as name of the reviewer (1220), date (1221), nationality of the reviewer (1222), and the actual opinion (1223) are assigned to subject matter 1201 under the ‘review’ context. In addition to the aforementioned attributes, additional attributes such as title, author, language, and edition may be assigned to subject matters 1201 and 1202 under ‘Book’ context 1230 and are used to describe the item of interest, i.e. the book “The War.” The information about the book, whether in textual, image or audio form, may be used as query to search for online information of or about the book. One main difference between the shopping (or review) context and the book context is that the former provides attributes for relational comparison while the latter provided attributes for identification comparison. While the use of attributes may improve the accuracy of both types of comparisons, its absence would typically have a more adverse effect on relational than identification comparison. For instance, to find luggage of meeting certain criteria of dimensions, attributes provide a better specification than just a textual description in free-form. While these attributes may be regarded semantically as identification data for identifying relevant luggage, the attributes are actually used for relation comparison in such identification.

Similar to FIG. 11, one or more recall handles 1240-1243 may be available for annotation with respect to subject matters 1201 and 1202. For example, as illustrated in FIG. 12, recall handles 1242 and 1243 may include information relevant for subject matter 1201 while recall handles 1240 and 1241 may include information relevant for subject matter 1202.

Recall handles whose annotations comprise both identification data and attributes for relational comparison provide a better, automated decision making support than those whose user annotations comprise only data of a homogeneous but otherwise undistinguished context. For instance, a user may use the UI described above to search for a book using some identification data for the book (e.g., “Book The War Joe Brown”). The user may then visit the web pages identified by their respective URIs listed by the search engine and through the UI specify attributes (e.g., price, delivery time, shipping cost) against the URIs of those web pages that offer to sell the book. The resulting annotations may comprise identification data for the book and attributes for relation comparison. These annotations may be used for automatic comparison and processing (such as sorting and filtering) with other annotations having compatible attributes as well as the same or equivalent identification data. It is to be noted that identification data need not be the same or equivalent if a user wants to compare, for example, two different but competing products having non matching identification data. Such comparison and processing is able to discern data for identification from those for relational comparison.

Figure 13:
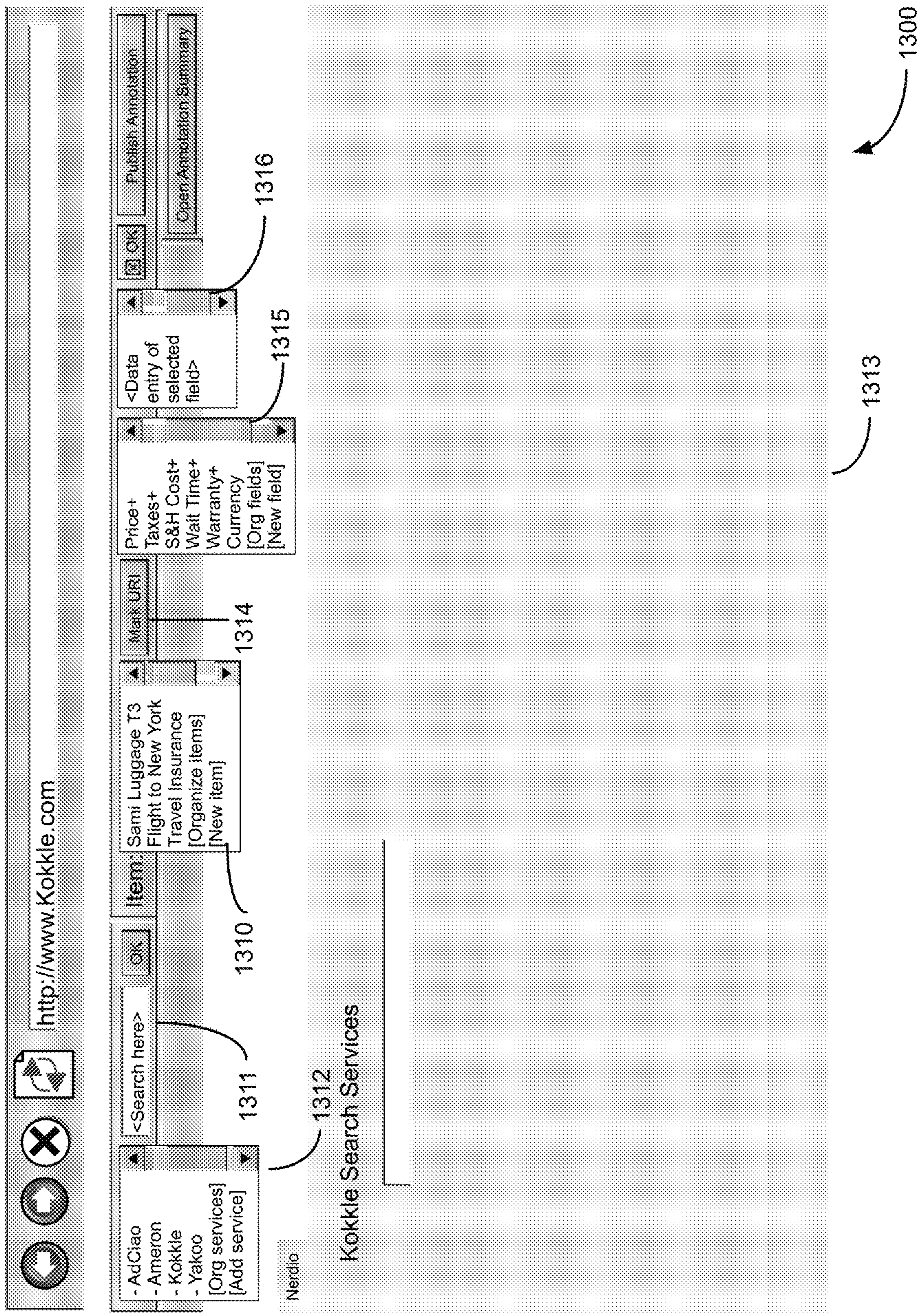
FIG. 13 illustrates a sample display screen of a user interface according to an embodiment of the present invention.

FIG. 13 illustrates UI 1300 with expanded drop down boxes showing the various options for annotating a URI/recall handle identifying digital information. According to an embodiment of the present invention, a process for creating an annotation using UI 1300 will now be described. A user may select an existing item or enter information into a client computer to enable the client computer to create a new item of interest using drop down menu 1310. For enabling the client computer to create a new item, the user may select '[New Item]' option in drop down menu 1310. For instance, a user may be planning for a trip. He may be want to buy luggage of a specific brand, book a flight to New York City, and buy travel insurance. The user may instruct the client computer to create three items: "Sami Luggage T3", "Flight to New York", and "Travel Insurance." An item may also include additional information or data to further qualify the item, such as the minimum and maximum dimensions and weights of the luggage, the origin of the flight to New York, the duration of travel insurance, and so on. Such additional data would help refine the item of interest to become more specific in comparing and matching web pages that provide the item of interest. If the item entry is a newly created entry, the user may submit a search term in section 1311 and select a search engine in section 1312. The item information corresponding to the item selected in section 1310 may be used as an initial search term in section 1311. Once the search query is executed by the search engine, a list of web pages offering the item of interest may be displayed in section 1313. The user may select 'mark URI' button 1314 and the client computer can make the URI whose webpage is being currently displayed in section 1313 to become the currently marked URI. In some embodiments, selection of the 'mark URI' button may also trigger other operations like retrieving existing attributes and data for those attributes for that URI and making the retrieved attributes and data available to the user. The user may instruct the client computer to make changes to one or more attributes by selecting the desired attribute in section 1315 and specifying new data (value) for the attribute in section 1316. Some attributes may include optional measurement units to qualify their data values. These optional units may be implicit, e.g., some unspecified currency of interest for price and shipping data fields, default, e.g. the current date for a time data field, or explicitly chosen, e.g., day, month or year for warranty period. The suffix '+' displayed alongside certain attributes in section 1315 indicates that each of these attributes would be used by an auto prompt feature, described later, whereby a user would be prompted for data entry for each such attribute in a successive manner. It is to be noted that any other means to indicate that a particular attribute provides an auto-prompt feature may be used in place of the '+' symbol but is not required by the present invention. Each attribute may provide further functionality in addition to providing a named piece of data with an optional measurement unit. The currency attribute, for example, would enable the price, taxes, and shipping attributes to be compared consistently with other price, taxes, and shipping data fields if the latter are specified in different currencies.

Changes made to the attributes are automatically updated. If there is an existing annotation entity associated with the marked URI, any new item description specified in section 1310 may be merged with the identification data of the existing annotation entity, because such an existing annotation entity could contain identification data that may be different from the current item description (e.g., "Sami bag T3" instead of "Sami Luggage T3"). Reconciliation of identification information may take several forms. For example, the two descriptions may be merged with each other with user confirmation, the old description may be replaced by the new description, or the user may be asked to select one of descriptions.

Selecting the "[New field]" or "[Org fields]" selections on the pull down menu 1315 presents a page where the user may be given a plurality of attributes to choose from. These attributes may be organized by categories, e.g., context and subject matter, and may be searchable, for inclusion in the menu. Each attribute may further be given its meaning, acceptable values, and possible measurement units. Relationship with and dependency on other attributes, if any, would be specified. For example, sum of the Price, Taxes, and Shipping & Handling (S&H) Cost data fields may be designated as a field called "Total Cost", and that their comparative values depending on the Currency field. A user may instruct the client computer to modify the relationships and dependencies of these system-defined or user-submitted attributes and their respective data fields. The user may also define custom relationships and dependencies complete with rules on interpreting and operating the attributes within the client computer. In addition, the user may further instruct the client computer to share these definitions with other users. A user may also instruct the client computer to create an attribute having a textual name and configure data field take on any value without any measurement unit.

In some instances, digital resources may have information spread over several locations. For example, a website offering a product for sale may have the shipping charges for the product listed on a different webpage than the webpage where price information for the product is provided. In one embodiment, the user may visit other locations, for the same digital resource, to select, identify, or enter data for different attributes without losing the already marked recall handle. For example, for a website, a user may use the "mark URI" button and instruct the client computer to designate the URI of a certain page of the website as the marked URI, while visiting other related pages of the website for identifying data to be used for annotation. The data gathered from the different web pages of the website may then be linked or otherwise related to the marked URI via an annotation entry.

As described earlier, the item information and attributes as provided by a user, along with other information (e.g., the timestamp of the latest attribute update), make up an annotation entity or entry for every marked URI. The corresponding URI may be part of the annotation entity or otherwise be associated with it. Such annotation data may undergo transformation or adaptation for the purpose of transmission, storage, indexing or retrieval. Additional data such as a copy of the webpage of the marked URI may also be kept. In some embodiments, a local repository (e.g., storage medium of client computer 701) or a remote repository (e.g., database server 702) may store and maintain the annotation entities for several URIs in a persistent manner. These repositories may provide the operational means or facilities to manage these persistent entities or entries (e.g., to delete, modify, update, and retrieve) and to query against them, e.g., to retrieve entries by filtering and matching criteria, orthographical, semantic, or otherwise, against their URIs, identification data, attribute names, attribute values and other annotation data, and to perform algorithmic, algebraic, relational and presentational manipulation involving these URIs and their annotation data.

Referring back to FIG. 8, an automated method for annotation according to an embodiment of the present invention is described below. As described above, consider that a user wishes to purchase a piece of luggage, e.g., a Sami T3 handbag as shown in FIG. 8. The user may select the item of interest in section 812 and execute a search query through a search engine from section 810 using information in section 812 as search term. Alternatively, a user may manually enter a search term. The search engine presents a plurality of hyperlinked recall handles (e.g., URIs) along with some other information, such as an excerpt of a webpage associated with its recall handle, presented in section 819. The user engages on-screen button 813 to mark the URI if he perceives a URI to be of interest. Selecting button 813 results in the button toggling to display "unmark URI" and now functions as means to unmark a currently marked URI. Section 814 similarly toggles to indicate either a marked URI or no URI. The system may then attempt to locate and then highlight, emphasize, or otherwise identify the text on the webpage that matches the name of the item or one of its aliases. An alias may be the search term used to search for the item or any other derived name that is closely related to the item. For example, as shown in FIG. 9, "Sami T3" displayed in section 819 is underlined since it is considered an alias or equivalent to the item "Sami Luggage T3" in section 812.

Once the user marks the displayed URI, it becomes the anchor URI to which all the annotations are linked. For example, the marked URI appears in section 814. The system may then prompt and assist the user to supply data for a plurality of attributes in section 815. In one embodiment, the system may auto-select the Price+ attribute and highlight the text, in section 819, that it believes provides the data for the selected attribute. The highlighting could be in form of visual cues such as underlining, textual annotation, color-coded background/foreground inversion of the selected text, or other forms such as audio readout. The highlighted and selected text may be captured as data in the data entry area 816 on the UI for the respective attribute upon user confirmation. For example, as shown in FIG. 8, the value "$239.99" is underlined to indicate that it provides valid data for the "Price+" attribute. Alternatively, the user may highlight and select another piece of text and designate that text as the data for the selected attribute. In yet another embodiment, the user may skip to the next attribute for data entry without entering any data for the currently selected attribute.

In addition, the user may navigate to a different page of the presented information using the shipping and warranty buttons 820 and 821, respectively. The new page may also be presented in section 819. The system may likewise auto-select the appropriate attribute and highlight the relevant text or data from within the displayed information. The user may confirm the selected text or data, add a value to the selected attribute, or skip the selected attribute. Any attribute contributed by the user using data on different pages may be associated, by the client computer, with the anchor URI selected by the user and presented in section 814.

Figure 14:
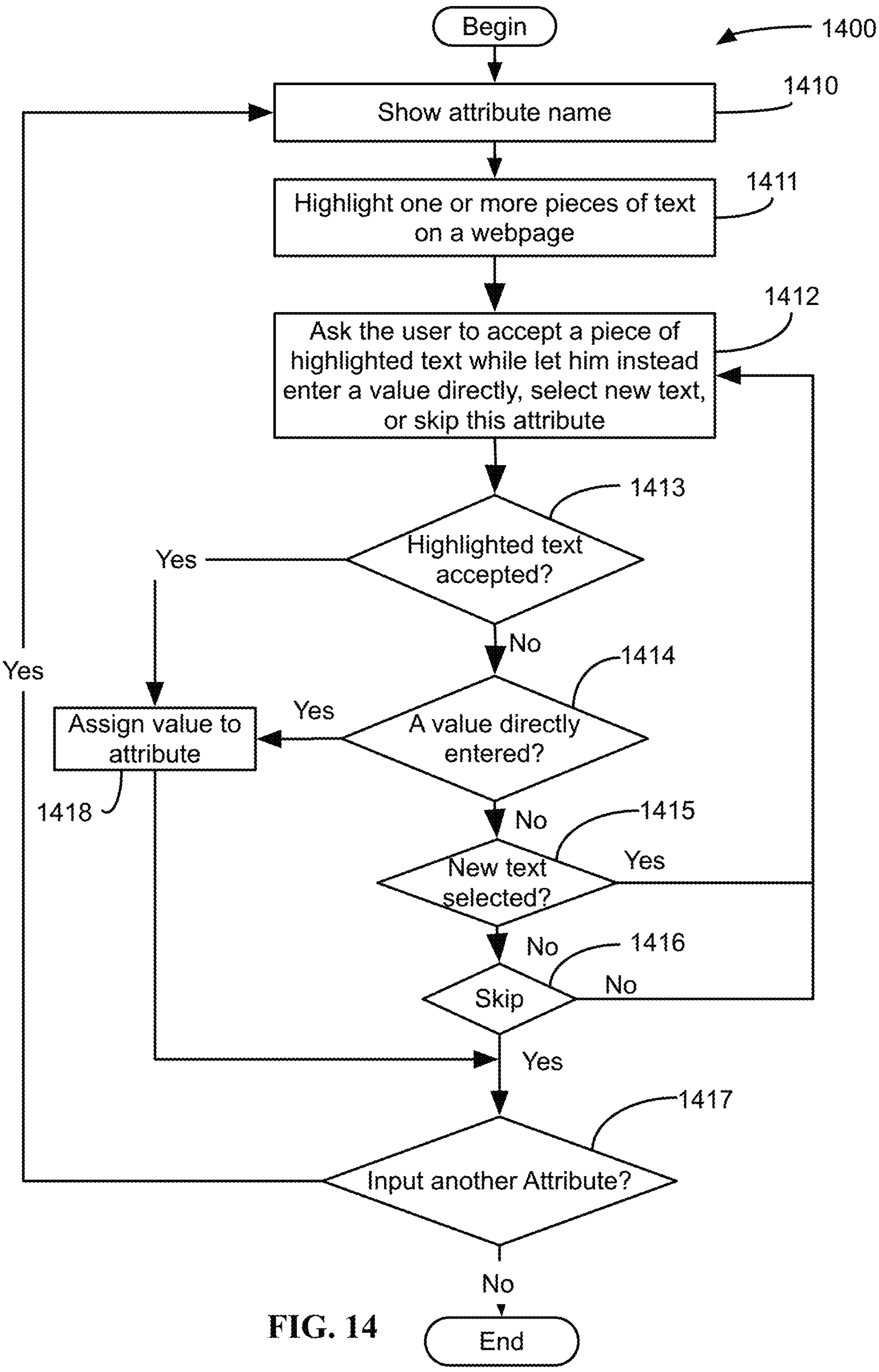
FIG. 14 is a flow diagram of a process for annotating digital information using an auto-prompt feature according to an embodiment of the present invention.

FIG. 14 is a flow diagram for process 1400 for annotating information using the auto prompt feature according to an embodiment of the present invention. At step 1410, the attribute of interest and the textual description or identification of the attribute is presented to the user. At step 1411, one or more pieces of text, from within the presented text are highlighted or made known to the user. In an embodiment, the system may audibly alert the user to the selected attribute and highlighted text. As step 1412, the user is provided with a choice to accept the highlighted text and designate the text as data for the selected attribute. In some embodiments, the user may also be given a choice to enter his own data, select some other text, or skip the data entry for that attribute. At step 1413, the system checks to see if the user has accepted the highlighted text. If it is determined at step 1413 that the user has accepted the highlighted text, the highlighted text is assigned as data for the selected attribute at step 1418 and user is asked whether he wants to add data for another attribute at step 1417.

If at step 1413, the user does not accept the highlighted text, the system checks whether the user has entered a value directly in the data field for the attribute at step 1414. If the user enters a value at step 1414, the process moves to steps 1418 and 1417, respectively, as described above. If the user does not enter data at step 1414, it is determined whether the user has selected some other text at step 1415. If the user has selected some other text, the process returns to step 1412. If it is determined at step 1415 that the user has not highlighted any other text, a determination is made whether the user has indicated that he wants to skip entering data for the selected attribute at step 1416. If the user has not elected to skip data entry, the process returns to step 1412. If the user selects to skip data entry at step 1416, the user is given an option to input data for another attribute at step 1417. If the user elects to input data for another attribute, the process return to step 1410, if not the process ends.

It will be appreciated that process 1400 described herein is illustrative and that variations and modifications are possible. Acts described as sequential may be executed in parallel, order of acts may be varied, and acts may be modified or combined. Information presentations, prompts, selections, and feedbacks as described in process 1400 may be visual, audio, tactile, or combinations thereof.

Figure 15:
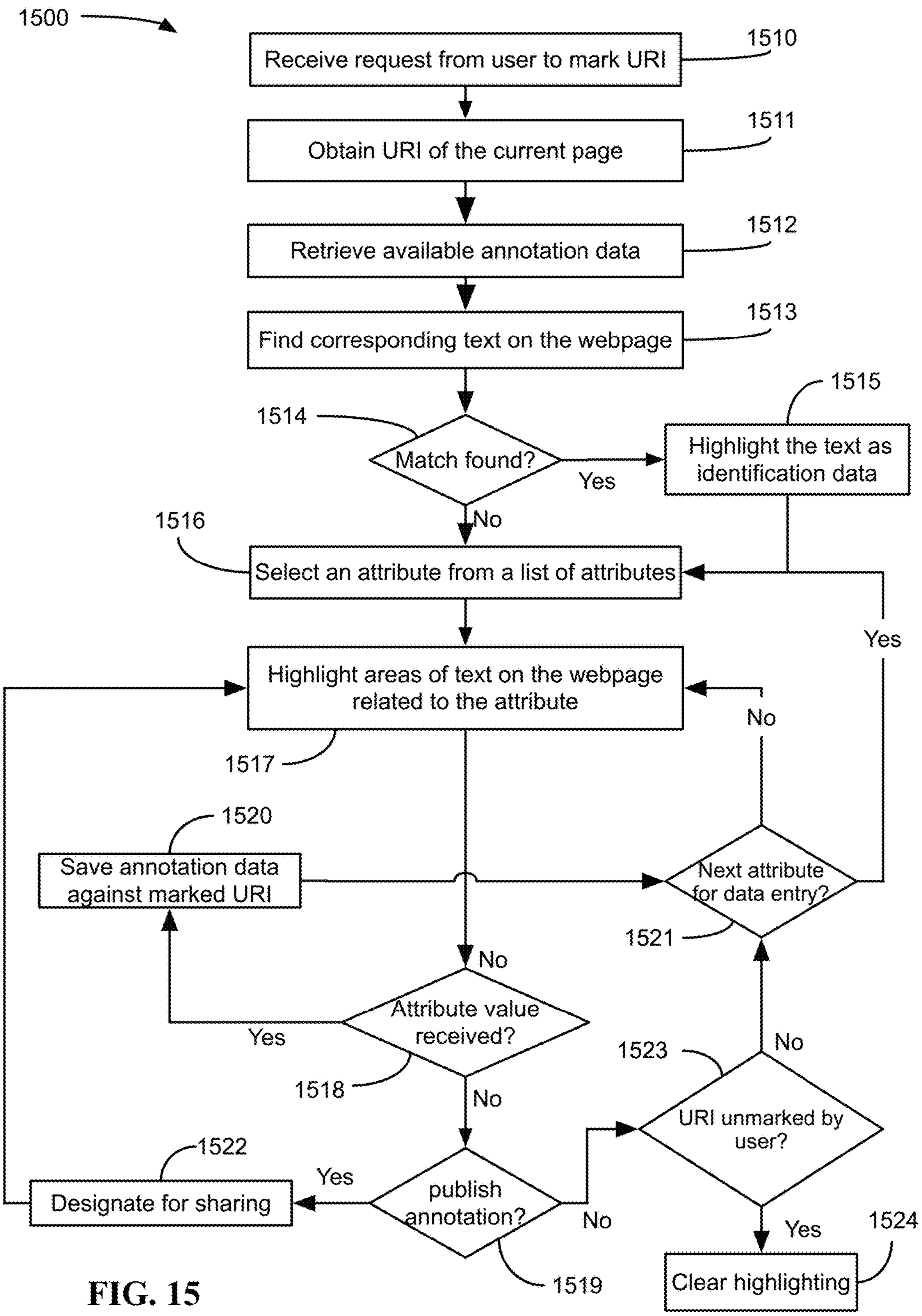
FIG. 15 is a flow diagram of a process for sharing annotations according to an embodiment of the present invention.

FIG. 15 shows a flow diagram of process 1500 for sharing annotated digital information according to an embodiment of the present invention. At step 1510, the system receives a request from the user to mark a particular URI for annotation. At step 1511, the URI may be obtained from, e.g., a browser. Alternatively, the current URI being displayed may be the marked URI. At step 1512, existing annotation information for the URI is located. The annotation information may be stored on a local storage medium of the user system or on a remote storage medium. As described previously, the annotation information may comprise identification data related to the item of interest. At step 1513, the text for the web page associated with the URI is searched to find whether there is text that matches identification data included in the retrieved annotation information. If a match is found, at step 1514, the relevant text is highlighted and designated as identification data at step 1515. The new identification data may be appended to the existing identification data or may be overwritten on the existing identification data.

If no match is found at step 1514, the system may select an attribute from the list of attributes for the user to update at step 1516. At step 1517, the displayed text is scanned to reveal/highlight any text that may be considered as valid data for the selected attribute. The user may then designate the highlighted text as data for the respective attributes as discussed in reference to process 1400 above. In an embodiment, the user may scroll to various sections of displayed text to locate the relevant highlighted data. Auto highlighting of relevant values for attributes may also be disabled or omitted. The user may be prompted to enter a value of a specific attribute or he may skip to the next attribute or select a piece of text on the webpage as the input for such a value. The value may be assigned to the attribute upon user confirmation. In some embodiments, the value available for an attribute of interest in the existing annotation information obtained at step 1512 may be provided as the default value for the attribute. The user may accept the default value as the current value for the attribute. In an embodiment, the name of each attribute of interest may be announced to a user who may respond verbally with either the command "skip" or the value for the attribute in question. The value so received would then be acknowledged audibly and/or visually. The user may then confirm the value before proceeding to the next attribute. In an embodiment, the user may respond to the various prompts by providing his input in textual or audio form. For example, a mobile phone or a multi-media computer may be equipped to provide audio prompts and receive audio input to those prompts from the user.

At step 1518, the process checks whether an attribute value was received from the user. If a value is received, the annotation entry is updated with the new value at step 1520 and a check is made at step 1521 whether there is another attribute to be updated. If no attribute value is received at step 1518, the user is given a choice to publish the annotation entry at step 1519. If the user chooses to publish the annotation entry, the annotation entry is designated as being available for sharing at step 1522. In one embodiment, once an annotation entry is marked for sharing, that entry may be communicated to an external system for storage where other users having access to the external system may use the annotation entry. If the user decides not to publish his annotation entry at step 1519, a check is made whether the user has unmarked the URI at step 1523. Unmarking a URI stops the data entry process for the marked URI (e.g., no highlighting of the webpage text). However, the annotation process may be resumed by having the same URI marked again.

If at step 1523, it is determined that the user has unmarked the URI, the highlighting of the text related to that URI is cleared at step 1524. If the user has not unmarked the URI, the user is prompted to enter information for the next attribute at step 1521 and text relevant to the next attribute is highlighted for the user. It will be appreciated that process 1500 described herein is illustrative and that variations and modifications are possible. Acts described as sequential may be executed in parallel, order of acts may be varied, and acts may be modified or combined. For instance, the locating and highlighting of text on a webpage that may match some identification data of the item of interest may be performed before a user requests a URI be marked. This approach may assist the user to decide relevance of the webpage by automatically locating possible relevant text matching or otherwise related to the item of interest. In addition, information presentations, prompts, selections and feedbacks as described in process 1500 may be visual, audio, tactile, or combinations thereof.

FIG. 16 illustrates a sample annotation summary page that may be presented to the user according to an embodiment of the present invention. In one embodiment, the summary may be presented on a UI screen described above. In other embodiments, the summary may be audibly presented to the user. The sample page of FIG. 16 shows annotation summary for the Sami T3 handbag example discussed above. Section 1610 displays annotation summary that includes information about various URIs. The information includes some or all of the relevant attributes that user has associated with the URIs. The page presents a snapshot view of the information that a user may need to make an informed decision about buying the Sami handbag. Although the sample summary page only shows three URIs, the user may designate the maximum number of results to be displayed on a page. Further, if there are more results than may fit on a single page, multiple pages listing the URIs of interest may be generated and the user may navigate to the various pages by selecting from a list of page numbers presented on each page. The summary page also includes the capability of sorting the list according to one or more criteria, e.g., price, total, warranty, etc. The summary page may also include 'total cost'. The total cost is derived value and is a sum of the values for the price, tax and S&H cost attributes. In the instance where an exact value for a particular optional attribute, e.g., tax, is not known, the system may designate the total cost by marking the cost as approximate. In one embodiment, the '~' symbol may be used to indicate an approximate value. In some embodiments, if an essential attribute, e.g., shipping and handling, is not known, the system may designate the total cost as "TBD" (To Be Decided) to indicate its inability to determine the total cost. In other embodiments, the system may approximate the missing values by searching for equivalent information.

Figure 17:
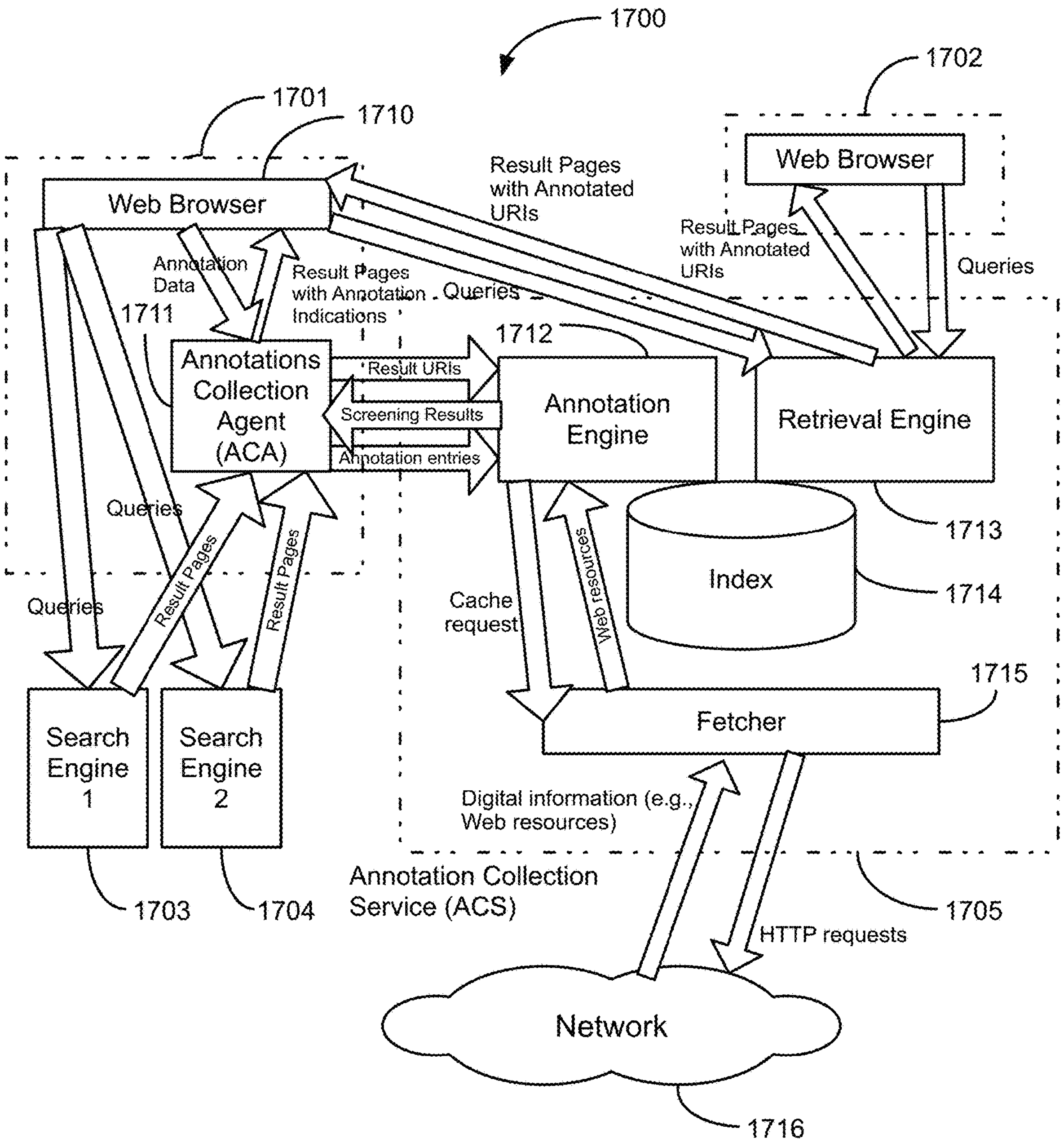
FIG. 17 is a block diagram of a system for sharing of annotated information according to an embodiment of the present invention.

FIG. 17 illustrates a system 1700 for performing annotation collection and retrieval according to an embodiment of the present invention. System 1700 includes client computers 1701 and 1702. Client computers 1701 and 1702 may be any general-purpose computers or devices capable of communicating with other devices over a network and having the ability to connect to the Internet. System 1700 also includes search engines 1703 and 1704. Search engines 1703 and 1704 may be any conventional search engines or specialized search engines. In an embodiment, search engines 1703 and 1704 may be included as part of client computers 1701 and/or 1702. Annotation collection service (ACS) 1705 may provide annotation management functions such as, annotation creation, storage, modification, and retrieval. In some embodiments, ACS 1705 may be referred to as annotation management unit.

Client computer 1701 (or 1702) may provide user interface 1710, e.g., as described in FIG. 8, and provide predefined attributes for a plurality of contexts such as shopping, etc. A user may use user interface 1710 to submit a search query to search engines 1703 or 1704 to search for an item of interest. In an embodiment, a user query may be submitted to multiple search engines concurrently. The results pages from the search engines may be received by annotation collection agent (ACA) 1711. The workings of the ACA are described in more detail below. ACA 1711 communicates with annotation engine 1712 of ACS 1705 in order to exchange information about marked URIs, annotation entries, etc. Retrieval engine 1713 is configured to accept queries from client computers 1701 and 1702 for retrieving information and communicate the results including annotated URIs to the client computers. Index 1714 is a repository or database that stores annotated URIs and the information associated with the annotated URIs. For example, information associated with annotated URIs may include item description and content information represented by the URI. Fetcher 1715 may communicate with network 1716 to collect digital information based on requests from annotation engine 1712. For example, upon receipt of an annotation entry or related information from ACA 1711, the annotation engine may send a request to fetcher 1715 to cache one or more webpages implicated by the URI to which the annotation corresponds or is otherwise associated. Fetcher 1715 may periodically fetch web pages associated with a URI and cache these web pages in index 1714. If a particular URI is no longer valid, fetcher 1715 may report this invalidity to annotation engine 1712, which may update index 1714 accordingly. Annotation engine 1712 may analyze these fetched web pages for information to update the attributes of existing annotation entries or create new and more recent annotation entries using attributes so updated. For example, a fetched web page may be compared with an older web page of the same URI. The differences in content, specific elements or parts of the content, and the locations or identities of these differences in relation to the locations or identities of the data for the attributes accumulated since the previous annotation entry may provide the information to update the existing attributes should such information changes over time. The cached web pages provide a snapshot of the contents of the web pages as of the day of caching. The annotation engine receives a copy of a web page from fetcher 1715 and stores it against the annotation data entry of the URI maintained in index 1714. The content of the copy of the web page may also further be analyzed and indexed. A user may later recall the web page and use it for comparing against a newer version of the web page or any other web page of interest.

System 1700 may receive and maintain annotation entries or data specific to a context or subject matter of interest, e.g., for context of shopping or for a subject matter of shopping for handbags or a particular handbag, the resulting annotation entries may serve as online offers with explicit item descriptions (i.e., identification data) and comparable attributes. For example, if retrieval engine 1713 is looking for items of interest, the retrieval engine may place a primary emphasis on item descriptions if matching user queries against such annotation entries, while treating attributes as dependent to this primary emphasis. A user, in one embodiment, may use a typical Web browser to search or otherwise access such online offers maintained in index 1714 of ACS 1705, in the same or similar manner as it may interact with typical search engines or services. For example, client computer 1702 may send queries to and receive result pages from ACS 1705 through retrieval engine 1713 in the same way as it may with any typical search engine or service. However, unlike result pages from search services 1703 and 1704, the search results received from ACS 1705 comprise recall handles that are all contextually congruent and annotated. ACS 1705 may also provide an input page or interface that accepts individual inputs or search items as attributes or data for the attributes for query, in addition to a description of the item of interest. Client computer 1701 may use the search service provided by ACS 1705, through retrieval engine 1713 of ACS 1705 or have ACS 1705 as one of the search service choices available to accept general textual queries (i.e., one that lacks specifically denoted identification data and attributes) sent from Client computer 1701. For the latter case, the user queries and result pages need not be intercepted or otherwise handled by ACA 1711 of Client computer 1701. For the context-specific general queries, identification data, available attributes and cached copies of the resources maintained in the index may assume different weights in the determination of which annotation entries (and therefore which URIs and resources) are more relevant to the queries from among the available annotation entries. For instance, identification data may have higher weight under typical circumstances.

Figure 18:
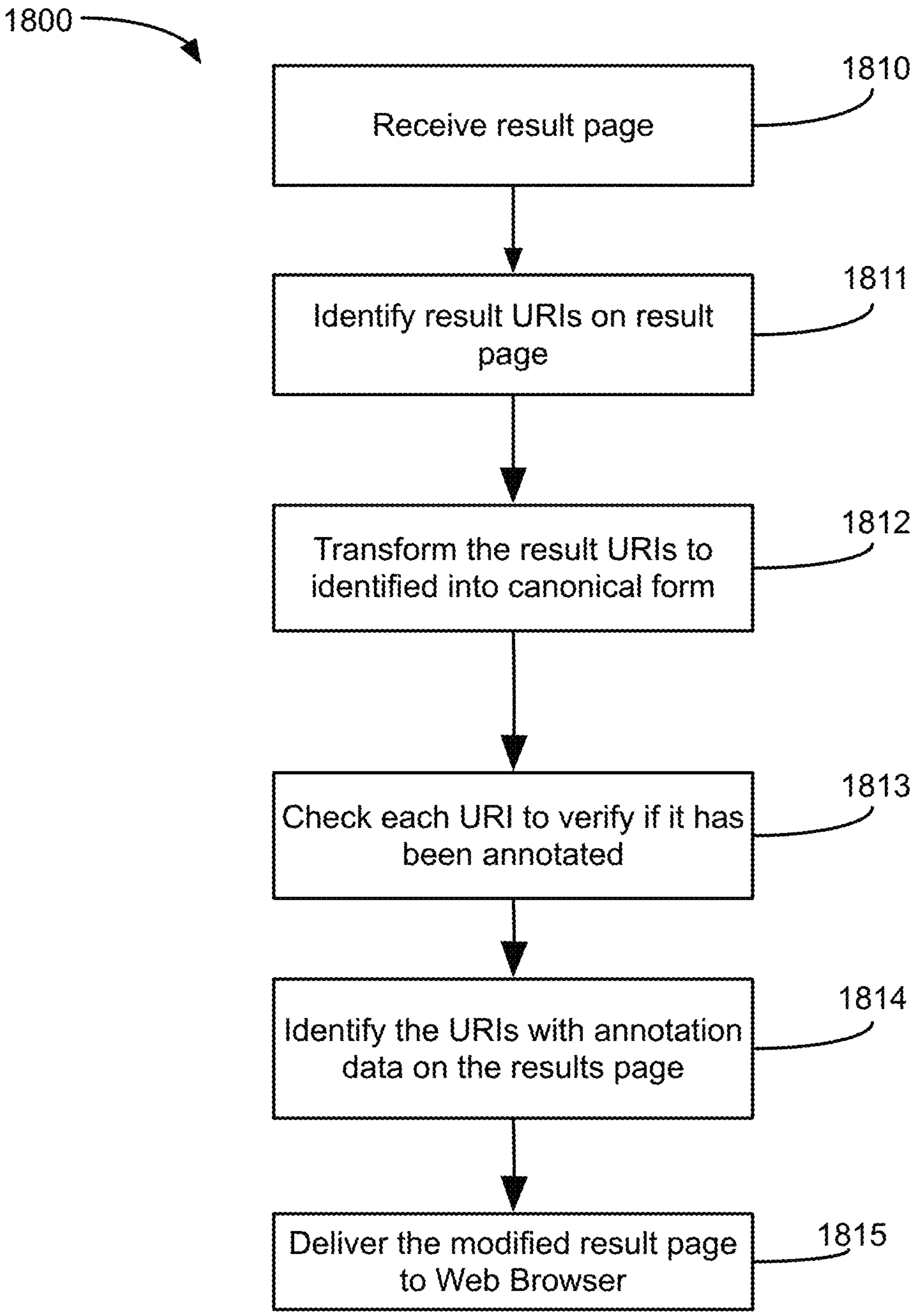
FIG. 18 is a flow diagram of a process for modifying presentation of search results having annotation entries according to an embodiment of the present invention.
Figure 19:
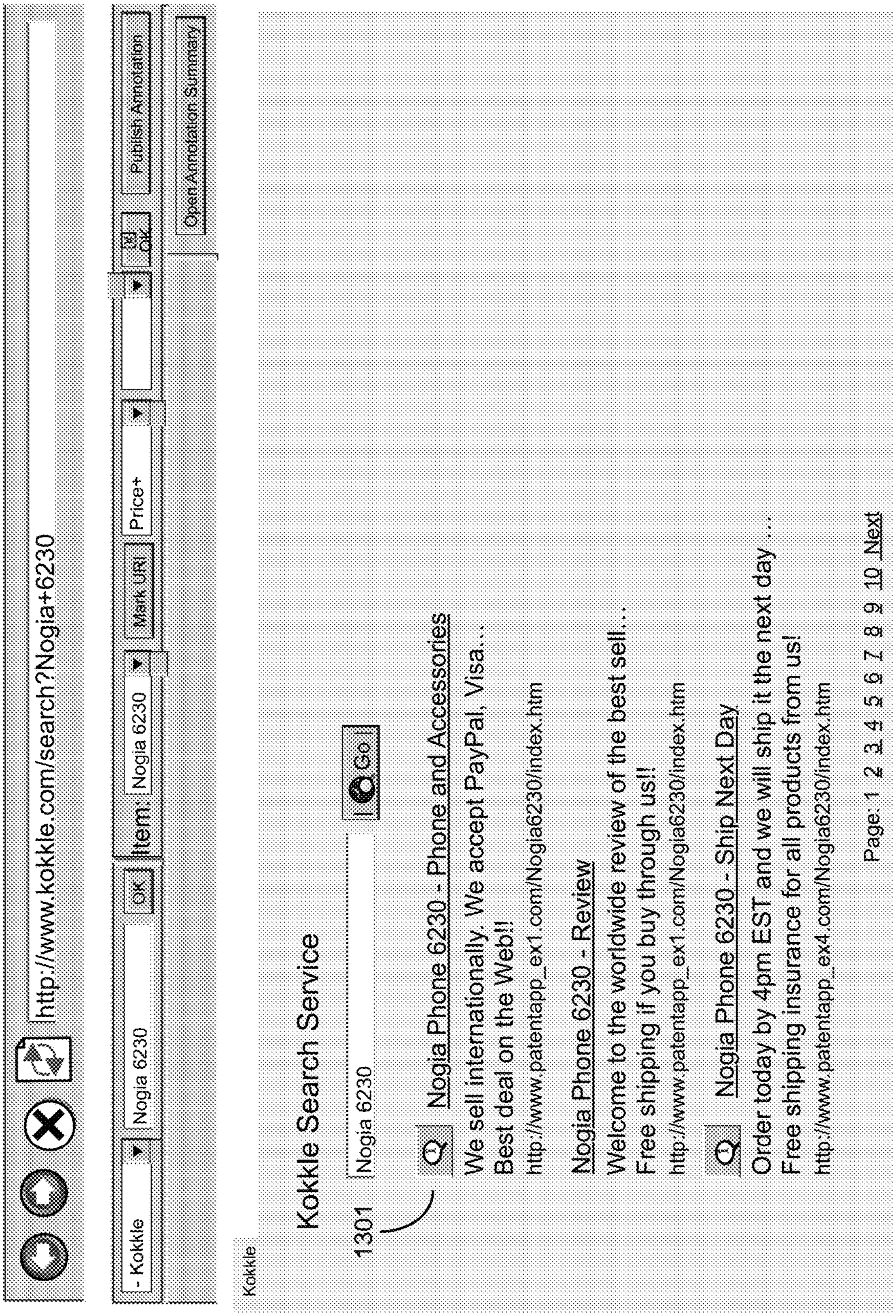
FIG. 19 illustrates modified presentation of search results having annotation entries, according to an embodiment of the present invention.

FIG. 18 is a high-level flow diagram of a process 1800 for modifying search results received from a search engine before being communicated to a UI such as a Web browser, according to an embodiment of the present invention. Process 1800 may be implemented e.g., by ACA 1711 of FIG. 17. At step 1810, the ACA receives the results page from the search engine. At step 1811, the ACA may identify the relevant URIs that correspond to the search term/s provided by the user. At step 1812, the ACA transforms the identified URIs into their canonical form. This is done to maintain consistency between disparate URIs. The ACA may communicate with the annotation engine of an ACS to identify the URIs that have annotation data associated with them, at step 1813. The annotation engine of the ACS may query the index of the ACS to determine which of the URIs have annotation data associated with it and communicate that information to the ACA at step 1814. In an embodiment, the ACA may also request the annotation engine to provide entries of URIs equipped with hyper-texting to annotation entries of screened URIs. The ACA may embed such hyper-texting as part of an annotation availability indication in the result page for presentation to the user. At step 1815, the ACA modifies the result page in accordance to the results obtained from the annotation engine and other relevant information from the ACS (through the annotation engine) and presents the modified page to the user. FIG. 19 provides an illustration of a sample modified results page according to an embodiment of the present invention. In an embodiment, the modified search results that have annotation information available are indicated using annotation indicator 1901. Annotation indicator 1901 is linked to the annotation data for that particular URI. Selecting annotation indicator 1901 will result in the annotation data for the associated URI being presented to the user.

It will be appreciated that process 1800 described herein is illustrative and that variations and modifications are possible. Acts described as sequential may be executed in parallel, order of acts may be varied, and acts may be modified or combined.

In addition, embodiments of the present invention may be realized using any combination of dedicated components and/or programmable processors and/or other programmable devices. While the embodiments described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. For instance, multiple processors may be involved in interaction with a user and in the creation and storage of the annotation entities. The annotation entities may be stored in a plurality of storage media, which these processors may access independently. For instance, the attributes and the values associated with the attributes may be stored on separate storage mediums. Further, the creation of annotation entities is not limited to information searched by a user. A content creator may pre-annotate information before making it available to the public at-large. The pre-annotated information may be shared among multiple users. In this case, users may access the pre-annotated information, add their own annotations and share the modified annotated information with other users. In some embodiments, the user may specify a time for which annotated URIs and/or information designated for sharing will be kept private and non-accessible to other users. For instance, the user may specify that his collection of personal annotation entries or his preference or ranking of annotation entries remains private until his current annotation or search session associated with this collection is complete, which may be triggered by various events. For example, in researching for retail online offers, the user may signal the end of session by indicating which annotated online offer he would choose among those that have been collected or included in his collection of annotation entries of online offer for a particular retail product or service. In one embodiment, the user's collection of annotation entries will be cleared upon the end of session, and ready for a new session. In another embodiment, a summary may be provided for an attribute related to annotation entries in a session. For example, a price range may be determined and published for the lowest and highest prices (currency-adjusted, if applicable) of all the annotated online offers in a shopping session. In yet another embodiment, a user may be associated with multiple concurrent sessions, for example, one session for a particular subject matter of interest, such as retail offers for a particular good or service. Annotation entries may be related to a particular good or service by having the same, equivalent, or compatible description of a good or service, or a reference to the good or service, or via some other means. An embodiment may also publish or advertise the most chosen or favorite annotation entries based on the interaction of a plurality of users with the available annotation entries. For example, a user may mark an annotation entry as favorite, like, or bookmark. A user may rank a plurality of annotation entries. A user may be allowed only to favor or recommend a limited number of annotation entries during a session of annotation or an interval of time for a particular subject matter of interest. For instance, an embodiment may enable users in a social group to annotate a plurality of retail items or offers on the Web, and to vote or rank among these annotated items or offers, so to rank or determine the most favorable items or offers, for example, as group gifts, group purchases, or some other common purposes. In one embodiment, an annotation entry for an online item or offer of interest may include a photo of the item or a hyperlink (textual, visual, or otherwise) to the offer webpage. In another embodiment, a software button or hyperlink on a webpage may cause creation of or make available an annotation entry, the annotation entry comprising, for example, an attribute (e.g., an image) of an item available online, or an attribute (e.g., a URI) of an offer posted online. The user triggering the software button or hyperlink may specify or select a subject matter (e.g., best gifts, cool nightclubs, or retail offers) with which the annotation entry is associated. The user may further qualify a subject matter that might have otherwise been made available to him for selection, for example, user input of wedding for best gifts and of a particular retail product or service name for retail offers. The user may be regarded as author of the annotation entry or otherwise responsible for the submission of the annotation entry to a system equipped with the present invention. In one embodiment, the software button or hyperlink may be associated with a subject matter, e.g., quality offer, so that the user needs not explicitly provide a subject matter. In another embodiment, attributes and their data may be preconfigured or preloaded, e.g., by the webpage, and they may or may not be editable by the user. The user may also be able to add or remove an attribute or its values. In yet another embodiment, the software button or hyperlink may be activated to present or otherwise be associated with one or more templates of attributes, each template being associated with a subject matter. For example, a user may specify or select a subject matter, the specification or selection of which resulting in the user being presented a template of attributes, with or without preloaded data, for input, edit or confirmation. In one embodiment, a system equipped with the present invention may determine one or more subject matters in question of a document associated with an annotation entry that the system or its proxy receives, for example, based on data, attributes, or data associated with the attributes that are available in the annotation entry, without the user associated with the annotation entry having explicitly specified a subject matter. For instance, an analysis of such data, attributes, or data associated with the attributes, e.g., based on their standalone meanings (pre-defined or otherwise), their semantic relationships and interpretations with other terms therein, a relative likelihood of a group of semantically relevant terms being present together in relation to a particular subject matter, and so on, may be utilized, in part or in whole, to determine a subject matter for the document of interest. In another embodiment, a subject matter of an annotation entry or a document associated with the annotation entry may be pre-assigned or pre-determined without the user associated with the annotation entry having provided an indication of the subject matter, for instance, by having the document or its associated metadata embed such information that may be readable or otherwise interpretable by the invention-embodying system. For example, an author, publisher, or machine generator of the document may have embedded the subject matter information into the document or its metadata, the subject matter information which may or may not be readable or perceivable by the user associated with the annotation entry; or a computer sending the annotation entry to the system may be capable of retrieving subject matter information from or for the document without specific input from the user to perform such retrieval. And the user may, for example, simply submit or cause the computer to submit an annotation entry for the document to the system, the annotation entry comprising subject matter information for the document without the user having provided the subject matter information. In yet another embodiment, data, attributes, or data associated with the attributes available in an annotation entry received by a system equipped with the present invention may be generated without the user associated as an author, submitter, contributor, or originator with the annotation entry having provided the data, attributes, or data associated with the attributes. For instance, an author, publisher, or machine generator of the document may have embedded such data, attributes, or data associated with the attributes into the document or its metadata, such data, attributes, or data associated with the attributes which may or may not be readable or perceivable by the user associated with the annotation entry; or a computer sending the annotation entry to the system may be capable of retrieving such data, attributes, or data associated with the attributes from or for the document without any input from the user. In some embodiments, the user may identify an attribute for inclusion into the annotation entry, and the computer may provide the data associated with the attribute to the annotation entry in response to such act of identifying. In another embodiment, the user may submit or cause the computer to submit an annotation entry for the document to a system equipped with the present invention, the annotation entry comprising data, attributes, or data associated with the attributes in relation to the document, without the user having provided the data, attributes, or data associated with the attributes.

According to another embodiment, an attribute of a product or service may be associated with a value or data that may differ in relation to or association with different or multiple sources, settings, or opinions. For example, the rating of a battery lifespan on a mobile phone may be subject to a usage scenario, experience of different users, or interpretation. Multiple users may, for example, assign a different value to a product's property or attribute that is typically associated with a single or a range of values (e.g., 7 to 8 hours of usage for a single full battery charge). In one embodiment, such a single or range of values may be determined based on user-generated values or data for an attribute. According to another embodiment, a user may be interested in a product's attribute whose or which information is not yet available or associated with a product. For instance, the user may define or otherwise associate such an attribute with the product. In one embodiment, a pool or collection of pre-defined attributes may be a source where the user searches and finds the attribute for association with the product. Attributes in such a pool or collection may be user-defined, system-defined, or a combination thereof. The pool or collection of attributes may be subject matter specific or related. In another embodiment, it may not be specific to a particular category of products. In one embodiment, a user may post, select, or otherwise put forth, e.g., via a webpage, website or application, a question related to an attribute of or about a product, wherein the attribute or data of the attribute is not yet associated with the product. For example, the attribute or date of the attribute is not yet part of its advertisement, specification or description available on the webpage, website or application. A system, website, or application embodying the present invention may identify or otherwise determine such an attribute from a user-generated or user-initiated input or question (e.g., via a pre-defined, pre-formatted, pre-arranged, or free-form question, statement, expression, or input with which a user may enter an attribute of interest). The system, website, or application may determine a value or a range of value based on answers, replies or responses to the question, statement, expression, opinion, input, or to a request for input for the attribute of interest (e.g., as provided by the asker, other users, or the provider of the system, website, or application). The attribute along with the value or the range of value may then be associated with the product (e.g., in an advertisement, specification, or description available on the system, website, or application), where the attribute or its value or range of value was not previously part of the advertisement, specification, or description of the product on the system, website, or application. In one embodiment, an advertisement, specification, or description that comprises such a user-initiated attribute or property of a product and/or its value or range of value is presented on a webpage, system or application independently of the one or more user-initiated input, questions, statements, expressions, and opinions that may identify the attribute or property, and does not include its value or range of value. The advertisement, specification, or description may also be presented independently of the one or more user-initiated answers, replies or responses to the input, questions, statements, expressions, and opinions that may include the value or range of value for the attribute or property. In another embodiment, a user-initiated attribute or property of a product may be associated a value or a range of value that is determined based on data or input from a plurality of users, where the user responsible for identification of the attribute or property is not the same user who may provide a value for the attribute or property.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like, whereas suitable transmission media include signals. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of applicable claims.

In addition, a method and system for advertising information items to a user on behalf of another user is also provided. A user (an information item-supplying user, or simply a supplying user) may relate a set of information items to another set of information items, so that when the set of information items may become a candidate for presentation to another user (an information item-consuming user, or simply a consuming user) when the other user indicates interest in any member in the other set of information items. Supplying users may also specify criteria that target their information items to consuming users with specific attributes or in specific locations.

There may be cases where the number of candidate information items available is more than what may be presented to a consuming user in a given response, session or setup. According to one embodiment, candidate information items associated with a higher priority may be selected over those with a lesser priority. For example, levels of priorities may be established by how much supplying users are willing to pay for presentation of their information items (i.e., as advertisements or ads) to consuming users, a higher limit amounting to a higher priority. According to another embodiment, round robin or random selection may also be employed in connection with other selection policies or schemes. According to yet another embodiment, popular information items may readily be made known to supplying users so that they may associate their ads with these popular information items for increased exposure or relevance. As supplying users identify information items for association with their information items or ads so to promote the latter, the former will have their individual popularity scores increased, in addition to contributions from other popularity evaluation policies or schemes that may also be employed. This "supply-side" activity will further help discover popular information items for the benefits of both the supplying user and the consuming user. In embodiments, any unit of digital content or resource may be regarded as an information item. A reference or means of access to such digital contents or resources may also be regarded as an information item. For example, a webpage, video, or a blog available on the Web is an information item, so is a URL, hyperlinked image, or on-screen button to that webpage, video, or blog.

Figure 20:
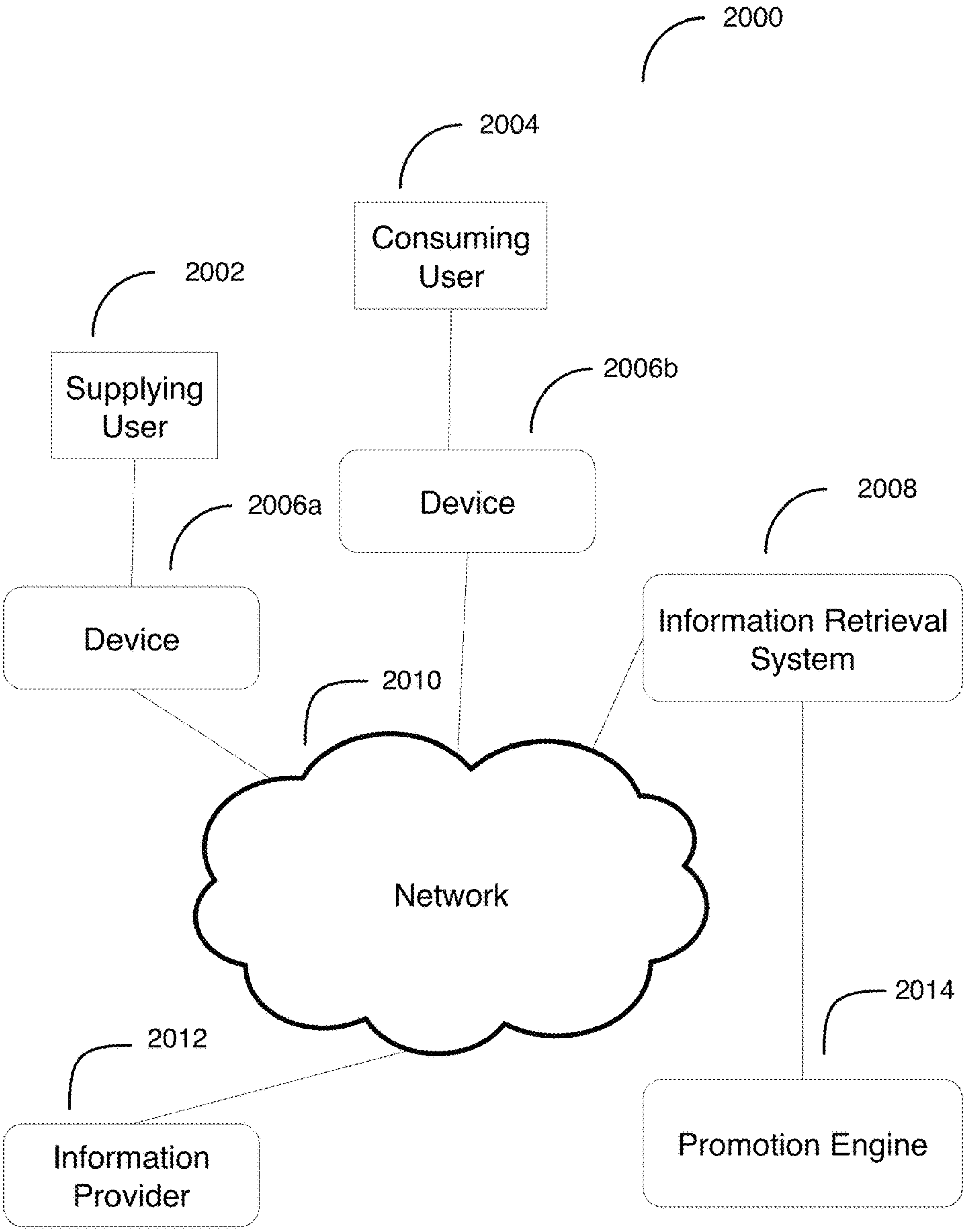
FIG. 20 illustrates an example environment for advertising information items on behalf of a user to another user.

FIG. 20 illustrates an example environment 2000 for advertising information items on behalf of a user to another user. A plurality of users, such as the supplying user 2002 and the consuming user 2004 at their respectively devices 2006*a* and 2006*b*, are communicatively coupled to an information retrieval system 2008 via a network 2010. (In embodiments, any type of network is within the scope of various embodiments.) The information retrieval system 2008 may comprise an entity that provides information retrieval services, content publication services, advertising services, news services, internal or external corporate information services, and so on. For example, the information retrieval system 2008 may provide a search engine that accepts queries or requests from one or more users through a device such as a computer, a terminal, or mobile phone, and provides one or more information items for presentation to the one or more users. The mode of such queries, requests or presentations may be textual, visual, audio, tactile, or anything communicable to or perceivable by the users. In addition, the information retrieval system 2008 may act as a gateway or proxy to information items available at another information provider 2012, to which the system may be coupled via a network. Examples of the other information provider 2012 include but are not limited to a search engine, a shopping website, a news portal, an online video download or streaming site, or the Web. For example, the information retrieval system 2008 may present URLs to information items that reside on another website or server.

A promotion engine 2014 is communicatively coupled to the information retrieval system 2008. The promotion engine 2014 maintains relationships between the supplying user 2002 (or the account of which the supplying user 2002 represents) and the information items (i.e., ads) that the user intends to advertise, and between these ads and third-party information items. The promotion engine 2014 also selects the appropriate ads for presentation to the consuming user 2004 based at least in part on their indications of interests regarding these third-party information items.

For instance, according to one embodiment, the supplying user 2002 may send via the device **2006*b* a query for information items on retail items, brand, sellers, and offers to a search engine (not shown) comprised by or otherwise associated with the information retrieval system 2008. The supplying user 2002 may then associate his ads (i.e., information items that the supplying user intends to advertise) with a subset of the information items returned by the information retrieval system 2008 in response to the query. The promotion engine 2014 would handle such association requests and maintain these association relationships. A consuming user may via another device indicate to the information retrieval system 2008 his interest in one of the information items in the subset. For example, the consuming user may click on or otherwise select a URL, hyperlinked text (i.e., hypertext), or hyperlinked image corresponding to that information item in a webpage or a list of search results as may be provided by the search engine or the information retrieval system 2008. The promotion engine 2014 would select or otherwise identify one or more of these ads in response to this user selection. The information retrieval system 2008 would make available the one or more ads so selected or identified for presentation or indication to the consuming user 2004 along with the information item that the consuming user 2004 has expressly indicated interest in. A supplying user may also be a consuming user, and vice versa. And a supplying user may represent an organization or corporation, or may be a machine or computer system acting in the role of a supplying user. And one or more supplying or consuming users may be communicatively coupled to the information retrieval system 2008 directly without via a network. According to other embodiments, the information retrieval system 2008 may comprise the promotion engine 2014, or the promotion engine 2014 may comprise a module or component associated with the information retrieval system 2008**.

Figure 21:
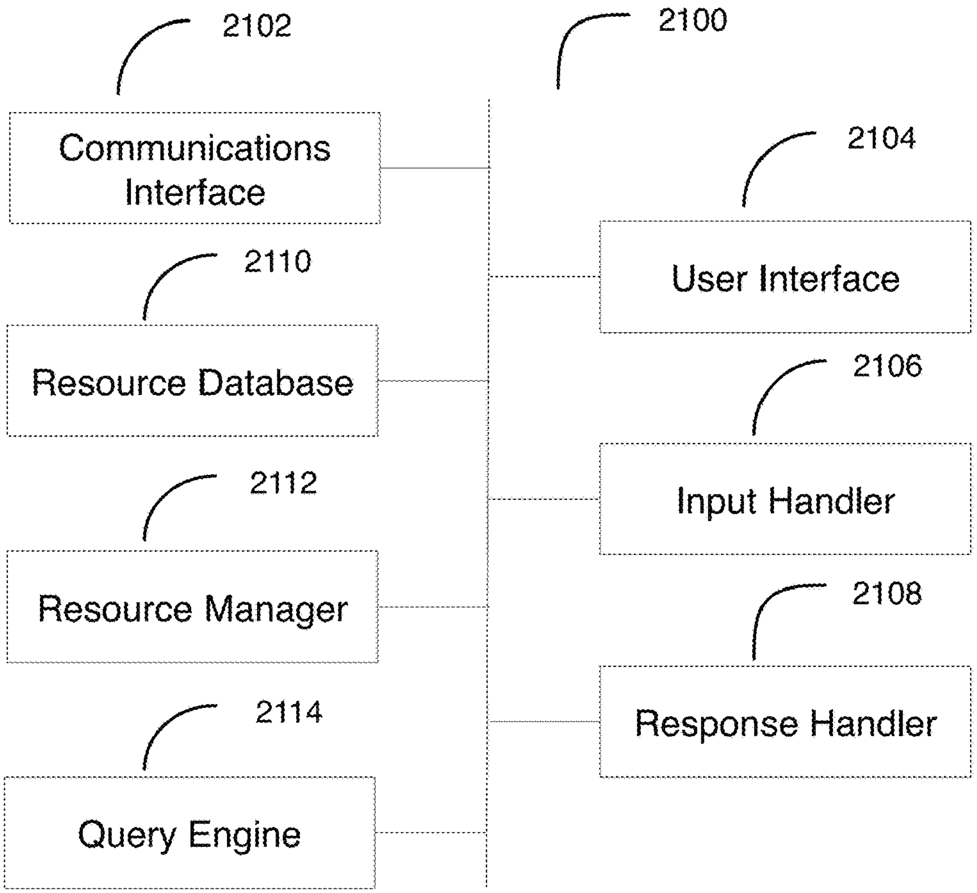
FIG. 21 illustrates a block diagram of an example information retrieval system.

Referring to FIG. 21, a block diagram of an example information retrieval system 2100, such as the information retrieval system 2008 illustrated in FIG. 20, is shown. The example information retrieval system 2100 includes a communications interface 2102, a user interface 2104, an input handler 2106, a response handler 2108, a resource database 2110, a resource manager 2112, and a query engine 2114.

The communications interface 2102 is provided for communicating with devices over a communications medium, such as the device **2006*a* or 2006*b* and the network 2010 shown in FIG. 20. These devices communicate with the information retrieval system 2100 via the communications interface 2102** utilizing various modes of delivery of data or messages, such as requests, responses, and notifications. Examples of such requests include login credentials, submissions of information items, queries for information items, requests for presentation of information items, and so on. Examples of such responses include search results or parts thereof, an information item or parts thereof, references to information items, error messages, and so on. Examples of such notifications include asynchronously generated information items, alerts of information items, location-triggered or time-of-day messages, and so on. Any type of communications interface or mode of delivery is within the scope of various embodiments.

The user interface 2104 is provided for communicating with a user, such as via the devices **2006*a* and 2006*b* described herein. It is configured to interact with the user to obtain his input and present output to him. For instance, it may be configured to communicate with a display engine or graphical user interface included in the devices 2006*a* and 2006*b* that are coupled to the user. It may also comprise a display engine or graphical user interface capable of accepting and presenting information from and to the user, whether the information is graphical, textual, audio, or any other mode of communication. For example, the user interface 2104 may present a search input box with which the user types in their query, accept the query, and present information items in response to the query. Data or messages between the user and the user interface 2104 are delivered via the communications interface 2102**. Any type of user interface is within the scope of various embodiments.

The input handler 2106 is provided for processing requests and collecting information items. For instance, it interprets requests received by the user interface 2104 from the user or the device to which he is coupled, and directs or otherwise causes other components or modules in the information retrieval system 2100 to fulfill those requests. Examples of such requests include a query, an information item submission, account login, and so on. For example, the input handler 2106 may cause the resource manager 2112 to store information items in the resource database 2110 in relation to an information item submission request. For a query request, the input handler 2106 may cause the query engine 2114 and response handler 2108 to process the query and respond to the user or the device via the user interface 2104. According to one embodiment, the input handler 2106 may for some requests respond to the device or the user via the communications interface 2102 or user interface 2104. Examples of this type of requests include an information submission request, new user account request, information item association request, and so on. The input handler 2106 may also generate inter-component or inter-module instructions based on or in response to incoming requests or information items. In some embodiments, the input handler 2106 includes a proxy for gathering or collecting information items from an information source, such as the information provider 2012 shown in FIG. 20. An example of such a proxy includes a crawler collecting resources from the Web.

The response handler 2108 is provided for preparing data for delivery to the device via the communications interface 2102 and for presentation to the user via the user interface 2104. For instance, it may cause the query engine 2114 to retrieve relevant information items when it receives instructions from the input handler 2106 to process a query for information items. After receiving the results from the query engine 2114, the response handler 2108 may select the most relevant set of results and present to the user via the user interface 2104 a response comprising this set of results. It may also include as part of the response a reference such as a URL with which the user may obtain another set of the results via the user interface 2104. In some embodiments, the user interface 2104 may cause the response handler 2108 to process this request for the other set of results without involving the input handler 2106. The response handler 2108 then causes the query engine 2114 to retrieve the other set of results. According to other embodiments, the user interface 2104 may cause the resource manager 2112 to retrieve the other set of results. The response handler 2108 may also interact with a promotion engine such as the promotion engine 2014 shown in FIG. 20 to retrieve additional information items or references to additional information items and make them available as part of the response for delivery and presentation to the device and the user.

The resource database 2110 is provided for storing information items and their related data, including but not limited to their submission and publication timestamps, authorship, submitter identification, authorship or submitter privacy settings, and so on. The information items and their related data may be stored, modified, added and so forth to any storage medium. Examples of timestamp include order of occurrence in a database, date, time of day, and the like. According to one embodiment, the resource database 2110 includes at least one index for the information items available therein.

The resource manager 2112 is provided for maintaining, organizing and operating the resource database 2110. Other modules or components communicate with the resource manager 2112 for access to the resource database. 2110 In one embodiment, other modules or components such as the query engine 2114 may access the resource database 2110 directly to search information items or their corresponding indexes. In some embodiments, the resource manager 2112 includes an indexing component or module that indexes the information items available in the resource database 2110 and facilitate fast information retrieval for the information items. It maintains and stores such indexes in the resource database 2110.

The query engine 2114 is provided for handling queries for information items and related data or metadata. It interprets or validates the queries and provides results to the queries as well as other data pertaining to the queries or results. For example, the query engine 2114 may include in its response the size of the available results and the searching time associated with a query. It communicates with the resource manager 2112 for access to the resource database 2110 where the information items and their related data or metadata are stored. In some embodiments, the query engine 2114 may access the resource database 2110 without involving the resource manager 2112 as an intermediary.

Although the information retrieval system 2100 is described as comprising various components or modules (the communications interface 2102, the user interface 2104, the input handler 2106, the response handler 2108, the resource database 210, the resource manager 2112, and the query engine 2114), fewer or more components or modules may be included in the information retrieval system 2100 and still fall within the scope of various embodiments. For example, the resource manager 2112 may comprise the query engine 2114. The input handler 2106 may further be divided into two components or modules, one for handling user requests and the other for handling information items from an external information provider. The input handler 2106 may comprise the response handler 2108, the response handler 2108 may comprise the query engine 2114 and resource manager 2112, or the user interface 2104 may comprise both the input handler 2106 and response handler 2108. And so on.

A promotion engine such as the promotion engine 2014 shown in FIG. 20 may be configured to maintain user accounts associated with supplying users, handle requests or instructions for relating or associating a set of information items to or with another set of information items, establish and maintain such relationships and associations, and promote one or more information items in the set of information items based at least in part on input from the input handler 2106, the response handler 2108, or some other component or module. For example, the promotion engine 2014 may receive a new user account request from the input handler 2106, and create a new user account in response to the request. It may receive an item information association request from the input handler 2106, and create and maintain the association or relationship between an information item and another information item in response to the request. It may receive from the response handler 2106 data about an information item selected by the consuming user 2004, and select one or more information items available in the information retrieval system 2008 in response to the data or based at least in part on the selected information item. In one embodiment, the promotion engine 2014 may receive the information item of user interest and identify other information items available in or otherwise referred to by the information item, and select for advertising one or more information items available in the information retrieval system 2008 based at least in part on these other information items. It may also select information items based on a part, segment, or section of the information item of user interest, and make them available as ads in relation to the part, segment, or section of the information item.

Figure 22:
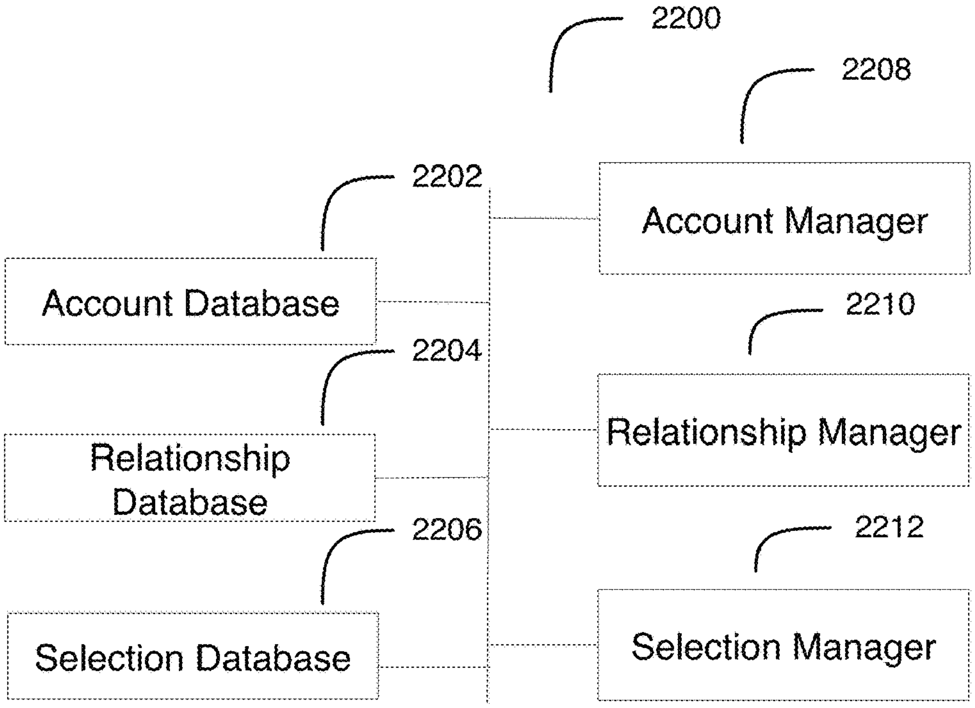
FIG. 22 illustrates a block diagram of an example promotion engine.

Referring to FIG. 22, a block diagram of an example promotion engine 2200, such as the promotion engine 2014 shown in FIG. 20, is shown. The example promotion engine 2200 includes an account database 2202, relationship database 2204, selection database 2206, account manager 2208, relationship manager 2210, and selection manager 2212.

The account database 2202 is provided for storing data associated with a user account, such as an account for the supplying user 2002 shown in FIG. 20. For instance, when a user subscribes to advertising or other services provided by the information retrieval system 2008, an account may be generated for the user. For example, the supplying user 2002 may provide logon credentials, budget information and other settings such as a daily cost limit, a maximum charge limit per thousand impressions, and so on. When the supplying user 2002 adds or modifies information to or in the account, such as changing the amount of his overall budget or adding an expiry to an ad campaign, the account in the account database 2202 may be updated with the information added or modified. The account may be stored, modified, added and so forth to any storage medium. A timestamp may be associated with the account. Examples of timestamp include order of occurrence in a database, date, time of day, and the like. In some embodiments, the account or part of the account may be created outside of the promotion engine 2014 or outside the information retrieval environment 2000.

For example, a third-party email or membership account may be used as logon credential for the user account. Alternatively, the account database 2202 may be located externally or remotely and accessed by the information retrieval system 2008 or promotion engine 2014 over the network 2010 or another network.

The account manager 2208 is provided for maintaining, organizing and operating the account database 2202. Other modules or components communicate with the account manager 2208 for access to the account database 2202, such as initiating a search of the account database 2202. In one embodiment, the selection manager 2212 may access the account database 2202 directly to search account information. In some embodiments, the account manager 2208 includes an indexing component or module that indexes the data available in the account database 2202 and facilitate fast information retrieval for the data. It maintains and stores such indexes in the account database 2202. In some embodiments, the account manager 2208 is operably configured to cause the query engine 2114 to search the account database 2202.

The relationship database 2204 is provided for storing data pertaining to relationships and associations relative to information items, such as the information items available in the information retrieval system 2008 and the information provider 2012 shown in FIG. 20. Example relationship and association data include associations between a user account and a plurality of sets of information items, associations between a budget available in a user account and a set of information items, associations between information items as ad and other information items that trigger or implicate them, relationships between information items as content, section, part or segment and their referring or embedding information items, an information item relating one information item to another, and so on. The data in the relationship database 2204 may be stored, modified, added and so forth to any storage medium. A timestamp may be associated with the account. In some embodiments, the relationship and association data or parts of the data may be created outside of the promotion engine 2014 or outside the information retrieval environment 2000. For example, a third-party social network may provide relationships between information items and user accounts. Alternatively, the relationship database 2204 may be located remotely and accessed by the information retrieval system 2008 or promotion engine 2014.

The relationship manager 2210 is provided for maintaining, organizing and operating the relationship database 2204, or any other database where relationship or association information among entities such as information items is available and obtainable. For example, two different information items may be related by a common part or constituent information item, such as two offer information items having or referring to the same brand despite having or referring to different product names and sellers. Other modules or components communicate with the relationship manager 2210 for access to the relationship database 2204, such as initiating a search of the relationship database 2204. In one embodiment, other components or modules such as the selection manager 2212 may access the relationship database 2204 directly to search information on relationships and associations. In some embodiments, the relationship manager 2210 includes an indexing component or module that indexes the data available in the relationship database 2204 and facilitate fast information retrieval for the data. It maintains and stores such indexes in the relationship database 2204. In some embodiments, the relationship manager 2210 is operably configured to cause the query engine 2114 to search the relationship database 2204.

The selection database 2206 is provided for storing data associated with selections of information items for advertising on behalf of supplying users, such as the supplying user 2002 shown in FIG. 20. Example selection-related data include impression counts, impression timestamps, assigned priorities or positions, and so on, for information items that have been selected for presentation as ad to consuming users. The data in the selection database 2206 may be stored, modified, added and so forth to any storage medium. A timestamp may be associated with data entries in the selection database 2206. In some embodiments, the data or part of the data may be created outside of the promotion engine 2014 or outside the information retrieval environment 2000. For example, a third-party billing or accounting system may provide the storage and maintenance of the selection-related data. Alternatively, the selection database 2206 may be located remotely and accessed by the information retrieval system 2008 or promotion engine 2014.

The selection manager 2212 is provided for selecting information items for advertising. For instance, it selects information items in relation to a given information item based at least in part on relationships or associations between the given information item and other information items available in or through the information retrieval system 2008. For example, the selection manager 2212 may receive from the response handler 2108 an information item selected by the consuming user 2004. It causes the relationship manager 2210 to search the relationship database 2204 for associations between the information item and one or more information items provided by or otherwise associated with the supplying user 2002 or any other supplying users (whose accounts are stored in the account database 2202). If data for such associations exist, the selection manager 2212 causes the resource manager 2112 to retrieve the one or more information items from the resource database 2110 based at least in part on the data. In one embodiment, the selection manager 2212 may choose from the one or more information items a subset of information items whose "last selected" timestamps are the oldest, up to some maximum limit on the size of the subset imposed by the response handler 2108. The selection manager 2212 updates the "last selected" timestamps and impression counts in the selection database 2206 for the chosen information items. It may also check via the account manager 2208 if the account balances associated with the chosen information items have sufficient funds to pay for the impressions before finalizing the selections. In another embodiment, the promotion engine 2014 may receive the information item of user interest (e.g., an article) and analyze its content to determine if it contains information items (e.g., a seller or brand name) for which there exists in the relationship database 2204 one or more associations between these information items and one or more information items in the resource database 2110 as provided by or otherwise associated with the supplying user 2002 or any other supplying users. In yet another embodiment, the selection manager 2212 may select information items for advertising based on a part, segment, or section of the information item of user interest, associate the advertising information items with the part, segment, or section of the information item, and cause the response handler 2108 to automatically make available (e.g., via the user interface 2104) the advertising information items to the consuming user 2004 without any further user input when the information retrieval system 2008 presents the part, segment or section of the information item to the consuming user 2004 via a coupled device such as the device 2006*b* shown in FIG. 20. In some embodiments, the selection manager 2212 is operably configured to cause the query engine 2114 to search the selection database 2206.

Although the promotion engine 2200 is described as comprising various components or modules (the account database 2202, the relationship database 2204, the selection database 2206, the account manager 2208, the relationship manager 2210, and the selection manager 2212), fewer or more components or modules may be included in the promotion engine 2200 and still fall within the scope of various embodiments. For example, the resource database 2110 and resource manager 2112 may comprise the account database 2202 and account manager 2208 respectively. Or the selection database 2206 and selection manager 2212 may comprise the account database 2202 and account manager 2208 respectively. Or the resource database 2110 may comprise the selection database 2206, and the selection manager 2212 is configured to interact with the resource manager 2112 to add, update and remove selection-related data therein. Or a single database may comprise the account database 2202, relationship database 2204, and selection database 2206 (as well as the resource database 2110). Or a single database manager may be configured to maintain the account database 2202, relationship database 2204, and selection database 2206 (as well as the resource database 2110), and provide access to these databases.

Figure 23:
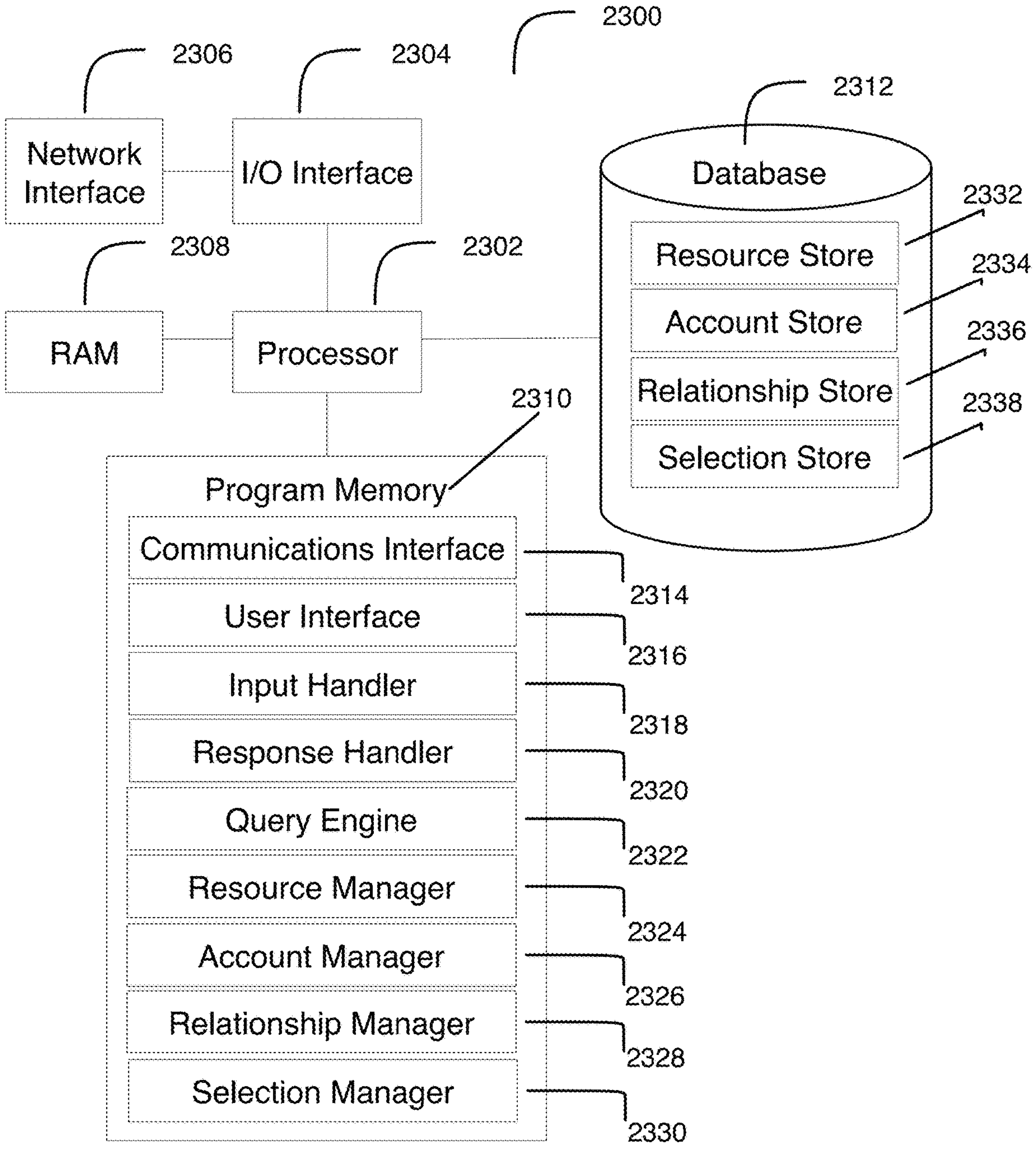
FIG. 23 illustrates a block diagram of a processor system implementing an information retrieval system comprising a promotion engine.

Referring to FIG. 23, a general block diagram of a processor system 2300 implementing an information retrieval system comprising a promotion engine, such as the example information retrieval system 2200 and the example promotion engine 2300 shown in FIG. 21 and FIG. 22 respectively, is shown. Generally, in the embodiment shown, the processor system 2300 includes a processor circuit comprising a processor 2302, and an input/output (I/O) interface 2304 to which a network interface 2306 is coupled. The processor is also in communication with random access memory (RAM) 2308, program memory 2310 and database memory 2312. The processor 2302 controls the database memory 2312 under the direction of a general database manager (not shown), a specialized database manager (not shown), a combination thereof (herein referred to as a hybrid database manager), or a collection of database managers, implemented in codes stored in the program memory 2310 that direct the processor 2302 to perform database management functions to maintain one or more databases of data records in the database memory 2312.

The term "processor system" has been used to indicate that the processor circuit shown in FIG. 23 is only one of a plurality of implementations and configurations and that, for example, the processor system 2300 may employ a plurality of processors locally or geographically distributed to effect the functions described below that are performed by the processor system 2300. The processor system 2300 may be configured to contain fewer or more components. For example, the RAM 2310 may comprise storage for parts of or the entire database 2312. Or the general database manager, the specialized database manager, the hybrid database manager, or the collection of database managers may include codes that direct the processor 2302 to communication with a database located remotely from the information retrieval system so realized. The remotely located database could be a commercial database, for instance, and the information retrieval system may merely be configured to interact with such database without requiring substantial memory or detailed database management functionality at the information retrieval system. A terminal interface (not shown) may be connected to the I/O interface 2304 for direct interaction with users. Or the I/O interface 2304 may comprise the network interface 2306. The processor system 2300 may comprise a plurality of distributed processors, program memories, and databases coupled over a network. Or it may comprise a plurality of processor subsystems each capable of operating as a standalone processor system.

To enable an information retrieval system (such as the information retrieval system 2008 shown in FIG. 20) to perform the functionality described above in which information items are advertised to a user on behalf of another user, the program memory 2310 includes the following components or modules: a communications interface 2314 (such as the one (2102) shown in FIG. 21, and being operably configured to perform its functionality as described above), a user interface 2316 (such as the one (2104) shown in FIG. 21, and being operably configured to perform its functionality as described above), an input handler 2318 (such as the one (2106) shown in FIG. 21, and being operably configured to perform its functionality as described above), a response handler 2320 (such as the one (2108) shown in FIG. 21, and being operably configured to perform its functionality as described above), a query engine 2322 (such as the one (2114) shown in FIG. 21, and being operably configured to perform its functionality as described above), a resource manager 2324 (such as the one (2112) shown in FIG. 21, and being operably configured to perform its functionality as described above), an account manager 2326 (such as the one (2208) shown in FIG. 22, and being operably configured to perform its functionality as described above), a relationship manager 2328 (such as the one (2210) shown in FIG. 22, and being operably configured to perform its functionality as described above), and a selection manager 2330 (such as the one (2212) shown in FIG. 22, and being operably configured to perform its functionality as described above). The database 2312 includes the following stores or repositories of data records: resource store 2332 (such as the resource database 2110 shown in FIG. 21, and being operably configured to perform its functionality as described above), account store 2334 (such as the account database 2202 shown in FIG. 22, and being operably configured to perform its functionality as described above), relationship store 2336 (such as the relationship database 2204 shown in FIG. 22, and being operably configured to perform its functionality as described above), and selection store 2338 (such as the selection database 2206 shown in FIG. 22, and being operably configured to perform its functionality as described above).

For instance, in one embodiment, the communications interface 2314 (e.g., HyperText Transport Protocol (HTTP) interface) is operably configured to direct the information retrieval system to send and receive data and messages over a network via the I/O interface 2304 (e.g., Transport Control Protocol (TCP) port interface) coupled to the network interface 2306 (e.g., Internet Protocol (IP) network interface). The user interface 2316 is operably configured to cause the information retrieval system to accept requests and present responses and notifications from and to users via devices coupled to the users. The input handler 2318 is operably configured to cause the information retrieval system to process and interpret requests such as a query for information items, a request for submitting information items, and a request for associating an advertising information item with one or more referring or triggering information items. The response handler 2320 is operably configured to cause the information retrieval system to prepare results in response to user requests, and make them available to the users via the user interface 2316. Such results include a list of references (e.g., URLs) to information items in response to a query from a supplying user, a list of references to information items and another list of references to ads in response to a query from a consuming user, and an operation result status in response to a request for submitting information items in the resource store 2332, or to a request for associating an advertising information item with one or more referring or triggering information items. The query engine 2322 is operably configured to cause the information retrieval system to initiate a search of the resource store 2332 for information items that meets criteria set forth in user requests or requests from other components or modules. The query engine 2322 is also operably configured to cause the information retrieval system to search the account store 2334, relationship store 2336, and selection store 2338 in accordance to criteria set forth in user requests or requests from other components or modules. The resource manager 2324 is operably configured to cause the information retrieval system to create new data records in the resource store 2332 for newly submitted information items. The account manager 2326 is operably configured to cause the information retrieval system to create and update user account data records in the account store 2334 in relation to user requests for account creation and update. The relationship manager 2328 is operably configured to cause the information retrieval system to create and update relationship and association data records in the relationship store 2336 in relation to user requests for associating a set of information items with another set of information items. The selection manager 2330 is operably configured to cause the information retrieval system to determine the appropriate information items for advertising in relation to an information item chosen by a user, for example, based at least in part on relationships or associations between the user-chosen information item and other information items available in or through the information retrieval system, the relationships or associations having corresponding data records in the relationship store 2336. The selection manager 2330 is also operably configured to cause the information retrieval system to create and update in the selection store 2338 the data records associated with the information items selected by the selection manager 2330 and the data records associated with the user accounts relating to those system-selected information items. The resource store 2332 is operably configured to store information item data records and related data, and handle operation requests from the resource manager 2324 and other components or modules in the program memory 2310. The account store 2334 is operably configured to store user account data records and related data, and handle operation requests from the account manager 2326 and other components or modules in the program memory 2310. The relationship store 2336 is operably configured to store relationship and association data records and related data, and handle operation requests from the relationship manager 2328 and other components or modules in the program memory 2310. The selection store 2338 is operably configured to store selection data records and related data, and handle operation requests from the selection manager 2330 and other components or modules in the program memory 2310.

Figure 24:
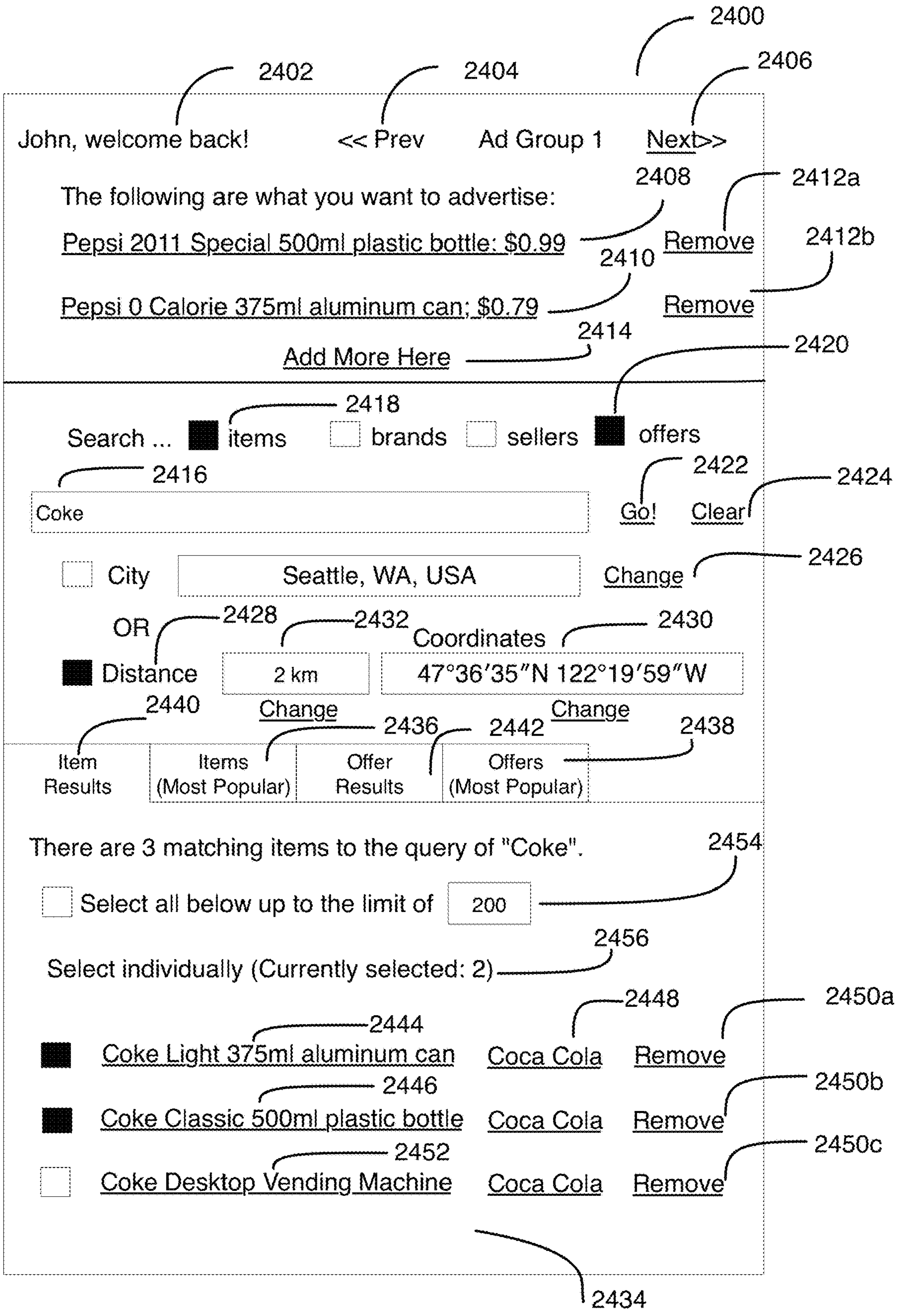
FIG. 24 illustrates an example presentation or screenshot that may appear on a device coupled to a user, such as the device coupled to the supplying user shown in FIG. 1.

FIG. 24 is an example presentation or screenshot 2400 that may appear on a device coupled to a supplying user, such as the device 2006*a* coupled to the supplying user 2002 shown in FIG. 20. At the top of the presentation 2400 is a greeting message 2402 to the user named "John" after he has successfully logged into his account at an information retrieval system embodying the present invention, such as the one (2008) shown in FIG. 20. The user may navigate to his different ad groups associated with his account using the hypertexts "Prev" 2404 (shown disabled) and "Next" 2406. His ad group 1 shows two information items, or their references (e.g., in form of a hypertext or URL), associated with the user for advertising, namely the "Pepsi 2011 Special 500 ml . . . $0.99" ad 2408 and "Pepsi 0 Calorie 375 ml . . . $0.79" ad 2410. These ads or ad entries are hyperlinked so that the user may retrieve more information about them through their corresponding hypertexts. Each of these information items may include item information (e.g., product or service), seller information (e.g., a seller address associated with the user account; not shown), and price information. Quantity information assumes the value of one if not explicitly stated. An information item comprising item information, seller information, and price information may be regarded as an offer information item or an offer entry, the offer information item or offer entry including an item information item, a seller information item, and a price information item. In this embodiment, an item information item, or an item entry, includes brand information. In another embodiment, brand information is a separate information item or entry. The user may remove an ad from his ad group using the hypertext "Remove" 2412*a* or 2412*b* next to the ad, and add a new ad using the hypertext "Add More Here" 2414.

To associate with his ad group 1 one or more information items available in the information retrieval system, the user first queries the system for information items of interest, and then selects from the results the one or more information items. For example, FIG. 24 shows that the user enters query input of "Coke" 2416 for two types of information items, namely the "items" 2418 and "offers" 2420, among the four available types (items, brands, sellers, and offers). The user initiates the query by selecting the hypertext "Go!" 2422. Or he may clear his query input through the hypertext "Clear" 2424. In some embodiments, query input may be sent to the system, as it is being typed or provided, without the need for explicit confirmation from the user. In another embodiment, the information retrieval system may present the user one or more information items, without any specific queries beforehand, for the user to choose for association with his ads.

In addition to types of information items, FIG. 24 shows that the user may also qualify his information items of interest with other criteria, such as location by city or by distance (which in this embodiment is applicable only to seller and offer information items or entries). The user may change the city, distance and coordinates through their corresponding hypertext "Change" 2426. FIG. 24 shows that the user selects location qualification by distance 2428, with coordinates—47° 36'35"N 122° 19'59"W 2430, and distance range of 2 kilometers 2432. Having received this query with such location qualification, the information retrieval system returns a plurality of information items 2434 per requested information type, as well as information items that the system deems popular for each of the type 2436 or 2438. The system may or may not consider the query or the location criteria when selecting these popular information items. Each set of results is displayed on an individual tabbed subarea, namely, Item Results 2440, Items (Most Popular) 2436, Offer Results 2442, and Offers (Most Popular) 2438. FIG. 24 shows the "Item Results" 2440 tabbed subarea in view. There 2454 and 2456 respectively the user may select all the information item results up to a certain maximum limit (e.g., 2100), or select each of them individually. FIG. 24 shows that the user has selected two information items, namely the product item “Coke Light 375 ml aluminum can” 2444 and the product item “Coke Classic 500 ml plastic bottle” 2446 respectively, both of brand “Coca Cola” 2448. The user may also remove any results from the tabbed area (and thereby deselecting them if they’re selected) through the hypertext “Remove” 2450*a*, 2450*b*, and 2450*c* located at the end of each result entry. These result entries are hyperlinked so that the user may retrieve more information about them or access more functions in relation to them through their corresponding hypertexts 2444, 2446, and 2452. As such, FIG. 24 shows how a user such as the supplying user 2002 shown in FIG. 20 may associate his ads with one or more information items available in or through an information retrieval system embodying the present invention, so that the ads may be selected for presentation, or become a candidate for presentation, to another user when the one or more information items are determined to be of interest to the other user, for example, in response to a query of the other user, or as part of a chronological or spatial series of presentations initiated by the other user.

Figure 25:
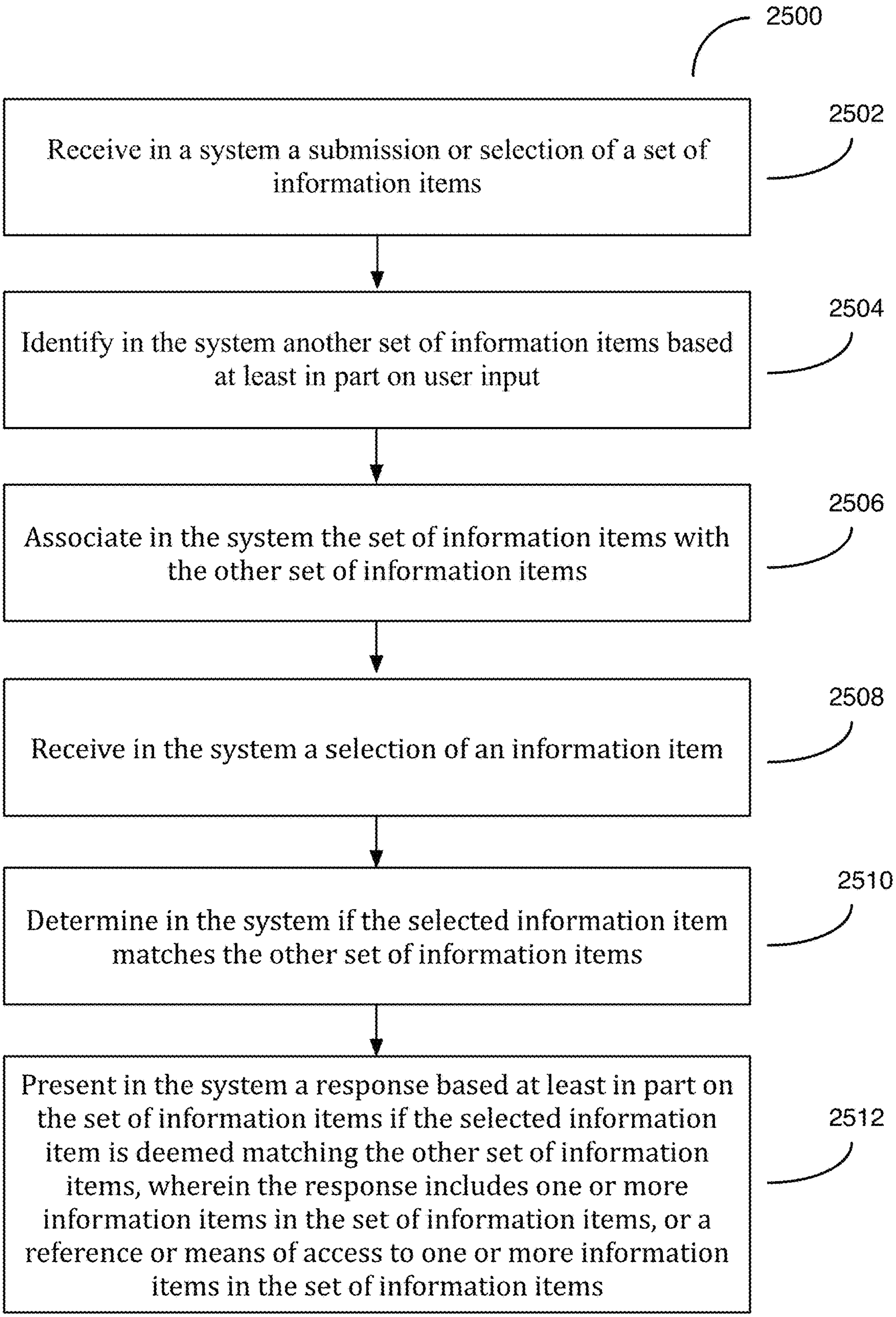
FIG. 25 illustrates a flow diagram of an example process for advertising information items.

Referring to FIG. 25, a flow diagram of an example process 2500 for advertising information items on behalf of a user to another user is provided. Per the example process 2500, a submission or selection of a set of information items is received (2502), wherein the set of information items may be available in or through an information retrieval system such as the one (2008) shown in FIG. 20, and it may be associated with a user account in the information retrieval system. For example, the user interface 2316 receives the logon request from a supplying user via the communications interface 2314. It passes the logon credential contained in the logon request to the input handler 2318 which in turn causes the account manager 2326 to verify the logon credential using the data records in the account store. Upon successful verification, the account manager 2326 notifies the response handler 2320 of this result. The response handler 2320 causes the account manager 2326 to retrieve user account information from the account store 2334 and the relationship manager 2328 to retrieve from the relationship store 2336 any relationships or associations that the user has with information items available in the resource store 2332. The response handler 2320 then causes the user interface 2316 to present a graphical user interface (such as the one (2400) shown in FIG. 24) to the supplying user via his coupled device. The input handler 2318 may then receive via the user interface 2316 a submission or selection of a set of information items from the supplying user. This set of information items, namely the ads associated with the supplying user account, such as the ad group 1 shown in FIG. 24, may already exist in the resource store 2332. For instance, the response handler 2320 via the user interface 2316 may populate the graphical user interface on the device with information items previously submitted by the supplying user under his user account maintained in the account store 2334, the information items thereafter being available in the resource store 2332 and the relationships between the information items and the user account being stored in the relationship database 2336. If any of the information items in the set does not yet exist in the resource store 2332, the input handler causes the resource manager to add it in the resource store, and the association manager to associate it with the supplying user account. The input handler 2318 may receive requests from the supplying user to add to his account-associated ad group (such as the ad group 1 shown in FIG. 24) one or more new information items not yet available in the resource store 2332, select one or more existing ones from the resource store 2332 to add to the ad group, or remove one or more information items from the ad group. In addition, the input handler 2318 may receive from the supplying user a set of criteria associated with the set of information items, store the set of criteria in the resource store 2332, and cause the relationship manager 2328 to store in the relationship store 2336 the relationships between the set of criteria and the set of information items. The relationship manager 2328 and/or the selection manager 2330 may then determine based at least in part on the set of criteria the eligibility of any information item, or parts thereof, or any user input, in triggering or otherwise implicating the set of information items for advertising. Examples of the set of criteria include a distance range relative to a geographical position, a set of cities, a set of countries, a set of genders, an age range, a score range, a set of identities, and a set of memberships. Alternatively, the input handler 2318 may retrieve in the account store 2334 via the account manager 2326 the set of criteria from the user account associated with the supplying user. Target information or attributes to be subject to these criteria may be available in the information item or user input or relating to information about the consuming user, the information being available in the account store 2334. Examples of such information or attributes include location information (e.g., a city name, a geographical point such as a Global Positioning System position or GPS position, a geographical area, and so on), time information (e.g., a time-stamp or range, calendar dates, time of day, and so on), and user information (e.g., age or age range, gender, membership, identity, purchase history, and so on).

Per the example process 2500, another set of information items is identified based at least in part on user input (2504), wherein the user input includes a submission or selection of the other set of information items from the supplying user, wherein the user input includes a query resulting in one or more information items in the other set of information items, wherein the user input includes the set of information items, and wherein the user input includes an information item selected by a consuming user. For example, the input handler 2318 may receive references to the individual information items in the other set of information items from the user interface 2316 that interacts with the supplying user via a graphical user interface such as the one (2400) shown in FIG. 24. Or the input handler 2318 may receive via the user interface 2316 a query from the supplying user and cause the query engine 2322 to search the resource store 2332 for the other set of information items based at least in part on the query. Or the input handler 2318 may cause the query engine 2322 to search for the other set of information items in the resource store 2332 based at least in part on the set of information items or the consuming user-selected information item, such as the constituent parts of each of the information item in the set or of the user-selected information item. In one embodiment, an operator or administrator of the information retrieval system may specify as the other set of information items a plurality of keywords in the relationship store. In another embodiment, the input handler 2318 may cause the relationship manager 2328 to discover common or shared information items based on information items in the resource store 2332, and provide these common or shared information items as the other set of information items. The input handler 2318 may also retrieve in the account store 2334 or receive via the user interface 2316 a limit, criterion, or constraint such as a maximum number, a city name, a location, and a geographical area. The query engine 2322 will further subject information items that are candidate to being part of the other set of information items to such a limit, criterion, or constraint.

Per the example process 2500, the set of information items is associated with the other set of information items (2506). For example, the input handler 2318 may cause the relationship manager 2328 to create at least one data record in the relationship store 2336 for associating the set of information items with the other set of information items.

Per the example process 2500, a selection of an information item is received (2508), wherein the information item is received from a consuming user, such as the one (2004) shown in FIG. 20, and the consuming user is not associated with the supplying user account. For example, the input handler 2318 may receive via the user interface 2316 a query from the consuming user for information items. The input handler 2318 causes the query engine 2322 to search the resource store 2332 for matching information items based at least in part on the query. The query engine 2322 causes the response handler 2320 to present via the user interface 2316 one or more of the matching information items to the consuming user. The input handler 2318 then receives via the user interface 2316 from the user a selection of an information item among the one or more matching information items. In addition, the input handler 2318 may receive from the consuming user another set of criteria associated with the selected information item, and cause the relationship manager 2328 and/or the selection manager 2330 to determine based at least in part on the other set of criteria the eligibility of the set of information items for presentation to the consuming user. Examples of the other set of criteria include a distance range relative to a geographical position, a city, a country, an affiliation, a certification, a quality mark, a minimum rating or score, and so on. Alternatively, the input handler 2318 may retrieve in the account store 2334 via the account manager 2326 the other set of criteria from the user account associated with the consuming user. Target information or attributes to be subject to these criteria may be available in the individual information items in the set of information items for advertising or relating to information about the supplying user, the information being available in the account store 2334. Examples of such target information or attributes include location information (e.g., a city name, a geographical point or area, and so on), time information (e.g., a time-stamp or range, calendar dates, time of day, and so on), seller information (e.g., a minimum customer satisfaction score or rating, a minimum number of sales, and so on), and price information (e.g., a price range).

Per the example process 2500, whether the selected information item matches the other set of information items is determined (2510). For example, the input handler 2318 may cause the relationship manager 2328 to search the relationship store 2336 or the resource store 2332 for data records indicating relationships or associations between the selected information item and the other set of information items. Examples of these relationships or associations include that the other set of information items includes or refers to the selected information item, that the selected information comprises or refers to at least one information item in the other set of information items, and that an information item in the other set of information items and the selected information item comprise or refer to the same information item, or an equivalent or comparable information item. In addition, the relationship manager 2328 may check for availability of matching criteria associated with the set of information items and that of target information associated with the other set of information items, and determine if the target information meets the criteria. Likewise, the relationship manager 2328 may check for availability of matching criteria associated with the other set of information items and that of target information associated with the set of information items, and determine if the target information meets the criteria. In one embodiment, only information items in the set of information items that pass both cases (or "directions") of such determination are deemed matching with the other set of information items. In some embodiments, the selection manager 2330 performs these criteria checking or matching. In other embodiments, it is the response handler 2320.

Per the example process 2500, a response based at least in part on the set of information items is presented if the selected information item is deemed matching the other set of information items (2512), wherein the response includes one or more information items in the set of information items, or a reference or means of access to one or more information items in the set of information items, and wherein the response is presented to the consuming user via his coupled device. For example, the relationship manager 2328 notifies the response handler 2320 of the determination result. If there is a positive match, the response handler 2320 causes the selection manager 2330 to select one or more information items in the set of information items, and presents the one or more information items in connection with the selected information item to the consuming user via the user interface 2316. Otherwise, the response handler 2320 presents the selected information item to the consuming user without the set of information items. The presentation of the one or more information items for advertising includes a list of URLs each corresponding to one information item, an alert or software button through which the one or more information items or their URLs may be accessed, and so on.

It should be appreciated that the specific steps illustrated in FIG. 25 provide a particular method of advertising information items according to an embodiment of the present invention. Other sequences of steps may also be performed according to alternative embodiments. For instance, alternative embodiments of the present invention may perform the steps outlined above in a different order. Moreover, the individual steps illustrated in FIG. 25 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives.

For instance, the step of receiving a selection of an information item (2508) may take place before the step of identifying another set of information items based at least in part on user input (2504), for example, when the user input comprises, refers to, or includes the selected information item. Relationships or associations obtained in the step of associating the set of information items with the other set of information items (2506) need not be stored in any database, for example, when they may be determined dynamically or on demand. Or the step of associating the set of information items with the other set of information items (2506) may be omitted, for example, when the selected information item and a member in the set of information items comprise or refer to a common, equivalent, or relating information item, which composes, constitutes or functions as the other set of information items. The step of identifying another set of information items based at least in part on user input (2504) may comprise, incorporate, eliminate, or replace the step of receiving a selection of an information item (2508), for example, when the user input is the selection of the information item. The step of identifying another set of information items based at least in part on user input (2504) may also comprise, incorporate, eliminate, or replace the step of determining if the selected information item matches the other set of information items (2510), for example, when the set of information items are the other set of information items, the user input is the selected information item, and both the set of information items and the user input comprises or refers to a common, equivalent or otherwise relating information item.

In another embodiment, the step of associating the set of information items with the other set of information items (2506) may be omitted or otherwise absorbed by other steps shown in FIG. 25. For example, the input handler 2318 receives a submission or selection of an offer entry (i.e., the set of information items) when the supplying user fills in, selects, or uploads via his coupled device the offer entry comprising a plurality of parts (e.g., item entry, seller, entry, and price entry) or attributes (e.g., item name, brand name, seller name, city location, GPS position, postal code, and price). The input handler causes the resource manager (2324) to create a data record for the offer entry if such data record does not yet exist. Each of these parts and/or attributes may readily be identifiable, for example, via the structure or template by which contents for these parts and attributes are specified, organized, or stored. These readily identifiable parts or attributes, and the contents therein, compose or otherwise constitute the other set of information items. When the input handler 2318 receives via the user interface 2316 a selection of an information item (e.g., another offer entry, a webpage, an article, a sound track, an image, a video, or a reference or URL to any of them) from the consuming user, the input handler 2318 causes the resource manager 2324 to compare the content of the selected information item with the contents of the readily identifiable parts or attributes, so to determine if the selected information item comprises or refers to contents in at least one of the readily identifiable parts or attributes. If so, then the resource manager 2324 causes the selection manager 2330 to retrieve the offer entry, and makes it available to the response handler 2320 for presentation to the consuming user, unless the offer entry is also the selected information item. Alternatively, the input handler 2318 causes the resource manager 2324 to identify the individual parts or attributes, and contents therein (i.e., the other set of information items), and create at least one data record for the offer entry and at least another data record for the individual contents if such data records do not yet exist in the resource store 2332. Each of the data records associated with the individual contents may be associated with an advertising cost or charge schedule, and may further be qualified (e.g., in form of name-value pair) by identification of their corresponding parts or attributes. This offer entry, as well as other offer entries in the resource store 2332 from the same supplying user or other supplying users, is associated with the data records for these individual contents when these offer entries comprise these individual contents. When the input handler 2318 receives a selection of information item, it causes the relationship manager 2328 to determine if the selected information item comprises or refers at least one of these individual contents. If so, the relationship manager 2328 causes the selection manager 2330 to retrieve at least one offer entry and causes the response handler 2320 to present the at least one offer entry to the consuming user, the at least one offer entry comprising or referring to the at least one of these individual contents. In some embodiments, the relationship manager 2328 creates and maintains at least one data record for associating the offer entry (e.g., the set of information items) in the resource store 2332 with the data records for individual part or attribute contents (e.g., the other set of information items), so to facilitate better performance and scalability in entry lookup and retrieval, such as using indexes. Or the relationship manager 2328 may create such association data records only when the input handler 2318 receives a request from the supplying user to associate the offer entry with the individual contents, so that the offer entry will be deemed matching the individual contents only if the corresponding association data records exist in the relationship store 2336. Offer entries without such corresponding association data records will not be deemed matching even if they comprise or refer to the individual contents. In other embodiments, the resource manager 2324 discovers or learns about the most frequently appearing or otherwise popular information parts or attributes, as well as their contents, based on a plurality of selected information items from various users, and builds up the other set of information items based at least in part on these popular information parts and attributes, as well as their contents.

Figure 26:
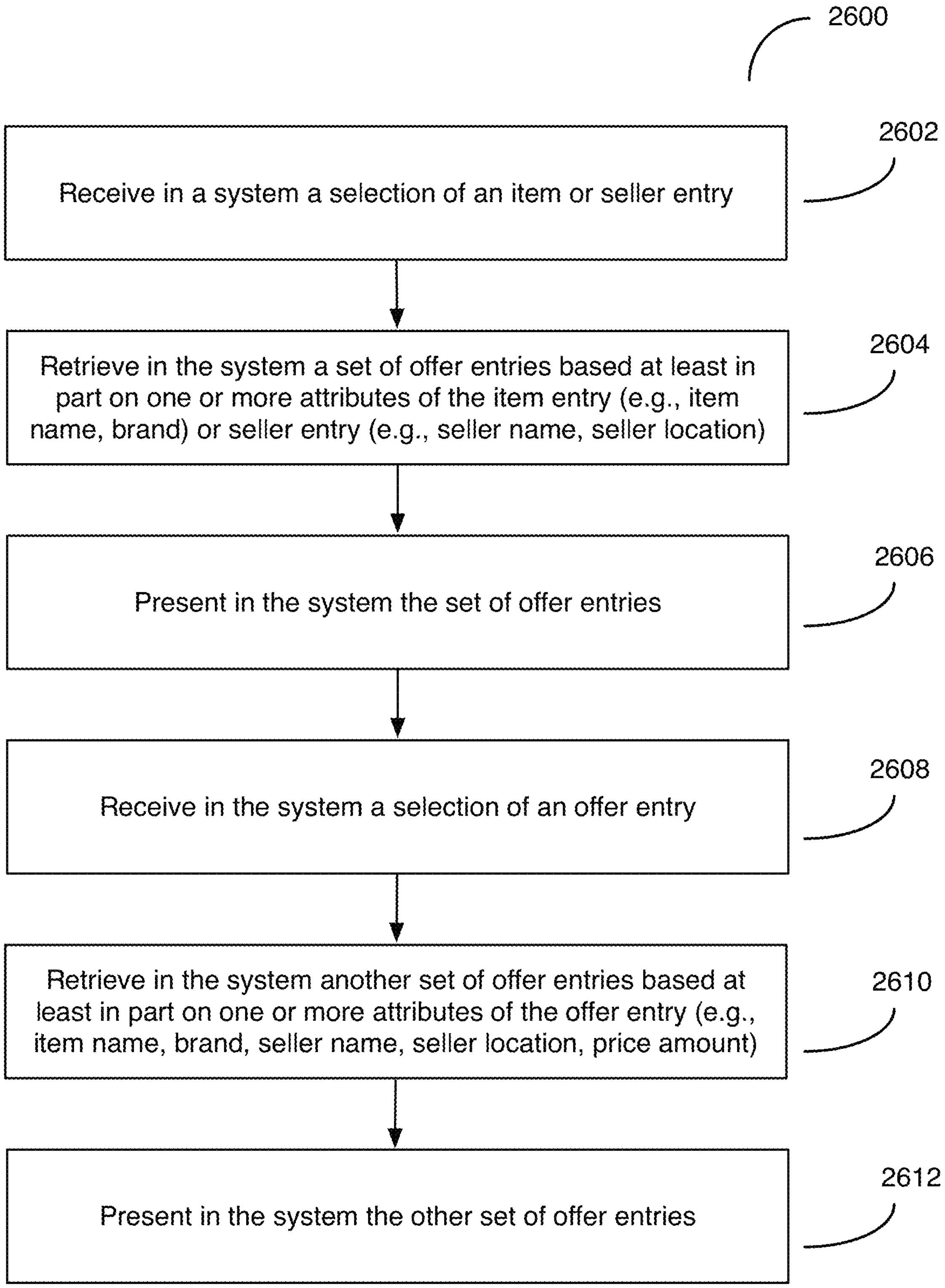
FIG. 26 illustrates a flow diagram of an example process for advertising offer information entries.

Referring to FIG. 26, a flow diagram of an example process 2600 for advertising offer information items or entries is provided. In one embodiment, an offer information item or entry comprises an item entry (e.g., an entry comprising or referring to descriptions or identification of a product or service), a seller entry (e.g., an entry comprising or referring to descriptions or identification of a seller, the seller providing the product or service), and a price entry (e.g., an entry comprising or referring to price information), wherein the item entry comprises or refers to one or more information items or attributes, such as an item name and brand. Per the example process 2600, a selection of an item entry is received (2602), such as from the consuming user 2004 shown in FIG. 20. The selection may be indicated by a reference, e.g., URL, to the item entry. For example, the input handler 2318 receives via the user interface 2316 a URL to an item or seller entry among a list of URLs to item or seller entries presented to a user through his coupled device (e.g., a mobile phone). In some embodiments, references to an item, seller, or offer entry are themselves regarded as item, seller, or offer entries.

Per the example process 2600, a set of offer entries based at least in part on the selected item or seller entry is retrieved (2604). For example, the input handler 2318 causes the relationship manager 2328 to search the relationship store 2336 or the query engine 2322 to search the resource store 2332 for the set of offer entries based at least in part on one or more attributes of the selected item or seller entry. In one embodiment, the set of offer entries comprise or refer to the same or equivalent one or more attributes (and the contents therein) as the selected item or seller entry, but not being the same or equivalent to the selected item or seller entry. Examples of these attributes include name, brand, location, and so on. The input handler 2318 may also cause the query engine 2322 to search the resource store 2332 for other offer entries that comprise or refer to the selected item or seller entry.

Per the example process 2600, the set of offer entries, as well as the other offer entries, is presented (2606). (In some embodiments, references to the offer entries in the set as well as to the other offer entries are presented instead.) For example, the relationship manager 2328 or the query engine 2322 notifies the response handler 2320 of the availability of the set of offer entries. The response handler 2320 causes the selection manager 2330 to choose one or more offer entries in the set of offer entries, and presents via the user interface 2316 the one or more offer entries to the user through his coupled device. In addition, the query engine 2322 may also notify the response handler 2320 of the availability of the other offer entries, and the response handler 2320 may present via the user interface 2316 the other offer entries to the user through his coupled device. The user interface 2316 may present both groups of offer entries as a single list, two independent lists one for each group, a single list for the other offer entries while a software button (e.g., an ad button) for access to the set of offer entries, and so on.

Per the example process 2600, a selection of an offer entry is received (2608). For example, the input handler 2318 receives via the user interface 2316 a reference, such as a URL, to an offer entry chosen by the user among the set of offer entries or the other offer entries (or their references) presented on the device coupled to the user.

Per the example process 2600, another set of offer entries based at least in part on one or more attributes of the offer entry is retrieved (2610). For example, the input handler 2318 causes the relationship manager 2328 to search the relationship store 2336 or the query engine 2322 to search the resource store 2332 for the other set of offer entries based at least in part on one or more attributes of the selected offer entry. In one embodiment, the other set of offer entries comprise or refer to the same or equivalent one or more attributes (and the contents therein) as the selected offer entry, but not being the same or equivalent to the selected offer entry. Examples of these attributes include name, brand, location, price, and so on. The input handler 2318 may also cause the query engine 2322 to retrieve the contents of the selected offer entry in the resource store 2332 or in an external or third-party information provider via a reference to the selected offer entry, such as a URL.

Per the example process 2600, the other set of offer entries, as well as the contents of the selected offer entry, is presented (2612). (In some embodiments, references to the other set of offer entries are presented instead.) For example, the relationship manager 2328 or the query engine 2322 notifies the response handler 2320 of the availability of the other set of offer entries. The response handler 2320 causes the selection manager 2330 to choose one or more offer entries in the other set of offer entries, and presents via the user interface 2316 the one or more offer entries to the user through his coupled device. In addition, the query engine 2322 may also notify the response handler 2320 of the availability of the contents of the selected offer entry, and the response handler 2320 may present via the user interface 2316 the contents of the selected offer entry to the user through his coupled device. The user interface 2316 may present the one or more offer entries and the contents of the selected offer entry on the same graphical user interface (GUI), or just the contents of the selected offer entry on the GUI including a software button (e.g., an ad button) for access to the one or more offer entries, and so on.

It should be appreciated that the specific steps illustrated in FIG. 26 provide a particular method of advertising offer information items or entries according to an embodiment of the present invention. Other sequences of steps may also be performed according to alternative embodiments. For instance, alternative embodiments of the present invention may perform the steps outlined above in a different order. Moreover, the individual steps illustrated in FIG. 26 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives. For example, the example process 2600 may repeat itself for any item, offer or seller entry selected by the user through the device to which he is coupled. In some embodiments, attributes of an entry, such as a brand name of an item, may be regarded as information items or entries composing the entry.

In some embodiments, there may be more information items or ads from the supplying user(s) that are qualified for presentation to the consuming user than what may be allowed under certain constraints. Example constraints include the maximum number of information items or ads (or their references such as URLs) that may be presented on a single screen or online page, the maximum time duration that consecutive information items or ads may be presented visually or audibly (e.g., in between two otherwise successive contents), and so on. Any selection criterion, policy or scheme for selecting information items or ads from a set of qualified information items or ads for presentation to the consuming user is within the scope of various embodiments. For example, the relationship manager 2328 notifies the selection manager 2330 of a set of qualified information items or ads. The selection manager 2328 selects a subset from the set of qualified information items or ads in accordance to some selection criteria, policies or schemes whose data are accessible and maintained in the selection store 2338 or any other storage, and causes the response handler 2320 to present via the user interface 2316 the subset of qualified information items or ads to the consuming user through his coupled device. Example criteria, policies and schemes include round robin, highest bid first, highest budget first, or a combination thereof. A set of ads may be associated with a user account such as a supplying user account in the account store 2334. Advertising budgets and limits may be associated with the set of ads, and such budgets and limits may be stored and maintained in the user account. Some or all of these advertising budgets or limits may be specific to certain selection criteria, policies and schemes.

FIG. 27 is an example presentation or screenshot 2700 that an information retrieval system equipped with the present invention may present to a user through a device to which she is coupled, such as the information retrieval system 2008 and the supplying user 2002 shown in FIG. 20. The example presentation or screenshot 2700 shows how the user (e.g., "Jane" 2702 as shown in FIG. 27) may provide advertising budgets and limits, or selection-related data, for her ads (e.g., the two ads "Campaign: Pepsi Seattle Marathon" 2704 and "Seller: Pepsi Downtown Seattle Mega Store" 2706 shown in FIG. 27), and how the information retrieval system may present various advertising costs associated with presenting ads in relation to a particular information item or group of information items. For example, the user may be presented with a screen or view such as the one (2700) shown in FIG. 27 when she selects a "Coca Cola" hypertext on a GUI such as the one (2400) shown in FIG. 24. The presentation 2700 in FIG. 27 shows three horizontal sections 2708, 2710, 2712 of information. The first section 2708 displays the individual ads 2704 and 2706 in the user's so-called "Ad Group 1". The second section 2710 displays the user's current budget and settings for "Ad Group 1" (e.g., advertising budgets, remaining balances, limits, or any selection-related data, for "Ad Group 1", such as total budget 2714, remaining balance 2716, expiry date 2718, daily limit 2720, cost limit 2722, minimum position 2724). The third section 2712 enables the user to navigate to a number of information items and displays the costs associated with presenting ads in relation to these information items under some conditions or criteria. For example, upon receiving via the user interface 2316 the selection of the "Coca Cola" hypertext from the user, the input handler 2318 causes the account manager 2326 to retrieve the data record(s) in the account store 2334 for "Ad Group 1", and causes the query engine 2322 to retrieve the ads in the resource store 2332 in relation to the data record(s). The input handler 2318 notifies the response handler 2320 of the availability of these ads, and the response handler 2320 presents via the user interface 2316 the ads or references to the ads to the user. In addition, the input handler 2318 causes the account manager 2326 to retrieve data record(s) in the account store 2334 for information about the budgets and limits associated with "Ad Group 1", and causes the response handler 2320 to present via the user interface 2316 the advertising budget and limits information. Furthermore, the input handler 2318 causes the relationship manager 2328 to retrieve relationship data records that associate an information item (e.g., the brand "Coca Cola" 2726) with the advertising costs for presenting ads in relation to that information item, and causes the selection manager 2330 to retrieve advertising cost data records in the selection store 2338 based at least in part on these relationship data records. The advertising cost data may be manually entered by an administrator or operator of the information retrieval system, or any personnel authorized to do so, automatically generated based on usage and interests in relation to the information item in question as determined by the information retrieval system or any third-party system, or a combination thereof. Any means of obtaining or generating data on advertising costs for advertising in relation to an information item is within the scope of various embodiments.

FIG. 27 shows an example advertising budget and limits available in data records associated with a set of ads (e.g., "Ad Group 1") that are stored in a user account (e.g., the user account of "Jane" in the account store 2334). The total budget 2714 (e.g., $1,000) indicates the maximum amount of money that is allocated for payments for advertising the set of ads. The remaining balance 2716 (e.g., $570) indicates the remainder of the budget available for advertising payments as of a certain timestamp 2728 (e.g., Jul. 1, 2011 3:45:12 pm PST). The expiry 2718 (e.g., Aug. 1, 2011 PST) indicates the day after which the advertising for the set of ads will stop. The daily limit 2720 (e.g., $100) indicates the maximum amount of charges allowed in a single calendar day. The cost limit 2722 (e.g., $0.50) indicates the maximum amount allowed to be charged per some advertising event, namely CPM (Cost Per Thousand Impressions), or some other schemes such as CPC (Cost Per Click Through), CPS (Cost Per Sale), and so on. The minimum position 2724 (e.g., 3) indicates the lowest position that the set of ads is intended to occupy if selected for presentation in an ordered list of ads to the user. The user may change any of these settings through the hyperlinked text (e.g., "Change" 2730) next to each of these settings.

FIG. 27 also shows an example schedule of advertising costs in relation to an information item (e.g., the brand "Coca Cola" 2726). As shown in FIG. 27, a combination of conditions or criteria determines a specific schedule of advertising costs. For example, FIG. 27 shows three different schedules 2732, 2734, 2736, each associated with a location and a time period. Each of these schedules lists the individual rate of charge for each position per CPM, applicable to ads being presented to a user in the specific location and the specific time period. FIG. 27 shows three schedules of charges, one (2732) for the location of U.S.A. and the period between 5 to 8 pm on Feb. 14, 2012, a second one (2734) for the location of the City of Seattle and the same period, and a third one (2736) for the location of a range of 2 kilometers from the GPS position 47° 36'35"N 122° 19'59"W and the same period. If multiple cost schedules are deemed applicable, the one with the highest rates applies. Any condition or criterion for determining schedules of advertising costs is within the scope of various embodiments. For example, different information items may be associated with different cost schedules even for the same location and time period based on, for example, their popularity to consuming users as well as supplying users.

FIG. 27 also shows that the information item in question (i.e., the brand "Coca Cola" 2726) is currently associated with the ads in "Ad Group 1" (i.e., via the "SELECTED!" 2738 indicator), so that if a consuming user indicates interest in that information item, the ads will be a candidate for presentation to the consuming user. The supplying user (i.e., "Jane" 2702) may remove this information item association, or look up advertising cost schedules for different locations or time periods for the same information time through their corresponding hyperlinked text for such action (e.g., "Change" 2740). The supplying user may also select another information item and views its associated advertising cost schedules through the hyperlinked texts for such action (e.g., "<Prev" 2742 and "Next>" 2744). In some embodiments, the user interface may provide a query interface for a supplying user to search information items and their associated advertising cost schedules.

Figure 28:
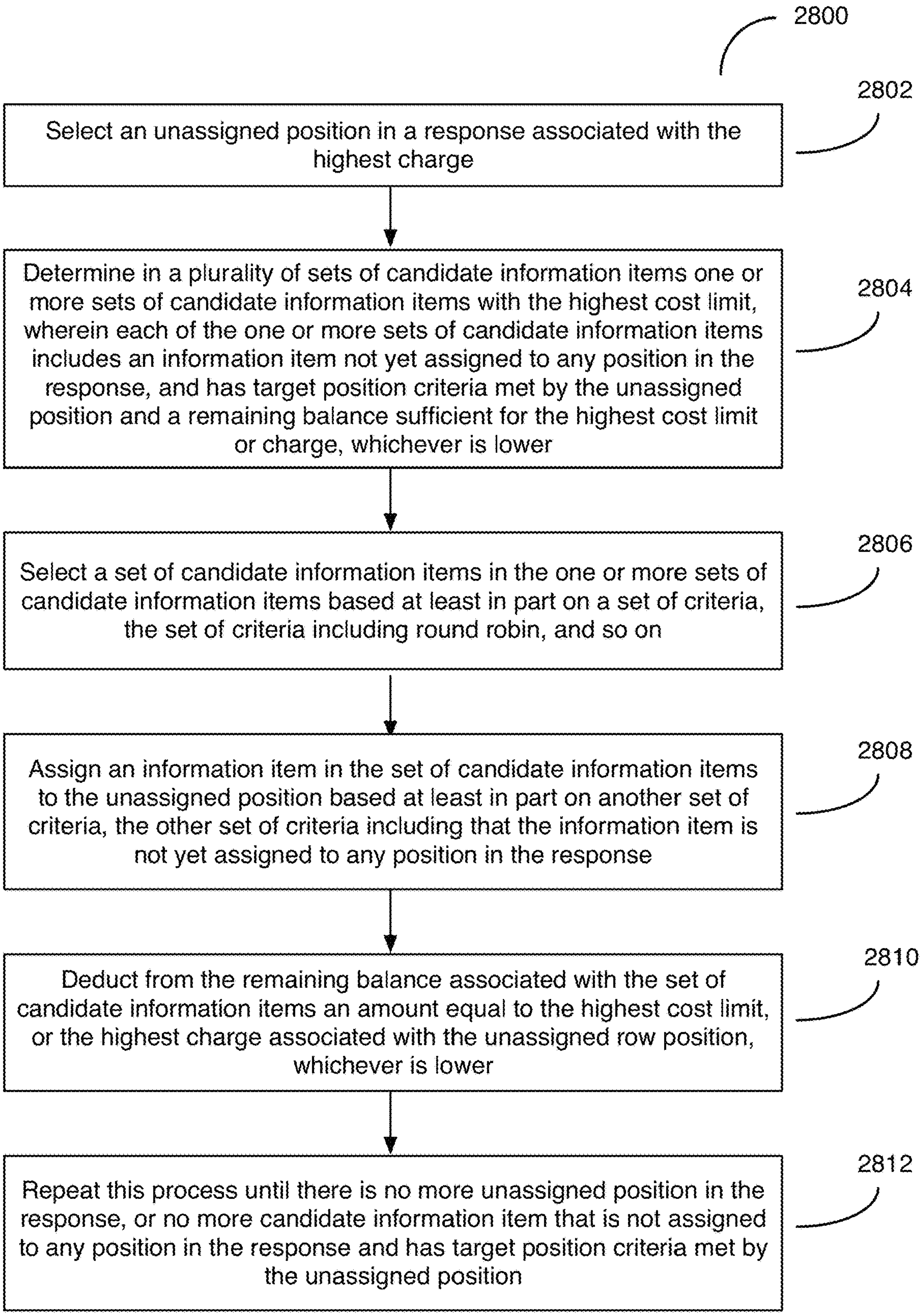
FIG. 28 illustrates a flow diagram of an example process for selecting information items from a plurality of sets of candidate information items, and prioritizing them in a response to a user.

Referring to FIG. 28, a flow diagram of an example process 2800 for selecting information items from a plurality of sets of candidate information items, and prioritizing them (e.g., for presentation) in a response to a user, such as presenting them in a list of prioritized positions of limited availability. Each set of candidate information items is associated with its own advertising budget, limits and any selection-related data, as may be stored and maintained in a user account. For example, the response handler 2320 may be configured to present up to ten ads in form of a top-down list to the consuming user in response to the user's selection of an information item. The selection manager 2330 is configured to select ads to fill the list, with the higher position being more valuable, and to determine which ads to select when there are more than 10 candidate ads in the resource store. Per the example process 2800, an unassigned position in an ads-carrying response associated with the highest charge is selected (2802). For example, the selection manager 2330 creates a response data record in the selection store 2338. It retrieves in the selection store 2338 the advertising cost schedule associated with the information item selected by the user, as well as other conditions or criteria, such as the GPS position of the device coupled to the user, and the time of day of the user selection. The response data record comprises a plurality of positions, each being associated by the selection manager with a charge in accordance to the advertising cost schedule in accordance to applicable conditions, criteria, or constraints as described above. The selection manager 2330 identifies in the response an unassigned position associated with the highest charge.

Per the example process 2800, one or more sets of candidate information items with the highest cost limit in a plurality of sets of candidate information items is determined (2804). Each of the one or more sets of candidate information items includes an information item not yet assigned to any position in the response, and has target position criteria met by the unassigned position and a remaining balance sufficient for the highest cost limit or the highest charge, whichever is lower. For example, the selection manager (2330) retrieves in the account store 2334 the cost limits of the candidate ads or of the sets of candidate ads, and determines the highest cost limit among them. It identifies one or more candidate ads or sets of candidate ads associated with the highest cost limit. Candidate ads or entire sets of candidate ads already assigned a position in the response (and their cost limits) may be ignored. Candidate ads or entire sets of candidate ads whose target position criteria not met by the unassigned position (and their cost limits), or those whose remaining balance is sufficient for neither the highest limit nor the highest charge (and their cost limits), may also be ignored.

Per the example process 2800, a set of candidate information items is selected in the one or more sets of candidate information items based at least in part on a set of criteria, the set of criteria including round robin (2806). For example, the selection manager 2330 selects the set of candidate ads for the unassigned position in the response if it determines that there is only one such set. When there is a plurality of matching sets, then the selection manager 2330 selects one of the matching sets based at least in part on some criteria, such as round robin, highest remaining balance first, highest budget first, and so on. The selection manager 2330 maintains working data as well as history of selections in the selection store 2338.

Per the example process 2800, an information item in the set of candidate information items is assigned to the unassigned position based at least in part on another set of criteria (2808). For example, the selection manager 2330 assigns the candidate ad to the unassigned row position in the response if it determines that there is only one ad in the set of candidate ads. When there is plurality of ads in the set, then the selection manager 2330 may select one of the candidate ads based at least in part on some criteria, such round robin, user-specified priority, and so on. Ads in the set that have already been assigned a position in the response are ignored.

Per the example process 2800, an amount equal to the highest cost limit, or the highest charge associated with the unassigned row position, whichever is lower, is deducted from the remaining balance associated with the set of candidate information items (2810). For example, the selection manager 2330 causes the account manager 2326 to deduct from the remaining balance associated with the set of candidate ads an amount equal to the highest cost limit, or the highest charge associated with the unassigned row position, whichever is lower.

Per the example process 2800, the steps described earlier may be repeated until there is no more unassigned position in the response, or no more candidate information item that is not assigned to any position in the response and has target position criteria met by the unassigned position (2812). For example, the selection manager 2330 repeats the steps described above for each unassigned position in the response, until all positions are assigned with an ad, or there are no more qualified ads.

In some embodiments, the response may comprise a plurality of positions that are associated with the same advertising cost or charge. Advertising costs, budgets, and limits need not be monetary. Points, scores or some system-generated metrics may also be used to qualify advertising costs, budgets, and limits. Cost limits may also be specified individually per some target position in the response, and advertising charges may also be specified relative to different positions in the response based on a base amount, such as $0.005 for the lowest position, with charges for higher positions being a multiple of that base amount.

It should be appreciated that the specific steps illustrated in FIG. 28 provide a particular method of prioritizing or selecting information items for advertising according to an embodiment of the present invention. Other sequences of steps may also be performed according to alternative embodiments. For instance, alternative embodiments of the present invention may perform the steps outlined above in a different order. Moreover, the individual steps illustrated in FIG. 28 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives. For example, the step of selecting a set of candidate information items in the one or more sets of candidate information items based at least in part on a set of criteria (2806) and the step of assigning an information item in the set of candidate information items to the unassigned position based at least in part on another set of criteria (2808) may be combined, for example, when the set of candidate information items has only one information item, and the selecting includes assigning the selected set of candidate information items to the unassigned position in the response.

Figure 29:
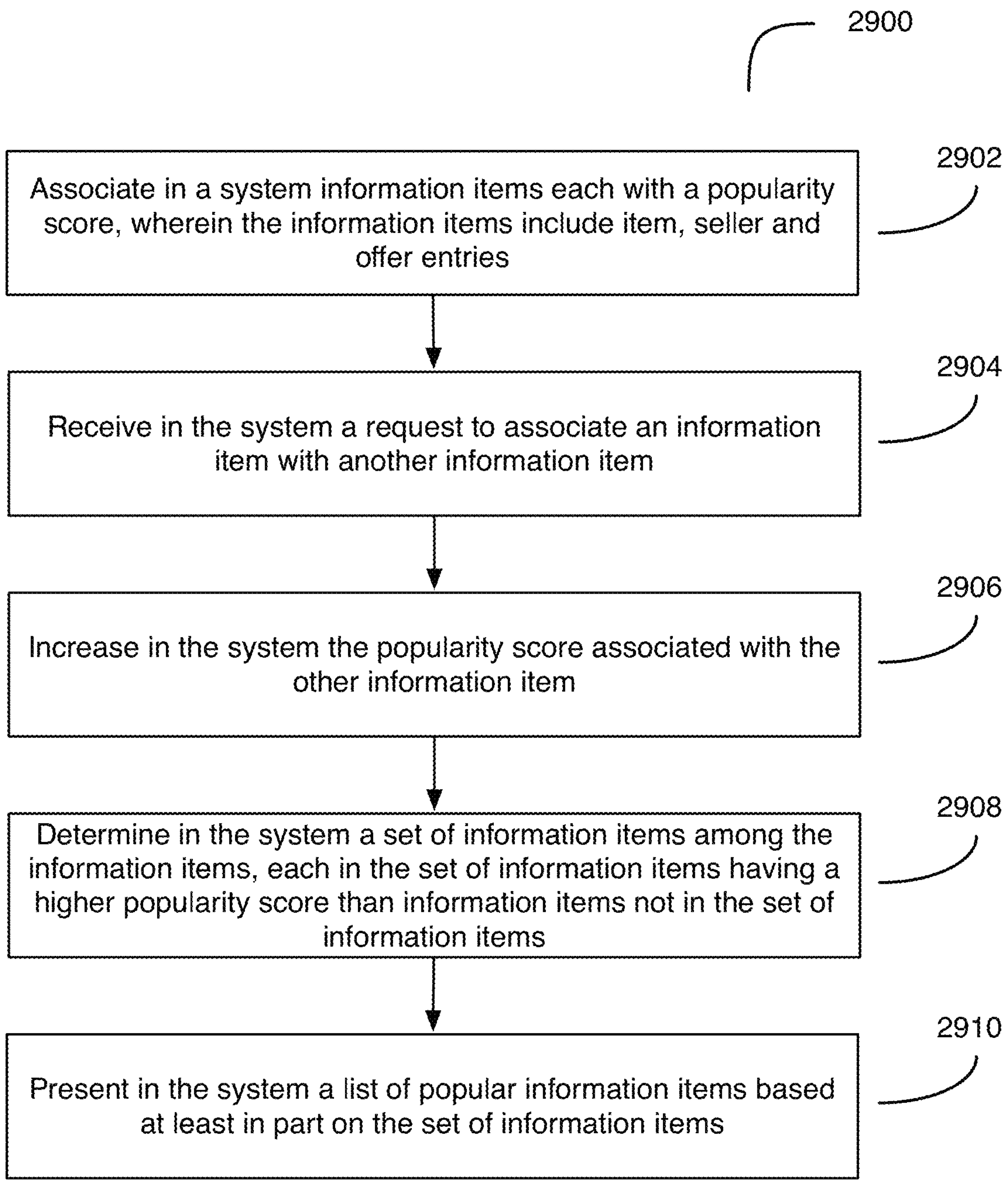
FIG. 29 illustrates a flow diagram of an example process for determining the popularity of an information item.

Referring to FIG. 29, a flow diagram of an example process 2900 for determining the popularity of an information item is shown. Per the example process 2900, a popularity score is associated with each of the information system available in an information retrieval system (2902). For example, the resource manager 2324 creates a popularity data record in the resource store 2332 for each information item therein. The resource store 2332 may comprise information items of various types, such as item (e.g., product or service), seller and offer. Any type of information item is within the scope of various embodiments.

Per the example process 2900, a request to associate an information item with another information is received (2904). For example, the input handler 2318 receives via the user interface 2316 a request from a user such as the supplying user 2002 shown in FIG. 20 to associate an ad in his user account with another information item available in the resource store 2332, so that the ad would become a candidate for presentation to the user when the user selects the other information item.

Per the example process 2900, the popularity score associated with the other information item is increased (2906). For example, the input handler 2318 causes the resource manager 2324 to increase the popularity score maintained in the popularity data record associated with the other information item.

Per the example process 2900, a set of information items each having a higher popularity score than other information items not in the set is determined (2908). For example, upon a request from the response handler 2320 in its preparation for presenting a GUI to a user, such as the one (2400) shown in FIG. 24, the resource manager 2324 retrieves information items with the highest popularity scores, in conjunction to any other applicable criteria, if any, such as belonging to specific brands or sellers.

Per the example process 2900, a list of popular information items based at least in part on the set of information items is presented (2910). For example, upon notification by the resource manager 2324 of the information items with the highest popularity scores, the response handler 2320 may choose a subset of the information items for presentation to the user, such as via a GUI similar to the one (2400) shown in FIG. 24. In another embodiment, the resource manager 2324 causes the selection manager 2330 to increase the individual amounts in the advertising cost schedules associated with the information items based on their popularity scores. Any process for determining the popularity of an information item is within the scope of various embodiments.

It should be appreciated that the specific steps illustrated in FIG. 29 provide a particular method of determining the popularity of an information item based at least in part on another set of information items according to an embodiment of the present invention. Other sequences of steps may also be performed according to alternative embodiments. For instance, alternative embodiments of the present invention may perform the steps outlined above in a different order. Moreover, the individual steps illustrated in FIG. 29 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives.

Figure 30:
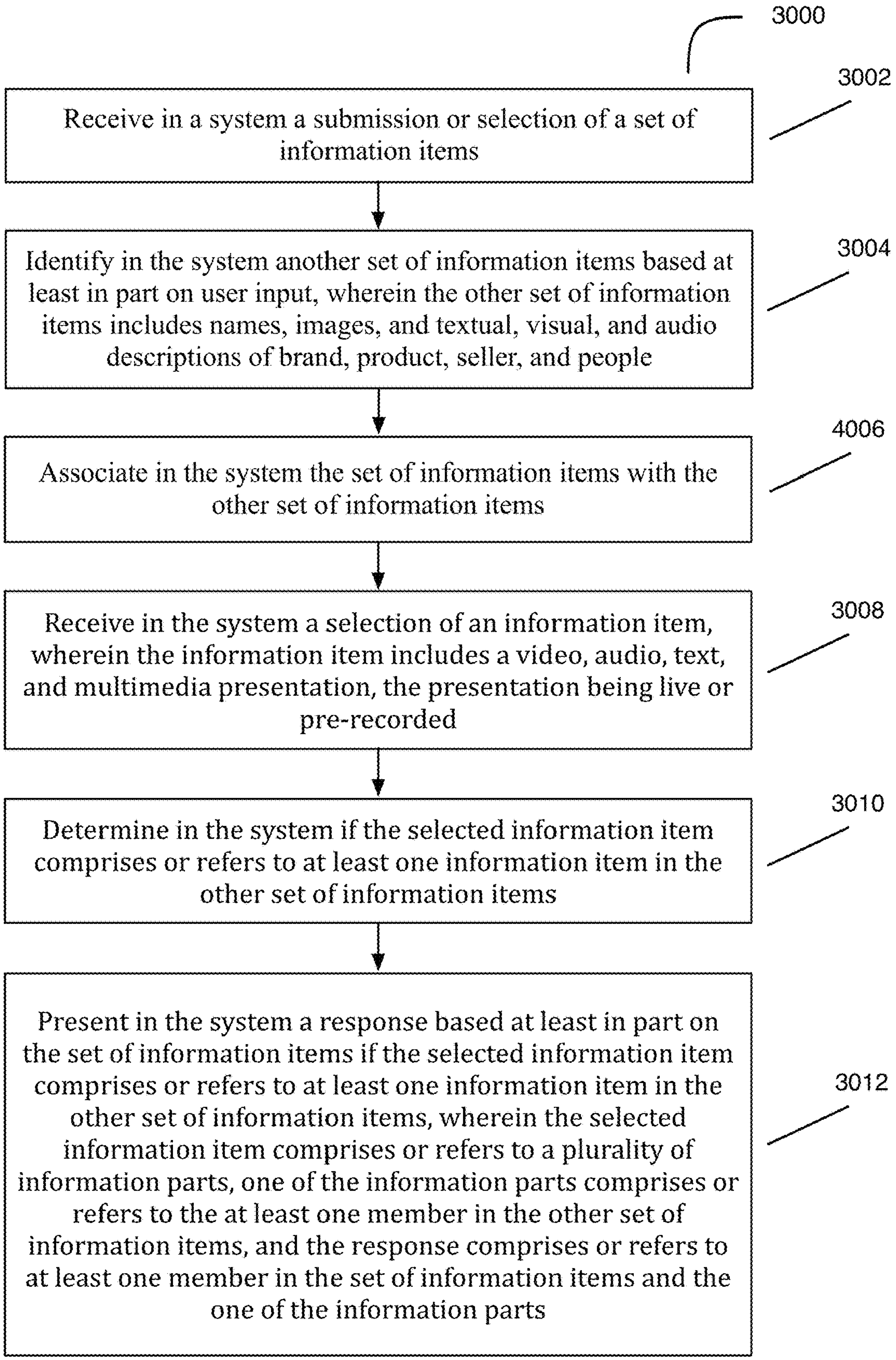
FIG. 30 illustrates a flow diagram of an example process for advertising a set of information items based at least in part on another set of information items.

Referring to FIG. 30, a flow diagram of an example process 3000 for advertising a set of information items based at least in part on another set of information items is shown. Per the example process 3000, a submission of a set of information items is received (3002). For example, the input handler 2318 receives via the user interface 2316 a submission or selection of a set of information items (e.g., a set of online ads), where the set of information items may or may not exist in the resource store 2332. The input handler 2318 causes the resource manager 2324 to create data records in the resource store 2332 to store any of the information items in the set not yet available therein.

Per the example process 3000, another set of information items based at least in part on user input is identified (3004), wherein the user input includes submissions or selections of information items from a user, such as the supplying user 2002 or consuming user 2004 shown in FIG. 20, or any other user. The other set of information items may include tags, keywords, and descriptions, such as names, images, and textual, visual, and audio descriptions of brand, product, seller, and people. For example, the input handler 2318 receives via the user interface 2316 a submission or selection of a set of names and images of brand and product, from an administrator of the information retrieval system. The submission or selection may include other information such as advertising costs associated with the names and images. The input handler 2318 causes the resource manager 2324 to create data records in the resource store 2332 to store any of the names and images not yet available therein, as well as their related data. In another embodiment, the user input may be the set of information items described in the above step of receiving (3002), or a submission or selection of an information item of interest to the user, such as the information item described in the step of receiving a selection of an information item below (3008). For example, the input handler 2318 causes the relationship manager 2328 to identify in the user input some specific tags, keywords, or descriptions available in the relationship store 2336 or resource store 2332, or words or pieces of content that appear in high frequency relative to other words or pieces of content in a collection of information items in the resource store 2332.

Per the example process 3000, the set of information items is associated with the other set of information items (3006). For example, the input handler 2318 causes the relationship manager 2328 to identify one or more information items in the set of information items that comprise or refer to at least one information item in the other set of information items, and to create in the relationship store 2336 at least one data record that associates the one or more information items (in the set) with the at least one information item (in the other set). Alternatively, the input handler 2318 may receive via the user interface 2316 a request to associate the set of information items with the other set of information items, and cause the relationship manager 2328 to create in the relationship store 2336 at least one data record that indicates this association. In one embodiment, the set of information items must comprise or refer to at least one information item in the other set. In another embodiment, there is no such constraint. Each information item in the other set may be associated with an advertising cost.

Per the example process 3000, a selection of an information item is received (3008), wherein the information item includes a video, audio, text, and multimedia presentation, the presentation being live or pre-recorded. For example, the input handler 2318 receives a request for an information item, such as a user's selection of a URL to that information item, and causes the query engine 2322 to retrieve the requested information item. In some embodiments, the user input described above is the selected information item.

Per the example process 3000, whether the selected information item comprises or refers to at least one information item in the other set of information items is determined (3010). For example, the relationship manager 2328 determines if the selected information comprises or refers to any of the information items in the other set, for example, a set of names and images of brand and product composing the other set of information items. Such determination or processing may be performed periodically, by schedule, or on demand, for example, when the selected information item is retrieved from the resource store 2332, when it is first received by the input handler 2318 or when requested by the administrator of the information retrieval system.

Per the example process 3000, a response based at least in part on the set of information items is presented if the selected information item is deemed comprising or referring to at least one information item in the other set of information items (3012), wherein the response includes one or more information items in the set of information items, and the selected information item, and wherein the selected information item comprises or refers to a plurality of information parts, one of the information parts comprises or refers to the at least one member in the other set of information items, and the response comprises or refers to at least one member in the set of information items and the one of the information parts. For example, the relationship manager 2328 determines that the selected information item comprises or refers to at least one information item in the other set of information items. It causes the response handler 2320 to prepare and present based at least in part on the set of information items a response for presentation to a user such as the consuming user 2004 shown in FIG. 20. In some embodiments, the response handler 2320 causes the selection manager 2330 to select one information item (e.g., an ad) in the set of information items (e.g., the set of ads) and presents the system-selected information item in parallel to the user-selected information item (e.g., a video, audio, text, and multimedia presentation, whether live or pre-recorded), or as interstitials to the user-selected information item. For instance, a plurality of user contents (i.e., information parts) in the resource store may be associated with the selected information item (e.g., a URL) of user interest, wherein the plurality of user contents is or otherwise refers to a chronological or spatial series of parts, segments or sections composing or referring to the selected information item of user interest. For each user content in the plurality of user contents, the response handler 2320 causes the relationship manager 2328 to determine if the user content comprises at least one information item available in the other set of information items (e.g., brand, product, seller and people names or images). If so, the response handler 2320 causes the selection manager 2330 to select one or more information items in the set of information items (e.g., ads) and presents via the user interface the one or more information items (e.g., selected ads) either before or after the user content. In one embodiment, the response handler 2320 repeats this process for each piece of user content in the presentation of the spatial or chronological series of user contents without further user input. The selection manager 2330 provides notifications of available ads to the response handler 2320 without further instructions from the response handler 2320. In some embodiments, information items or ads selected in relation to a particular piece of user content are presented in connection with that piece of user content, such as spatially (e.g., appearing on the same screen or visual area) or chronologically (e.g., appearing right before or after the piece of user content). Criteria for selecting the one or more ads among the set of candidate ads include the budgets, remaining balances, cost limits, running times, spatial dimensions or areas, and so on, that may be associated with the candidate ads. Any selection criterion is within the scope of various embodiments.

It should be appreciated that the specific steps illustrated in FIG. 30 provide a particular method of advertising a set of information items based at least in part on another set of information items according to an embodiment of the present invention. Other sequences of steps may also be performed according to alternative embodiments. For instance, alternative embodiments of the present invention may perform the steps outlined above in a different order. Moreover, the individual steps illustrated in FIG. 30 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives. For example, the step of receiving a selection of an information item (3008) may be omitted, skipped or otherwise combined, for example, when the user input is the selection of an information item, or the information item itself. Or the step of the associating the set of information items with the other set of information items (3006) may be combined with the step of determining if the selected information item comprises or refers to at least one information item in the other set of information items (3010), for example, when the set of information items is searched for determining if any member in the set comprises or refers to at least one information item in the other set at the same step of the determining (3010). Or the step of receiving a submission or selection of a set of information items (3002) may take place after the step of identifying another set of information items based at least in part on user input (3004), for example, when the subsequent step of associating the set of information items with the other set of information items (3006) includes searching the set of information items (e.g., set of ads) for matching information items in the other set of information items (e.g., set of keywords or images), and performing the associating based on the matching information items.

Various embodiments of how the system can be employed for different advertising applications have been provided. It will be appreciated that the system can be adapted to accommodate other applications of advertising for virtually any types or combinations of information items. For example, a search engine equipped with the present invention may allow its users to associate their online ads (in form of banner, URL, and so on) with URLs to webpages, websites, products, brands, offers, events, and so on. Popular webpages or websites are associated with higher advertising costs. The search engine prepares a search results page in response to a query from another user, where each search result comprises a URL. Online ads having associations with the search results become a candidate for inclusion into the search results page. The search engine then chooses a subset of the candidate online ads based on some specific selection criteria and includes them in the search results page for presentation to the other user. When the other user selects a particular search result (e.g., URL) in the search results page, the search engine may further select online ads associated with the selected search result and present them in connection with the contents of the selected search result, for example, as interstitials or concurrent contents. An ad may also be associated with a plurality of information items such that the ad will become a candidate for presentation only if a user may selected more than one information items in the plurality of information items per some criteria, such as within the same request for information items, within a given period of time, within a certain number of requests, selections, or clicks, and so on.

The present invention provides methods and systems, among other uses or applications, for accepting a set of information items from a user, relating the set of information items to another set of information items, receiving a selection of an information item from another user, and presenting a response to the other user based at least in part on the set of information items if the selected information item comprises or refers to at least one information item in the other set of information items. Such methods and systems make it possible for sellers and advertisers to expressly identify information items most relevant to their ads and make the ads available for presentation in connection with the information items when one of the information items is selected by or otherwise presented to a consumer. Some embodiments of the present invention also enable sellers and advertisers to use their product, service, brand, seller, and offer entries as ads, so that no or minimal extraneous information or effort is required for ad production.

For instance, a shopping information retrieval system or search engine may retrieve these entries in response to a user's request or query, and only present them as ads in connection to other entries when the user requests or queries for the other entries. In one embodiment, the constituent parts of the entries provide data of association or relationship with other entries available in the system or engine, and facilitate auto discovery for relevance without no or minimal manual intervention. Another embodiment enables sellers and advertisers to easily specify their budgets and cost limits amidst fluctuating advertising costs or charges associated with information items of their interest in ads association, and benefit from having their ads placed in a more expensive position than what's incurred against their budgets or otherwise committed by their cost limits. Yet another embodiment is also capable of determining a popularity score of an information item based on requests for ad associations from sellers and advertisers, and determining a set of popular information items relevant to the sellers and advertisers based at least in part on such popularity scores. An embodiment may also adjust or evaluate advertising costs relating to having ads associated with individual information items based at least in part on such popularity scores of these individual information items.

In addition, an advertising system embodying the present invention may present to a seller (for example, in response to a query or a command from a user, a trigger from a third party, or a system-controlled notification, playback or streaming) a set of information items (e.g., product, brand, seller, or event information), where the seller is associated with an account. Each information item may be associated with cost information, the cost information including a charge rate for presenting an ad in relation to the information item. The advertising system may receive from the consumer a selection of one or more information items from the set, the one or more information items being associated with an ad chargeable to the account of the seller. For example, the consumer may submit his choice of such ads along with his selection of these information items, or indicate to the system such choices before or after the selection. The system would associate the ads with the selected information items, and determine rate information based on the cost information, the rate information including how to calculate for each presentation or impression of the ads. In an embodiment, the rate information may be the same as the cost information. The system may also present another set of information items to a consumer, and detect the presentation of one of these information items to the consumer. For example, the consumer may select an online entry or hyperlinked text among the entries or hyperlinked texts presented or otherwise tracked by the system. If the entry or hyperlinked text so selected by the consumer refers to or otherwise relates to the information items selected by the seller for association with his ad, then the ad would be presented to the consumer. (According to one embodiment, the consumer may not need to explicitly select or otherwise identify a particular information item of interest. For example, the consumer may be watching a video or a slide show that presents an ad-triggered information item only 10 minutes or 5 slides after the show has begun.) A charge based on the rate information would be applied to the account of the seller. In one embodiment, such charges are not applied until a specific number of presentations or a specific billing period has been reached.

According to another embodiment, the advertising system may receive from the seller a submission or identification of his ad, and in response present a set of information items relevant to his consideration for association with his ad. Such an ad may include information about a product, a brand, a retailer, a place, a location, an event, and so on. The advertising system may determine the set of information items based on such information. For instance, the advertising system may identify competing or otherwise related products, brands, retailers, places, and events based on other ads that are associated with the seller's ad or the information in or about the seller's ad, the other ads comprising information about the competing or related products, brands, places, retailers, and events. For example, seller A may have associated an ad with seller B or seller B's ads. When seller B indicates to the advertising system that it is interested in placing an ad with the system, the system may indicate to seller B that seller A or seller A's ads are a candidate for association with seller B's ad. In one embodiment, the advertising system may select the information items for association with the seller's ad without the seller's explicit selection of those information items. For instance, the system may select competing or complementary products, brands, or retailers for the seller's ad based on associations established by other users of the system, and the seller may provide criteria to assist the selection process, such as information on popularities and advertising costs associated with the candidate information items. In some embodiments, the system may also identify the intent of the consumer in relation to the selected information item of interest in consideration for whether to trigger the presentation of a seller's ad, the ad being associated with the selected information item. For example, the information item of interest may be about a product, and the consumer would be presented the ad if he indicates his interest in an online offer for the product, but not be presented the ad if his interest in an online review of the product. The system identifies and maintains the context of the information items and corresponds the context to the intent of the consumer.

In another embodiment, another seller may also associate an information item with her ad, and indicate to the system the preferred position for her ad to appear in an ordered list of ads. When the preferred position of the other seller is the same as the preferred position of the seller, then the ad of whichever seller whose attains a better ranking in the system would have their ad promoted to a higher and unassigned position for free. For example, a better ranking may be determined based on the size of the advertising budget associated with an account. In one embodiment, how ads from competing sellers may be ordered or selected over others for presentation to the consumer may also be based on an attribute of the ads. For instance, a "price" attribute associated with an ad may be utilized for such comparison or determination, even when other attributes of the ads in question, such as "product", are not semantically compatible. In another embodiment, the seller may submit a query of products or brands to the system, and receive from the system a list of sellers selling the products or brands. The seller may then choose which seller(s) on the list to associate his ad (e.g., of his own store) with, so that a consumer would be presented with the seller's ad when an interested information item relative to the consumer refers to the sellers so chosen. In another embodiment, the seller may submit location information to the system so to reveal local competitors or sellers for association with his ads. The seller may also simply submit or identify his ads to the system that would then derive based on the ads the relevant competitors or sellers for consideration of association with his ads. The system may also derive based on the ads the relevant products or brands for consideration of association with his ads.

In another embodiment, the more an information item in the system receives requests from sellers to associate their ads with, the more the costs associated with the information item would go up, but only after the current session (e.g., the current day, a preset number of accounts, a preset number of associations for a given time range and location) of association bidding or sales is over.

In another embodiment, the consumer may be watching a video or slide show delivered by the system, the video or slide show presenting a series or collection of information items chronologically. Ads associated with one of these information items may be presented to the consumer in connection with the presentation of that particular information item. Such ads may also be presented as interstitials during the video or among slideshow content. If the content of interest to the consumer is an online newspaper comprising a plurality of information items, ads associated with these information items may also be presented along with their individual information items to the consumer, even though the consumer might not have expressly identified or otherwise indicated that all these information items are of his interest. Alternatively, an ad associated with a particular information item among the plurality of information items may only be presented to the consumer when he selects the particular information item, while ads associated with the other information items therein are hidden. When the consumer selects another information item so presented, the ad associated with the previously selected information item would disappear from the presentation, and the ad associated with the newly selected one would appear.

The embodiments discussed herein are illustrative of the present invention. As these embodiments are described with reference to illustrations, various modifications or adaptations of the methods and/or specific structures described herein may become apparent to those skilled in the art. All such modifications, adaptations, or variations that rely upon the teachings of the present invention, and through which these teachings have advanced the art, are considered to be within the spirit and scope of the present invention. Hence, these descriptions and figures should not be considered in a limited sense, as it is understood that the present invention is in no way limited to only the embodiments illustrated.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

In addition, a digital resource hub (or simply hub herein) may provide dissemination or distribution of digital resources (or simply resources herein) to its users. A user may rate resources to recommend them or otherwise increase their visibility to other users. A hub may limit its access to members. Membership may simply entail a registration (e.g., by email address) or criteria pertaining to a user's physical characteristics (e.g., gender, age, ethnicity), location (e.g., residence, current position), beliefs (e.g., religion, political views), ability (e.g., language, IQ test score), and so on. Membership may also be established or determined continually or per some session or operation, such as those based on GPS positions, personal interests at the moment, and so on. For example, a hub provider may create a plurality of multi-level hubs based on geographical positions for recommended beverage and food. The finest level may represent a radius of 50 meters or an area of 50 times 50 meters square, with a higher level being a composite of four of the previous level (i.e., 100 times 100, 200 time 200, and so on). The geographical extent or coverage of a hub (or its center and dimensions relative to the center) may be pre-assigned by the hub provider, or is determined relative to the position where the user is at the moment of his request for lists of relevant resources (i.e., those of recommend food and beverage), or some combination thereof. The hub provider may respond to a user's location-specific query with a plurality of resource lists, each comprising highly recommended food and beverage items at each level of area coverage, except at the lowest level, based at least in part on the hub-specific scores at the lower levels, whose score would be determined based at least in part on ratings given by users in the geographical area corresponding to that level.

Members may assume different roles as administrators, scouts, reviewers and observers, each of which might require a different set of membership criteria. Administrators or a hub authority may be creators or owners of a hub. Scouts are members who may submit or recommend resources to the hub. Reviewers are those who may provide ratings for resources available in the hub. Observers may access the resources but may neither bring resources into the hub nor provide any rating. Any type of membership role is within the scope of various embodiments. According to one embodiment, a member may assume multiple membership roles.

An authority of a hub may establish or otherwise choose rules for operation, administration and maintenance of the hub, such as those for membership, resource submissions, and resource import and export. There may be multi-tiered levels of authority, where the higher level may delegate some power to the lower level. For instance, a hub provider may assume the highest level of authority for all hubs under its jurisdiction while a hub administrator is responsible for a particular hub. For example, a local hub authority (e.g., a hub administrator) may choose for a hub the applicable membership roles as made available by the hub provider, and have each member assigned to its intended role, centrally or otherwise, while the hub provider may be responsible for rules in ranking resources in the hub based at least in part on ratings given by members of the hub. A hub authority may decide whether to make available to other hubs resources as discovered or otherwise submitted by the hub's members, and if so, under what criteria, if any. Likewise, a hub authority may decide if his hub would accept such public resources, and if so, under what criteria, if any. A hub authority may also decide the circumstances under which a member be removed from the hub. A hub authority may further be established by some voting scheme, where a new hub administrator or new rule may be elected or enacted by a majority of qualified members (e.g., where observers are not allowed to vote).

A hub may present or otherwise make available a plurality of lists of resources, such as the latest and the prize, which may be updated continuously, periodically, or from time to time. The latest list shows a list of resources whose order is mainly influenced by chronological considerations, e.g., from the most recent to the least. (The latest list may comprise resources submitted or otherwise recommended by the hub's members, imported from other hubs, or received as public resources). The prize list shows a list of resources whose order is mainly influenced by relevancy considerations, e.g., from most popular to the least, where the more recent may be considered more popular when all other factors are equal. In embodiments, a user or member may provide a rating against a resource on each of the two lists. According to one embodiment, only one rating is counted for a resource for each unique user or member, and should the user or member belong to more than one hub, then a home hub or a hub priority list would be established to determine which hub should receive the rating in question. A user's hub priority list identifies a plurality of hubs whose hub-level scores may include the user's rating. In one embodiment, the weight of the user's rating may decrease gradually for hubs on the lower order of the hub priority list.

For each hub, the prize list of resources would usually demand more attention from its members than the latest list. This may result in resources on the former list (namely prize resources) attracting more ratings from members who would have otherwise missed them, e.g., the members' not checking out resources on the latest lists (namely latest resources). Given the potential heterogeneity of hubs and their constituent members, a resource may be popular in one hub while barely known in another, even though it might have appeared on the latest lists of both hubs. A hub provider enables the existence of a plurality of hubs that may accommodate different interests and intents. No one single homogenous group of users may easily dominate the opinions about resources and take control of their dissemination under a single jurisdiction. As such, a resource has a much better chance of reaching an appreciative audience.

In addition, a resource may obtain different ratings or scores from a plurality of hubs, and an overall score may be derived based on these hub-level scores. In embodiments, the hub-level scores assigned to different hubs are normalized or otherwise made according to the same scoring system, such that they may be directly compared with each other, and combined to create an overall score. Such an overall score may help determine the relevancy of a resource to a population under a jurisdiction (e.g., that of a hub provider). Furthermore, a prize user, member or hub may be identified, when a user, a member or a hub's members are consistently discovering prize resources, at the hub or provider level.

According to one embodiment, a hub is regarded as an organization characterized by a culture realized via some membership criteria and agreements which may include considerations in beliefs, languages, age, gender, religion, professional affiliation, and so on. Users not compatible with or otherwise interested in one organization may have membership with other organizations (i.e., hubs). Existing members may lose their membership should they fail to fulfill the membership criteria or agreements imposed by the hub in question. Like minded would gradually gather at appropriate hubs, whose otherwise heterogeneous cultures would help not only to promote resources of interest to their peers and members, but also identify and select popular or prize ones for all users in the hub provider as a whole. According to one embodiment, the hub provider may be a social network, and hubs may be groups within the social network. According to another embodiment, the hub provider may comprise a collection of entertainment and news providers, and a hub may comprise individuals, a group, a company, or an organization subscribing to services of any of these entertainment and news providers.

Figure 31:
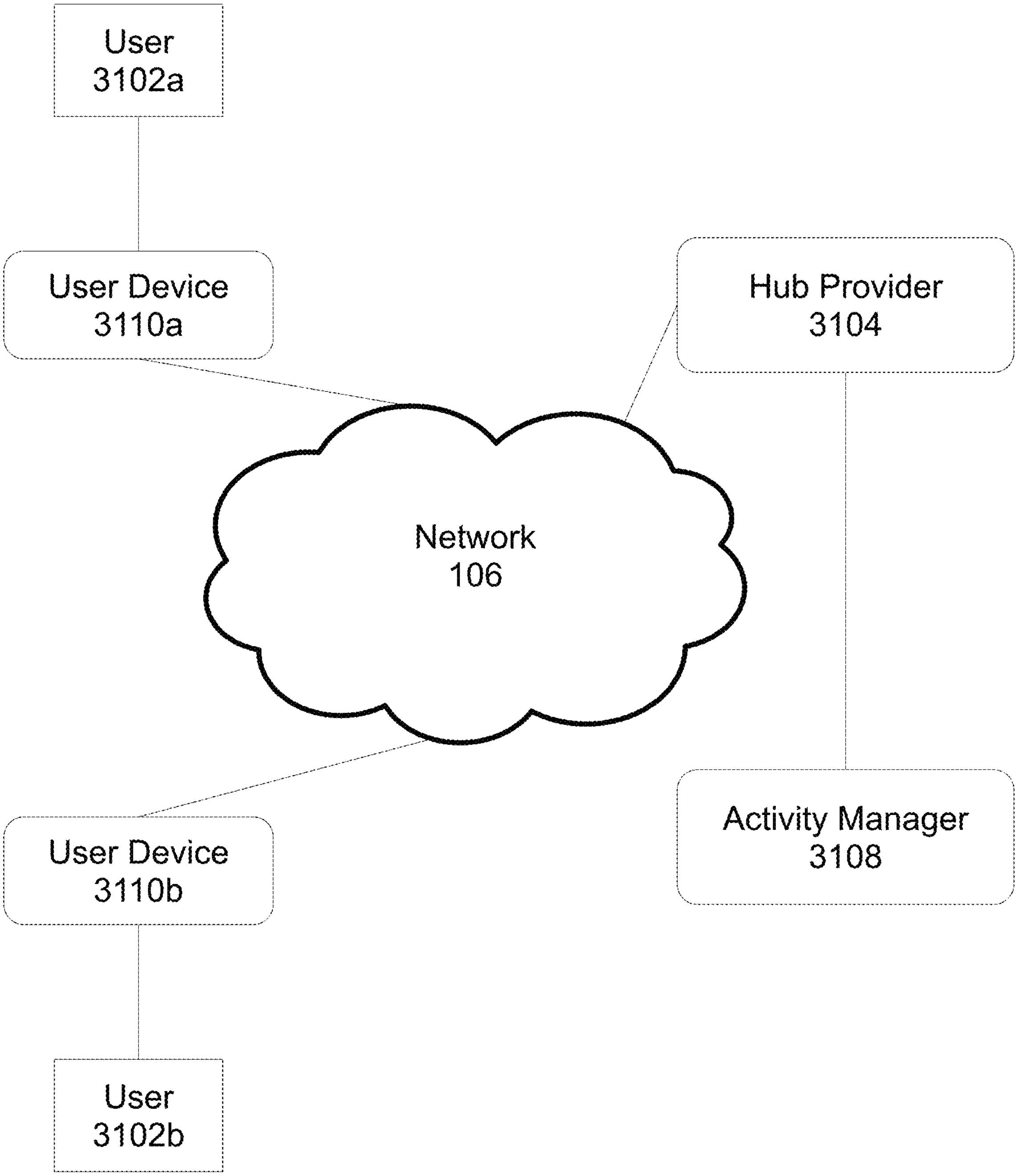
FIG. 31 illustrates an exemplary environment for distributing digital resources and identifying prize resources and their contributors among heterogeneous users.

FIG. 31 illustrates an exemplary environment for distributing digital resources and identifying prize resources and their contributors among heterogeneous users. A plurality of users 3102*a*, 3102*b* are communicatively coupled to a hub provider 3104 via their respective user devices 3110*a*, 3110*b* to a network 3106. The hub provider 3104 may comprise a plurality of hubs (not shown) each associated in membership with one or more of the plurality of users 3102*a*, 3102*b*. According to one embodiment, the hub provider 3104 may interact with a plurality of users 3102*a*, 3102*b* at their devices via a website. A user may search, join, create and visit a hub on the website. According to some embodiments, an administrator may set up rules for membership subject to constraints, if any, by the hub provider 3104.

A hub may be realized as a website where any user 3102*a*, 3102*b* of the hub provider 3104 may view or access content therein, including a list of most recent resources and a list of current prize resources, and where only authenticated users 3102*a*, 3102*b* may submit or recommend resources to the hub of which they are a member. An authenticated user 3102*a*, 3102*b* may submit a resource via a submission page of the website, a toolbar on a Web browser, a submission link for the hub provider 3104 carried by a third-party website, or some other mechanisms whereby a resource or a reference (e.g., URL) to a resource may be submitted by a user 3102*a*, 3102*b* along with a user identity known to the hub provider 3104. Any type, scheme, or mechanism of submission is within the scope of various embodiments.

The hub provider 3104 may cache or otherwise retrieve a copy of the resource in question, and create a new reference to the copy for backup or faster retrieval, while maintaining the original reference and making it available to its users 3102*a*, 3102*b*. In addition, a user 3102*a*, 3102*b* may specify a submission as private, in that only a designated hub (e.g., a hub to which he is a member) may receive the submission.

In one instance, a user 3102*a*, 3102*b* associated with a user device 3110*a*, 3110*b* requests a resource (e.g., via a reference such as a URL) from the latest resource list of a hub. Once authenticated as a member of the hub, the user 3102*a*, 3102*b* may provide a rating against the resource. The resource may be made available on the current prize resource list of the hub should the hub provider 3104 determine that the resource has attained a certain score, whether or not in relation to other resources available in the hub. On the prize resource list, the resource may continue to receive ratings (positive or negative) from members who have not rated it yet. The resource may be removed from both the prize and latest list if it no longer satisfies the criteria that govern the selection of resources for either of the lists.

An activity manager 3108 is coupled to the hub provider 3104. The activity manager 3108 monitors or receives user activities that may result in changes in availability of digital resources, in ratings or scores (e.g., those of resources, hubs, members, and users 3102*a*, 3102*b*) and if applicable, in memberships to hubs. In one instance, the activity manager 3108 receives a reference to a digital resource from a user 3102*a*, 3102*b* associated with a user device 3110*a*, 3110*b*. The activity manager 3108 checks if the digital resource already exists in his hub(s) or the hub provider 3104, subject to the submitter's privacy preference, which may be set in a user profile or at the time of submission. If the resource is considered as publicly available (e.g., having been introduced to the hub provider), such a submission may be counted as a positive user or member rating for the resource, and the submitter may be notified of other users (as well as their hubs) who have submitted the same resource publicly, or of hubs (e.g., those to which the submitter is member) that already have the resource available, subject to their privacy settings, if any. Wherever applicable, the submitter may be credited as having made available the resource to his hub(s) or the hub provider 3104. According to one embodiment, original submissions themselves in relation to a hub or the hub provider 3104 do not contribute to hub or overall ratings of their corresponding resources. The activity manager 3108 may forward or otherwise distribute the newly submitted public resource to the submitter's hub(s) or hubs that accept public resources. According to some embodiments, the activity manager 3108 comprises a module associated with the hub provider 3104.

Figure 32:
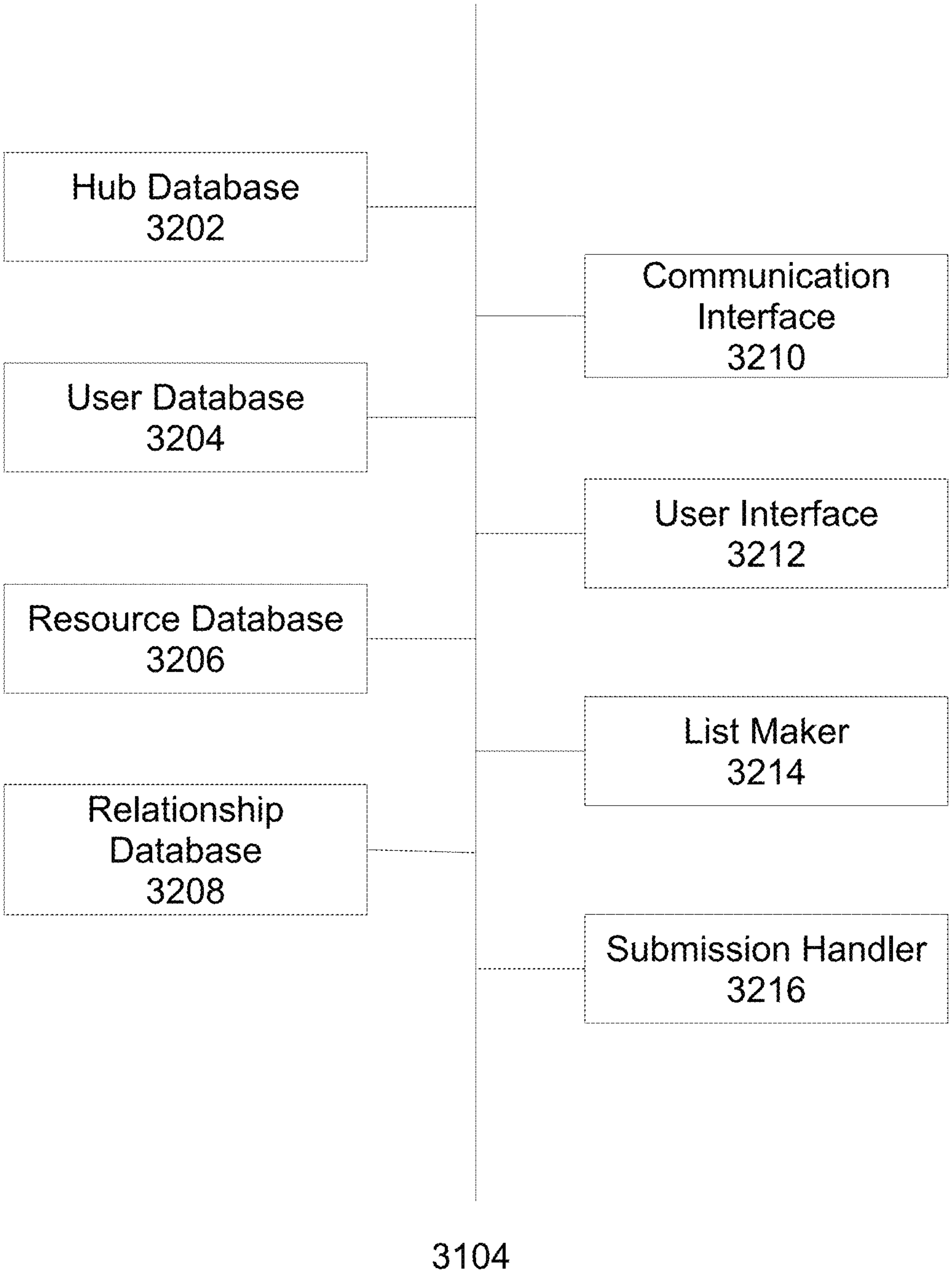
FIG. 32 shows a block diagram of an exemplary hub provider, such as the hub provider shown in FIG. 31.

FIG. 32 shows a block diagram of an exemplary hub provider 3104, such as the hub provider 3104 shown in FIG. 31. A hub database 3202 is provided for storing data associated with each hub, such as membership rules, scores, ranks (e.g., those based on membership size and number of provider-wide prize resources originated), and resource import and export lists and constraints (e.g., hubs from and to which resources are received and forwarded respectively, and if a resource should be exported, and how many times an exportable resource originated from the hub may be forwarded by other hubs), and if public resources are to be received.

A user database 3204 is provided for storing data associated with each user 3102*a*, 3102*b* (in a user account), such as his ranks (e.g., those based on numbers of hub-specific and provider-wide prize resources respectively), and user ID and password for the hub provider 3104.

A resource database 3206 is provided for storing resources and/or their references, as well as other related data such as their time of availability, overall rating or score, and local copy and reference.

A relationship database 3208 is provided for storing data associated with relationships among hubs, users and resources, as well as their attributes such as popularity or scores. For example, it may store the membership relationship between a user 3102*a*, 3102*b* and one or more hubs, and a rating of his contribution for each hub (e.g., the number of prize resources that he submitted into the hub), and support query for the membership of a hub. It may store the availability relationship between a hub and one or more resources, and a rating for each resource in the hub, and support query for all hub-level ratings for each resource. It may also store activity relationships between a user having a user account and one or more hubs, as well as those between a user having a user account and one or more resources (or their references). Such activity relationships include but not limited to submission of a resource to a hub, rating of a resource, and rating negatively of a prize resource in a hub.

A communication interface 3210 is provided for communicating with devices and users over a network 3106, such as a user 3102*a*, 3102*b* via the user device 3110*a*, 3110*b* shown in FIG. 31. A device or a user 3102*a*, 3102*b* via a user device 3110*a*, 3110*b* may send and receive data (e.g., rating and resource submissions, hub membership requests and responses, and personal preferences) to and from the hub provider 3104 via the communication interface 3210. Any type of communications interface is within the scope of various embodiments.

A user interface 3212 is provided for interacting with users or user devices 3110*a*, 3110*b*, and it includes the logic or procedures for user logon and logoff, presentation of hub-specific and provider-wide views having lists or selections of latest and prize resources, filtering and sorting of entities such as resources, hubs and the like, and hub creation and signup. Any layout, format, mode (e.g., audio), policy, scheme, or rules pertaining to presentation of resources and other entities such as hubs, users, relationships and the like are within the scope of various embodiments. The user interface 3212 may also be equipped with a search engine or search module (not shown), or otherwise configured to provide indexing and searching services for entities such as resources, users, hubs, relationships and the like in the hub provider 3104. Corresponding indexes, if any, may be stored and maintained in the databases for the entities of interest (e.g., the hub database 3202, the user database 3204, the resource database 3206, and the relationship database 3208), or some other databases.

A list maker 3214 is provided for creating and maintaining lists or selections of latest resources and those of prize resources for the hub provider 3104 and each hub therein. For instance, the relationship database 3208 may provide the list maker 3214 with the latest (and historical) aggregate ratings or popularity scores for a resource in a particular hub, so that the list maker 3214 may create and maintain a list of prize resources at a given time for a hub. The resource database 3206 may provide the list maker 3214 with the latest (as well as historical) overall scores or popularity ranks for a resource.

A submission handler 3216 is provided to process submissions from users 3102*a*, 3102*b* or user devices 3110*a*, 3110*b*, namely resources (or their references) and ratings against resources. According to one embodiment, the submitted resources (including their references) and ratings may be stored in the resource database 3206 and the relationship database 3208 respectively. Resource entries in the resource database 3206 may include a timestamp indicating time and date of the submission, identification of the user 3102*a*, 3102*b* providing the submission (i.e., the submitter), his preference for whether to make the submission public (i.e., whether it be available to other hubs to which he is not a member), and the like. Rating entries in the relationship database 3208 may include a timestamp of the submission, the submitter (or his ID), the hubs (or their IDs) to which the submitter is a member, and the like. These submissions and ratings (and other entities such as hubs, users, relationships, and the like) may be stored in a single or multiple databases, including the resource database 3206, the user database 3204, the resource database 3206, the relationship database 3208, and the like. One or more databases described herein may be located remotely and accessed by the hub provider 3104 or any component, system or device coupled to the hub provider 3104, subject to any applicable authentication control and access policy. A timestamp or other chronological information may be associated with each entry in these databases. The user interface 3212 may feed or otherwise provide the submission handler 3216 with resources and ratings from a user 3102*a*, 3102*b* or user device 3110*a*, 3110*b*. The submission handler 3216 may include modules or functions for processing these resources and ratings, or act as a proxy or agent to a component, system or device comprising such components and functions, or a combination thereof. According to some embodiments, the submission handler 3216 may be optional.

Figure 33:
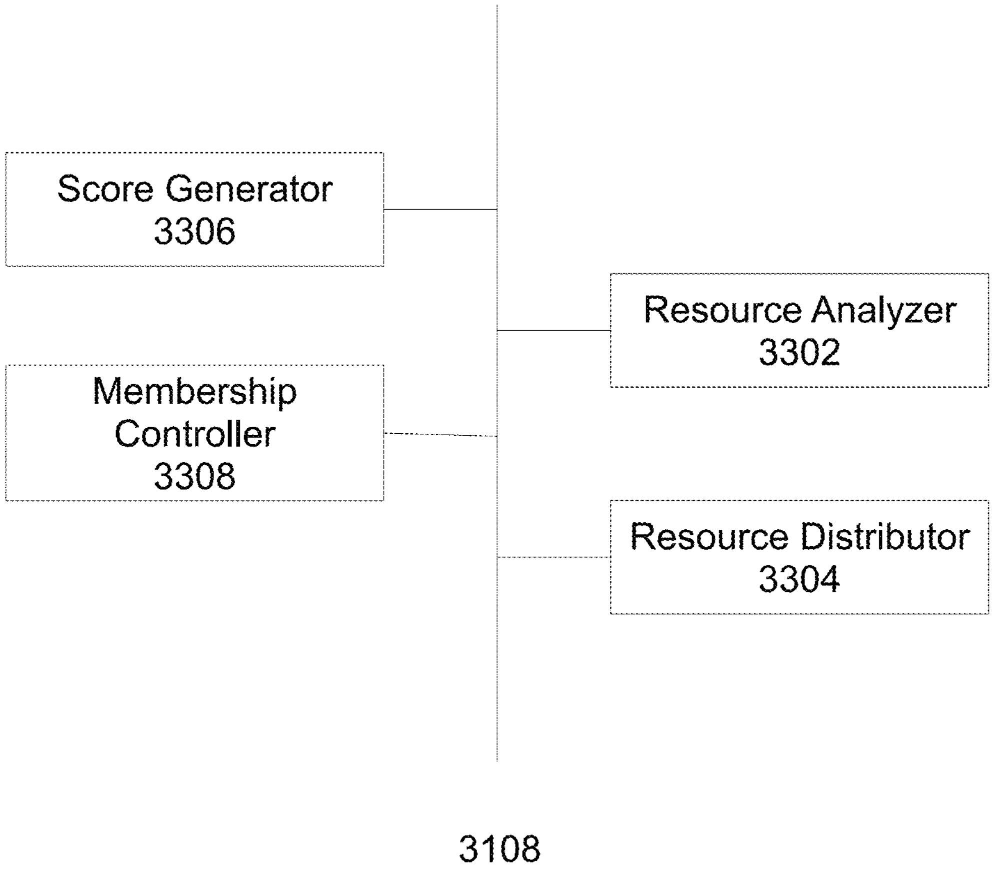
FIG. 33 shows a block diagram of an exemplary embodiment of the activity manager of FIG. 31.

The activity manager 3108 shown in FIG. 31 is such an exemplary component, system and device. FIG. 33 shows a block diagram of an exemplary embodiment of the activity manager 3108. The activity manager 3108 comprises a resource analyzer 3302, a resource distributor 3304, a score generator 3306, and a membership controller 3308. According to some embodiments, the membership controller 3308 may be optional.

The resource analyzer 3302 determines if the submitted resource already exists in the provider hub (for instance, by checking the resource database 3206). It may also create a local copy of the resource along with a new reference, store them in the resource database 3206, and maintain the relationship between the copy and the original in the relationship database 3208. In addition, multiple resources may be related to one another, for instance, for the purpose of popularity rating. For example, multiple linguistic translations or versions to the same news reporting, while having different URLs, may be regarded as referring to the same news item. On the other hand, resources having the same URL might be regarded as different resources, for example, when a newer and distinguishable version has been made available via the same URL, such as a newer version of software or a news front page with a newer publication date. The resource analyzer 3302 creates a resource entry in the resource database 3206 when the submitted resource is considered new. In an embodiment where submission of an existing resource (at the hub or provider level) is considered as a positive rating from a user 3102*a*, 3102*b* when he has not yet rated the resource, the resource analyzer 3302 may create an internal rating submission for the resource, and the user 3102*a*, 3102*b* may then be considered as having rated it (at the hub or provider level, wherever applicable).

The resource distributor 3304 identifies the hubs to which a submitted resource be made available based at least in part on hub membership of the submitter, and delivers the resource to the hub(s). Where an embodiment may support the creation and receipt of public resources, the resource distributor 3304 determines whether the submitted resource should be made available to hubs which are configured or otherwise identified to accept public resources and to which the submitter is not a member. The submitter may provide a privacy setting that causes the resource be only made available to all his associated hubs (e.g., with membership), or some specific individual hubs or groups of hubs. Where an embodiment may support a private personal hub (i.e., to which no other users may have access except the user owner), the submitter may specify a privacy setting that causes the resource available to no hubs but his private personal hub. (A private personal hub, for example, may record all resources submitted and those rated positively by its owner, and highlight those being made prize at a hub or in the whole of the hub provider 3104.) Such a privacy setting may be specified as part of a user account in the hub provider 3104 (e.g., in the user database 3204) and/or as part of a resource submission. The latter, if present, may override the former. The delivery of resources to their destination hubs may be realized via entries to the relationship database 3208, where an entry relates or associates a destination hub in the hub database 3202 to or with the resource in the resource database 3206. The entry may comprise such a relationship, the date and time of association, the current and historical cumulative positive and negative ratings of the resource for the hub, and the like. The list maker 3214 as shown in FIG. 32 would then be able to make it available to users of the hub via the user interface 3212.

In some embodiments, the resource distributor 3304 may be configured to attach or otherwise associate advertising to or with a resource destined to a hub. Examples of advertising include, but are not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like. In addition, the format of the advertising may include, singularly or in combination, an audio or animation or other multimedia element played at various times, banner advertising, network links, e-mail, images, text messages, video clips, audio clips, programs, applets, cookies, scripts, and the like. Furthermore, each instance, entity, or object of advertising itself may be regarded as a resource, and be maintained in the resource database 3206 or some other databases. Its relationship with one or more resources (and/or with possibly other entities such as users, hubs, and the like) may be maintained in the relationship databases 3208 or some other databases. The resource distributor 3304 may deliver one or more advertising resources to a hub in response to a single resource submission (e.g., one carrying a primary resource). An advertising resource may also be rated by a user 3102*a*, 3102*b* and selected as a prize resource (e.g., by the list maker 3214). It may be presented (e.g., by the user interface 3212) to a user in a pop-up window on a user device 3110*a*, 3110*b* when a primary resource is chosen by a user 3102*a*, 3102*b* for view, or as part of the presentation of the primary resource. The user 3102*a*, 3102*b* may not only view the primary resource and its associated advertising resource(s), but also provide ratings against each of them. Any advertising presentation policy, scheme, or rules are within the scope of various embodiments.

The score generator 3306 interprets, updates and maintains scores and the like (such as ratings, rankings, votes, marks, yes/no answers, like/dislike, bless/damn/forget, mark as favorite/hide it, clicks, impression time, and so on) that may be associated with resources and other entities, such as hubs, users, relationships, and the like. It may store the scores in a central database, or in various databases such as the relationship database 3208, the resource database 3206, the user database 3204, and the hub database 3202. Based at least in part on a rating submission (including internal rating submissions, if applicable), the score generator 3306 may create or retrieve a database entry (e.g., from the relationship database 3208) corresponding to the score for a resource at a hub, the hub having the submitter as member, and update the entry accordingly (e.g., the score and time of update). The score generator 3306 may create or retrieve a database entry (e.g., from the resource database 3206) corresponding to the hub provider-wide score for a resource, and update the entry accordingly. Score update or assignment may be executed in accordance to some policy or rules. For example, if a submitter is allowed to provide (only once) either a positive or negative rating against a resource, then one point may be added to the score of a resource for a positive rating, while one point may be removed from the score for a negative rating, with the score starting from zero when the resource is first made available in a hub. The hub provider-wide score for a resource may then be the sum of all its individual scores from all hubs. Alternatively, a good score and a bad score may be maintained simultaneously for a resource (at both hub-level and provider-wide-level), each accumulating points from positive and negative ratings respectively. According to one embodiment, the list maker 3214 as shown in FIG. 32 may then produce a list of popular resources for a hub using only the good scores, and a list of controversial resources based at least in part on both the good and bad scores (both of which may be regarded as list of prize resources). Yet another scoring scheme may be to regard a resource as prize at the hub level when the percentage of a hub membership that have given it a positive rating is twice or more than the percentage that have given the resource a negative rating. And a resource may receive at the hub provider level one point for every ten positive ratings within a hub, with a minimum of 100 positive ratings within the hub, regardless of any negative ratings. A scoring rule may also be that there may only be one hub or a limited number of hubs receiving the one and only one rating (positive or otherwise) given by a user 3102*a*, 3102*b* against a resource even though the user 3102*a*, 3102*b* may be member to more than one hub (not counting his private personal hub, if any). The user 3102*a*, 3102*b* would need to designate a home hub or a hub priority list for the score generator 3306 to decide which hub should receive the rating in relation to the resource. Another scoring rule may be that ratings from a hub administrator do not count in hub-specific scores for resources in relation to the hub. While the score generator 3306 may be responsible for updating and maintaining scores for resources (and for other entities such as users, hubs, and so on) in the hub provider 3104, the list maker 3214 is responsible for selection of prize resources. A scoring policy or scheme may involve the collaboration of both the score generator 3306 and the list maker 3214. Any scoring policy, scheme, or rules are within the scope of various embodiments.

The membership controller 3308 monitors scores and statuses of resources and users 3102*a*, 3102*b* (and other entities wherever applicable) that may affect hub memberships and performs appropriate actions accordingly. For instance, there may be a rule for a particular hub that stipulates a member be removed or changed to become an observer if he has not voted for or against a resource for a specific period of time (e.g., one month) despite being eligible to do so. Another example rule may be that a member be removed if none of his submitted resources is picked as prize for the hub for a specific period of time, or three or more of his submitted resources have ever received a certain number or percentage of negative ratings from the membership in a given period of time (e.g., over 70% of membership giving negative ratings within three months of the submission of each of his submitted resources). Any membership control policy, scheme, or rules are within the scope of various embodiments.

The membership controller 3308 may check the relationship database 3208 and other databases whenever there is a score, status and/or time change, or be notified of such changes (e.g., by the score generator 3306, the resource distributor 3304, and/or an internal or external timer (not shown)). The membership controller 3308 may also set up a condition and associate it with each entity of interest (e.g., in the database where the entity resides) so that the score generator 3306, resource distributor 3304, resource analyzer 3302 would check if the condition is met prior or subsequent to its own operations. The databases may also be configured to perform some or all of this condition checking upon access, and provide the necessary notification when needed. Upon notification of such conditions, the membership controller 3308 may perform its operations accordingly (e.g., further rules checking and/or subsequent member removal). In one embodiment, the membership controller may notify users of their membership being removed from a hub via the user interface 3212.

Any type of hub may be provided by the hub provider 3104 shown in FIG. 31. A hub may comprise people or users established or grouped according to any type of category, such as friendship, geopolitical boundaries, affiliation (e.g., having the same email domain), and so forth. A user 3102*a*, 3102*b* may specify the hubs, the categories, subcategories, and so forth; and/or the hubs, the social networks, the categories, the subcategories, and so on may be predetermined by the hub provider 3104. A user 3102*a*, 3102*b* may create a hub, join an existing hub, invite other people or users to join a hub, and cease to be a member of a hub, subject to the terms, rules and policies that may be set forth by the hub provider 3104 and/or the hub owner. Such terms, rules and policies may include the provisions for hub creation, hub membership and resource submission and rating.

For instance, a user 3102*a*, 3102*b* may connect via a desktop computer or a portable device (i.e., a user device 3110*a*, 3110*b* shown in FIG. 31) to a website or system embodying the hub provider 3104. The device 3110*a*, 3110*b* is communicatively coupled with the website, namely the hub provider, over a network 3106 via the communication interface 3210. The user 3102*a*, 3102*b* provides his email address as his user ID and a string of characters as his password as part of the signup process with the hub provider (via the user interface 3212). Upon successful registration, the user interface 3212 would create an entry (namely, a user account entry or simply a user entry) in the user database 3204 for the user.

Figure 34:
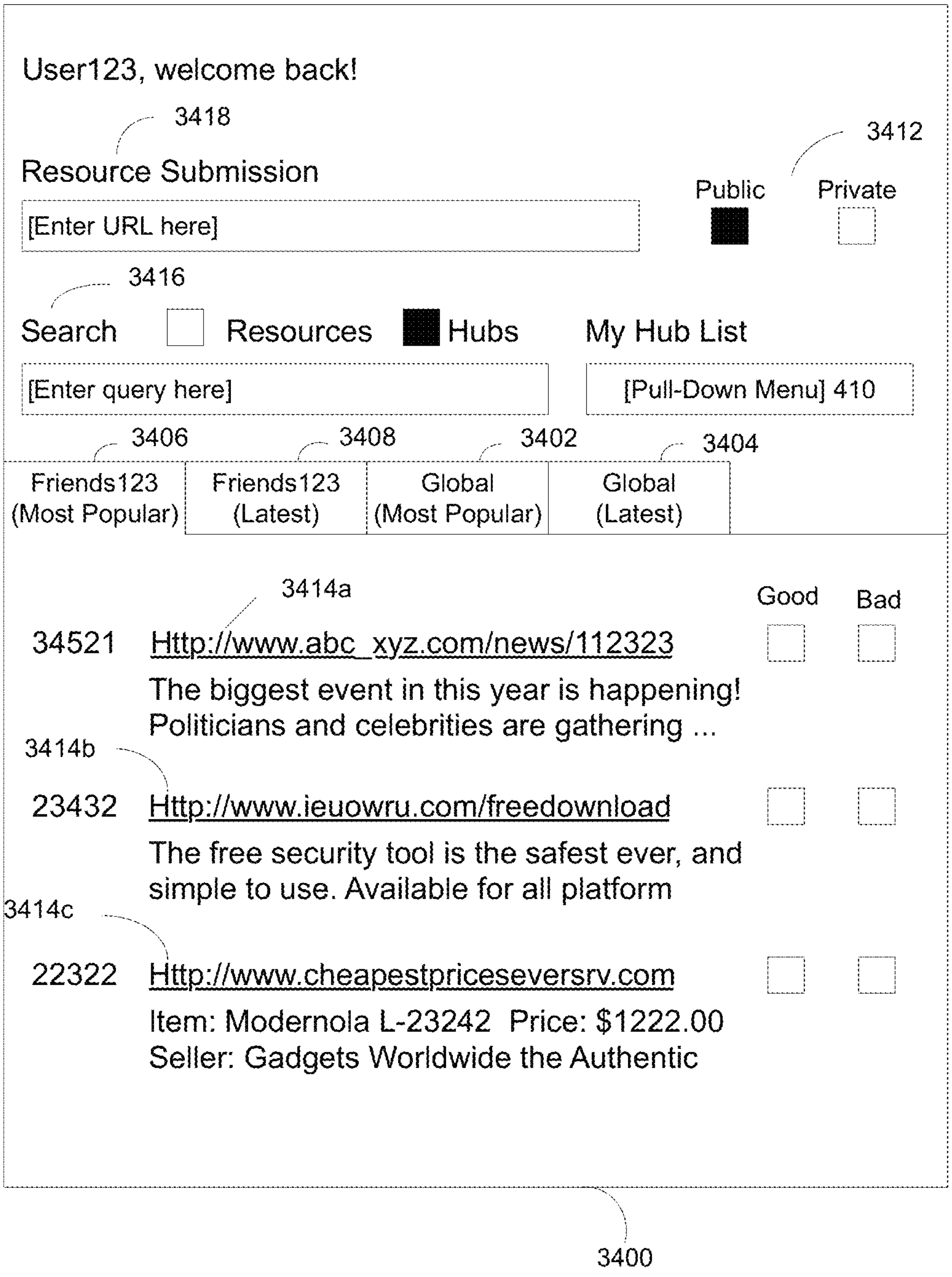
FIG. 34 shows an exemplary webpage that a user of the hub provider may be presented with upon successful logon.

FIG. 34 shows an exemplary webpage 3400, which a user of the hub provider 3104 may be presented with (by the user interface 3212) upon successful logon. For instance, such an webpage may comprise a list or selection of provider-wide or global prize resources 3402, a provider-wide or global view of latest resources 3404, a pair of lists of hub-wide prize resources 3406 and latest resources for a hub 3408 (e.g., hub "Friends123"), a pull-down list 3410 of hubs to which the user 3102*a*, 3102*b* is a member (from which a user 3102*a*, 3102*b* may select more hubs into view), a search interface 3416 for resources and hubs in the hub provider 3104, and a resource submission interface 3418 which also allows a user 3102*a*, 3102*b* to specify if the resource should be made public 3412. Each entry 3414*a*, 3414*b*, 3414*c*, in the selection or list of resources may comprise a URL to the resource in question, a summary or excerpt for the resource, a hub-level and/or overall score, and a control for receiving a good or bad rating. An authenticated user 3102*a*, 3102*b* may locate a hub among a plurality of hubs retrieved via the search interface 3416 (e.g., by school name, hobby description, organization name, a friend's name or user ID, and so on). The user 3102*a*, 3102*b* decides to sign up with the hub (herein named "ABC"), and is presented with membership criteria (e.g., a minimum age of 18 and a pending IQ test passed with a score of 80 or above) and agreements (e.g., initial membership of scout, but be demoted to observer if no prize resources submitted by the user within three months of membership). Such criteria and agreements may be stored and maintained in the hub database 3202 or some other databases, which may also maintain other membership rules such as those for invitation, as well as rules about resources such as those for prize resource selection, public resource acceptance, resource import and export, and the like.

If the user 3102*a*, 3102*b* passes the criteria and accepts the agreements, then the user interface 3212 may create a membership relationship between the user 3102*a*, 3102*b* and the hub in the relationship database 3208, thereby realizing the adding of the user 3102*a*, 3102*b* as member to the hub. Otherwise, the signup process with the hub via the user interface 3212 will be aborted, and the user 3102*a*, 3102*b* will be notified as such. Upon successful signup with the hub, the user's hub list will now include the hub. As such, the user 3102*a*, 3102*b* in this example may now view up to six non-private-personal lists: two for global latest and prize resources, two for hub Friends123's latest and prize resources, and two for hub ABC's. The list maker 3214 retrieves the appropriate resources from the resource and relationship databases 3208 and produces the respective lists.

Later the user 3102*a*, 3102*b* discovers a webpage of interest (e.g., via the same or different user device 3110*a*, 3110*b*), and submits the URL to the webpage to the hub provider 3104 (e.g., via the resource submission interface 3418 on the hub provider 3104 website, or a resource submission interface 3418 on a third-party tool or website, or one on the webpage of interest itself). The user interface 3212 receives the resource submission via the communication interface 3210, and passes it to the submission handler 3216. (In some instances, the submission handler 3216 may also receive the submission directly without involvement of the user interface 3212.) The submission handler 3216 invokes the resource analyzer 3302, which checks if the resource already exists in the resource database 3206. Assuming the resource already exists in the hub provider as a whole but not in hubs Friends123 and ABC, the resource distributor 3304 will create a positive availability relationship between the resource (e.g., via its URL in the resource database 3206) and each of the two hubs in the relationship database 3208. Subsequently, other members of these two hubs may see the resource or a copy or excerpt of the resource along with its URL on the hubs' lists or selections of latest resources, which are updated by the list maker 3214. The submitter member or other members may add comments to the resource. These comments may be stored and maintained in the relationship database 3208 or other databases, and made available for view to all members of the same hub. According to some embodiments, members of other hubs which happen to have already included the resource in their latest and/or prize resource lists may also view these comments if both parties agree to export and import comments respectively in relation to a common resource.

As other members of hub ABC provide their ratings against the resource, the score generator 3306 is updating the hub as well as overall (i.e., provider-wide) scores for the resource in the relationship database 3208 or the databases where the scores are kept. The popularity of the resource in hub ABC may soon promote the resource to become a global (i.e., provider-wide) prize resource (as determined by the list maker 3214) when it has so far been unable to attain such a status despite being available to many other hubs for quite a while. The resource may have also received little attention in hub Friends123.

The same user 3102*a*, 3102*b* in this example may join another hub (herein named "XYZ"), with the same membership criteria and agreements as hub ABC (e.g., membership status changed from scout to observer if no prize resource submissions within three months of membership). Later when the user 3102*a*, 3102*b* fails to meet the criteria or fulfill the agreements (as determined by the membership controller 3308), the membership of the user 3102*a*, 3102*b* in the hub XYZ will be removed (e.g., as executed by the membership controller 3308 via the removal of the corresponding membership relationship entry in the relationship database 3208). The user interface 3212 may also notify the user 3102*a*, 3102*b* of such membership removal.

According to some embodiments, one or more hubs may be provided for each user 3102*a*, 3102*b* in a hub provider 3104. For example, a user 3102*a*, 3102*b* may have a hub comprised of membership established or otherwise grouped according to university attended, to the user's residence or geographical position (e.g., via location sensing modules or devices), to the user's professional status or position, to a business or organization, and so forth. In one embodiment, a common or global hub may establish or otherwise group all users 3102*a*, 3102*b* in a hub provider 3104.

Although the hub provider 3104 is described as being comprised of various components (the hub database 3202, the user database 3204, the resource database 3206, the relationship database 3208, the communication interface 3210, the user interface 3212, the list maker 3214, and the submission handler 3216), fewer or more components may comprise the hub provider 3104 shown in FIG. 31 and still fall within the scope of various embodiments. Likewise, fewer or more components than those shown in FIG. 33 may comprise the activity manager 3108 shown in FIG. 31 and still fall within the scope of various embodiments.

Figure 35:
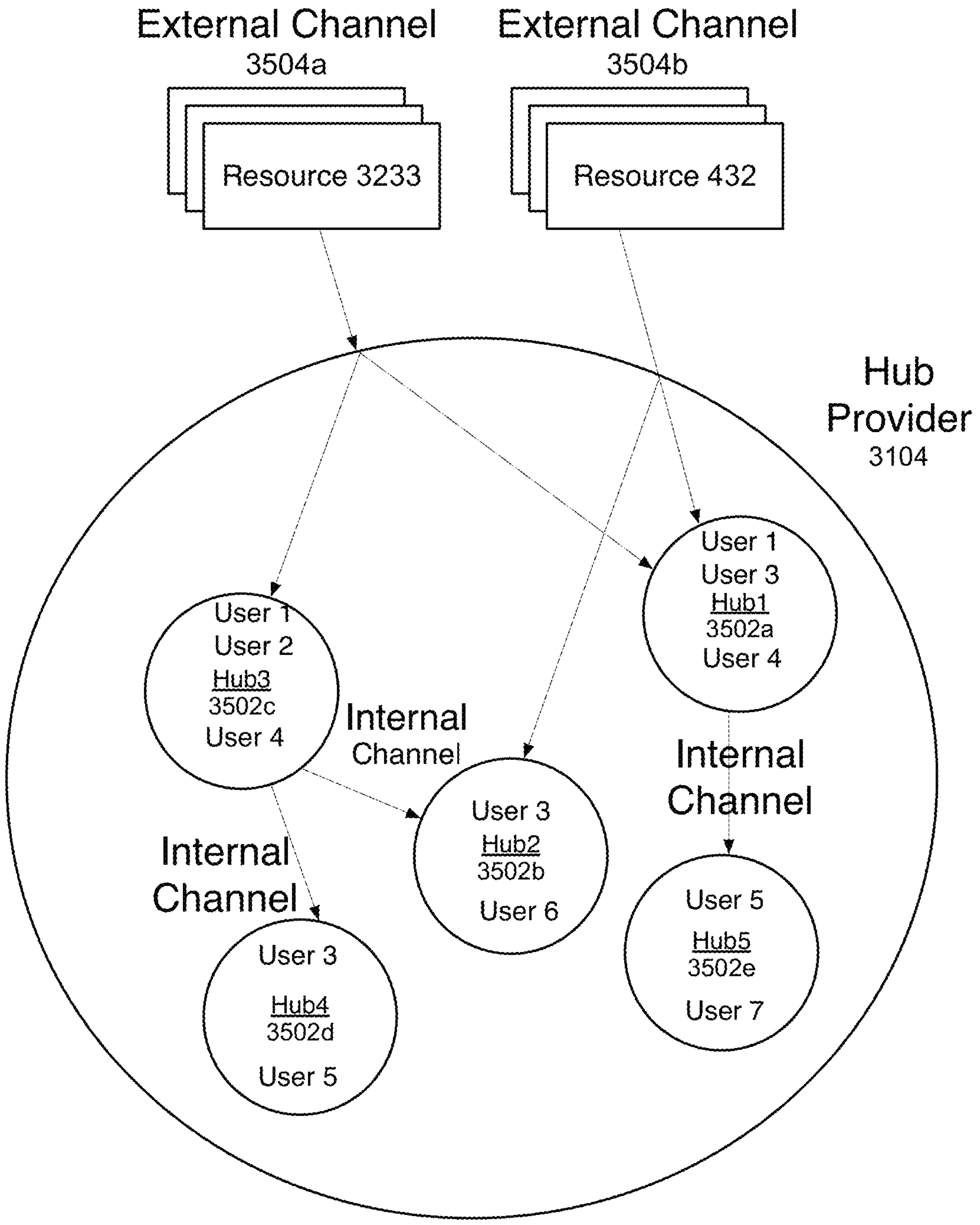
FIG. 35 shows a representation of a hub provider, and a hub-level prize resource list for five hubs, as well as the provider-wide prize resource list 3506.

FIG. 35 shows a representation of a hub provider such as the hub provider 3104 in FIG. 31, and a hub-level prize resource list for five hubs 3502*a*, 3502*b*, 3502*c*, 3502*d*, 3502*e*, as well as the provider-wide prize resource list 3506. There are two external channels of resources 3504*a*, 3504*b* that hubs in the hub provider may subscribe to or otherwise obtain resources from. These two channels 3504*a*, 3504*b* have Resource 3233 and Resource 432 respectively. Hub1 3502*a* and Hub3 3502*c* receive resources from the former channel while Hub1 3502*a* and Hub2 3502*b* receive resources from the latter channel. Hubs may also subscribe to or otherwise obtain resources from other hubs. For example, Hub2 3502*b* and Hub4 3502*d* receive resources from Hub3 3502*c*, while Hub5 3502*e* receives resources from Hub1 3502*a*. Hub1 3502*a* and Hub3 3502*c* are referred to as internal channels. A user may belong to more than one hub. For example, User1 belongs to Hub1 3502*a* and Hub3 3502*c*, while User3 belongs to Hub1 3502*a*, Hub2 3502*b*, and Hub4 3502*d*. According to one embodiment, a hub may specify criteria for selecting incoming resources from an external or internal channel. For example, a hub may only import prize resources from another hub. According to another embodiment, a hub may perform export control on its resources, whether created internally, or imported from external or internal channels. For example, a hub may make available only a subset of resources to other hubs for subscription, while restricting other resources for internal consumption only. The former may be referred to as public resources, while the latter as private resources with respect to the hub. All members of the hub may designate individual resources as private or public, or only those with certain privileges such as the hub owner or administrator may make resources public.

Figure 36:
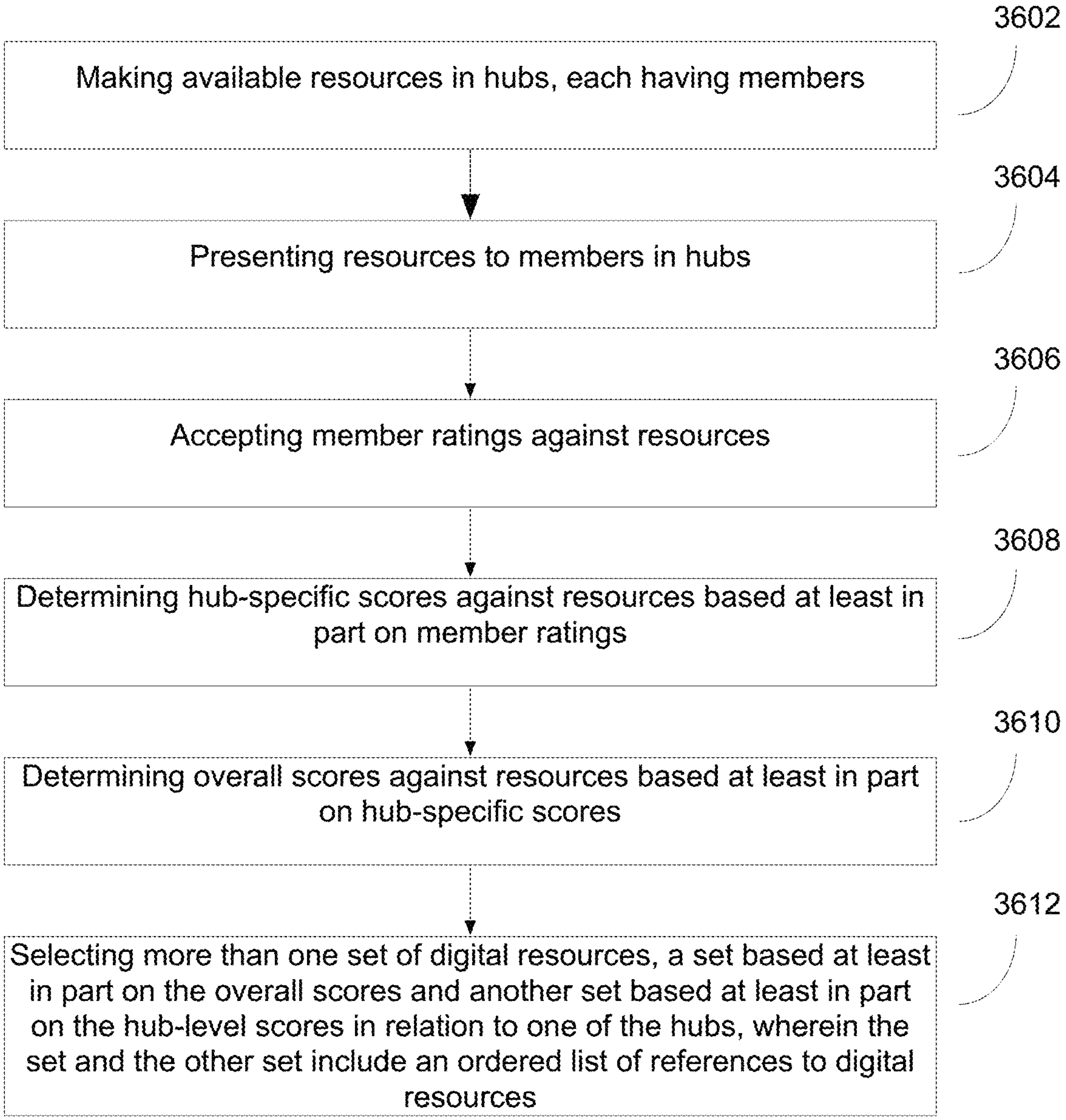
FIG. 36 shows a flow diagram of an exemplary process for selecting more than one set of digital resources among a plurality of resources via a hub provider.

FIG. 36 shows a flow diagram of an exemplary process for selecting more than one set of digital resources among a plurality of resources via a hub provider 3104. For instance, a user 3102*a*, 3102*b* via a user device 3110, 3110*b* such as one shown in FIG. 31 may make available 3602 one or more resources to a hub provider by sending or submitting their references (e.g., URLs) over a network 3104. The hub provider 3104 may comprise a plurality of hubs each having members, where the user 3102*a*, 3102*b* may be member to one or more of the hubs, subject to membership criteria and agreements, and other applicable constraints. The submitting may include sending a user ID (and password if not yet authenticated as a user 3102*a*, 3102*b* of the hub provider 3104), and other information, such as comment or some initial rating.

The hub provider 3104 may then make available the resource (and/or its representative reference, copy, or other equivalent entities or objects) to all the members of the hubs to which the resource is destined 3604, e.g., by the membership of the user 3102*a*, 3102*b* in the hubs, the policy in public resource acceptance of the other hubs, and the like. For example, the user interface 3212 of the hub provider 3104, upon receipt of the submission, may pass it to the submission handler 3216 which invokes the resource analyzer 3302. The resource analyzer 3302 may determine that the resource is not yet available to the hubs to which the user 3102*a*, 3102*b* is member, so it adds the resource to the hubs via positive resource availability entries in the relationship database 3208. The list maker 3214 may then make the resource available on the list of latest resources for each of the hub.

The hub provider 3104 may accept ratings from members whose hubs have the resource in question available 3606, and determine a hub-level or hub-specific score against the resource for each of the hubs 3608, based at least in part on these member ratings. For example, the user interface 3212 may receive a rating submission from a user 3102*a*, 3102*b* or user device 3110*a*, 3110*b* via the communication interface 3210. The user interface 3212 then passes it to the submission handler 3216 which invokes the score generator 3306. The score generator 3306 may update the score for the relationships between the resource and each of the applicable hubs in the relationship database 3208.

The hub provider 3104 may also determine an overall score 3610 against the resource based at least in part on its hub-level or hub-specific scores. Such overall scores associated with resources in the hub provider 3104 may drive, enable or otherwise facilitate the hub provider 3104 to select more than one set of prize digital resources 3612, the more than one set of prize digital resources comprising a set based at least in part on the overall scores, and another set based at least in part on the hub-level scores in relation one of the hubs in the hub provider 3104, wherein the set and the other set include an ordered list of references to digital resources, the references comprising URLs each accompanied by a score, the score being an overall score or a hub-level score. For example, the score generator 3306 may calculate and maintain an overall score (e.g., in the resource database 3206) for each of the resources in the hub provider 3104, in addition to updating their hub-level scores. The list maker 3214 may identify global prize resources 3402 based at least in part on these overall scores, and produce a selection or list of global prize resources 3402 accessible (e.g., via the user interface 3212) to all members of the hub provider 3104. Generation or production of such a selection or list may take place continuously, on-demand, periodically, or from time to time.

Similar to prize resources, a prize member may be determined at the hub level, for instance, based at least in part on his contribution to making available prize resources to the hub in question, and a prize user 3102*a*, 3102*b* based at least in part on the hub-level scores the resources that he has made available to the hub provider 3104 have received. (In an embodiment, a user may receive points towards his obtaining a prize status for resources he has made public that other hubs, i.e., those to which he is not a member at the time of submission, have then considered as prize.) A prize hub may be determined, for instance, based at least in part on the number or percentage of provider-wide prize resources made available by the hub in question over a given period of time, or based on the number or percentage of hubs per some category whose prize lists have included resources that originated from the hub.

A plurality of embodiments are specifically illustrated and/or described herein. However, it will be appreciated that modifications and variations are covered by the above teachings and within the scope of the present invention without departing from the spirit and intended scope thereof. For example, a hub provider 3104 may provide a set of rules or rule templates for various aspects of a hub-related maintenance and operations, such as those for membership admission, invitation and removal, and those for resource submission and (hub-specific) resource rating and list making. A hub owner or authority (e.g., the creator of the hub, one or more members elected by others in the hub, and so on) may choose among these rules or rule templates to form a specific membership policy for the hub. Rules or rule templates for changing existing rules may also be provided by the hub provider 3104. A hub may also be associated with an external or third-party component or system for conducting membership admission testing, such as an IQ test. The user interface 3212 may be configured to invoke such a component or system upon a user request for membership to a specific hub, cause the user 3102*a*, 3102*b* or the user device 3110*a*, 3110*b* to interact with the component or system, and then receive the testing result from the component or system. The user interface 3212 may also monitor how a user interacts or otherwise selects resources in the hub provider 3104 to generate (internal) rating submissions. A user 3102*a*, 3102*b* may also send the hub provider 3104 via a user device 3110*a*, 3110*b* a single submission comprising more than one resource and/or rating. The user interface 3212 may provide a search interface 3416 whereby a user may perform personalized queries against the resources in the hub provider 3104. For example, he may enter queries comprising keywords against only the resources he has submitted or rated positively. A user 3102*a*, 3102*b* or a hub authority may also specify criteria for filtering and sorting resources available to him or the hub. For example, a user 3102*a*, 3102*b* may hide a resource from his personal view either for his own private personal hub or another hub. Such a request and another subsequent change may cause the user interface 3212 to generate a rating submission against the resource, e.g., for the calculation of the overall score for the resource in question. A hub provider 3104 embodying the present invention may provide hubs in a specific category, including but not limited to advertising, retail goods and services, or news and journalism. A hub provider 3104 may also specify various categories of hubs (e.g., lifestyle, politics, science and technology, literature, and the like), where a user 3102*a*, 3102*b* may create a new category. A hub provider 3104 may stipulate that a user 3102*a*, 3102*b* may only join one hub per category, or become a voting or rating member to one hub (per category or per hub provider 3104) while being allowed to be observer to all other hubs. A hub provider 3104 may detect or determine hubs common in interest and thereby suggest merging of these hubs. Users may also be recommended for membership to hubs or review of resources based on his interests that may be deduced or induced from his memberships with other hubs, his resource and rating submissions, or some other observations or testing, including but not limited to questionnaires and personality profiling. The hub provider 3104 may also identify and publicly recognize a user 3102*a*, 3102*b* or hub for his or its ability to discover prize resources, and award or otherwise assign a title or rank to the user 3102*a*, 3102*b* or the hub. Ratings or scores of such a prize user or prize hub may receive more weight than other non-prize users or hubs for hub-level or overall score generation. In embodiments, a user in a hub provider may not need to join or belong to any hub. He or she may be presented with a list of provider-wide prize resources.

A hub provider 3104 may comprise a plurality of hub providers 3104. For example, a system or website may be a hub provider 3104 for a number of news publishers each being a hub provider 3104 for its subscribers, who may join or create hubs of their interest. A hub may also comprise a plurality of hubs. For example, a hub may refer to a country and have state or province hubs, each further comprising city or town hubs. Ratings or scores may be amalgamated or consolidated for each higher level (e.g., by the summation of lower-level scores or some other schemes) for entities or objects of interest, such as resources, hubs, users and the like. A system or service may be equipped or otherwise embodying the features of the present invention in addition to its inherent functionality. For example, a search service or engine may initially partition or assign its users 3102*a*, 3102*b* into different geographical areas or locations each area or location being a hub, and allow them to join other hubs (of types other than geographical area or location, e.g., shopping, health, entertainment, travel, and so on). The users may join and quit any of these hubs freely in relation to their queries. The search engine may monitor or track resources selected by the users from search results, and the queries responsible for the search results. The user-selected resources may be considered as having better ratings than those not selected from the search results. Each resource may then be associated with a relevancy score for the hub(s) in question, while having a global relevancy score. In response to queries, the search engine may present the users with search results comprising groups of relevant resources or their references, one group corresponding to their overall relevancy scores, while each of the others corresponding to a specific hub. Relevant resources in more than one hub of interest (e.g., geographical location hub "Seattle" and context hub "Travel") may further be consolidated to produce a selection or list of resources based on their consolidated hub-level scores. For example, a logical hub of "Travel from Seattle" may be created (e.g., on the fly in response to queries from users having membership in both "Travel" and "Seattle") to account for resources that are applicable to both hub "Travel" and hub "Seattle", and assume their consolidated hub-level score (e.g., by summation of their individual hub-level scores, or some other schemes). A social networking website or system, or an application on the website or system, may provide its members with the provision to create hubs based on friendship, topic, organization or professional affiliation, brand, and so on. A peer-to-peer resource sharing website or system may allow its users to share music, videos or retail offers among groups or circles of friends or people, each group or circle being a hub. A member may share the availability of a song, video or retail offer with his peers in the group or circle, and provide indication or action interpretable as a rating, such as its being his favorite, a good deal, a purchase, a watched video, and so on. Some action or indication may result in a higher rating than another, e.g., a purchase resulting in a higher rating than being a favorite.

In addition to selections or lists of latest, prize, or controversial resources, a hub provider 3104 or individual hubs in a hub provider 3104 may include other types of selections or lists. For example, a list of pending prize resources may include resources that have attained some intermediary level of scores, so that users 3102*a*, 3102*b* or members may be led or otherwise suggested to view or review such pending prize resources so to obtain better consensus or more ratings on their way to being included in a prize selection or list. According to some embodiments, a hub provider 3104 could determine a resource that has a high negative score in one hub while a high positive score in another hub to be a prize resource for the latter hub and not the former, and yet consider both scores as a positive contribution to the overall score of the resource, for example, for a list of controversial resources.

Furthermore, a hub provider 3104 may also be equipped with facilities or components to allow users to generate their own digital resources, which may be derived from resources submitted from other users. For example, a user may create a resource comprising an incoming resource, and his editorial or opinion about that resource. A digital resource may also be specific to a certain type of resources and be created in accordance to some templates or guidelines. For example, an offer of goods and services may include an item name, seller information, price, and optional quantity. Membership to hubs or delivery of resources may require payment. A hub provider 3104 may be equipped with a component or otherwise configured to trigger a component or system to handle such payment. A submitter may also receive payments for resource submissions whose resources or their related or associated ads that have received a certain level of attention, e.g., becoming a prize resource. For example, an online newspaper may register as or otherwise become a hub, with subscribers as members and other content distributors/aggregators being hubs that receive news items from the online newspaper. Resource usage (e.g., impressions, clicks, transactions, and the like) may also be metered, e.g., for payment or revenue. A portion of such revenue may be distributed to users responsible for submitting or otherwise making available those resources.

Moreover, a resource may be a composite, comprising a plurality of resources, including resources of different categories or sources, e.g., ads on a new article, or still photos in a video, and so on. A reference to a resource may involve different scopes, e.g., a URL may refer to a single webpage or a website including all URLs comprising the URL. A resource submission may include annotations, tags and other information to qualify or otherwise annotate the resource, such as whether the URL refers to a webpage or a website, the topic to which the resource is relevant to, a summary of item, seller, quantity, and price to an offer, and so on. A reference to a resource needs not be explicitly available or accessible online to a user 3102*a*, 3102*b*. For instance, an brick-and-mortar retail offer comprising an item name, seller information and price may be presented or otherwise accessible via a list of offers, where a user 3102*a*, 3102*b* may choose one among the list, where the hub provider 3104 would maintain internal references to such offers. Answers from a user 3102*a*, 3102*b* to a series of questions may also help determine a resource without revealing the resulting resource(s), e.g., a personality profile or characterization, to the user 3102*a*, 3102*b*. How the chosen or resulting resources correspond to one another may be established or otherwise determined by the hub provider 3104.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on physical computer readable storage media, or embodied in signals in computer readable transmission media, the logic configured to perform methods of the invention. The examples provided herein are exemplary and are not meant to be exclusive.

"Protocol is the Context."

Embodiments of the present invention provide systems, methods, processes, and products for establishing one or more semantic contexts for dissemination and retrieval of digital resources such as those available on the Web, including but not limited to webpages, documents, multimedia presentations, computer executables, interactive programs, and any online information or resources, partial or otherwise. For instance, they make possible context-layer, context-level or context-aware communication between communication entities such as clients and servers, information requesters and providers, information senders and receivers, and so on, and enable a plurality of communication entities to transfer, interact with or otherwise handle digital resources via context layer or context-level protocols or interfaces. A semantic context, or simply context, refers to providing a denotation or setting for interpreting information in relation to a specific intent or subject matter (e.g., advertising, reviews, news, business and finance, entertainment, politics, science and technologies, medical and health, history, books and arts, scholastic and academic). A context may be thematic and self-contained. In contrast, an attribute (e.g., a length) may be a characteristic, property or quality inherent or subordinate to something, which it serves to qualify. As such, an attribute on its own may not be capable of providing a context.

According to one embodiment, a context for an interface (or protocol) may mean a primary context whereby a digital resource deemed relevant to the context may include contextually irrelevant content or data, as long as the primary content or data is consistent with or otherwise relevant to the context. For example, a webpage of a news article including ads may be served in a news context, as long as the news article itself is not of advertising. This is similar to a specialty television channel where the primary content of interest should be consistent with the claimed specialty (e.g., history), while ads may be exhibited during program breaks, or concurrently with the program runs, e.g., at the bottom margin of the screen. According to another embodiment, a context's definition is provided in a URI-identifiable (Uniform Resource Identifier-identifiable) or publicly available document. (This could be similar to how various IETF (Internet Engineering Task Force) protocols are defined in RFC (Request for Comments) documents.)

An interface, as herein referred to, defines a programmatic, access or communication point or a set of such points at which operative or communication entities such as independent systems or diverse components may interact, entailing certain service or protocol declarations or agreements. (Entities that provide the services of an interface may be referred to as interface service providers, while those that use the services may be referred to as interface service users. An interface service provider may be regarded as a service or server while an interface service user may be regarded as a user or client to the service or server.)

For instance, the following shows some example interface definitions or declarations:

(1) get(<location>)=> < >
(2) get(<location>)=> <document>
(3) get(<location>)=> [Advertising]
(4) get(<location>)=> [Advertising]<document>
(5) getAdvertising(<location>)=> <document>
(6) getGarbage(<location>)=> [Advertising]
(7) getAdvertising(<location>)=> [Advertising]

The first interface "get" makes no statement about the data type or format of digital resources being retrieved, nor the context to which such resources may be related. A source of digital resources is being identified by a location such as a URL. (Such a source may refer to some repository or service hosting or capable of locating digital resources.) The second interface "get" is also context-free, but it states that target resources for retrieval is of document type, e.g., a web page or a spreadsheet. The third interface "get" is context-aware, in that it states the semantic context of target resources is of advertising. A target digital resource needs not be a document; it could be a computer executable file, for example. The fourth interface "get" is also context-aware, and it states not only that the semantic context of its target resources is of advertising, but also that they are of document type. The fifth interface "getAdvertising" is context-free, even though the name itself may suggest that its target entity is of advertising. As far as an interface declaration or specification is concerned, the name of an interface provides identification and description, but does not necessarily make any declarative or binding statement on the acceptable types, let alone contexts, of the interface's input and output. That is, if the interface returned a document not of advertising, the interface service provider did not break its service agreement. In contrast, the sixth interface "getGarbage" declares to return some digital resource of advertising. If it returned a document not of advertising, the service provider of this interface would have broken its service agreement. The seventh interface "getAdvertising" is context-aware, and it has the same interface name as the fifth interface, though the latter is context-free.

A protocol, such as a communication protocol, may be considered as a form of interface. A protocol may provide a convention whereby communicably-coupled entities could send, receive, or exchange requests, responses or data via some communication link such as a connection, channel, path, memory, or any medium across between two endpoints or across an interface, whether physical (including wireless), programmatic (including procedure call stacks), or logical (including pipes and queues). When a communication link embodies an interface, there may involve two (or more) endpoints, each of which may be considered as an interface for each side or end of the communication in question. For example, a HTTP server may use port 80 (namely, the server port) for accepting requests while a HTTP client may use available ports other than port 80 (namely, the client port) for sending requests. There may exist a communication link between a HTTP client and a HTTP server when the former sends requests to and receives responses from the latter. The client in this case may regard the client port as its interface for sending requests to the server while the server may regard the server port as its interface for receiving requests from the client.

An implementation of a protocol may include client or server functionality when the protocol involves exchange of requests and responses between two communication entities, with one assuming the role of a client while the other, the role of a server. A server-side protocol implementation may be referred to as a protocol server, while a client-side protocol implementation, a protocol client. A protocol server or client may provide services for sending and/or receiving information over a communication link to and from its peer at the other end of a communication link. It may make available these services for third-party use (e.g., an interface service user) via a service access point or service interface, for example, an application programming interface (API). An example of such third-party use includes a higher-layer protocol client or server using the services of a lower-layer protocol client or server, such as a HTTP client and server using services provided by a TCP protocol client and server respectively, or a Web browser using services provided by a HTTP protocol client. According to some embodiments, a protocol client or server may include its protocol service user. For example, a Web browser may be regarded as a HTTP protocol client communicating with a HTTP server on behalf of a human user.

Information exchanged in accordance with a protocol may include overhead information such as those for connection initiation, maintenance or control. User content, information or payload of a protocol includes data or digital resources that may be received from or delivered to an interface service user or an application. For example, a file for transfer is a payload of FTP (File Transfer Protocol), while a webpage to retrieve is user data of HTTP.

Figure 37:
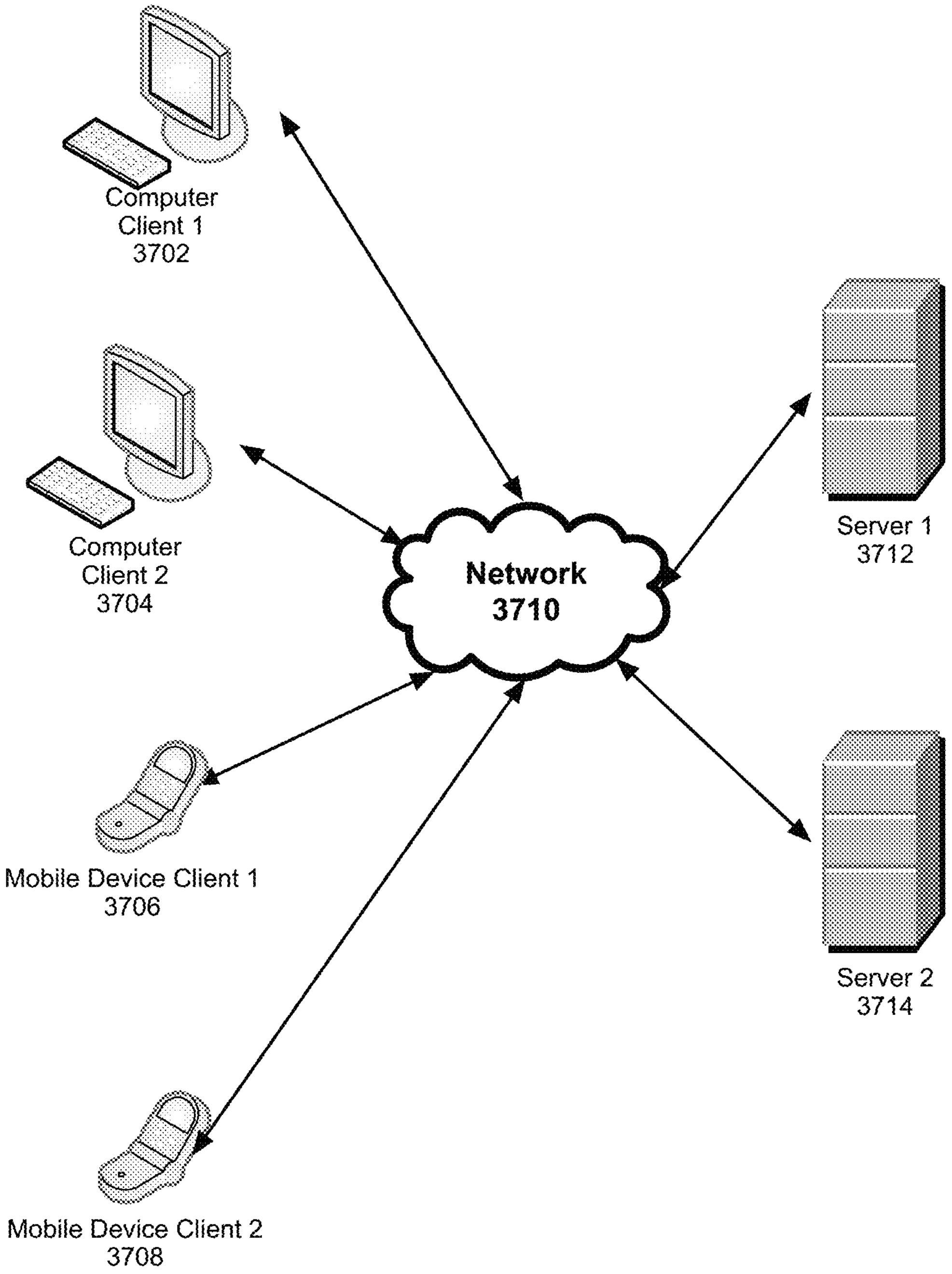
FIG. 37 shows a client-server communication in accordance with an embodiment.

FIG. 37 shows a system for retrieval of digital resources relative to some specific contexts according to an embodiment of the present invention. Portable and mobile devices and computers are example clients that may communicate with a server over a network.

The system may include one or more client computers and devices 3702-3708. A client is any general-purpose apparatus that can communicate with other computers or devices over a network and has the capability of connecting to the network 3710. In one embodiment, a client may be a portable or mobile communications device having the requisite functionality. The system may include a server 3712, 3714 such as a database server or a Web server. The server may be any general-purpose computer capable of storage, such as hosting a database or file system, and of communication with multiple clients over a network. The network may be an intranet, the Internet, the World Wide Web (i.e., the Web), or any other network, either closed or open, that includes one or more devices or applications that are communicating over the network. Clients and the server may communicate using a wired or wireless medium. A client may include a web browser when the server is a Web server. In addition, a client may also include an application resident in its memory (not shown) that may provide a user interface through which the client may receive input, instructions or directives from a user. In some embodiments, the user interface may reside as an extension to a software application and may be integrated into a web browser resident of client. In some other embodiments, a client and a server may be embedded into a single apparatus and communicate with each other. A server may also receive requests, responses or some other transmissions from another server. A server that sends a request or response to another server without prior solicitation from the latter is often referred to as a proxy server or a proxy. A client may also receive responses or some other transmissions from a server without specific corresponding requests, usually upon some prior authorization or setup. This is often referred to as notifications or events.

Figure 38:
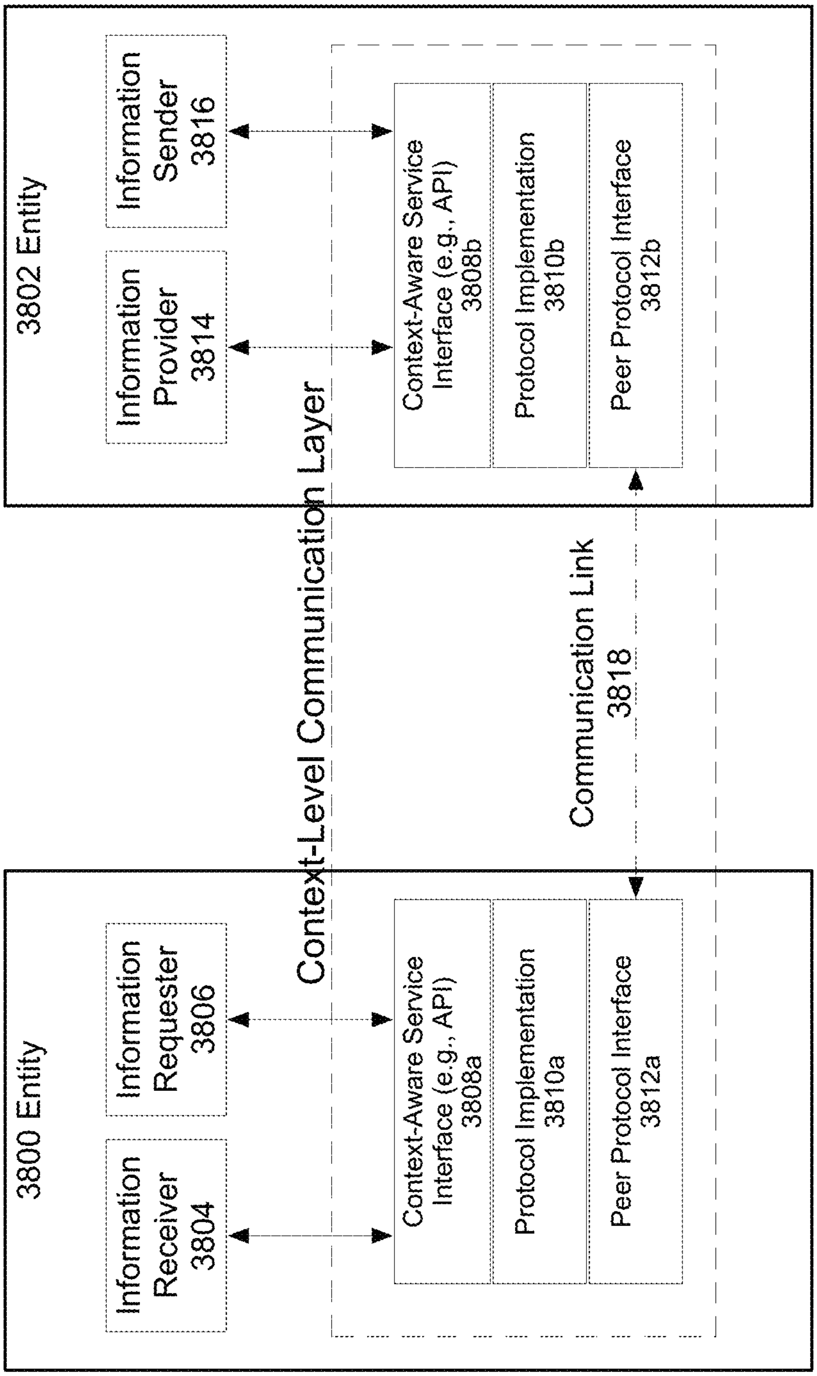
FIG. 38 shows a context-level communication layer in accordance with an embodiment.

FIG. 38 shows two communication entities, such as those embedded in or otherwise embodied by the clients and servers shown in FIG. 37, communicating via a context-level communication layer according to one embodiment. Each entity 3800-3802 comprises three components, which may be realized in software and/or hardware. A context-aware service interface 3808*a*-3808*b* or service access point component enables an information receiver 3804 (or requester 3806) and information sender 3816 (or provider 3814) to access and use services provided by a protocol implementation to receive and deliver context-denoted payload (such as data or digital resources). A protocol implementation component 3810*a*-3810*b* (e.g., a protocol client or server) may realize a specific protocol in accordance to some rules, specifications or roles. It may use services provided by other entities, such as those available from other communication layers. The layer that uses the services of another layer but not the other way around is often regarded as a higher layer in relation to the latter. A peer protocol interface 3812*a*-*b* (e.g., a TCP/IP stack) provides an endpoint for a communication link (e.g., a network socket) with another entity capable of communication via the same or compatible protocol. Below the protocol interface, a communication link can establish a connection via a physical link or a wireless channel. A communication link 3818 may also be encapsulated into or otherwise established upon another communication link to achieve its functions or utilities. For example, a payload of a higher-layer communication link may be encapsulated into or otherwise carried by a payload of a lower-layer communication link for delivery, e.g., the transfer of encoded data from one geographical location to another via a physical communication link (i.e., the lower layer) may be performed before the data may be decoded by a recipient application (i.e., the higher layer).

For non-physical communication links, there may be addressable identifiers (IDs) for identifying peer protocol interfaces or endpoints. For example, MAC (Media Access Control) addresses provide an addressable ID for interfacing with Ethernet and Token Ring network devices or adapters, which may be regarded as being capable of layer-2 communication as defined in the OSI Reference Model. IP (Internet Protocol) addresses provide an addressable ID for computers and devices communicable via the Internet or Web. Internet Protocol may be regarded as a layer-3 protocol in accordance to the OSI Reference Model. TCP (Transmission Control Protocol) port numbers provide a 16-bit addressable ID for one of the virtual interfaces that a TCP/IP-capable device may provide for interfacing with its applications and services therein. In accordance to the OSI Reference Model, TCP may be regarded as a layer-4 protocol that uses services provided by a lower-layer protocol, e.g., Internet Protocol, which in turn may also use services by a lower-layer protocol, e.g., Ethernet. Communication entities peer to one another would use addressable IDs suitable to their layer of communication to identify the specific interfaces of interest.

Addressable IDs may be independent or relative to addressable IDs at dependent or otherwise lower layers of communication. For example, IP addresses (OSI layer 3) may be regarded as independent from MAC addresses (OSI layer 2), even the former might map to the latter for effecting actual transmission of data from one computer or host to another. TCP or UDP port numbers (OSI layer 4) would require a layer-3 address (e.g., IP addresses) to identify a specific interface or endpoint for peer-level communication. For example, an endpoint of a bi-directional inter-process communication such as an IP socket may have an address comprising the address of the host where the process resides and that of an endpoint at the host. For instance, an IP socket address may comprise an IP address and a port number. In contrast, an IP address or MAC address on its own would suffice in this respect.

Peer interfaces or endpoints of some protocols, especially at the higher layers, may include or otherwise involve a reference to a digital resource (e.g., a user account, a software program, a file, a webpage), which may also be independent or relative to addressable IDs of some lower-layer protocols. Such inclusion or involvement may depend on specific connections, operations or payload that a protocol in question may support. For example, Telnet, an Application Layer or Layer 7 protocol according to the OSI Reference Model, may require or otherwise accept a user account for connection, when there are multiple user accounts available for Telnet connections. FTP and HTTP (both also of OSI layer 7) may accept a file path or URL (Uniform Resource Locator) to identify for retrieval, for example, a software program, folder, file or webpage. Such references to digital resources themselves may be regarded as interface or endpoint IDs in relation to these digital resources, especially when these resources may provide services or interactivity, such as a user account having specific access and operation privileges, or a webpage comprising hyperlinks, videos or spreadsheets.

In contrast to those at OSI layer 4 or below, protocol implementations of higher layers may use OSI layer 4 interfaces or endpoints to identify point of entries or access points for peer communication. For example, TCP port 80, an OSI layer-4 addressable interface ID, is designated as a well-known port for HTTP (i.e., layer-7) servers or services. While any available and unoccupied TCP port may be used by a HTTP server or service as the server or service's interface or endpoint for communication, port 80 is the official addressable interface for a computer, server or host to provide HTTP services. For example, the Web at large comprises a myriad of HTTP service providers accepting requests at port 80.

According to one embodiment, an OSI layer-4 addressable ID, such as a TCP or UDP port, may be assigned to or otherwise associated with a protocol implementation whose peer communication is relative to one or more contexts. According to another embodiment, a peer communication relative to a context (e.g., advertising) may be established in a layer higher than the Application layer of either the OSI Model or the TCP/IP Model, and references to digital resources of interest in relation to this communication may include URIs (Uniform Resource Identifiers), which comprise URNs (Uniform Resource Names) and URLs. For instance, a protocol implementation for a context-level layer of communication may listen to a TCP/IP or TCP/UDP port for accepting context-level requests for digital resources. According to yet another embodiment, a context's definition as well as the association between an endpoint and the context is provided in a URI-identifiable or publicly available document, such a standard or specification published or maintained by an organization or corporation.

In contrast, TCP or UPC ports like port 13 (associated with a so-called "daytime" protocol), port 17 ("quote of the day" protocol), port 43 (WHOIS protocol), ports 350 and 351 (for mapping of Airline Traffic over IP), and port 666 (for DOOM, an online game) provide an interface for obtaining data pertaining to debugging and measurement purposes (e.g., via a sequence of characters, including time information or an arbitrary message), to a particular system operation (e.g., an online game or air traffic system), or to a proprietary, centrally managed, or application-specific database (e.g., domain holder information), and not to a defined context with which information or digital resources having the same, equivalent or compatible context may be published, requested, or retrieved in accordance with the context.

For example, port 13 (for both TCP and UDP) provides a service to output a current date and time as a character string without regard to the corresponding input (e.g., whatever reference to a digital resource present in the request would be ignored). Port 17 provides a service to output an arbitrary short message, also without regard to the corresponding input. Although the name of the protocol associated with port 17 is called Quote of the Day protocol, the standard or definition of this protocol does not require sending of any actual notable quote, but simply a short message (without regard to the input). Hence a service implementing the protocol may send an arbitrary text (instead of any notable quote) without violating the standard governing or otherwise defining the protocol. In fact, the purpose of ports 13 and 17 is for testing and measurement. That is, any data (including any references to digital resources) received by their protocol servers or services implementing these protocols are ignored or discarded, and a sequence of characters expressing a date or a short message would be sent as response to their protocol clients or service users for the purpose of network testing and measurement, rather than anything useful in a given context. In addition, these testing and measurement ports are often disabled by default in a server or host for security concerns.

Ports 350 and 351 (both TCP and UDP) as well as 666 (UDP only) provide an interface for accepting requests for operation of a particular system, namely an airline traffic system and an online game system respectively. Port 43 (TCP only) provides a service to obtain registration information about an Internet domain (i.e., the WHOIS service). Usually only domain registrars would provide such a service. Domain names are managed under an administrative hierarchy headed by the Internet Assigned Numbers Authority (IANA), and only relevant to the operation, administration and maintenance of Domain Name System (DNS), a hierarchical naming system for computers, services, or resources connected to an IP-based network, including the Web.

According to one embodiment, a TCP port may be used for publishing or receiving requests for online ads using HTTP as an underlying context-ignorant transport protocol. Such publications and requests may be accomplished without any central administration or authoritative control, just like how digital resources such as webpages may be published and requested via HTTP over TCP port 80. According to another embodiment, an endpoint for communication of layer lower than the Transport layer may be assigned with or otherwise declared for a context, such as an IP address (i.e., the Network layer).

Figure 39A:
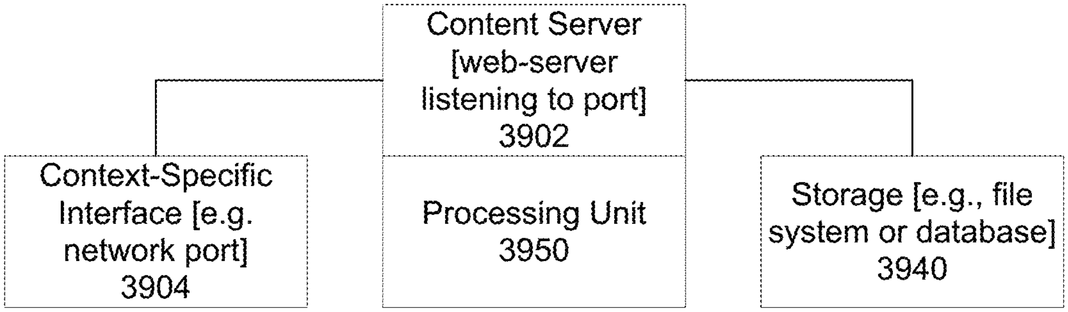
FIGS. 39A, 39B, and 39C show a number of systems capable of handling context-level requests in accordance with some embodiments.
Figure 39B:
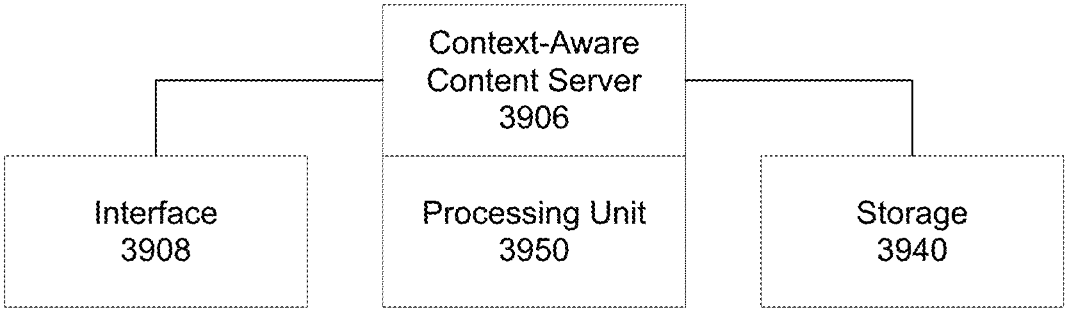
Figure 39C:
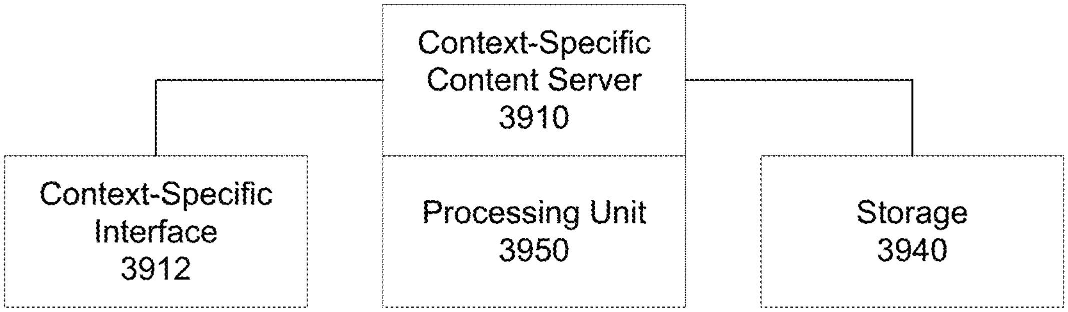

FIGS. 39A to 39C show three example systems capable of contextualizing digital resources in response to a request. Each example system comprises a processing unit 3950 (e.g., a processor coupled with an operating system), a storage device 3940 (e.g., a file system, a database), an interface (e.g., an endpoint capable of establishing or otherwise facilitating a communication link with one or more clients, the endpoint including both hardware and software necessary for such connection, virtual or otherwise, such as a network port), and a content server (e.g., a service having a protocol stack that may process requests and send responses including digital resources maintained in the storage, the protocol stack being a particular software implementation of a computer networking protocol suite or a collection of protocols for communication via the interface). According to one embodiment, a content server includes a plurality of protocol servers, the plurality of protocol servers having at least one protocol server capable of establishing or supporting a context-level communication layer, such as the one shown in FIG. 38.

FIG. 39A shows a system according to one embodiment, where there exists an interface 3904 which may be context-specific. For example, a TCP/IP port or IANA-maintained port may be designated for scholastic and academic content or for advertising of goods and services. As such, user-level or payload-related requests, responses, and messages sent to this interface or port are considered to be relative or in relation to the context.

Other types of requests, responses, messages, or data such as those for transmission control and protocol operation may also go through the interface or port, and yet they need not be considered as having bearing on any context. For example, between a Web browser and a Web server 3902 participating in context-level communication, a HTTP request for a webpage and a corresponding response including the webpage may be considered as a user-level data or payload-level request and response in relation to a given context. On the other hand, context-ignorant protocol data in support of a context-level protocol (e.g., those of TCP) may also go utilize the same port. A context-level Web server may also send context-irrelevant responses to its clients (e.g., for server capability queries or service timeout). According to one embodiment, only user data or payload requests and responses may be relative to a given context for context-level communication or in a context layer of communication. According to another embodiment, a context-specific interface may be defined as providing digital resources primarily for advertising of goods and services via HTTP, for example, through TCP/IP port 98 or 2040, which may be in contrast to port 80 the official or well-known port of the Web's context-ignorant HTTP interface. According to one embodiment, instead of the context-specific interface that receives requests for digital resources, another interface, which may or may not be context-specific, can be responsible for delivering those digital resources. According to another embodiment, an entire website (e.g., as identified by a domain name or IP address) may be regarded as a digital resource. Such a digital resource may provide other digital resources (e.g., web pages, videos, interactive programs). A computer or system hosting the website that listens on a context-specific network port, or otherwise serves via a context-specific interface, may contextualize the website as a whole. Depending on the definition or scope of a subject matter context, the website associated with the subject matter context may include contents not associated with the subject matter context per se. For example, a website associated with a shopping context may include webpages containing investor and management information, legal statements about the terms of use of the website, application programming interface (API) specifications for accessing services or contents of the website, and so on. According to one embodiment, a subject matter context of a website or a collection of web resources pertaining to a website indicates the overall nature of the website or the collection of digital resources pertaining to the website. An individual digital resource of the website needs not be consistent with the subject matter context in question.

FIG. 39B shows a system according to one embodiment, where there exists a content server 3906 which may be context-aware. For example, the content server may determine from protocol data, message metadata, or payload whether the transmission in question may be context-specific or what context it may belong to. According to one embodiment, a content server may be responsible for handling requests received via an otherwise context-ignorant interface 3908 (e.g., port 80 for HTTP), in addition to context-specific requests received via the same interface. As such, the content server may service HTTP requests just like a typical HTTP server would, except that the former may also handle context-specific requests and responses. For example, a context-specific protocol may also use port 80 as its contact or well-known port. A context-aware content server would service context-level messages, while still being able to recognize and process messages for the other and context-ignorant protocol sharing the same port, i.e., HTTP on port 80. Such a context-level protocol may or may not be a superset of this other protocol. A superset protocol often provides an extension to its constituent protocols wherein data for such an extension would be transparent to constituent protocol servers or handlers if they receive transmissions relative to the superset protocol. According to one embodiment, a context-aware protocol server needs not be able to handle messages of an otherwise context-ignorant protocol. According to another embodiment, a context-aware protocol server may determine or decide whether a message is context-specific via data or metadata carried in an otherwise context-ignorant or context-neutral protocol. For example, context indication, declaration or data may be specified as optional parameters in a URI, protocol data or payload metadata, and that their presence would not interfere with the operation of the context-ignorant or context-neutral protocol in question (e.g., HTTP). According to yet another embodiment, a context-aware protocol may handle requests or messages for more than one context. A digital resource may also be relevant to more than one context. For example, an online ad for airline tickets may be relevant to both travel and shopping contexts that may otherwise, according to one embodiment, be unrelated to one another.

FIG. 39C shows a system according to one embodiment, where there exists an interface a content server 3910 which may both be context-specific. For example, an interface 3912 of port 98 or 2040 may be assigned to the context of advertising of goods and services, while the content server responsible for that port is only capable of receiving and generating requests and responses whose digital resources of interest are provided in or otherwise primarily related to the advertising context.

Embodiments of the present invention may also provide asynchronous retrieval or receipt of digital resources via context-level protocols and interfaces. According to one embodiment, a system such as one shown in FIG. 39A to FIG. 39C may be configured or otherwise adapted to receive digital resources via a context-level protocol and/or interface. For example, a content receiver along with an interface, processing unit, and storage may receive digital resources via a contextualized endpoint. A content receiver may also implement or otherwise include a context-level protocol client capable of identifying incoming context-level messages or payload, similar to the manner or scheme in which a context-level protocol server may identify context-level requests or digital resources. According to one embodiment, a prior registration or configuration may be set up (e.g., establishing or installing authorization code, logon credential, secret token) so that the content receiver may perform authentication against the receipt or delivery of unsolicited or asynchronous receipt of digital resources.

Figure 40:
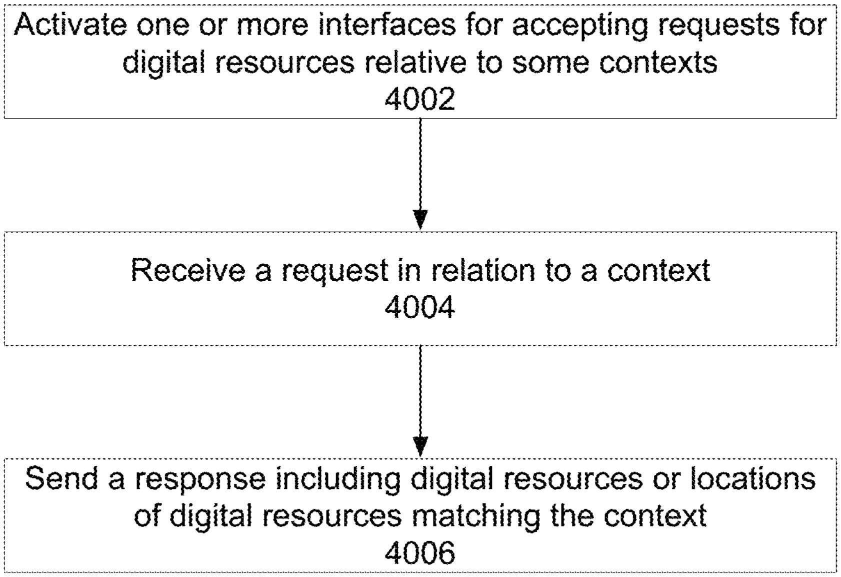
FIG. 40 shows a computerized method in accordance with an embodiment.

FIG. 40 is a high-level flow diagram for a computerized method that may be executed by a functional entity, such as a context-level protocol server, or a system such as one of those shown in FIG. 39A to FIG. 39C, according to one embodiment. Those of skill in the art will understand that various steps in the method (and in other methods described herein) may be added or combined without deviating from the spirit and purview of the embodiment. The high-level flow diagram is not limiting on any claims. As shown in FIG. 40, a system may:

(a) activate one or more interfaces for accepting a request for one or more digital resources, the one or more digital resources having relation to one or more contexts 4002;

(b) receive the request in relation to a context 4004; and (c) send a response including a collection of the one or more digital resources or a collection of locations of the one or more digital resources, wherein the collection has relation to the context 4006.

The one or more digital resources may include digital resources identifiable by URI or accessible by HTTP or FTP. The request may include the URI. The activating may include assigning the one or more contexts to the one or more interfaces. The one or more interfaces may include one or more communication endpoints, the one or more communication endpoints including a TCP port or UDP port. In addition, the receiving may include receiving from a client while the sending may include sending to the client. The one or more contexts may include Advertising, Reviews, News, Science and Technologies, Medical and Health, History, Books and Arts, Scholastic and Academic. Each pair of the one or more contexts and the one or more interfaces may be associated with a URI-identifiable or publicly available standard or specification defining the context in each pair.

Figure 41:
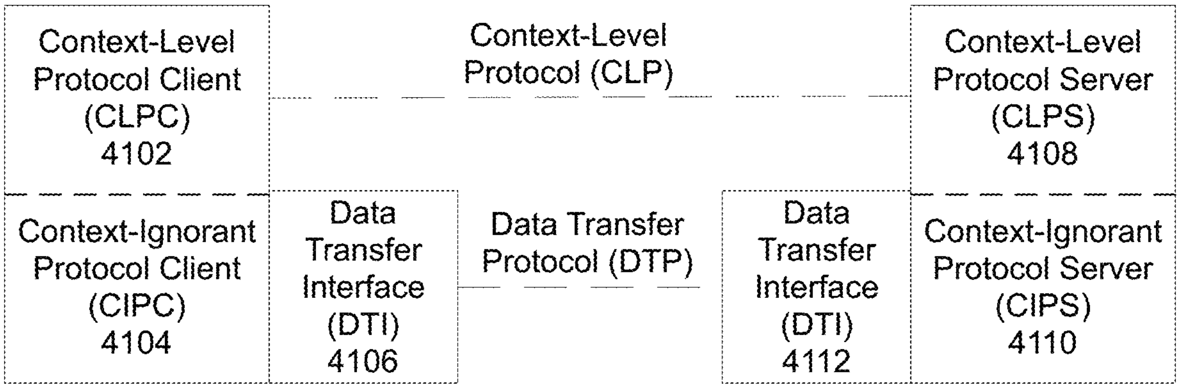
FIG. 41 shows multi-layer communication between a client and server via a context-level protocol, in accordance with an embodiment.

FIG. 41 shows a client and server capable of context-level communication, according to one embodiment. The client comprises three components: a context-level protocol client (CLPC) 4102, a context-ignorant protocol client (CIPC) 4104, and a data transfer interface (DTI) 4106. The server comprises a context-level protocol server (CLPS) 4108, a context-ignorant protocol server (CIPS) 4110, and a data transfer interface (DTI) 4112. A protocol whose purpose is to transfer data from one endpoint to another without regard to any context is herein referred to as a data transfer protocol (DTP). A protocol intended or used for communication or connection (virtual or otherwise) at a context layer or level is referred to as a context-level protocol (CLP).

Examples of DTP are TCP/IP and HTTP, where HTTP uses the services of TCP/IP. As such, HTTP is usually regarded as a higher level or layer protocol than TCP/IP. (HTTP is an application layer protocol while TCP/IP, a transport layer one, according to OSI Reference Model.) Examples of CIPS are protocol servers for TCP/IP and HTTP respectively, while examples of CIPC are protocol clients for TCP/IP and HTTP respectively. A CLPC or CLPS may rely on or otherwise use one or more DTPs explicitly for data delivery across two endpoints over a communication link. A protocol client or server may use services from some lower layer or level protocols without explicit knowledge or exposure. For example, a HTTP protocol server may use TCP services (Layer 3) that may in turn rely on Ethernet services (Layer 2) without the HTTP protocol server being aware of the latter. A context-level protocol server may use HTTP services without the context-level protocol server being aware of TCP services on which the HTTP services may rely.

A DTI may be context-specific or context-ignorant. For example, the status-quo well-known port 80 for HTTP may be regarded as context-ignorant, whereas the example of port 98 or 2040 having assigned the context of advertising (as described herein) may be regarded as context-specific. On the other hand, an interface may also simultaneously be context-ignorant with respect to one protocol or protocol server, while being assigned with one or more specific contexts with respect to a context-level protocol or protocol server. For instance, port 80 of HTTP may also be designated for use with a context-level protocol or communication link, with which a protocol server may accept, distinguish, and serve all requests arriving at that port, or otherwise direct the two different types of requests (i.e., context-level vs. context-ignorant) to their respective dedicated servers or handlers. A protocol server may also embed or otherwise comprise a plurality of individual protocol servers or handlers that may otherwise be distinctive from one another. In addition, a CLPS or CLPC may incorporate the functionality of a CIPS or CIPC instead of relying on services of an otherwise distinctive CIPS or CIPC for data transfer, the latter case being illustrated in FIG. 41.

Figure 42:
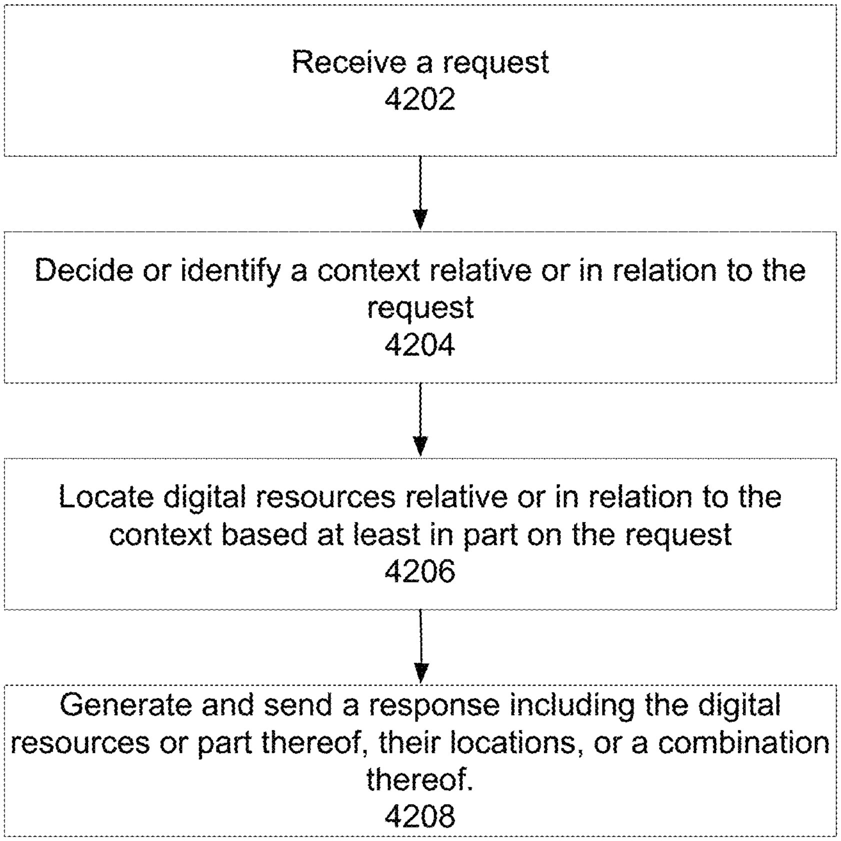
FIG. 42 shows another computerized method in accordance with an embodiment.

FIG. 42 is a high-level flow diagram for a computerized method that may be executed by a server, a communication entity or a content server, such as those shown in FIG. 37, FIG. 39A-39C and FIG. 41, according to some embodiments. Those of skill in the art will understand that various steps in the method (and in other methods described herein) may be added or combined without deviating from the spirit and purview of the embodiment. The high-level flow diagram is not limiting on any claims. As shown in FIG. 42, a server may:

(a) receive a request, wherein the receiving includes receiving from a client 4202;

(b) decide or identify a context relative or in relation to the request 4204;

(c) locate one or more digital resources relative or in relation to the context based at least in part on the request 4206; and (d) generate and send a response comprising the one or more digital resources or part thereof, their locations, or a combination thereof, wherein the sending includes sending to a client 4208.

In addition, the server may relate an interface to one or more contexts, wherein the interface may include a communication endpoint. It may receive the request via the interface, wherein the request may include a reference to digital resources, the reference including a URI. It may then locate digital resources via the reference. Furthermore, the server may determine if the reference refers to the one or more contexts, wherein the determining includes looking up a table having entries each comprising a criteria for matching one or more references, and a corresponding context. The server may identify dialogue questions in the request if the reference refers to the one or more contexts, generate dialogue answers for the dialogue questions, and include the dialogue answers in the response. (Dialog questions and answers would be described later.) Moreover, the server may identify the context in the reference, locate dialogue questions in the reference, and determine dialogue answers based at least in part on the one or more digital resources.

Figure 43:
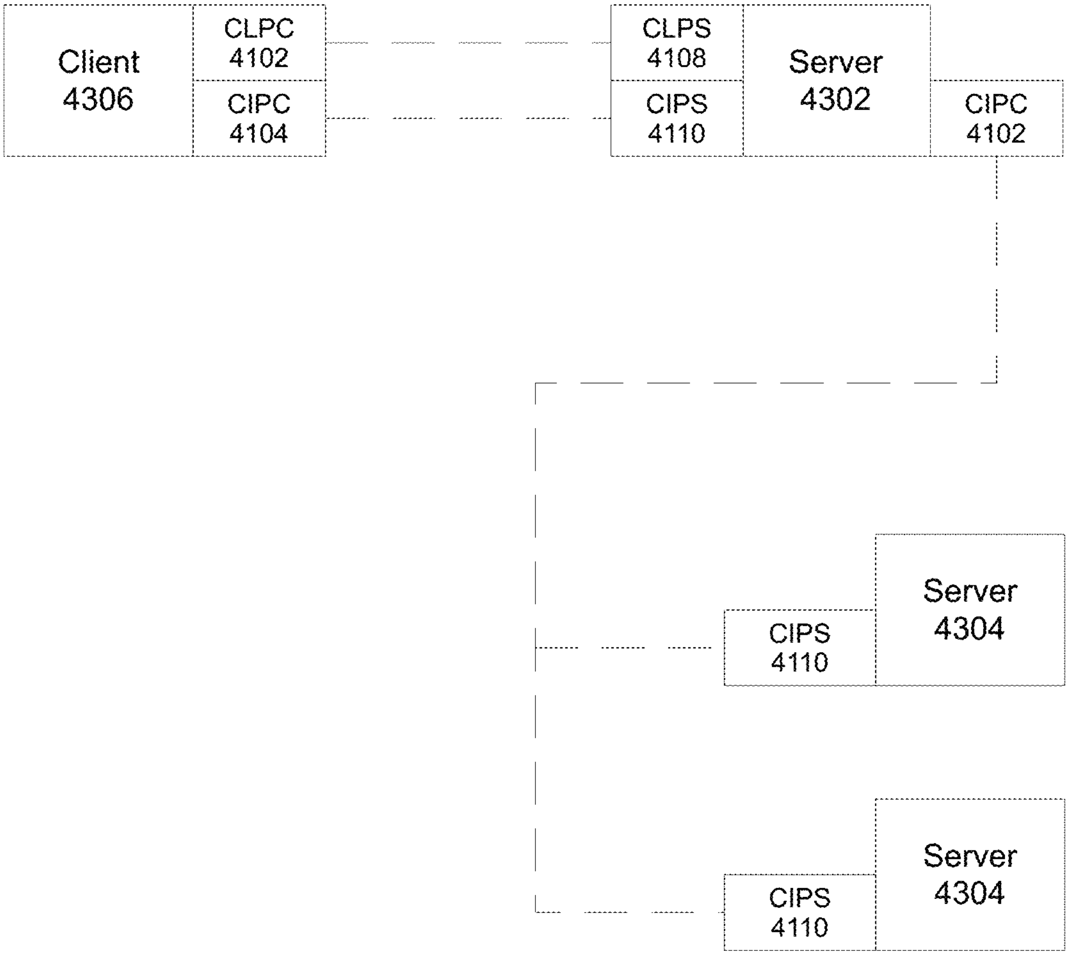
FIG. 43 shows a server acting as proxy for context-level communication in accordance with an embodiment.

FIG. 43 shows a scenario where a server 4302 embodying or otherwise equipped with a CLPS and DTI (no DTIs shown in FIG. 43; see FIG. 41) may serve as a proxy to another server 4304 that is otherwise context-ignorant, according to one embodiment. A client 4306 may send a server a context-level request (e.g., a request via a context-level protocol). The server may in turn request digital resources from one or more servers that are otherwise context-ignorant, and return them via a context-level protocol (e.g., a response including context-specific digital resources), thereby contextualizing these digital resources. For instance, such a proxy or a server having the capability of a proxy may contain information, e.g., via a directory, lookup table or database, that may help map a context-level request to applicable digital resources. For example, such a request may refer to an URL of a digital resource. Upon receiving the request, a proxy or proxy server may try to locate the URL from its database of URLs having the context that the request may correspond to or otherwise implicate. If the lookup is successful, then the proxy may retrieve the corresponding digital resource from another server having only CIPSs, and then forward it to the client of the request, both the server and client participating in a context-level connection or communication via their respective CLPS and CLPC. Alternatively among other possible options, the proxy may reply the client with a location of the digital resource so that the client may directly fetch or otherwise receive the digital resource in question from a server hosting that resource.

Figure 44:
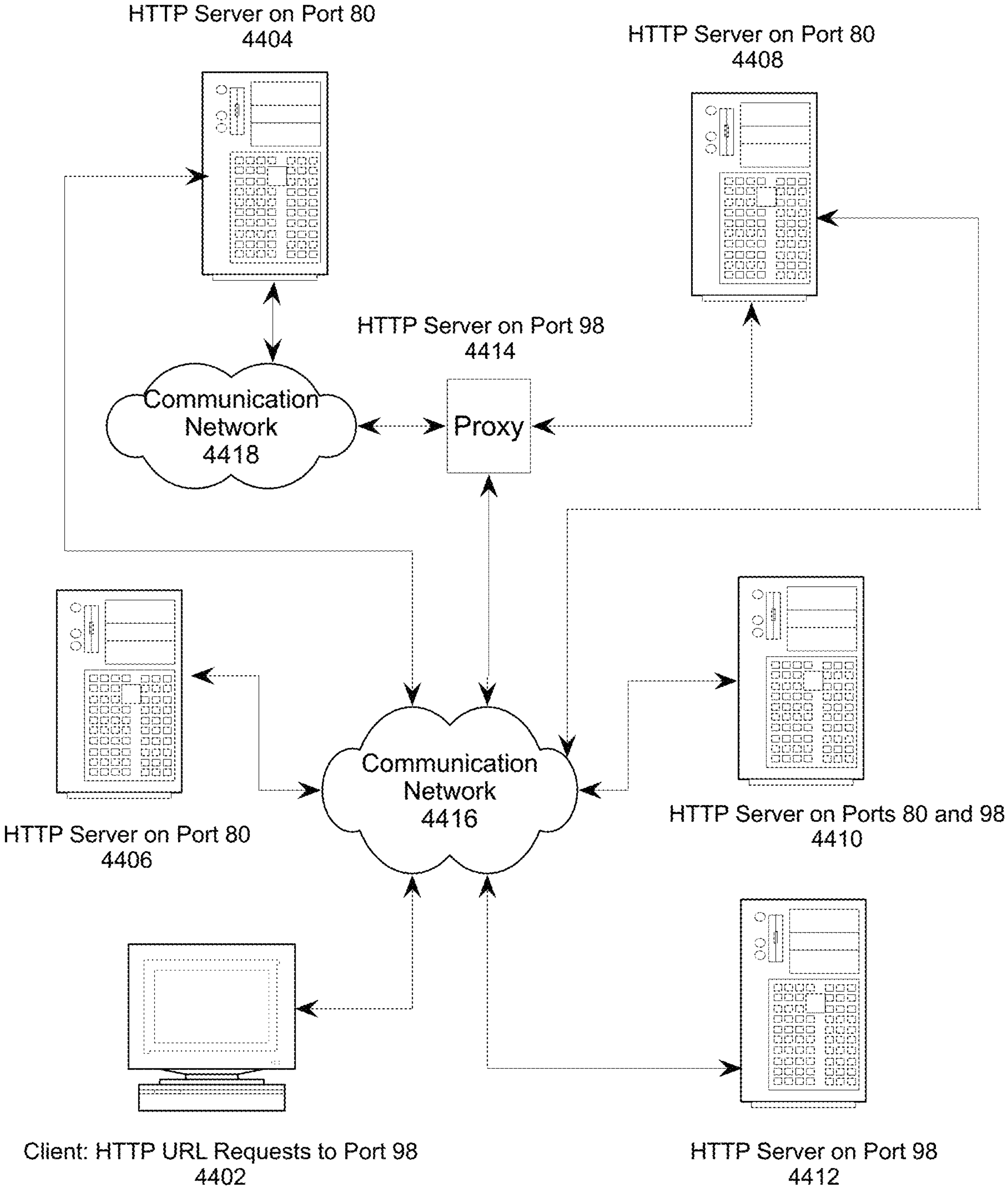
FIG. 44 shows a proxy and a plurality of servers involved in context-level communication in accordance with an embodiment.

According to another embodiment, a context-level proxy or proxy server may provide contextualization of digital resources via interfaces, such as a communication endpoint or a TCP/IP port, the contextualization including denoting requests for digital resources via a specific endpoint or interface as requests for resources about advertising of goods and services. For instance, FIG. 44 shows a client (e.g., a computer), a proxy server (or simply proxy), and a plurality of HTTP servers and communication networks (wireless or otherwise), according to one embodiment. Here port 98 is used as a context-denoted port. As such, HTTP traffic destined or otherwise addressed to the port would carry context-level payload, information or resources of interest consistent or congruent to the context associated with the port. For example, if the context is of shopping, then webpages whose primary concern is politics should not be requested or received through port 98. In contrast, the official HTTP port 80 makes no such contextual denotation or declaration, and cannot impose or demand any contextual integrity. According to embodiments of the invention, a declaration of a subject matter context (such as Shopping) of an interface, a network port, or a TCP/UDP port number is published in a publicly accessible resource or document. According to another embodiment, such a declaration is published in a standard or specification, such as one defined, maintained, or overseen by the Internet Assigned Numbers Authority (IANA), the Internet Engineering Task Force (IETF), or a private company.

In FIG. 46, the client 4402 is set up to send HTTP URL requests to port 98 over a communication network 4416. HTTP servers 4404-4408 listening only on Port 80 (namely, the official HTTP port) may not be reachable by requests from the client. While unavailability of these otherwise operational information servers might be regarded as a problem at the data communication level or for dissemination of digital resources via HTTP, it may be an advantage at the context level or for dissemination of context-denoted digital resources. This is so because the client by targeting port 98 indicates that it is interested in information or resources (such as a webpage) for a specific context. For example, a search engine crawling and indexing webpages obtained from port 98 would generate and maintain indexes comprising, maintaining or otherwise referring to context-denoted webpages. As such, the results from such a search engine would be much more contextually certain than those from a general-purpose search engine of port 80. As such, both information requesters and providers sharing the same context would be able to more reliably receive and publish digital resources of their interests by utilizing a context-denoted interface for communication between their respective clients and servers.

There are two HTTP servers connected to a proxy 4414 shown in FIG. 44. One is connected directly to the proxy while the other through a communication network 4418. Although these two servers are listening to or otherwise serving port 80, the context of some or all webpages provided by them may be denoted or otherwise made certain by the proxy that may handle context-level HTTP requests on their behalf (e.g., HTTP requests sent to port 98). For instance, the proxy may intercept or otherwise receive HTTP requests sent from the client. It would process the requests, e.g., parsing the URL in the requests for information on a host or server and its port (e.g., port 98), as well as a path identifying a webpage or digital resource. (A HTTP request of port 80 could bypass the proxy and go directly to the intended HTTP server, as illustrated in FIG. 44.) According to one embodiment, all digital resources of a server registered with or otherwise reachable by the proxy (e.g., via port 80) may be retrieved by context-level requests sent to the proxy (e.g., via port 98), thereby contextualizing all such digital resources. According to another embodiment, only a subset of digital resources of such a registered or reachable server may be contextualized. For example, a lookup table or rules such as URL pattern matching, either maintained by the server or its proxy, may further distinguish digital resources of a specific context from those without or otherwise with an incompatible one. According to one embodiment, the proxy may retrieve digital resources from a server, and then forward them to the client sending the request in question. Alternatively among other possible options, the proxy may reply the client with a location of the digital resources so that the client may directly fetch or otherwise receive them from the server.

FIG. 44 also shows a HTTP server listening on both ports 80 and 98. Such a server may be able to serve in both the context-ignorant Web (i.e., port 80) of the status quo and an alternative context-aware Web made possible by context-level interfaces. According to one embodiment, currently unassigned TCP/IP ports may be adopted or otherwise chosen as official or default context-level ports so to create one or more context-aware Webs or information channels, which may be placed under different jurisdictions, whether administrative, technical or otherwise. Such a Web or channel demands or otherwise declares an information space relative or congruent to one or more contexts. According to one embodiment, context-ignorant protocols such as HTTP and FTP as well as clients, servers and services available for the status quo Web may be re-used or otherwise applicable to these individual context-aware or channelized Webs. For instance, a single server may participate in both types of Webs, e.g., by serving both port 80 and 98 as illustrated in FIG. 44.

When there is more than one context for a given information space, the contexts may or may not be compatible with one another. For example, the context of wars and military and the context of shopping might be regarded as incompatible or otherwise mutually independent. Yet a Web or Web channel may be associated with both contexts, thereby regarding digital resources about wars and military or those about shopping as contextually relevant. On the other hand, a composite context may also be supported, so that a digital resource contextually relevant to it would also be contextually relevant to its constituent contexts. For example, an online ad for a video disc whose content is about a certain war may be regarded as relevant to the composite context of wars and military, and shopping. In addition, a context may comprise one or more sub-contexts, as will be discussed later.

FIG. 45A to 45D together illustrate how a protocol in embodiments of the present invention may establish an advertising context for user information or payload that may otherwise be context free. FIG. 45A shows an information requester 4502 asks 4508 for some information 4504 from an information provider 4506 via a context-free protocol. The information provider returns the requested information 921, void of context 4510. FIG. 45B shows an information requester asking for a specific piece of information 4520 of a specific name and on a specific location, also via a context-free protocol. The information provider returns the requested information, also void of context 4522.

FIG. 45C, similar to FIG. 45A, shows an information requester asks for some information 4530, except this time it is via a context-specific or context-making protocol 4534, e.g., for advertising. Although the information provider may have behaved the same as in FIG. 45A, the returned information 4532 is construed to be of advertising nature 4536, whereas in the scenario depicted in FIG. 45A there is no such revelation. The difference that exists between the two scenarios depicted respectively in FIG. 45A and FIG. 45C may be only the use of advertising-context protocol or interface over the use of context-free protocol or interface. In both cases, the information requester and provider may have performed the same actions. Yet the advertising-context protocol may provide preliminary meaning (i.e., context) to the information being requested and returned.

In FIG. 45D, both an information requester and provider may benefit from the semantic implication of using a context-aware protocol or interface on user information or payload in question 4540. Transfer of digital resources via a context-aware protocol or interface may provide an unambiguous context denotation that would otherwise be unavailable or difficult to ascertain. An information provider might find a piece of information of the same name and location as specified and requested by an information requester, but if it is not of the requested, expected or specified context, the information provider shall deem that there is no such relevant information 4542. Subsequently the information provider would not reply to the requester with that piece of information even it exists on the location as specified, as demonstrated in FIG. 45-D.

According to one embodiment, a context-aware protocol may handle more than one context, and a default context may be established or otherwise implied if no context is explicitly specified. According to another embodiment, a context-aware protocol may support or otherwise handle context-ignorant or context-neutral payload, in addition to context-denoted one.

According to yet another embodiment, having a context established or otherwise declared for a communication link or endpoint, a protocol may provide capabilities to inquire about a digital resource in relation to the context. A client of such a protocol may obtain responses from a server hosting or otherwise providing the digital resource or a location of the digital resource, or from the digital resource itself (e.g., a running computer executable referenced by a URI or URL). Exchange of context-level inquires and responses about a digital resource between a requester and a provider may herein be referred to as dialogue. A context-level inquiry and response may also be herein referred to as a dialogue inquiry and a dialogue response respectively. A dialogue inquiry may comprise one or more questions (namely, dialogue questions), while a dialogue response may comprise one or more answers (namely, dialogue answers). A dialogue inquiry requester or dialogue inquirer may send via an advertising context protocol an inquiry comprising dialogue questions as well as other requests, such as a request for the possible formats of seller addresses, or a request for seller addresses in a specific format. Likewise, a dialogue response provider or a dialogue responder may send a response comprising dialogue answers as well as other results, such as those corresponding to requests not at the context level.

According to one embodiment, an advertising-context protocol may provide services for inquiry of information about a product or service that a digital resource may represent or otherwise have data for, such as its detailed specification or after-sales warranty information, the seller's address and rating information, and shipping and handling costs for a specific location of a prospective customer. According to one embodiment, a digital resource may represent or otherwise has data for more than one product or service. Questions or inquiries may be specific to a certain type of products or services. For example, a question "What is the product's 'best before' date?" may be applicable only for perishable goods.

A context-level protocol or protocol client may interpret or otherwise process dialogue answers for its own operation or on behalf of an information requester, or simply pass them back as the protocol's user information or payload for processing and manipulation by a protocol service user (e.g., an application such as a Web browser) or a higher-level or layer protocol implementation, whether a human, a piece of hardware, a software program, or so on.

A dialogue question or answer may specify a framework or format that information in an answer or response would adhere to. For example, a freeform answer may comprise a piece of structure-free content such that there may be no structure within the content of the answer for guided parsing and interpretation, although the content as a whole is still associated with a context relevant to a given question. For example, the answer to the question "Seller's Address" in freeform could be "1213 First Avenue, Vancouver, Wash., USA 91021". A structured answer, such as that of AVP (Attribute-Value Pair), may be:

```
Street = "1213 First Avenue"
City = "Vancouver"
State = "Washington"
Country = "USA"
ZipCode = "91021"
```

An attribute may be associated with a definition of meaning while a value with a definition or format. For instance, a structured answer, such as that based on RDF (Resource Description Framework of the Semantic Web Initiative by W3C—the World Wide Web Consortium), could provide much more precise definitions to street, city, state, etc. so that there should be no semantic ambiguity of what each piece of data means in accordance to some semantic definitions specified elsewhere. There may be other possible frameworks or formats suitable for use in the specification of dialogue answers or responses.

According to one embodiment, a context-level protocol may allow a dialogue inquirer to specify preferences for formats or frameworks in which answers shall be provided. It is up to whether a dialogue responder may fulfill such preferences. A context-level protocol may allow a dialogue inquirer to stipulate that certain dictionaries be used to provide for term definitions of an answer that should follow a given framework or format.

For example, a plurality of dialogue questions may be specified for a given context. Digital resources relevant to the context may result in dialogue answers to these questions. With advertising or shopping context, possible dialogue questions may include "What is the product name?," "What is the product specification?" and "What are the customer satisfaction ratings of the seller according to Rating Agency X and Rating Agency Y?". A dialogue inquirer such as a search engine or crawler may post, send or otherwise search dialogue questions to or against digital resources via a context-aware protocol. Digital resources or protocol servers found ignorant of these questions may result in the digital resources in question deemed contextually irrelevant. Those found capable of containing or handling dialogue questions may result in the digital resources in question deemed contextually relevant. Specific answers to those dialogue questions would afford a search engine or service to provide context-specific results with better relevancy or precision, such as when serving a query in relation to a particular product from a seller of a particular location with a specific customer satisfaction rating.

According to one embodiment, dialogue answers may be embedded in a digital resource to which they may be applicable, or be maintained and served as metadata to the digital resource. They may be identified by their corresponding dialogue questions, which may be specified by computer-readable codes or human-readable text. A context-level protocol may locate dialogue answers therein and deliver them to dialogue inquirers as if sent or otherwise provided by a dialogue responder. For example, a search engine or service equipped with an embodiment of the present invention may be able to identify and include digital resources such as webpages that are relevant to a certain context of interest, such as advertising or review of products and services, and exclude irrelevant ones, so to create and maintain a context-specific search index or service. According to another embodiment, a dialogue question (or a dialogue answer identifier or referrer) may be specified or otherwise identified as a markup tag (such as those on a HTML-authored page) and the corresponding dialogue answer may be specified as data to the markup tag. Such a dialogue question and/or answer may be hidden from visual presentation of the digital resource in or to which it may be specified or otherwise belong. Or it may be included as part of the visual presentation, with the tag optionally being indicative of some stylistic implication (such as boldfacing the dialogue answer) or associated with some other data (such as a hyperlink).

FIG. 46A to FIG. 46D provide an illustration of interactions between an information requester and an information provider through a protocol in embodiments of the present invention, and how they act as dialogue inquirer and dialogue responder respectively.

FIG. 46A shows that an information requester specifies a digital resource for retrieval 4602. The digital resource is referred to by a web address (e.g., www.abc_store.com/stereo_systems). An information provider replies 4604 with the requested advertising digital resource. (Note that many may consider a web address is equivalent to a URL (Uniform Resource Locator), which includes an access scheme or protocol part, e.g., the "http://" or "http" in http://www.abc_store.com/stereo_systems. The term "web address" as used herein does not necessarily include an access scheme or protocol part.)

FIG. 46B shows an information requester asking 4606 for addresses of the seller associated with a particular advertising digital resource. An information provider capable of such dialogue may reply 4608 with the requested addresses. If there is no specified reply format, then the addresses are deemed to be in a default format, e.g., in freeform.

FIG. 46C shows an information requester asking 4610 for seller addresses associated with a particular advertising digital resource, and demanding the reply in a specific format. An information provider replies 4612 none, even though the digital resource may exist and the information provider is capable of such dialogue, because none of the available addresses is in the requested format.

FIG. 46D shows an information requester asking 4614 for information not of advertising nature. The requester asks whether the protocol supported by an information provider is of version 2.3 or higher. Some designation (such as "check" as shown in FIG. 46D) that appears in a protocol request may indicate that the requested information is not of advertising nature. The corresponding API for this request may explicitly state that the user information in response to this request is not a context-level payload of the protocol. For example, the API for FIG. 46D indicates the reply 4616 would be of a Boolean data, i.e., either true or false, and not of any specific context, namely advertising.

Note that a digital resource may represent a single product or service, and may act as dialogue responder. In addition, an information requester or dialogue inquirer may not need to specify a reference to the digital resource as part of a dialogue question if it has already addressed or otherwise identified the digital resource as part of the communication link between the information requester and provider or between the dialogue inquirer and responder.

Figure 47:
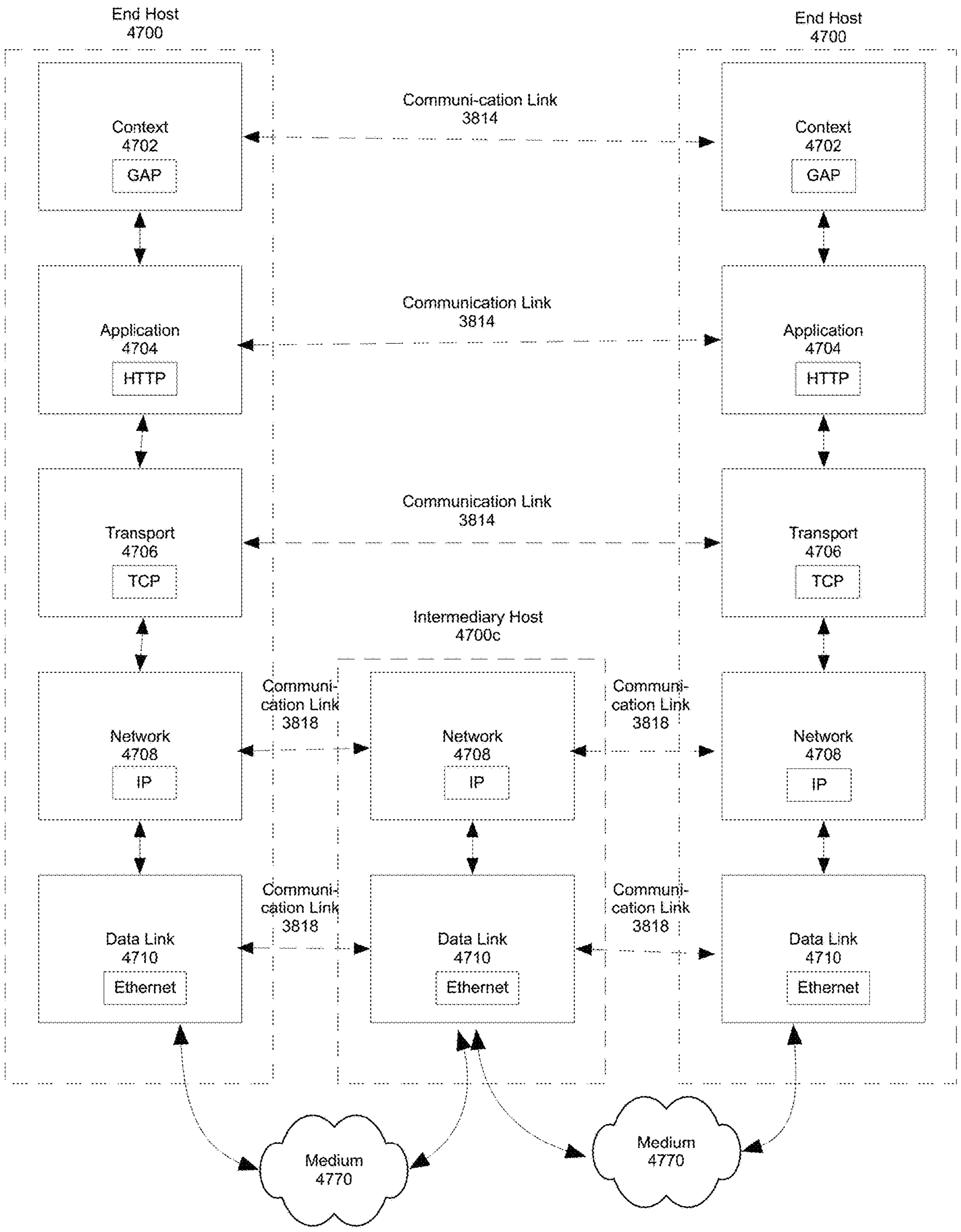
FIG. 47 shows a layered communication model including a context layer in accordance with an embodiment.

FIG. 47 shows an ARPANET (Advanced Research Projects Agency Network) TCP/IP Reference Model (or simply TCP/IP Model) equipped with the present invention, according to one embodiment, as implemented in end host 4700. The reference model comprises five layers of communication. A protocol is given as an example for each layer: Ethernet for Data Link Layer 4710 (which, as depicted, may communicate via communication link 3818 or medium 4770), IP (Internet Protocol) for Network Layer 4708, TCP (Transmission Control Protocol) for Transport Layer 4706, HTTP for Application Layer 4704, and GAP (Global Advertising Protocol) for Context Layer 4702. GAP is a context-level protocol for advertising of goods and services. An intermediary host 4700*c* may comprise a network layer 4708 and a data link layer 4710. Multiple protocols may exist for the same, compatible or similar context, and may assume different names, such as Shop or Ad. According to one embodiment, a context-level protocol may be published in a standard or specification, such as one defined, described, or maintained by the Internet Engineering Task Force (IETF) or a private company.

As illustrated in FIG. 47, GAP uses services provided by HTTP (Hyper-Text Transfer Protocol), a common-place communication protocol for use on the Web. Other protocols at lower layers may also be used by GAP, such as HTTPS, an extension of HTTP to include security functionality. Note that some define the Web as a complete set of hypertext documents available on the Internet that are accessible through HTTP. However, since protocols such as FTP are also supported by web browsers using the same URL (Uniform Resource Locator) syntax to retrieve digital resources or online entities, accessibility through HTTP may be considered by some to be an insufficient defining characteristic of the Web.

The basic syntax of an address in form of URL (Uniform Resource Locator) for locating a HTTP-accessible resource on the Web is as follows:

http://<authority>[/<path>][/<object>][?<query>], where:

A part is represented by a token with a pair of enclosing angular brackets, such as <authority> for an authority part. Parts delimited by a pair of square brackets mean optional. <authority> may be optional too if the HTTP request is for a local host. URL also supports a fragment part that is not shown in this basic syntax above.

The term <authority> refers to a resource-serving host, and comprises an optional <userinfo> in the form of <username>:<password> terminated with "@" (e.g., johndoe: mypassword@), a hostname in the form of a domain name or an internet protocol address (e.g., www.example_forsales.com or 134.12.13.23), and an optional port number (with default port 80) preceded by ":".

The term <path> is a sequence of subdirectory-like abstract containers separated and delimited by "/" (e.g., cars/honda). When <path> is absent, the logical root of the resource repository on the host may be considered.

The term <object> is a location-invariant handle that identifies on a host a specific local object or digital resource, which usually takes the form of a file (e.g., index or index.html), but not necessarily so. When <object> is absent, a default object (e.g., index.html), if any, in the identified logical location of the resources repository would be considered.

The term <query> is a series of name-value pairs in the form of <name>=<value>, separated and delimited by "&" (e.g., clientName=John&gender=Male). They are not used as any special queries specific to HTTP itself. An application that uses HTTP queries may specify name-value pairs that are meaningful only to information requesters and providers involved in the HTTP communication.

The following is an example address (e.g., URL) for a HTTP-accessible resource:

http://john:passwd@www.uspto.com:80/patents/index?clientId=1010

A more common syntax seen by web users would be:

http://www.uspto.com/patents/index?clientId=1010

A HTTP information requester (namely, an information requester using HTTP) such as a web browser or some other software capable of HTTP can get a URL from many sources, such as user input, web pages, a plain-text file, and a database. The requester would then formulate a HTTP request message based on the selected URL, and send it away via HTTP. The implementation of the underlying transport protocol (i.e., TCP—Transmission Control Protocol) of HTTP would be responsible for the delivery of the request message to its counterpart at the host specified in the URL. When an information provider on the destination host receives the request through HTTP, it or its agent would interpret the request, and return the requested resource if the resource exists on the host, regardless of the context that the resource may belong to. GAP (Global Advertising Protocol) information provider, on the other hand, should not return the requested resource (namely, a target digital resource or digital resource) even if the named resource exists on the host, when the context of the resource is not of advertising. That is, HTTP is a context-free protocol in relation to GAP, whose target entities or user-level payloads are of advertising nature. An example URL of GAP is as follows:

gap://www.example_cars_for_sales.com/honda/

In this example, whether a GAP information requester should receive the referenced resource depends not only on its existence on the referenced host location (i.e., www.example_cars_for_sales.com/honda/), but also the context of the referenced resource. A GAP information provider will reply with the requested resource only if the resource is of advertising nature. In the other words, HTTP will retrieve the resource, but GAP will not do so should the requested resource is not of advertising. (According to one embodiment, the context information of a digital resource may be maintained as metadata stored in the digital resource. According to another embodiment, it may be stored in a lookup table or index external to the digital resource.) However, a GAP information provider can "lie," in that it returns resources of non-advertising nature to a GAP information requester. GAP protocol users (i.e., both GAP information providers and requesters) that do so behave like a software component that does not act in accordance to its interface specification in a distributed software system, or like a licensed specialty television channel for shopping that broadcasts history shows as its regular programming. Such GAP information providers shall be regarded as malfunctioning or violating a protocol's interface service agreements.

To realize an implementation of GAP, a HTTP interface (including its URL) and implementation may be modified as per following specification. Likewise, to realize a GAP information provider and requester, a HTTP information provider and requester may also be modified accordingly.

First, the protocol or access scheme part of URL is "gap" (which stands for Global Advertising Protocol). Then two optional parts, namely <options> and <inquiry>, are added as follows between <object> and <query> in the URL syntax, as shown below:

gap://<authority>[/<path>][/<object>][*<options>][|<inquiry>][?<query>]

Note that both the asterisk and vertical-bar characters would then become special characters, or characters reserved for the use by the protocol for special meanings. The <options> part, with an asterisk character "*" as a marker prefix and delimiter, provides alternatives to the default behavior or mode of operation of the protocol. (Multiple options may be separated by "&".) Exemplary alternatives are described in the following paragraphs.

The part context=<on or off: this allows the retrieval of resources not of advertising nature. E.g.: "gap://www.example_onlinestore.com/nikeShoes/history*context=off". (This may be optional for questions in <inquiry> if those questions are already unambiguous in their context relevance in relation to the target digital resource in question. For example, a question like "what is the protocol's version?" is self-evident in its context irrelevancy.)

A part entityFormat=<format>: this specifies the expected format(s) of the requested digital resource. Examples of possible formats are dontCare (the default), freeform, markup, nvp (name-value pair), and rdf (Resource Definition Framework). Multiple formats specified in <options> are possible. E.g.:

gap://www.example_onlinestore.com/nikeShoes/catalog*entityFormat=freeform&entityFormat=nvp A part answerFormat=<format>: this specifies the expected format of answers to the inquiry in the protocol request. Possible formats are the same as those of the entityFormat option. E.g.:

gap://www.example_onlinestore.com/nikeShoes/Air3000*answerFormat=nvp&answerFormat=markup|sellerRatings( )

The part <inquiry>, with a vertical-bar character "|" as a marker prefix and delimiter, contains pre-defined questions capable of parameters. (Multiple questions are separated by "&".) These questions in attribute form include:

A query sellerName( ) What is the seller's name?

A query sellerAddresses([<location>]): What are the seller addresses for a given location?

A query sellerRatings([<ratingAgency1>[,<ratingAgency2>]]): What are the seller's ratings? (This example question supports up to two rating agencies to simplify the presentation above. More could be supported in an implementation. Alternatively, multiple sellerRatings questions may be used in a single request.)

A query productOrServiceName( ) What is the product or service name?

A query productOrServiceDescription([<language1<[, <language2>]]): What is the product or service description? (This example question supports up to two languages to simplify the presentation. More could be supported in an implementation. The order of the languages specified indicates preference from most preferred to least.)

A query marketType( ) What is the market type? (E.g., fixed price, auction)

A query price( ) What is the current price of the product or service?

A query acceptablePaymentTypes( ) What are the acceptable payment types? (E.g., Paypal, Visa, Amex.)

A query shippingAndHandlingCharge(<location>): What is the shipping and handling charge given the consumer's location specified in <location>?

A query paymentAt([<location>]): Where do I go to do the payment for the purchase given the consumer's location specified in <location>?

A query currency( ) What is the currency of this offer?

A query offerExpiryDate([<location>]): What is the offer's expiry date given the consumer's location specified in <location>?

A query offerLastChanged( ) What was the date and time that the offer was last modified?

The following is a list of questions applicable to advertisements of perishable goods:

A query bestBeforeDate( ) What is the product's best-before date for consumption?

The following is a list of questions applicable to advertisements of auction-type markets:

A query reservedPrice( ) What is the reserved price of the auction?

A query minimumBid( ) What is the minimum bid of the auction?

A query currentBid( ): What is the current bid of the auction?

A query increment( ) What is the minimum incremental amount of the bidding price?

A query maximumPrice( ) What is the "buy it now" price of the auction?

A query auctionAt([<location>]): Where do I go to participate in the auction given the consumer's location specified in <location>?

Questions not of advertising nature include:

A query protocol Version( ) What is the version of the protocol being used by the information provider?

A query entityCapabilities( ) What are the format and dialogue capabilities of the digital resource?

A query isMasterInstance( ) Is the digital resource the original copy?

A query masterInstanceURL( ): What is the URL of the original copy of the digital resource?

Of course, the above lists of pre-defined questions and their options are by no means exhaustive. They may also be modified as the protocol evolves over time while in use. The form and format of these questions (and their answers) is also just one of many that may be implemented for a particular embodiment of the present invention. For example, in conjunction with providing <options> and <inquiry> on a GAP-supported URL (or simply GAP URL), <options> and <inquiry> may also be specified via a method similar to HTTP's POST method in a GAP request message, one of whose functions is to provide a block of data to information providers for processing. Proper markup tags to delineate <options> and <inquiry> making up such block of data may easily be furnished by one who has skill in Standard Generalized Markup Language (SGML) and its related or spin-off markup standards (e.g., HTML—HyperText Markup Language and XML—eXtensible Markup Language).

Based on a GAP URL, a GAP information requester would be able to construct a GAP request message using the same format of HTTP request header that a HTTP information requester would construct using a HTTP URL. Additional fields (e.g., name-value pairs to specify <options> and <inquiry>) in the request header may be added. Successfully constructed GAP request messages are sent to their destination hosts (which may also include the host where the information requester resides, if applicable) via the underlying network transport mechanism (e.g., TCP as for HTTP) available at the information requesters' host.

Likewise, GAP's responses follow the same structure of HTTP's responses. Additional fields (e.g., name-value pairs to specify answers to dialogue questions as well as the formats of those answers and of the requested online entities or resources) may be added to the response header. Such extra fields may also be specified as part of HTTP response content, embedded inside HTML comments. For example:

```
<!-- HTML comments are here
<-! GAP comments are here. !->
<gap:seller name="ABC Example Retailer" format="nvp">
<address format="markup"
definition="www.fictitious.org/dictionary/all/2.0">
<street> 1032 Empire Street </street>
<city> Los Angeles </city>
<state> California </state>
<country> USA </country>
<zipCode> 91321 </zipCode>
</address>
</gap:seller>
-->
```

The above HTML entity provides an answer to two possible dialogue questions, i.e., the seller's name and addresses. (Note that "<!--" and "-->" are HTML comment opening and closing markers. Content inside these markers is not interpreted at all by HTTP requesters for visual presentation on web browsers.) Such embedment within a HTTP comment allows a GAP-aware resource to serve both GAP and HTTP requesters without causing confusion to the latter. GAP-specific comments may be placed within "<!-" and "!->" as shown in the example above. Again, proper field and markup tags for GAP responses may easily be furnished by one who has skill in Standard Generalized Markup Language (SGML) and its related or spin-off markup standards.

Similar to HTTP protocol servers, a GAP protocol server may use a Transport Layer endpoint or TCP/IP port for its designated level or layer of communication. A suite of GAP protocols may use a plurality of lower-layer protocols, such as HTTPS, FTP and FTPS. Realization of such a GAP protocol suite (e.g., GAPS—GAP Secure, GAPF—GAP File Transfer, and GAPFS—GAPF Secure) may include assigning different TCP/IP ports to each GAP protocol in the suite and providing standards for each of them (e.g., GAPS—secure access to digital resources of advertising context via HTTP; GAPFS—secure retrieval of digital resources of advertising context via FTP). Variations of GAP or other context-level protocols may define or adopt a different URI syntax (e.g., "GAP://com/cookshot/www/" instead of "GAP://www.cookshot.com"), and they may use services provided by other context-ignorant application-level protocols, or those of transport-level protocols, or a combination thereof. (Similarly, an application-layer protocol server or service may communicate with a transport-layer protocol server or service with no necessary support from any explicit protocol servers of the intervening session and presentation layers between the application and transport layers in the OSI Reference Model.) According to one embodiment, a context-level protocol may not need to re-invent or otherwise be concerned with how data or digital resources are transferred or displayed. Instead, its functionality may focus on context determination and establishment of requests and responses, or identification and retrieval of context-denoted digital resources.

According to another embodiment, a digital resource itself needs not be GAP-aware. A plain-text digital resource with no markup tags could totally be acceptable to GAP requesters. The GAP response header for this entity would specify the resource's encoding scheme (e.g., ASCII—American Standard Code for Information Interchange) and its format (i.e., freeform text). If such information is missing in the response header, then GAP requesters could attempt to determine the format of the presentation of the retrieved entity by checking the resource's file extension, if there is one (e.g., ".txt" file extension means text file).

For example, if an embodiment of a GAP information requester includes a web browser-type application, therefore displaying a retrieved digital resource, it may choose to display a format-unclassified presentation in ASCII plain text format, when the file size of the entity is below a certain threshold. That is, if the entity in question is large and of some unknown media type, it is usually not useful to display the content in ASCII plain text format in its entirety. On the other hand, such a browser-type application may also allow its users to try various presentation formats and encoding schemes to attempt successful display of the presentation of a retrieved resource or entity with respect to the user's intent. For example, a user may view a HTML-formatted entity in plain-text format, so to reveal all HTML markup tags embedded for the presentation of the entity.

There may be a variety of ways to make available digital resources via GAP as advertising entities. One is to equip web servers with GAP-capable protocol servers or information providers, such as those shown in FIG. 39B and FIG. 39C. Another is to provide a GAP-capable proxy system or server that may maintain a list of URLs of advertising resources on GAP-incapable web servers, such as the proxy shown in FIG. 44. Such URLs may then be submitted or otherwise made available to the proxy system or server. A GAP information requester would learn about these URLs when communicating to the proxy system or server. The proxy system or server may also handle dialogue questions on behalf of those advertising resources. Dialogue answers may be generated for the proxy system or server as part of the URL submission process.

A GAP information provider and requester both expect the primary context for digital resources of their interest to be of advertising. For instance, similar to FIG. 46, a GAP information provider would not reply a GAP information requester asking for advertising digital resources with a non-advertising digital resource (or web resource) even the resource exists as specified in its URL. On the other hand, if the content of the same resource (i.e., by the same or equivalent identifier or address) is replaced with one of advertising nature, then it would be legitimate for a GAP information provider to make it available to the GAP information requester. It is an obligation of a GAP information provider to respect this rule, and behave accordingly in presenting its resources as target entities or user payloads for retrieval by a GAP information requester.

Existing web tools and technologies such as search engines may be applied to or otherwise adapted for GAP. Knowing that digital or web resources available through GAP may be contextually ascertained to be of advertising, an online consumer may formulate his search words or phrases on a GAP-aware search engine more confidently, knowing non-advertising web resources would be excluded from the search all together. In addition, a GAP-aware browser or search engine needs not be resident on the online consumer's host system. Online consumers may use a GAP-unaware browser or client software to access GAP-aware browsers, search engines and applications. Moreover, new and better tools and technologies using contexts and dialogues afforded by GAP would now be possible.

On the Web, existing online advertisements (or simply called online ads or web ads) available via HTTP may simply be made available to GAP as well. This in effect contextualizes web resources that are of advertising nature but otherwise lack a reliable and recognizable context for such interpretation. There may not be need to change the content of existing web ads if their context is consistent with advertising. The advantage of such contextualization is already substantial. It is no longer legitimate to get non-advertising resources on the Web through GAP when one is actually interested only in advertisements of goods and services.

For example, an online consumer may see an ad on a magazine about a new mobile phone. The ad shows a GAP URL. He then enters the URL on a GAP-capable web browser. The browser as a GAP information requester would then:

(1) Process and interpret the given URL to create a GAP request.

(2) Send the request via its underlying transport mechanism to the destination host, i.e., the authority specified as part of the URL.

(3) Receive an online resource of interest (namely, the primary resource) as a response from a GAP information provider at the specified destination host. The online resource is an ad about the mobile phone which includes the phone's specification and unit price.

(4) Interpret the response for proper presentation as per format (e.g., HTML) specified in the GAP response.

(5) Send retrieval requests, if necessary, for other resources (i.e., secondary resources, such as inline graphics) making up a complete presentation of the primary resource.
(6) Display the received resources as a single page. A page may contain both GAP URL links (such as GAP links to the phone's accessories) and non-GAP URL links (such as a HTTP link to a high-resolution picture of a product, a FTP link to a user guide, and so on).
(7) Indicate that the pending resource is not of advertising context when the online consumer clicks on a non-GAP URL link to, for example, a user manual.
(8) Retrieve the user manual and present it on a separate non-GAP or a separate context-off GAP browser.

All the above steps are procedurally similar to those of HTTP, except the last two steps (Step 7 and Step 8) which demonstrate how the context-making ability of GAP influences the selection and presentation of a resource based on the resource's context, or its lack of it.

On the content supply side, no undue effort is imposed on the creation and provision of online ad content for GAP (namely, GAP online ads). For example, a plain text of advertisement is sufficient as a response body (along with a corresponding response header) for presentation via GAP. Of course, one may also create presentation-rich online ads, much like HTTP-accessible web pages written in HTML. Such online ads may themselves contain GAP links as well as non-GAP links. Conversely, non-GAP resources such as a web page of a discussion forum may also contain links to GAP resources, although a GAP-incapable information requester such as a conventional web browser would not recognize these links to GAP resources. These links may be embedded in comments if they pose problems to a GAP-incapable information requester. A GAP-capable browser would recognize GAP links as well as dialogue answers embedded in non-GAP comments, and display or interpret them accordingly.

To serve an information requester a GAP online ad, an ad exhibitor would place the ad in a host's GAP information realm. (Note that content of an online ad may be dynamically generated on demand upon request, instead of being prepared in advance.) An information realm of a protocol in relation to a computing host is a subdivision of the information available in a host that is accessible or otherwise applicable to a protocol. For example, a HTTP (information) realm comprises all the resources visible and accessible via HTTP, subject to security and connectivity considerations. The same online ad may also be made available as a regular context-free web page to the HTTP realm of the same host. Moreover, the same instance of an online ad can be placed in both GAP and HTTP realms, as well as other realms such as FTP.

A GAP-capable search engine may operate on GAP realms, much the same way as search engines of the status quo operate on HTTP realms (and possible other realm types such as FTP) on the Web. Moreover, HTTP realms could also be examined to discover GAP resources. Furthermore, advanced indexing based on query answers may be performed on dialogue-capable GAP resources. Query answers may be obtained through dialogue with GAP resources or their information providers or proxies, or through parsing of dialogue answers embedded in their representations.

With a GAP-capable search engine, an online consumer may enter his search words for information in the GAP realms. The consumer may also have an option of performing a more refined search if the search engine supports the use of dialogue answers as part of its indexing. In this case, the consumer would be able to enter search words for specific dialogue answers, for example, a product name as a search word entry for searching first the part of the index that contains answers to the dialogue question "What is the product or service name?," and then the rest of the index. This facilitates a much more reliable ordering of results in which links with more relevance precede those with less. Similarly, the more precise the format of a resource representation and its dialogue answers in relation to the demand of the search words or phrases, the better chance of quality matching between a online consumer's intent and ads providers' offerings there could be.

A search engine may also be capable of multiple types of realms, for example, GAP and HTTP. A search can be performed indiscriminately on all supported realms. A user can also prioritize the realms (e.g., GAP first followed by HTTP) or exclude certain realms (e.g., no GAP) for the search operation and result presentation.

As shown above, online consumers and ad providers familiar with the web would readily appreciate the similarities between GAP and HTTP in their user-level operations. The added features afforded by GAP are also intuitive, since they are user-centric, and semantically relevant to their need. Of course, the user-level GAP operations depicted above are not exhaustive, and there are many variations and additions possible. As such, these operations should not be construed to be the limitations on the operation of GAP. Although simple, these operations serve to demonstrate the effectiveness of embodiments of the present invention in form of GAP when applied to a HTTP-like environment, which is familiar to web users.

Note that GAP may use HTTP's well-known port 80 as its contact port as well, while according to another embodiment, it may be assigned with a currently unassigned TCP/IP port. While ports other than their respective well-known ports may be used for HTTP and GAP, such use may require clients to first discover the ports at which servers are listening to or waiting on, before requests may be sent to them. For example, all HTTP servers deployed on the World Wide Web (i.e., the Web) at large would use port 80 for accepting requests. Without explicit port specification in a URL, HTTP clients such as web browsers would usually by default send their HTTP requests to port 80 of their target hosts or web servers. On the other hand, a URL on a webpage may embed the port information so that it would lead clients to the correct port at the time of requests, without any prior port discovery per se.

Figure 48A:
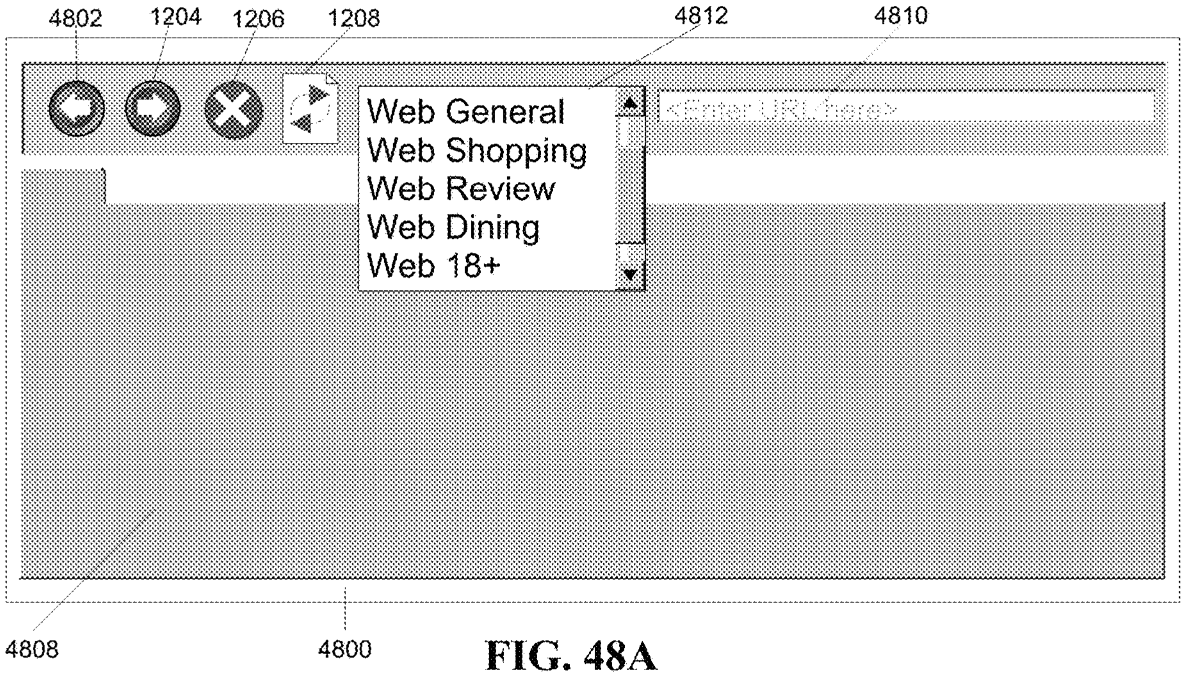
FIGS. 48A, 48B, 48C, and 48D show a number of Web browser user interfaces equipped with the present invention in accordance with some embodiments.

FIG. 48A shows an example browser page 4800, according to one embodiment, that one may see on a HTTP client station. The browser page comprises the back 4802 and next 4804 buttons, the abort 4806 and refresh 1208 buttons, an empty tab-enabled display page or area 1208, an input field for URL entry 4810, and a scrollable pull-down menu 4812 listing a plurality of context-selector phrases such as Web General (i.e., no context), Web Shopping, Web Travel, Web Dining, and Web 18+(e.g., adult-only content). These illustrative user-interface elements with the exception of the pull-down context selection menu are commonly seen in many web browsers. The first selectable choice is "Web General," which is the status quo Web, for which the default port would be 80. The next one is "Web Shopping," which may refer to the context-denoted Web for shopping, whose default port could be 98, such as the one shown in FIG. 44. The other choices such as "Web Review" and "Web Dining" correspond to the context-denoted Webs for reviews and dining respectively, whose default ports could be any distinct port numbers chosen among available port numbers not in official, de facto, or common use by other protocols. Consequently, the URL specified in the URL input field would result in a HTTP request being sent to or otherwise set up for the target HTTP server (or its proxy) at the specific port designated for the chosen context.

A URI (Uniform Resource Identifier), of which URL is a particular type, is a string of characters that adheres to a specification for identifying or otherwise referencing resources (e.g., a webpage) on the Internet or a private intranet. A URI scheme is the top level or part in the syntax of a URI construct. The remainder of the construct is to be structured and interpreted per specified URI scheme, subjected to certain constraints and conventions. For instance, the URL "http://www.uspto.gov/" has a URI scheme name "http," and the rest of the URI (not including the preceding colon ":"), namely "//www.uspto.gov/," is considered a scheme-dependent or specific part. The colon serves as a separator or delimiter between the scheme part and the scheme-specific part(s). Note that it is not necessarily for the scheme part of a URI construct to be a protocol (e.g., HTTP) even though it is commonly so. In addition, different URI schemes (e.g., HTTP and FTP) may share the same or a subset of structure and semantics for their scheme-specific parts.

Figure 48B:

FIG. 48B shows another example browser page 4800*b*, according to another embodiment, where a pull-down context selection menu is not present. There the example URL entry at the URL input field has "shop" as its scheme. This keyword "shop" is a scheme name associated with a protocol of shopping context. In particular, the protocol uses the same syntax and semantics of the scheme-specific part of HTTP URL, except now the default port would be, using the example illustrated in FIG. 44, port number 98, not 80. Hence the HTTP server to which "www.cookshot.com" in the URL refers would be listening and serving requests at port 98. (As such, URL entry "http://www.cookshot.com:98" would also be able to reach the HTTP server in question.) According to one embodiment, a TCP port other than port 80 is assigned with a context of shopping including sub-contexts of online ads and reviews of products and services, such that a HTTP server listening on or otherwise serving at this port are expected to deliver digital resources whose primary context being shopping or whose content of interest having a primary context of shopping. A HTTP client generating HTTP requests for target digital resources associated with URLs having "shop" as their scheme part or its equivalent would send the HTTP requests to that port, and not port 80.

Figure 48C:
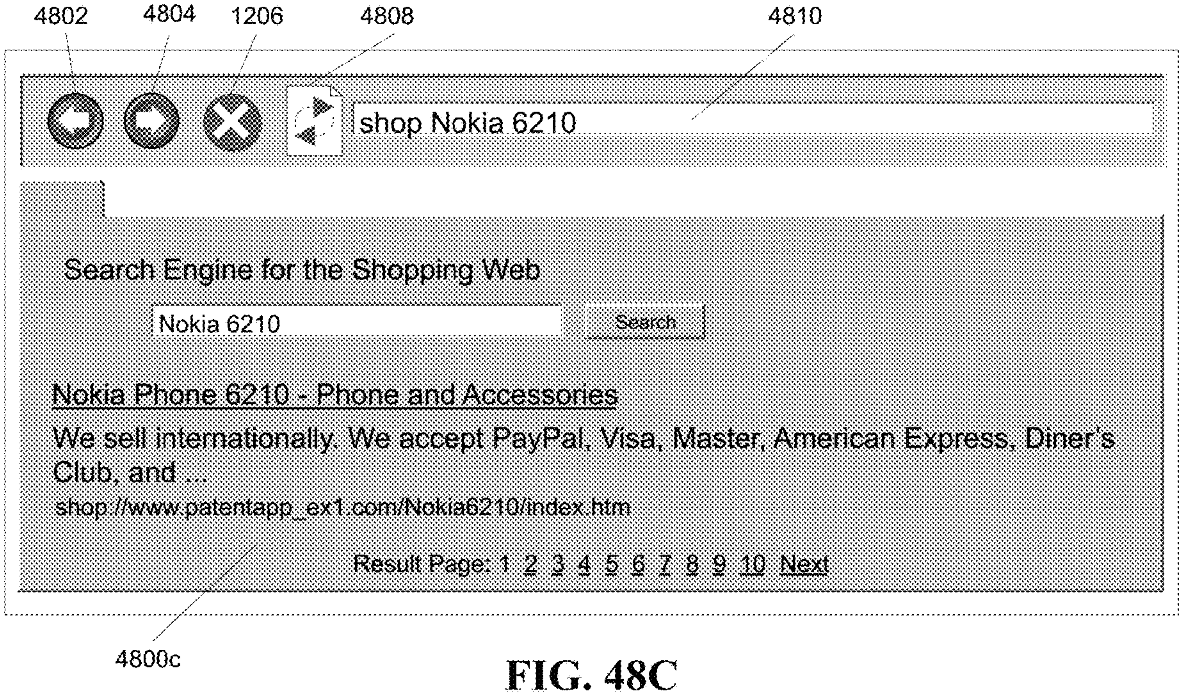
Figure 48D:
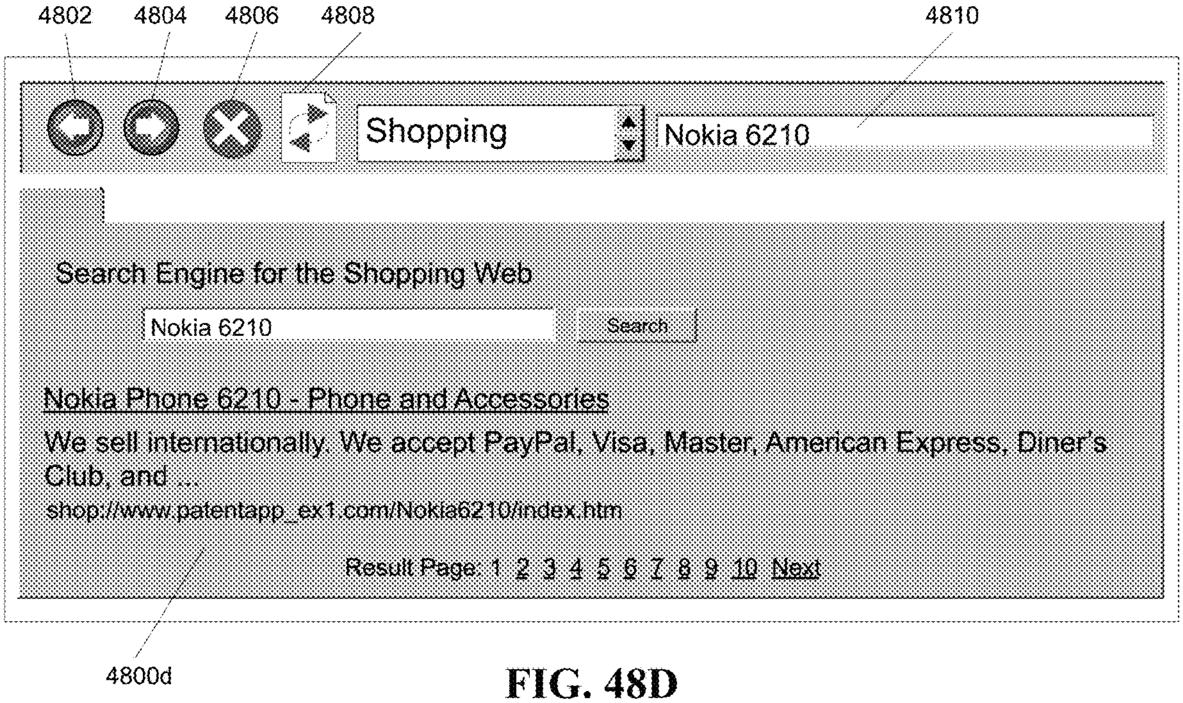

The "shop" scheme may further provide context-specific enhancement to the scheme-specific part. For instance, an entry "shop Nokia 6210" (see FIG. 48C) may result in a query with the search string "Nokia 6210" sent to a default search engine pre-assigned to or otherwise associated with the "shop" scheme. That is, if free-form keywords or phrases or those involving Boolean logic are detected as entry to the scheme-specific part, then it is considered as input to a search engine for the context of shopping. FIG. 48C illustrates such an example 4800*c*. (For example, the HTTP server of web address "www.cookshot.com" described earlier could be the default search engine.) FIG. 48D illustrates the same example but in a browser page 4800*d* similar to that of FIG. 48A.

A contextualized Web made possible by embodiments of the present invention may allow the use or adaptation of existing context-ignorant technologies, protocols and schemes in providing a context-certain or context-denoted layer or filter over digital or online resources delivered, processed or otherwise handled by or through these technologies, protocols and schemes. The operation scenarios for online resource providers and consumers participating in information exchange via such an embodiment, while may differ from one specific application to another, may not require any undue effort from these participants. Their skills and abilities in online resource retrieval, browsing, creation and publication may remain applicable or relevant. For instance, the user operations shown in FIG. 48A to FIG. 48D should be quite straight forward, and a Web user would find the user interface intuitive and consistent with what they are accustomed to. According to one embodiment, non-compliance of a digital resource provider may be reported by any party and be dealt with by the jurisdiction in accordance to the agreement or generally accepted practices, such as the removal or suspension of the addresses of non-complying online resource servers from the contextualized Web in question.

According to one embodiment, a contextually consistent space of digital resources may be achieved through communication end-points (e.g., a communication port of a TCP/IP protocol suite) that are dedicated to a certain context of digital or online resources, and by agreements, declarative or otherwise, between and by resource consumers and providers that their online queries, requests, and information of interest that may be received or served via these end-points shall be consistent with the context, unless otherwise specified.

For instance, among so many possible contextual integrity rules and guidelines, a certain TCP/IP port may be designated for serving webpages that are advertisements free, copyright free, one advertisement per page or one-offer per page, independent of or in addition to any contextual conformity requirement that the contextualized TCP/IP port may demand. Contextual integrity achieved through this approach would improve substantially the accuracy of indexing and queries of such webpages, while still allowing contextual heterogeneity among webpages and web resources that a server of digital resources may serve.

In addition, data going through a communication end-point with contextual conformity or integrity requirements may be protected or otherwise distinguished by a digital signature or other forms of security measures, so that only online resource providers and consumers (or requesters) that have formally accepted those requirements and, if any, the related penalty clauses for non-conformance, would have the keys or means to send, receive, read, produce or publish such data or digital resources.

A contextualized Web may also be furnished with enhancements such as tools, formats and rules (e.g., contextual integrity on a per webpage basis) and so on that aid in their ability to deliver, process or otherwise handle online resources in the specific context. Furthermore, sub-contexts such as "reviews," "offers" and "ads" may further refine or otherwise supplement a context to which these sub-contexts are applicable. The differentiation of these sub-contexts may be performed or otherwise realized at the port level or in the syntax of a protocol (e.g., special keywords defined in the syntax that may identify the sub-contexts of interest).

With the enhancements and modifications to HTTP as specified above, one who is skilled in the art would be able to realize an implementation of GAP, as well as other context-level protocols. For instance, a variant of HTTP may be specified as follows:

http://<authority>[/<path>][/<object>][*[<context>][*<context>]][?<query>]

(Note that while more than two named contexts may be supported, the above specification would support two for simplicity in illustration.)

The introduction of the optional part and its subparts "[*[<context>]*[<context>]]" to HTTP URL syntax allows the specification of additional contexts that the requested resource may belong to. The presence of the asterisk "*" alone in a HTTP URL would mean the default context, for instance, advertising. Without this optional part, an URL would be just a regular HTTP URL.

An additional context may also be specified in an optional "<context>" part. For example:

(1) http://www.wbstz.com/brandnamePhones (2) http://www.wbstz.com/brandnamePhones*

(3) http://www.wbstz.com/brandnamePhones*mobilePhone (4) http://www.wbstz.com/brandnamePhones*mobilePhone("USA")

(5) http://www.wbstz.com/brandnamePhones*mobilePhone("USA")*brand("Nokia")

The first HTTP request bears no context. The second request specifies an advertising context. The third request specifies advertising of mobile phones. The fourth request specifies advertising of mobile phones applicable to use in USA. The fifth request specifies advertising of Nokia-branded phone mobiles applicable to use in USA. (Note that the parameter "USA" is an example of context parameterization.)

Each explicitly named context and its supported parameters, if any, may not need to be defined as an inherent part of a context-aware protocol. They may be defined independently. Information requesters and providers could then use the named contexts of their interest to contextualize each individual requests and responses through a context-aware protocol capable of such on-demand contextualization, as long as these information requesters and providers share the same definitions of these named contexts. The fulfillment of this stipulation is made simple when the protocol is associated with a set of commonly used contexts. An "unknown" context may be included in requests and responses along with its unique identifier, such as an URI. Accordingly, an otherwise context-free protocol might reliably be made context-capable on a per request and response basis, as long as the information provider and requester may themselves be context-aware and know how to mutually specify and recognize these on-demand named contexts through the protocol. For example, the query part of the context-free HTTP URL may be used to carry these on-demand named contexts, such as: "?contextName=mobilePhone&contextDefinition=urn:www.fictitious.org:glossary:all:2:0," and a context-ignorant HTTP information provider would return an error when it encounters a query part that the information provider fails to make sense or interpret.

The addition of these optional context parts to HTTP would incorporate embodiments of the present invention into HTTP, thereby upgrading the protocol while preserving its existing functionality. An ordinary HTTP information provider would not understand such a context-aware or context-making HTTP request, and would return an error (e.g., resource not found). A context-aware information requester would learn about this incapability from the error message so returned. Such an information requester capable of this enhanced HTTP is in effect capable of a "combined protocol," namely a combination of both the original context-free HTTP and a context-specific or context-making protocol made possible by embodiments of the present invention. Another illustrative variant of HTTP in embodiments of the present invention is as follows:

http://<authority>[/<path>][/<object>][*[<options>][|<inquiry>]][?<query>]

This variant supports GAP's features of options and inquiry in lieu of multiple contexts. Here is yet another variant:

http://<authority>[/<path>][/<object>][*[<context>][*<context>][*<options>]][|<inquiry>][?<query>]

This one supports GAP's features of inquiry and options in addition to multiple contexts. (Although both contexts and options use the asterisk "*" character as marker and delimiter, the latter are of name-value-pair, while the former are not. This difference in syntax is sufficient for proper distinction during parsing of the URL. Note that this is just one example syntax used by a protocol in embodiments of the present invention.) Contexts as well as options and inquiry may also be specified in a HTTP requester header.

In addition to open systems such as the Web, embodiments of the present invention may be applicable to use within an application or system, where a communication protocol is used among pre-defined modules or components within the application or system.

Furthermore, a communication protocol equipped with embodiments of the present invention may make a distinction between copying and transferring a target digital resource, and treat the resource as having more than one instance, if such distinction is useful to a given context, such as advertising. That is, when the protocol copies a digital resource, it leaves the number of instances of the digital resource unchanged. When the protocol transfers a digital resource, it removes an instance of the resource. For example, an advertising digital resource may be a limited number of discount coupons. A transfer of such a resource would reduce the number of available coupons. In addition, an information requester may register for notification of query answers, especially those that change over time such as the current auction price, if the information provider would support it. These additional features do not indicate a new use or an enhancement to embodiments of the present invention. Rather, they are some of many different features that a communication protocol equipped with an embodiment of the present invention may possess. Those skilled in the art would be able to realize a particular embodiment per some requirement in accordance with the present invention.

For instance, specific embodiments may vary depending on the specific operating environments as well as specific functional, performance, security, reliability, maintenance and presentation requirements. For instance, the art of communication protocol development has been around for more than 30 years. While in essence all communication protocols are designed to transfer some information from one end to another end, there are a myriad of variations, with different data representations, synchronicity and logical connection models, error handling, security mechanisms, data caching and buffering strategies, and so on. Some protocols work in conjunction with others, while some exclude each other for the same application. Embodiments of the present invention make possible context-level communication via interfaces and protocols for subject matters including but not limited to Advertising, Reviews, News (Business, finance, entertainment, politics), Science and Technologies, Medical and Health, History, Books and Arts, Scholastic and Academic.

For example, in addition to advertising, which could already encompass beyond retail goods and services, e.g., jobs and personal ads, a communication protocol herein referred to as Good Answers Protocol (GAP) may be specified as follows:

gap://<authority>[/<path>][/<object>] *<context> [*<context>][*<context>][?<query>]

(While the protocol shown here may support up to three contexts for simplicity, it may be extended to support an indefinite number of them.)

Furthermore, a context may be described in a hierarchical manner, like categories in a business directory. For example:

gap://www.movie_chain.com/movies/ABC*movie/review gap://www.movie_chain.com/movies/ABC*movie/showtime("New York City")

Instead of just a mere different representation of the same information the same digital resource (www.movie_chain.com/movies/ABC) provides different information, namely the critics' review on the movie ABC and the showtimes of the movie in New York City. The former and the latter are both related to movies, but differ in their specific "subcontexts." In addition, semantically independent contexts may also be specified as follows:

gap://www.example_travel_info.com/destination/HongKong*touristInfo("New York City")*fineDining Here the request is to the entity "www.example_travel_info.com/destination/HongKong" for information on fancy restaurants, specifically for visitors from New York City. The contexts "touristInfo" and "fineDining" are independent in that they can exist without the other. For example, without the "touristInfo" context, the returned information is still of fine dining, but it would not be customized to visitors coming from the New York City. On the other hand, without the "fineDining" context, the returned information would be of tourist information for visitors from New York City in general, including visa requirement, currency rate, embassy address, etc.

A glossary and grammar of contexts may be developed to facilitate this example Good Answers Protocol. An information provider may also maintain and make available a list of contexts supported for a particular or a group of digital resources or online entities that the provider may be responsible for, so that an information requester may survey the kinds of information available. In addition, this GAP protocol may also support dialogue. For example, a digital resource, whose context is established as medication, may be asked about its generic name, indications, and so on.

Another example is an application of embodiments of the present invention to turn the Web from a global repository of distributed semantically-uncertain information base into one of semantically-rich information source. Different channels of specific semantic communication contexts may be established to support a much more effective heterogeneous mode of information dissemination and request. Because the current Web is inherently context-free, it inevitably treats all information dissemination and request as though for homogeneous users, thereby discriminating against user groups or interests of lesser majority. This would impede the growth to universality of the Web.

For example, someone looking for an urn for funeral use may get a large result of links to websites about URN (Uniform Resource Name—an IETF RFC protocol standard) if today he enters "urn" (when not even in form of a capitalized acronym) as a search word in a popular search engine. The result is biased towards the current user base of the Web, most of who would be considered computer savvy enough to be more interested in URN than an urn. However, one would argue, and rightly so, that most of the people in the world are not computer savvy, and should not be required to be so in order to take full advantage of the Web. It is similar to word processing software which in essence shall not give computer programmers any considerable advantage over non-programmers in using the software to perform its intended tasks, i.e., document creation, maintenance, collaboration, publication, and distribution. As such, contextualized channels on the Web made possible by embodiments of the present invention would drastically help equalize this imbalance. Context-specific search engines may be developed, relying on the communication contexts of the contextualized channels that these engines are to index and operate on. According to one embodiment, an otherwise general-purpose search engine serving a contextualized information channel or Web becomes contextualized. These contextualized channels may be likened to specialty channels in television broadcasting. This is like before the time of specialty channels, television audience could only choose channels of television stations or networks, and subject themselves to the programming of these conventional channels. The rise of specialty channels gives audience of heterogeneous nature the ability to choose content of their interested subject matters. Embodiments of the present invention might further reify Marshall McLuhan's famous literary trope "the medium is the message" with realization of "protocol is the context."

Still yet another example is an application of embodiments of the present invention to make possible legitimate user feedbacks for search engines and information provider. Because there is no established context for online information at large, it may not be suitable or relevant for web users to rate the results from search engines in relation to a given context. However, when web pages are presented in a certain context, such as that of advertising, web users may now rate more objectively on the relevance of a given web page in a search result. Based on the search input and ratings given by the web users, a search engine may improve the search quality based on this correlation. Information providers may also be rated for the content integrity. This is made possible because of an established context mutual to both content providers and consumers through a context-making communication interface or protocol. Contextual integrity of searchable content within a resource may subsequently improve.

For example, if an online consumer looks for a sailing jacket of a particular brand, and therefore specifies the search words of "Goodbrand sailing jacket," a search engine nowadays could return links to popular web pages that sell assortment of goods, some of which are of brand "Goodbrand," and some of which are about sailing, and some of which are jackets, but no item would be a sailing jacket of brand Goodbrand. In short, the online consumer would get a page that lists items that each of which may contain one or no relevant word. This illustrates while all content in a given resource may be of advertising, the contextual integrity of the resource is compromised by having listed many unrelated items for sales as its content.

Good contextual integrity should translate into better ratings for information providers, which in turn encourages contextual integrity improvement. In fact, a single webpage may contain more than one web resources. Yet multiple web resources presented together on the same webpage could have their own independence with respect to searches and dialogues. (That is, a resource may further be decoupled from its mere presentation. A webpage needs not be a single homogeneous resource. It may serve as a collection or presentation of one or more resources. Such a collection or presentation may itself be a resource.) Such independence may easily be set up and identified with structural markups. A search engine can consider individual web resources independently even though they appear on the same webpage. When there is a match for a given context, the search engine can return a link to the whole webpage, or a modified link to just the matched web resource for preciseness. Again, demand for such contextual integrity of web resources is made possible by embodiments of the present invention. In addition, a search engine may now disregard web resources of advertising nature whose offers have expired. (Note that an expiry of an offer is not the same as that of a web page. The former is a possible natural attribute to an advertised offer, while the latter is a control attribute to temporary storage of webpages for later retrieval.) That is, a web page may contain several ads, where some have expired and some have not. A search engine would ignore the expired ones should its user ask only for online ads still in effect.

As illustrated above, embodiments of the present invention make possible so many applications. Hence, while the specification so far may have contained much specificity, it should not be construed as limitations on the scope of the invention, but rather as an exemplification of embodiments thereof. One who is skilled in the art would be able to incorporate the present invention into a variety of embodiments and applications. For instance, an online document or resource may comprise an indication of its subject matter or subject matter context, the indication comprising an identification of a protocol interface associated with a subject matter or subject matter context. For example, a HTML webpage may indicate an alternate link (e.g., a LINK element with "rel" attribute whose value is "alternate"), the alternate link comprising a URL whose port (e.g., port 89) is associated with a subject matter (e.g. shopping). A search engine or a user agent such as a web browser may recognize the subject matter based on the alternate link, and process the webpage accordingly. For instance, the search engine may catalog, classify or index a web resource based on information available via an alternate link, and present or select the web document or resource based on matching of a query or context against the information, even though the webpage does not necessarily contain that information, or the information in the same or compatible form, mode or scheme. For example, an online video may be associated with an alternate link to a transcript or a text description of the video. A search service may index the transcript or text description. It may present or select the video if the search service deems that the transcript or text description is a match with a user request or query. In one embodiment, such a matching may require that the alternate link is associated with a protocol interface that is associated with a particular subject matter, such as port 89 if port 89 is deemed being associated with the subject matter, e.g., by way of a published online document such as an IETF RFC (Request for Comments). In one embodiment, an online publication identifying a TCP/IP port and associating the port with a subject matter such as shopping is regarded as having the port deemed being associated with the subject matter.

In addition, further disclosed are methods, systems, and devices for restricting access to one or more apps on a device. For instance, a method for restricting access to one or more apps and their data is described, the method comprising providing an area; accepting a request to associate one or more functions with the area; associating the one or more functions with the area; accepting a request for access to the area; requesting for authentication; providing access to the one or more functions, if the authentication is successful; and denying access to the one or more functions, if the authentication is not successful. According to another embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

Figure 49:
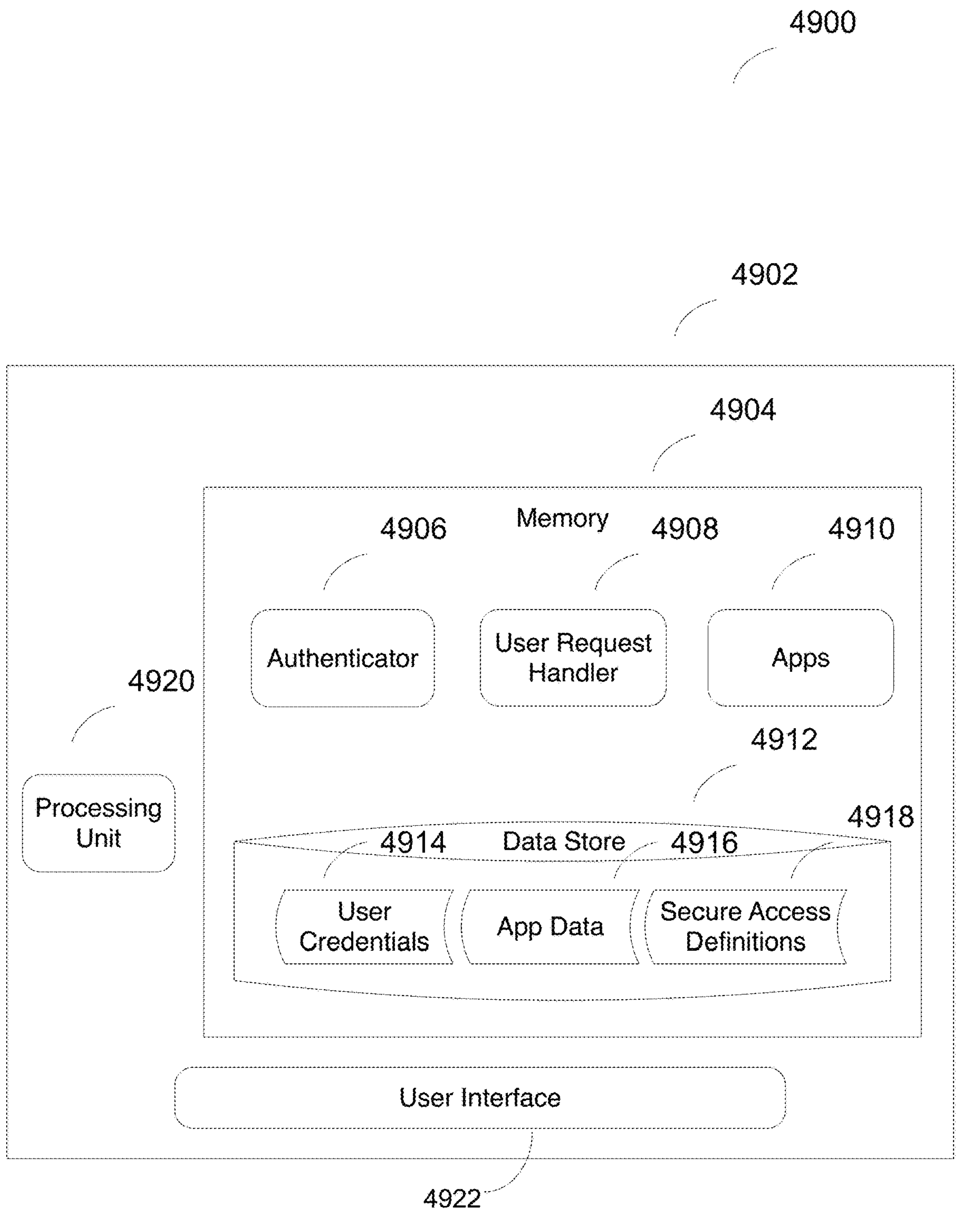
FIG. 49 shows a block diagram of a device in accordance with an embodiment.

FIG. 49 shows a block diagram 4900 of an exemplary device 4902 equipped with the present invention. The device 4902 comprises a processing unit 4920, a memory 4904, and a user interface 4922. The device 4902 (e.g., a mobile phone, personal digital assistant, computing tablet, desktop phone, a portable or desktop computer, a control terminal, and so on) is communicatively coupled to a user via the user interface 4922 (e.g., a display, a speaker, a microphone, a keyboard, a touch screen, and so on). Any type of user interface is within the scope of various embodiments.

The user interface 4922 is provided for interacting with a user, including receiving requests for designating an app for restricted access and accessing the app or a restricted area, view or screen in or with which the app is protected or associated, as well as indications that another user or a device of another user may access applications or services on the device.

The memory 4904 is provided for storing programs and data for the operation of the device 4902. It includes an authenticator 4906, a user request handler 4908, one or more apps 4910, and a data store 4912, the data store comprising user credentials 4914, app data 4906, and secure access definitions 4918. The user request handler 4908 is responsible for interpreting requests sent by a user via the user interface 4922, such as associating apps with a secure or restricted area, assigning apps to a secure or restricted area, view or screen, deciding if authentication is required in relation to accessing the secure or restricted area so to run or make visible the one or more apps and their data installed or otherwise accessible through the device, and communicating with the one or more apps 4910 about requests from one or more users, the requests for granting access to the one or more apps 4910 on the device 4902 to one or more devices associated with the one or more users. The authenticator 4906 is responsible for prompting for and accepting input from the user, for example, to decide if a secure area comprising the apps in question should be made visible or available to the user, as well as other authentication-related activities, such as creating or changing user credentials. If the authentication is successful, the authenticator may then allow the requested operation or effect to proceed. Otherwise, the user is notified of such denial. The user credentials 4914 in the data store 4912 are used for such authentication purpose (e.g., as executed by the authenticator 4906), while the secure access definitions 4918 there provides the rules or boundaries under which an authentication is required. The app data 4916 provides data storage for the one or more apps 4910. The authenticator 4906 may also facilitate identification and/or authentication of an external device or an application on an external device based on identification and/or authentication of the user of the application or the external device.

The processing unit 4920 is provided for executing the programs (e.g., the authenticator 4906, user request handler 4908, and apps 4910) in the memory 4904, and the user interface 4912 for interacting with a user.

In some embodiments, the secure access definitions 4918 may be part of the user request handler 4908, or the authenticator 4906 may be part of the user request handler 4908. As such, although the device 4902 is described as being comprised of these various components, fewer or more components may comprise the device shown in FIG. 49, and still fall within the scope of various embodiments.

In one embodiment, a user via the user interface 4922 selects an app for configuration (e.g., by touching and holding for a pre-determined period of time an icon for the app on a touch screen), and specifies that the app be associated with a secure area, such as a folder, a screen view or page, or a virtual screen available on the device. (E.g., the user may gesture to the device via screen scrolling that he wants to access to the next screen view or page to the right of the current screen view or page, or an out-of-sight virtual screen positioned virtually at the top of the current screen, the next screen view or page, or the out-of-sight virtual screen being designated or configured as a secure area.)

Such specification or association may be performed via a configuration file, settings page, or the selected icon (e.g., dragging the icon to the secure area). The user request handler 4908 or its equivalent stores this configuration in the secure access definitions 4918. If the user does not yet have credentials established for such authentication, then the user request handler 4908 causes the authenticator 4906 to prompt the user to establish one, and to handle the subsequent interaction with the user. Alternatively, the user request handler 4908 may do so with the user via the user interface 4912. Successfully established, the credentials are stored in the user credentials 4914 in the data store 4912. The user may also change the credentials via the authenticator 4906 independent of any app invocation or configuration for access. If the user wishes to no longer restrict access to the app, then he may be first authenticated by the authenticator 4906 before being granted the permission to make such change. (E.g., to disassociate an app with a secure area, the user may touch, hold, and drag the icon for the app in the secure area to outside.) The user request handler 4908 updates the secure access definitions 4918 accordingly.

Upon receiving a request from a user to access an area or screen through the user interface 4912, the user request handler 4908 checks if there is any applicable data in the secure access definitions 4918 for the area or screen. If so, it causes the authenticator 4906 to interact with the user and authenticate him against the data in the user credentials 4914 in the data store 4912. Otherwise, the area or screen may be accessible without further permission or credentials checking. Should the authentication in the former case be successful, the area or screen may be accessible, thereby making the apps therein available to the user.

In an embodiment, a touch-screen device presents a list, view or inventory of available apps on one or more visual pages or areas, where a user may go from one page or area to another. For example, a so-called home screen on the device may comprise more than one set of apps, where each set of apps is displayed or otherwise presented independently from the other sets. The user may gesture to the device (e.g., by swiping across the screen) to select the previous or next set or sets in relation to the current set of apps. Each set of apps so display or presented makes up a view, each of which may extend beyond what the physical screen of the device can show at any one point in time. For example, individual views may be organized horizontally while the icons of the apps vertically. Animations such as that of sliding from one page to the previous or next, either horizontally or vertically, may accompany this change of view. In addition, an secure area may change in size and/or color, for example, depending on the status of protection and the number of apps therein. The user interface 4912 is responsible for such interaction with the user.

In one instance, the user indicates via the user interface 4912 to the user request handler 4908 that one view is configured to become a restricted area, in that access to it would require authentication of the user by the authenticator 4906. Upon successful authentication, the user may access this restricted area or view, and assign apps to it (e.g., by moving their icons into the area or view), thereby removing these apps from authentication-free access at the app execution level even when the device-level authentication, if any, has been successfully performed or otherwise been disabled. That is, to gain access to apps with restricted access, the user needs to be authenticated by the authenticator 4906. Successful authentication enables the user to access all apps in the restricted view or area for which the authentication is performed. Such authentication may be required every time access to the restricted area or view, or to the individual apps within it, is requested by the user, or when there is some inactivity of the device or apps in question since the last successful authentication. Or the user may open and close restricted areas or views manually via the user interface 4912, so that the user request handler 4908 may then decide in accordance to this manual setting if access to the restricted areas is granted and whether authentication is needed.

The user may also designate two or more sections of views, one or more of which comprising one or more restricted areas or views. Between any two sections may be a demarcation or partition point, line or interface (visible or otherwise), where authentication will be required if the user requests access to a section of restricted areas or views, and not required if he requests access to a section of non-restricted areas or views. Different sections of restricted areas or views may have different passwords or credentials for authentication. In addition, the same app with different data sets may also appear in different sections. For example, a phone app may appear in both the non-restricted and restricted areas, where the phone app in the restricted area has access to different contact data and call logs compared to the one in the non-restricted area. Another example app is a photo album app. That is, the data that an app may have access to defines the function of the app and distinguish it from the otherwise same app that does not have access to the data (but perhaps to other data). In one embodiment, a Secure Access Definition such as the one shown in FIG. 49 stores and maintains the relationships between the apps and their respective data in relation to the sections that they are applicable to. For instance, the user may specify an email address for which messages received will be associated with an email app in a section of restricted areas, while messages received for all other email addresses will be associated with an email app in another section.

Figure 50:
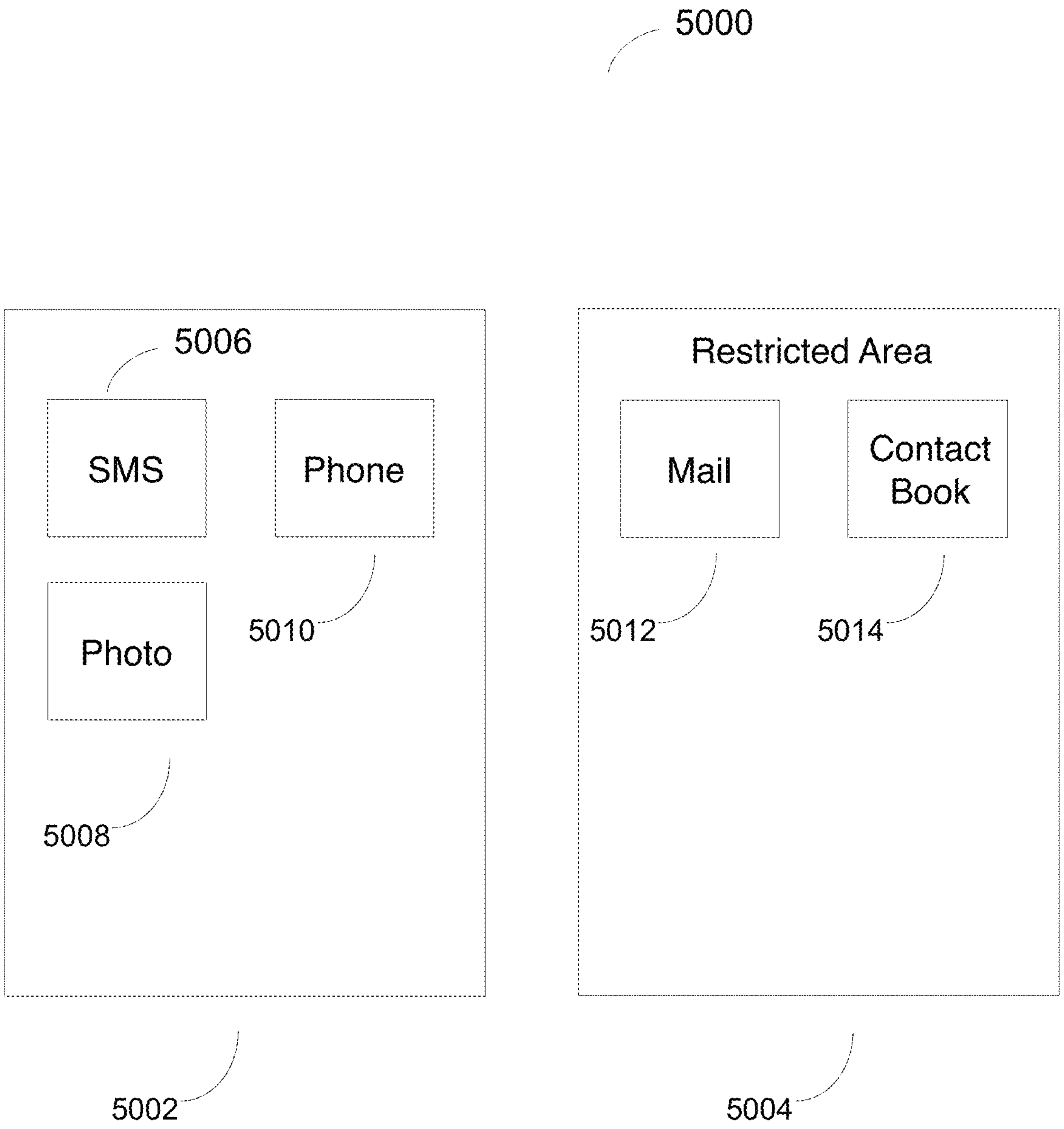
FIG. 50 shows screenshots on a device in accordance with an embodiment.

FIG. 50 shows an exemplary display 5000 of screen that may be presented on a device embodying the one depicted in FIG. 49. There are two screen shots 5002, 5004, each representing an area or view of apps or their icons. The one on the right is a restricted area whereas the on the left is not. As such, the left screen, area or view will be accessible to the user without the need for authentication, while the data associated with the apps whose icons appearing in this screen, area, or view (i.e., SMS 5006, Phone 5010, and Photo 5008) are available to the user also without any authentication. On the other hand, since the right screen, area, or view is restricted, a user will not gain access or visibility to it until successful authentication. As such, the apps (i.e., Mail 5012 and Contact Book 5014) in this screen, area, or view will be protected from unauthorized access. The data associated with these apps are likewise unavailable to the user or other apps that the user may be using or capable of invoking without authentication.

Figure 51:
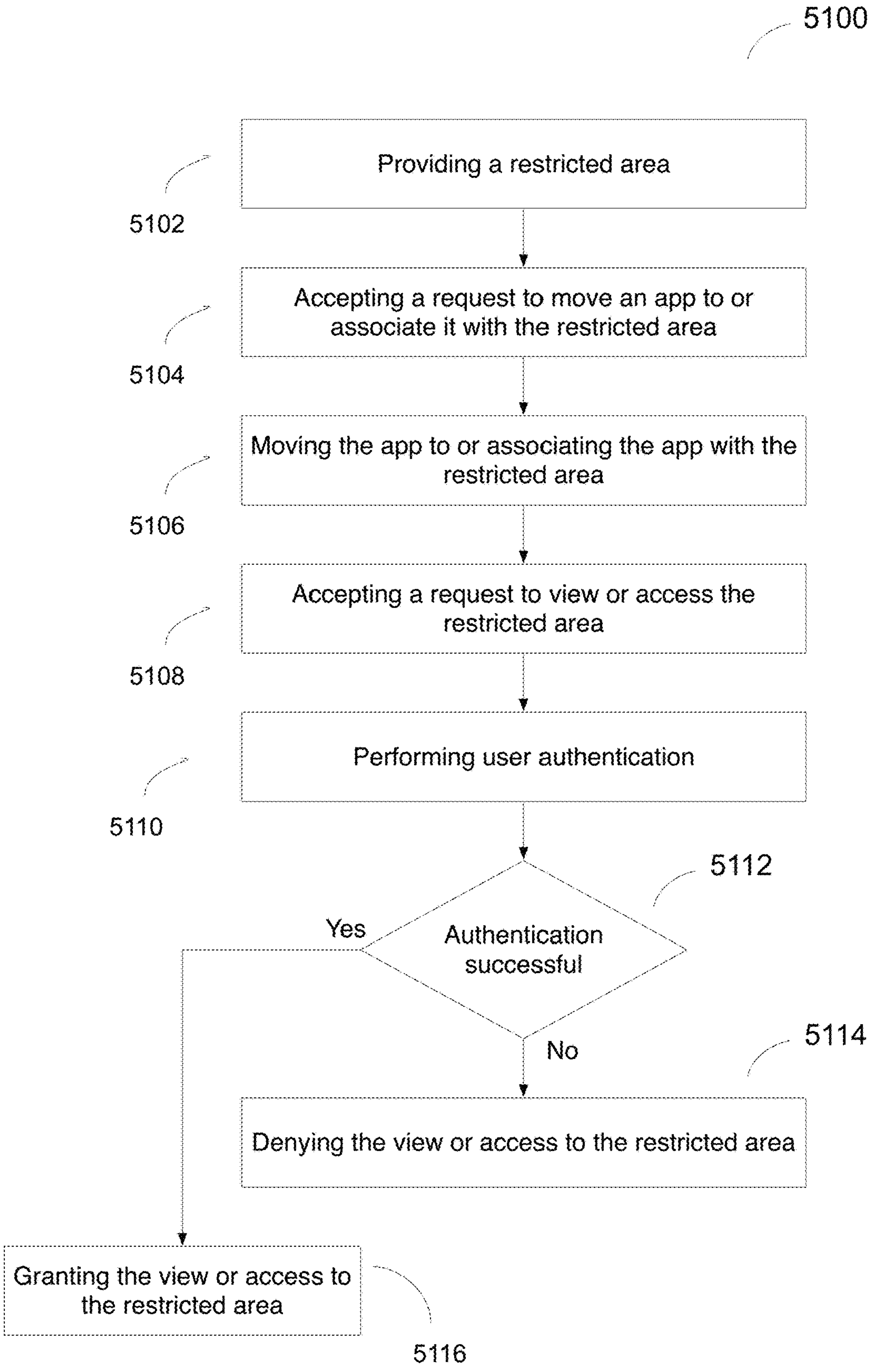
FIG. 51 shows a first computerized method in accordance with an embodiment.

FIG. 51 shows a flow diagram of an exemplary process 5100 for configuring an app for authentication on a device, such as the one shown in FIG. 49, with a display or screen an example of which is depicted in FIG. 50. For instance, per the example process 5100, the user interface 4922 provides a restricted area, view or screen (5102), which may be disabled, enabled or otherwise configurable by the user. If there are no user credentials available yet, the user request handler 4908 will cause the authenticator 4906 to interact with the user via the user interface 4922, so to obtain them, before the restricted area, view or screen may be activated, enabled or otherwise created. (In one embodiment, the user password for the device, if available, will be used as the initial user credentials for restricted areas, views, or screens.) The authenticator 4906 (or in some embodiments, the user request handler 4908) will store the information in the user credentials in the data store. The user request handler 4908 accepts a request via the user interface 4922 to move an app to or otherwise associate it with the restricted area (5104), such as having the user pressing, holding and dragging the app icon from an unrestricted area, view or screen, to the restricted one. The handler 4908 causes the user interface to remove the app icon from the unrestricted area to the restricted one (5106), and stores in the secure access definitions 4918 this membership in or association with the restricted area, view or screen. (Such setting in the secure access definitions 4918, for example, may cause the data maintained by or otherwise associated with the app to become unavailable to other apps that may otherwise have access to them, such as the data in Contact Book app being available to the Phone app.) Then the user request handler 4908 receives a request from the user via the user interface (e.g., by gesturing the intent to access the restricted area from the unrestricted one, such as those shown in FIG. 50) to access the restricted area (5108). The handler causes the authenticator to request user credentials (e.g., password) or otherwise authenticate with the user (5110). If the authentication is successful (5112), then the authenticator causes the user request handler to make visible or otherwise accessible the restricted area to the user via the user interface (5116), thereby enabling access to the apps therein, as well as making available the data of these apps to other apps. Otherwise, the secured area access request is denied (5114).

Figure 52:
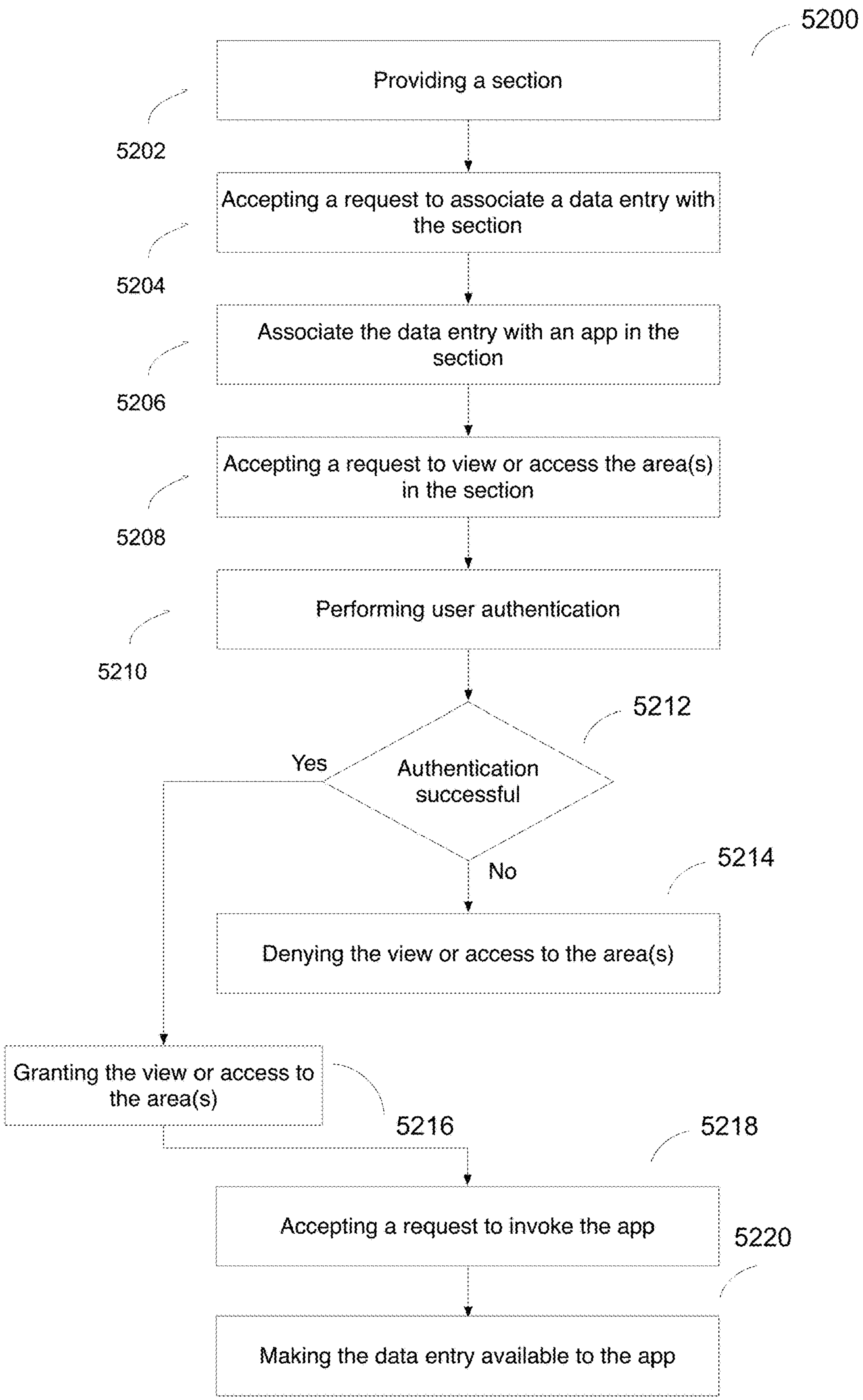
FIG. 52 shows a second computerized method in accordance with an embodiment.

FIG. 52 shows a flow diagram of an exemplary process 5200 for assigning a data entry (e.g., a contact entry, a photo, an email address) to a section of restricted areas available on a device, such as the one shown in FIG. 49. For instance, per the example process 5200, the user interface 4922 provides a section of restricted areas, views or screens (5202). It accepts from a user a request to associate a data entry with the section (5204). The User Request Handler 4908 identifies one or more apps that can handle the type of the data entry or are otherwise associated with the type, and associates the data entry with the one or more apps (5206). It stores this association information in Secure Access Definitions 4918. The User Interface 4912 accepts a request to view or access a restricted area in the section (5208). The Authenticator performs user authentication (5210). If successful (5212), it grants access to the area (5216); otherwise it denies the access (5214). When the User Request Handler 4908 accepts a request to invoke one of the one or more apps in the area upon successful authentication (5218), it makes available the data entry or data related to the data entry to the invoked app (5220).

The embodiments as described above enables a user to restrict access to an app that may not have any authentication capability itself, without the need for the device-wide authentication. For example, a parent may create a secure visual area, and place a phone app in that area, so that his kids cannot access the app without successful authentication. Or he may place a video browsing app or a Web browser in the secure area, which only requires authentication outside a certain period during a day, given that access to the date setting function for the device is also restricted. In the other words, an embodiment of the present invention enables a user to organize and manage invocation or execution-level authentication for a group of apps collectively even when the apps are not capable of doing so.

In some embodiments, data from restricted apps may not be visible or accessible to apps whose access is otherwise unrestricted. For example, if a contact book app is restricted while a phone app is not, then the phone app although functional (e.g., for making calls) cannot access to the data provided or otherwise maintained by the contact book app, and history information that the phone app may maintain should hide or otherwise omit entries that are derived from or otherwise related to the data of the contact book app.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on computer readable media, the logic configured to perform methods of the invention. The examples provided herein are exemplary and are not meant to be exclusive.

In addition, a service or application available on a user device may be made accessible to a compatible service or application on another user device for purposes of relaying a message or data sent by or addressed to a user on the other user device. For example, a user of a service (e.g., an electronic messaging service provided by one or more computing systems comprising a messaging system and a user device) may indicate to the service (e.g., via an application associated with the service where the application is running on a device of the user) that another user of the service is authorized to use a device of the user to relay, send, or receive messages or data sent by or addressed to the other user. This authorized access to such functions or capabilities on a device of the user is limited to a device of the other user whose user identity can be authenticated or otherwise ascertained.

Figure 53:
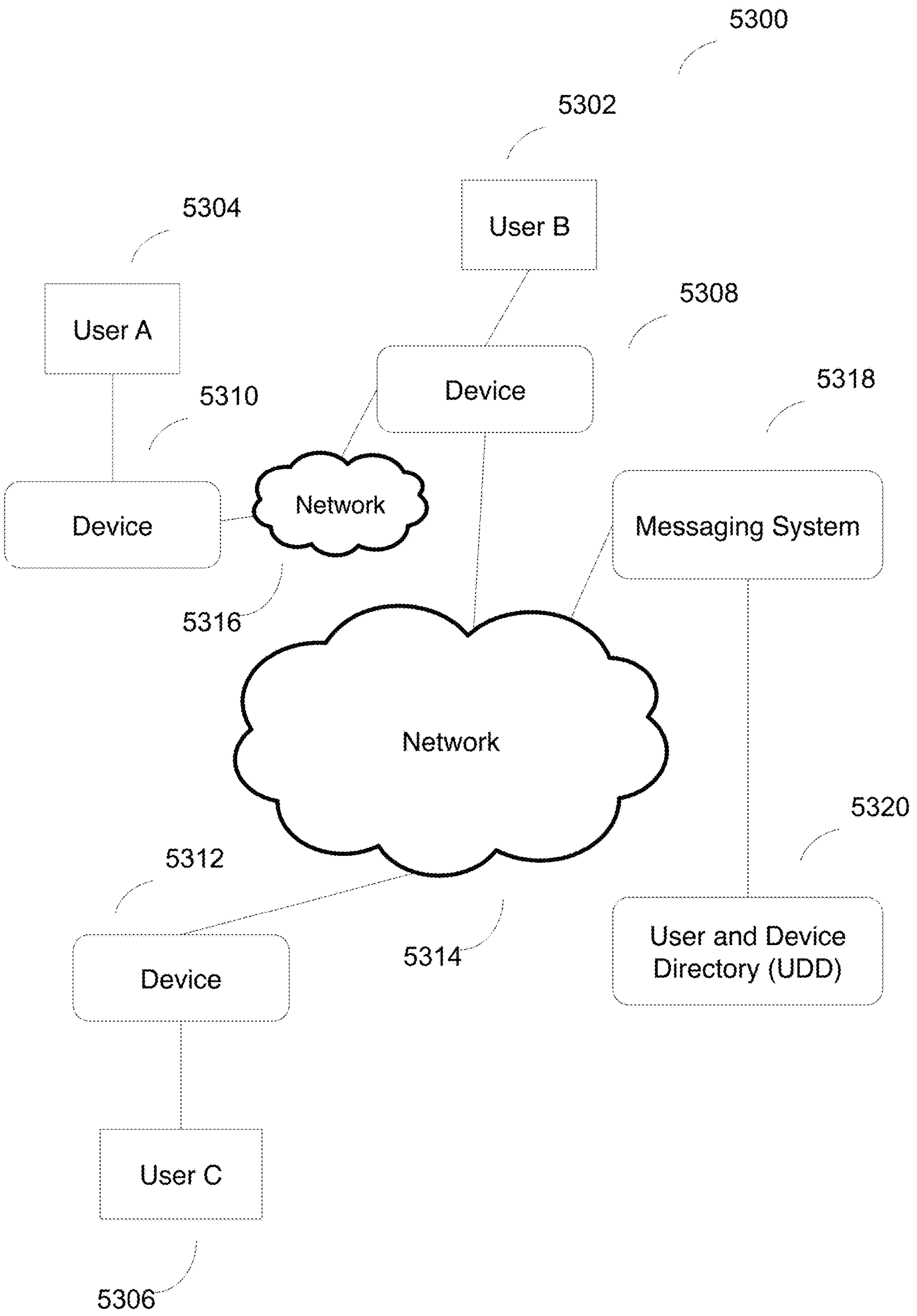
FIG. 53 shows an example environment in accordance with an embodiment.

For instance, FIG. 53 illustrates an exemplary environment 5300, according to an embodiment, for enabling a device 5310 of User A 5304 to make use of a device 5308 of User B 5302 to send and receive messages or data to and from User C 5306, when a network 5314 (e.g., the Internet) through which User C, his device 5312, or a messaging system 5318 can be reached is unavailable to the device 5310 of User A. For example, the device 5310 of User A may be communicatively connected or linked to, or otherwise reachable by the device 5308 of User B via another network 5316, e.g., a Bluetooth connection or a Wi-Fi network in non-infrastructure mode. Any type, mode or form of presence discovery and data transfer among devices is within the scope of the present invention, such as those utilizing near-field communication (NFC), Bluetooth, and Wi-Fi, or a peer-to-peer connectivity protocol or system.

As part of a signup process or user account configuration for the service, User B 5302 may specify or otherwise indicate to the messaging system 5318 that User A 5304 is permitted to receive and/or send messages (or data) through a user account of User B or a device associated with User B 5302. In one embodiment, User A may also indicate to the messaging system 5318 that messages sent by or addressed to him may be relayed through a device of User B. In one embodiment, such a permission or authorization in itself neither allows User A 5304 to interact directly with a device of User B, nor enables User B 5302 to gain visibility or access to these messages.

In one embodiment, when the messaging system 5318 receives a message addressed to User A, for example, received from the device 5312 of User C, it determines if a device of User A is available (e.g., by not receiving a periodic poll from an application or device associated with User A 5304, or by sending asynchronously or unilaterally such as via WebSocket a notification to an application or device associated with User A 5304). Should a device of User A be deemed unreachable, the messaging system 5318 may identify a device of another user, e.g., by consulting with a user and device directory (UDD) 5320, which, in one embodiment, is a database system that maintains information on one or more devices that are associated with each user of the service, and information on one or more users who are permitted to use devices associated with a particular user for relaying messages. In relation to that User A 5304 is permitted to use devices associated with User B 5302 and that the device 5308 is associated with User B 5302, the messaging system 5318 may deliver the message whose sender is User C 5306 to the device 5308 of User B, which forwards or otherwise sends it to the device 5310 of User A for presentation to User A 5310 or consumption by a compatible application associated with User A 5310. In one embodiment, the device 5308 of User B or the application receiving the message on the device does not disclose the message to User B 5302. In another embodiment, the device 5308 of User B or the application receiving the message may disclose the information in the message and any attachments or media associated with the message to User B 5302 when User B 5302 is also a recipient of the message. This mechanism or arrangement may save or otherwise reduce data usage of transmission or transfer bandwidth through the network 5314 with respect to User A 5304 and User B 5302 together, as it would otherwise take two payloads of similar size and format to deliver the content in the message to two users of the service.

Whereas an application on a device should reject or would otherwise not receive a message addressed to users that do not have an account with the application running on the device, an application in one embodiment may accept such a message and identify these recipients. The application may maintain a local list of users that User B 5302 has authorized their associated devices to receive and send messages via his device 5308, and it may obtain, receive, or update such a list of users at the messaging system 5318 (which may store and maintain this information at UDD 5320). In one embodiment, these users also agree to use a device associated with User B 5302, such as the device 5306 of User B, to relay their messages to and from their individual devices.

In one embodiment, while a device such as the device 5310 of User A 5304 may maintain its own list of authorized users, the messaging system 5318, in connection with UDD 5320, may provide and maintain a service or system-wide database for such information for all users of the service. For example, when a messaging application on the device 5310 of User A detects that there is no connectivity or communication path at the device to the network 5314 (e.g., the Internet) that would have enabled its messages or data to reach the messaging system 5318, it searches for connectivity to other devices that may reach the messaging system 5318, where these other devices may have a compatible message application running thereon. For example, in one embodiment, the messaging application may detect presence of another device through the network 5316 (or via a means of connectivity not necessarily regarded as a network, such as NFC) and exchange user identity information with the compatible messaging application on the other device. In one embodiment, the compatible messaging application may send the user identity information about User B 5302 to the messaging application on the device 5310 for presentation to User A 5304, who may then, for example, confirm the identity of User B 5302 and trust the device 5308 of User B to relay his messages. In another embodiment, the compatible messaging application may request user identity information about User A 5304 for presentation to User B 5302 who may then, for example, permit the device 5308 of User B to relay messages for the device 5310 of User A.

In one embodiment, User A 5304 may interact with his messaging application on his device 5310 so to indicate via the device 5302 of User B to the messaging system 5318 that the device 5308 of User B or the compatible messaging application on the device 5308 of User B is allowed to receive and send messages on behalf of User A 5304. For instance, User A 5304 may authorize the sending by his device 5310 to the device 5308 of User B 5302 of a code or token uniquely identifying User A 5304 to the messaging system 5318, or any messaging service-specific identification information about User A5304 that cannot easily be tempered with by User B 5302 or other users. In one embodiment, such identity information or credential may be one-time use. In another embodiment, such identity information or credential may be exchanged securely between the two devices or the two applications on these devices. In one embodiment, the device 5308 of User B may use this identity information about User A 5304 to register with the messaging system 5318 over the network 5314 that messages addressed to User B may now be sent to the device 5308 of User B, and that messages whose sender is User A 5304 may now come from the device 5308 of User B. While the application on the device 5308 of User B may handle these messages, it may not allow access to them to User B 5302. In another embodiment, User B 5302 may have access to content contained in such messages if he is also a recipient of the messages.

In one embodiment, the information provided to the messaging system 5318 for assigning or otherwise associating the device 5308 of User B as a message relaying means to the device 5310 of User A may comprise identification information of User A 5304, the device 5310 of User A, User B 5302, and the device 5308 of User B. In another embodiment, identification information of User A 5304 may be derived or otherwise looked up, e.g., by the messaging system 5318, via identification information of the device 5310 of User A, or vice versa. Likewise, identification information of User B 5302 may be derived or otherwise looked up via identification information of the device 5308 of User B, or vice versa. In one embodiment, each piece of such information may be provided by its respective device to the messaging system 5318. In another embodiment, each piece of such information may be first collected by the other device that may then forward it to the messaging system 5318.

Any mode, form, or mean of user identification and authentication as well as resource authorization, such as adopting or adapting an OAuth protocol for granting access to select resources (e.g., messages addressed to User A 5304) to a third party (e.g., the device 5306 of User B), is within the scope of various embodiments of the present invention.

In one embodiment, a compatible application, which may be running as a background service or in an active mode on the device 5308 of User B, may report to the messaging system 5318 that a device associated with User A 5304, such as the device 5310 of User A, is communicatively coupled, linked, or otherwise associated with the application, and that the device associated with User A requests the messaging system 5318 to send from now on to the device 5308 of User B those messages addressed to User A 5304, and to receive messages whose sender is User A 5304 from the device 5306 of User B. In one embodiment, such a message relaying setup or arrangement can be manually requested by either User A 5304 or User B 5302, or either user device based on some calendar time information or a timer.

In one embodiment, when the compatible application on the device 5308 of User B receives a message addressed to User A, it may send it to the device 5310 of User A, for example, via the network 5316 from the messaging system 5318, for presentation to User A 5304. In another embodiment, when the compatible application on the device 5308 of User B receives from the device 5310 of User A a message whose sender is User A with, for example, User C 5306 as recipient, it may send it to the messaging system 5318 via, for example, the network 5314. The messaging system 5318 may then forward it to the device 5312 of User C for presentation to User C 5306. In one embodiment, such an application may belong to a secure area. Identities of users whose device may be granted access to the application may also be associated with the secure area.

In one embodiment, the device 5308 of User B (namely, the relaying device) may receive or continue to receive messages addressed to User A while the device 5310 of User A (namely, the relayed device) is unreachable to the relaying device, whether temporarily or otherwise. When later the reachability is established, the relaying device may then forward those messages to the relayed device. In one embodiment, this message storing and forwarding relationship between these two devices is one to one, and can be made temporary, e.g., the relaying device not being a server configured to receive and store messages for a user (e.g., User A 5304) without the need of consent from another user (e.g., User B 5302).

In one embodiment, the relayed device may establish or restore connection or connectivity with the messaging system 5318 over the network 5314. Such establishment or restoration may be detected by the relayed device, the relaying device, and/or the messaging system 5318, and made known to the messaging system 5318, so the messaging system may choose a desirable communication path (e.g., over the network 5314 or via the relaying device) to deliver the next messages. In one embodiment, the relayed device may receive duplicate messages that may come from different networks 5316, 5314. The application receiving these messages on the relayed device may remove the duplicate messages from presentation to its user (e.g., User A 5304) based on, for example, a message identifier or some sequence number that is unique across messages, whether alone or in combination with other readily available information, such as time information.

Unlike technologies that enable multiple devices to share a network connection or to work together to bridge different payload protocols, such as peer-to-peer mobile internet connection sharing or tunneling protocols, a particular embodiment would make it possible for a device to receive a message or data addressed to another user of a common or compatible application running on the device, and forward or otherwise relay the message or data to another device communicatively coupled to the other user, where the application or another instance of the application is also running on the other device. The other device may also send messages or data via the device where the other user is a sender of the messages or data, and the user is not a recipient. The selection of or permission for this communicative channel, path, or link between the device (or the application on the device) and the other device (or the application on the other device) for receiving and sending user messages or data is based on user identity and consent.

Figure 54:
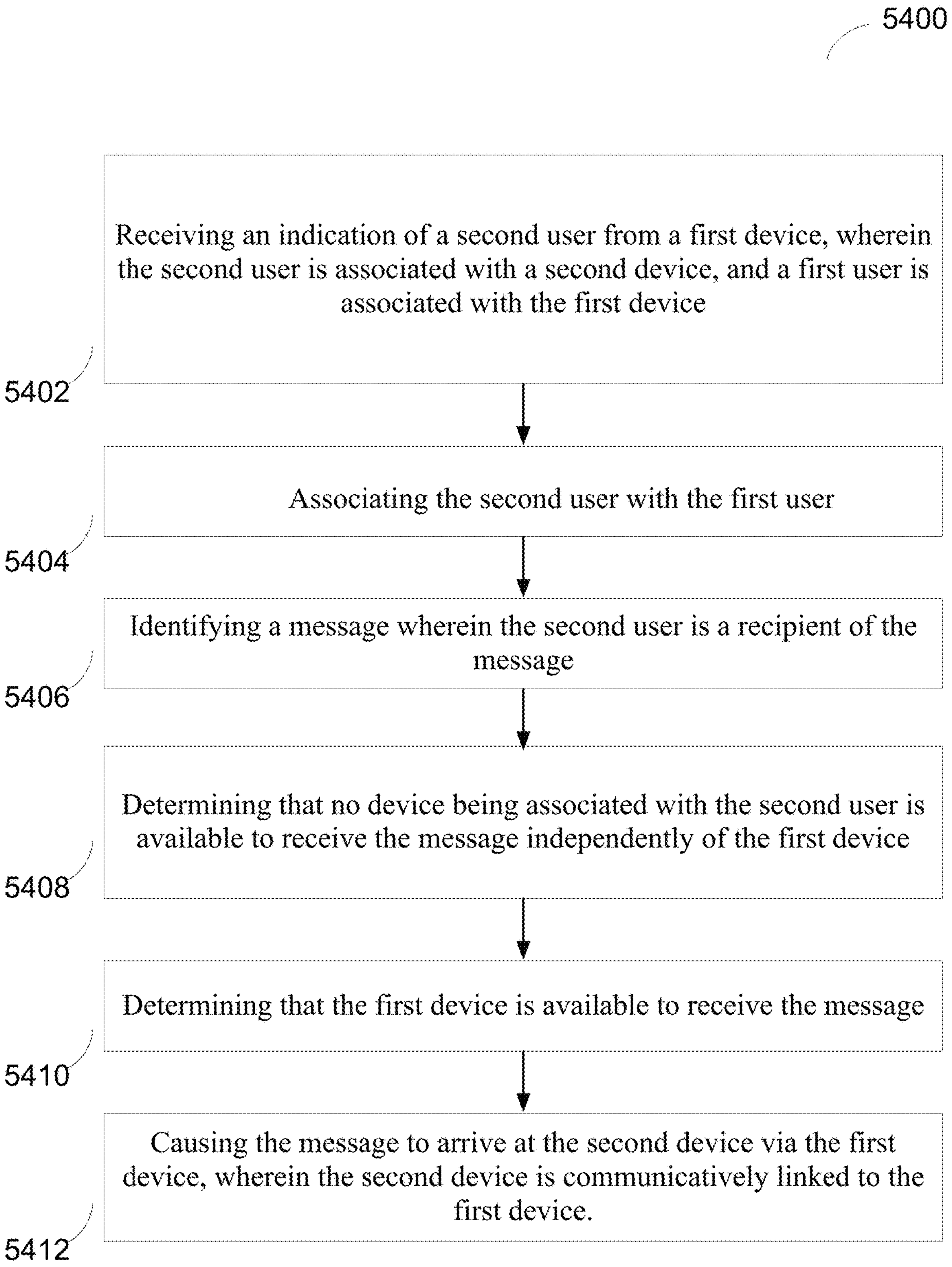
FIG. 54 shows a fourth computerized method in accordance with an embodiment.

FIG. 54 shows a flow diagram of an exemplary process 5400 for relaying a message to a user through an intermediary device of another user where, for example, the process or the steps as described may be performed under the control of one or more computing systems of a service, such as a real-time messaging service for text and multimedia. A computer system may be configured with executable instructions and may comprise a device local to a user, such as a mobile phone, and a device non-local to a user, such as a messaging system. Per the example process 5400, the computer system may receive from a device an indication of another user, such as an identification of the other user, where the device is associated with a user (e.g., an application with the user logged on is running on the device), the other user has access to a device that was, is, or will be known to the computer system, and the device is communicatively connected to the computer system over a network (5402). In one embodiment, the indication of the other user may include identification information that is inaccessible to or un-modifiable by the user and may originate from the other device or from the other user. In another embodiment, the two users may have their own accounts with the computer system or the service, and each user cannot access the account information of another user unless he obtains the logon credential of the account.

The computer system may then associate the other user with the user (5404), for example, for alternative message delivery paths, should the device of the other user become unreachable. For instance, the computer system may receive an incoming message whose recipients include the other user, or identify an outgoing message in a database or another device (e.g., a server), the message having the other user as recipient (5406). In one embodiment, the computer system may receive an indication of the user from the other user or a device associated with the other user, so to permit a device of the user to relay messages addressed to the other user or whose sender includes the other user. In another embodiment, such a message may be specific to or otherwise associated with an application or a type of application that is configured to receive or send the message or messages of similar type. In one embodiment, a device in the computer system, such as a mobile phone of the user or the other user, may receive an indication of a user and present it to the user of the other use for acknowledgment or confirmation so to grant the association of the device with another device associated with the indicated user, for the purpose of relaying messages, e.g., the device being a message relayed device or a message relaying device.

The computer system may detect that there is no device that is reachable and has the other user logged on an applicable program running on the device (5408). In one embodiment, the computer system may detect that there is no device that has an applicable program or application running with the other user logged on, where the program or application is configured to receive or send the message or messages of similar type.

In relation to the association of the other user with the user, it may locate or otherwise identify a device that is reachable (5410). In one embodiment, the computer system may locate or otherwise identify in a database a device that has an applicable program running with the user logged on.

The computer system may then send the message to the applicable program running on the device of the user, which may in turn send via a communications link, channel, or path, the message to the applicable program on the device of the other user, for example, for presentation to the other user (5412). In one embodiment, the message may be stored in a third device, from which the computer system may cause the message to be delivered from the third device to the device of the user, and then from the device of the user to the device of the other user. A compatible program or application, for example, may run on the device of the user and the device of the other user to receive and/or send the message, and is associated with its respective user who is deemed to have logged on the program or application, where the user or the other user may change to another device running another compatible program or application. In one embodiment, the computer system may then cause delivery of the message to or from the other device automatically upon determining that the user or other user is deemed to have logged on the other compatible program or application.

Figure 55:
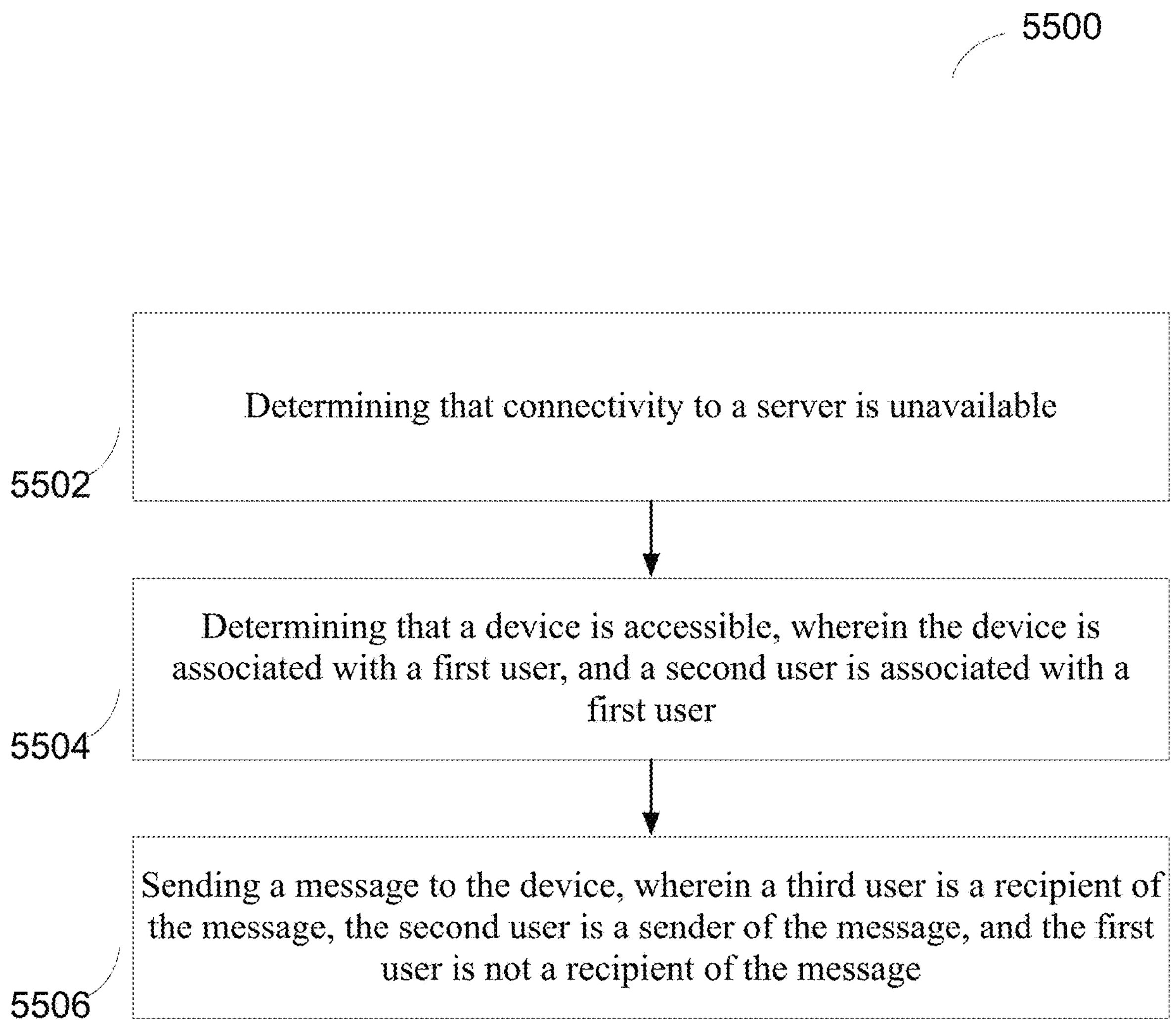
FIG. 55 shows a fifth computerized method in accordance with an embodiment.

In one embodiment, a message-relayed device may detect a message-relaying device and send a message through the latter when it loses communication to the messaging system, or connectivity to the network that may enable it to reach the messaging system. For instance, in accordance with one embodiment, FIG. 55 shows a flow diagram of an exemplary process 5500 for sending a message through a message-relaying device. A computer system may be configured with executable instructions and may comprise a device local to a user, such as a mobile phone, and/or a device non-local to a user, such as another mobile phone local to another user. Per the example process 5500, the computer system may determine that connectivity to a network or a server, e.g., a message system, is no longer available (5502). The computer system may then detect a device that it may reach (e.g., a nearby device that can be connected via a peer-to-peer connectivity or protocol), and that the device belongs to a user that the user of the computer system trusts, or is otherwise associated with an authenticated user that he trusts (5504). For instance, a first application on the computer system may request a compatible second application on the device to provide an identification of its user, which may match the identification information of the other user that the user has indicated to the first application that the user trusts the other user, devices associated with the other user, or a specific device associated with the other user. In relation to identifying the device as being associated with the other user, the computer system may send a message to the device, where the sender of the message is attributable to the user of the system, a recipient of the message is attributable to yet another user, but does not include the other user (5506).

Figure 56:
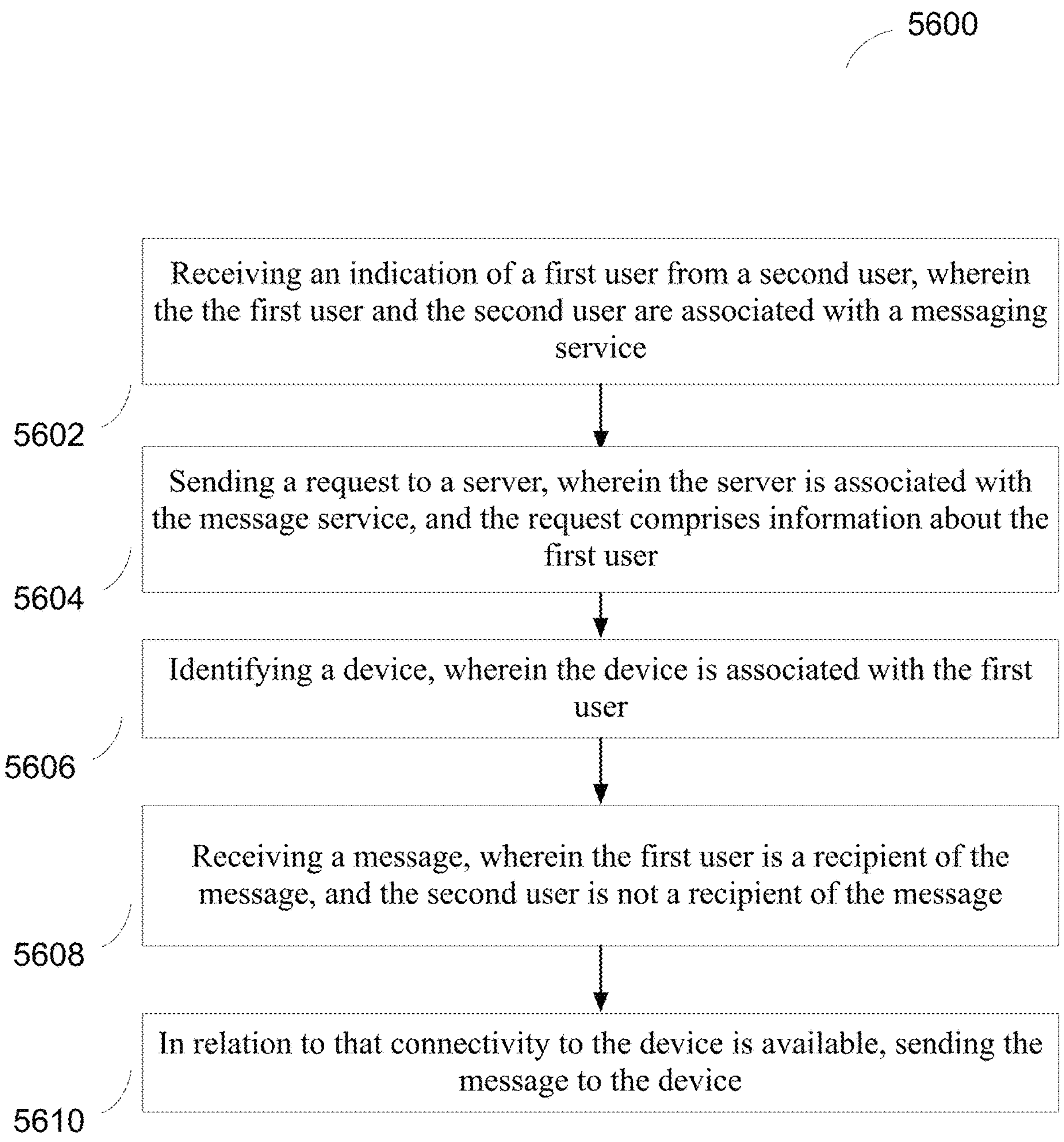
FIG. 56 shows a sixth computerized method in accordance with an embodiment.

In one embodiment, a message-relaying device may detect a message-relayed device or a device that is requesting to have another device to relay its messages. For instance, in one embodiment, FIG. 56 shows a flow diagram of an exemplary process 5600 for receiving a message on behalf of another device where the message is addressed to a user on the other device. A computer system may be configured with executable instructions and may comprise a device local to a user, such as a mobile phone, and/or a device non-local to a user, such as another mobile phone local to another user. Per the example process 5600, the computer system may receive an indication of a first user from a second user, where both users have an individual account with a common messaging service (5602). For example, the computer system may be local to the second user. It may receive from another device a request to use an application on the computer system to relay messages, where the request identifies the first user making the request or otherwise being associated with the other device. The second user may then decide to accept this request based on the identity of the first user, and indicate to the computer system as such. In one embodiment, the computer system may then send a request to a server associated with the message service, where the request identifies the first user whose messages are acceptable to devices associated with the second user for relaying (5604). The computer system may also identify the other device associated with the first user for purposes of receiving from the messaging service the future messages addressed to the first user and sending to the messaging service the incoming messages whose sender is attributable to the first user (5606). For instance, the computer system may receive a message addressed to the first user but whose recipient does not include the second user (5608). In relation to that connectivity to the other device (e.g., one that is local to the first user and has the first user authenticated) is available, the computer system may send the message to the other device (5610), for example, for presentation to the second user. In one embodiment, should connectivity to the other device be unavailable, the computer system may store the message. It may then send the message to the other device when such connectivity is available.

Figure 57:
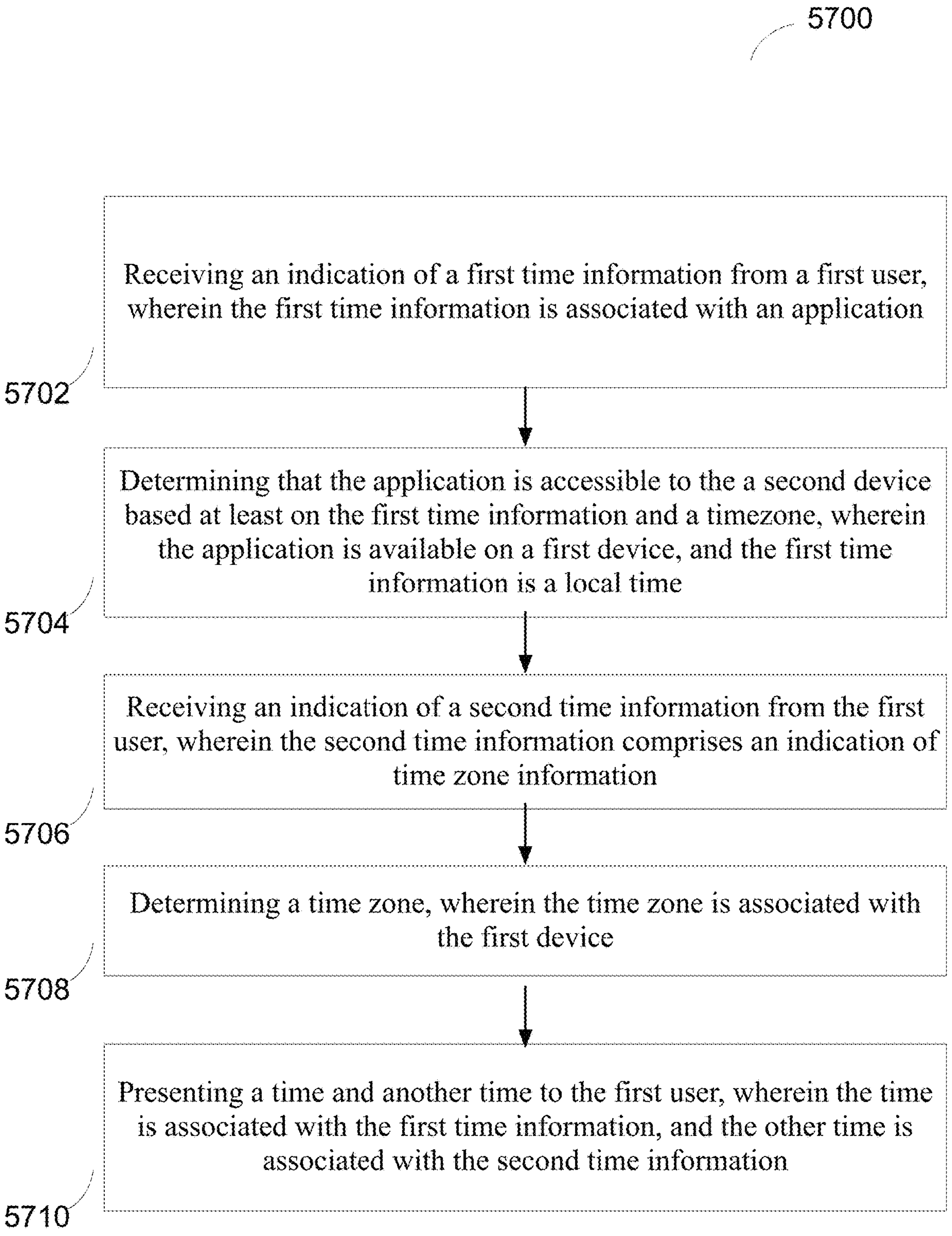
FIG. 57 shows a seventh computerized method in accordance with an embodiment.

The access to a relaying device associated with a user by a relayed device associated with another user may also be controlled or otherwise managed based on time information, e.g., time of day, a time range, a calendar time, or a combination thereof. FIG. 57 shows a flow diagram of an exemplary process 5700 for presenting time information based on a time zone-independent time in a time zone-aware context, where, for example, the process or the steps as described may be performed under the control of one or more computing systems, such as a calendar application on a mobile device. A computer system may be configured with executable instructions and may comprise a device local to a user, such as a mobile phone, and/or a device non-local to a user, such as a messaging system. Per the example process 5700, the computer system may receive an indication of a time information from a user (5702), where, for example, the time information may comprise a time when the computer system or an application on the computer system is accessible to a device associated with another user.

The computer system may then determine that a corresponding application on the computer system is accessible to a device associated with another user based on the time information and a time zone (5704). In one embodiment, the time zone may be associated with the current time zone of the computer system. In another embodiment, the time zone may be associated with the current time zone of the device. In one embodiment, the time information may be a local time pertaining to the computer system. In another embodiment, the time information may be a local time pertaining to the device. In one embodiment, the computer system may determine a time based on a time zone and the time information that is independent of a time zone (e.g., a local time), such that the time reflects the intended time of the time information in the time zone or the context of the time zone.

The computer system may also receive an indication of a second time information, for example, from the user, where the second time information comprises an indication of a time zone (5706). For example, such a second time information may indicate when access to the device by the other device associated with the other user is to begin or to end. In one embodiment, the computer system may determine a time zone to interpret the first time information and/or the second time information (5708). In one embodiment, such a time zone may be the current time zone of the computer system, the device, or the other device.

In relation to a time zone information, a first time information that is independent of a time zone, and a second time information that is specific to a time zone, the computer system may present to the user, e.g., via a schedule, calendar, or time table, an indication, e.g., a view, of a time and another time (5710). For instance, in one embodiment, the time may be determined based on the first time information and the time zone information and the other time may be determined based on the second time information and the time zone, where both the time and the other time are presented correctly in relation to each other and in accordance with the time zone.

Figure 58:
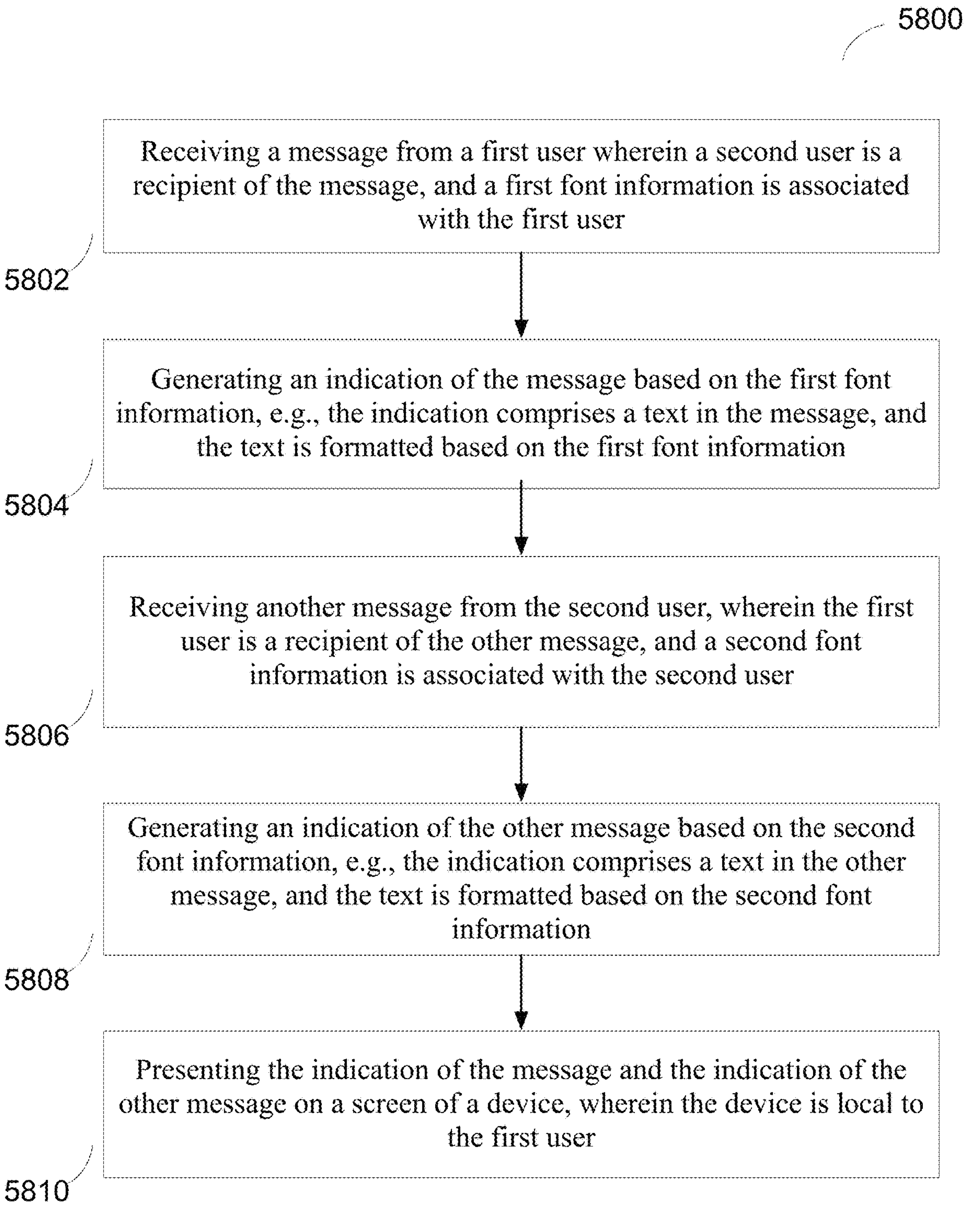
FIG. 58 shows an eighth computerized method in accordance with an embodiment.

The identity of a user of a message-relayed device or a message-relayed application on a device may also be indicated with a personalized font for text information in a message. FIG. 58 shows a flow diagram of an exemplary process 5800 for generating and/or presenting a message based on font information that is specific to a sender of the message, where, for example, the process or the steps as described may be performed under the control of one or more computing systems, such as a messaging application on a mobile device. A computer system may be configured with executable instructions and may comprise a device local to a user, such as a mobile phone, and/or a device non-local to a user, such as a messaging system. Per the example process 5800, the computer system may receive a message whose sender is attributed to a first user and whose recipients include a second user, where a first font information, e.g., Helvetica, is associated with the first user (5802). In one embodiment, such a font information may contain a font that corresponds to the handwriting of the first user. In another embodiment, the first font information and its association with the first user may be maintained at a device associated with the second user, the device having received the message. In one embodiment, the message may comprise the first font information, or a device associated with the second user may receive an indication of a message, where the indication may include the first font information. In relation to receiving the message, the computer system may generate an indication of the message based on the first font information (5804). For example, a text in the message may be formatted in accordance with the first font information.

Likewise, the computer system may receive another message whose sender is attributed to the second user and whose recipients include the first user, where a second font information, e.g., Arial, is associated with the second user (5806). In relation to receiving the other message, the computer system may generate an indication of the other message based on the second font information (5808). For example, a text in the other message may be formatted in accordance with the second font information.

In relation to the two indications each comprising a message from a different user, the computer system may present them to a user via a device screen (5810), where, for example, the two messages are displayed in two different fonts, each being associated with its respective user.

As indicated earlier, the embodiments discussed herein are illustrative of the present invention. The various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of any applicable claim.

Figure 59:
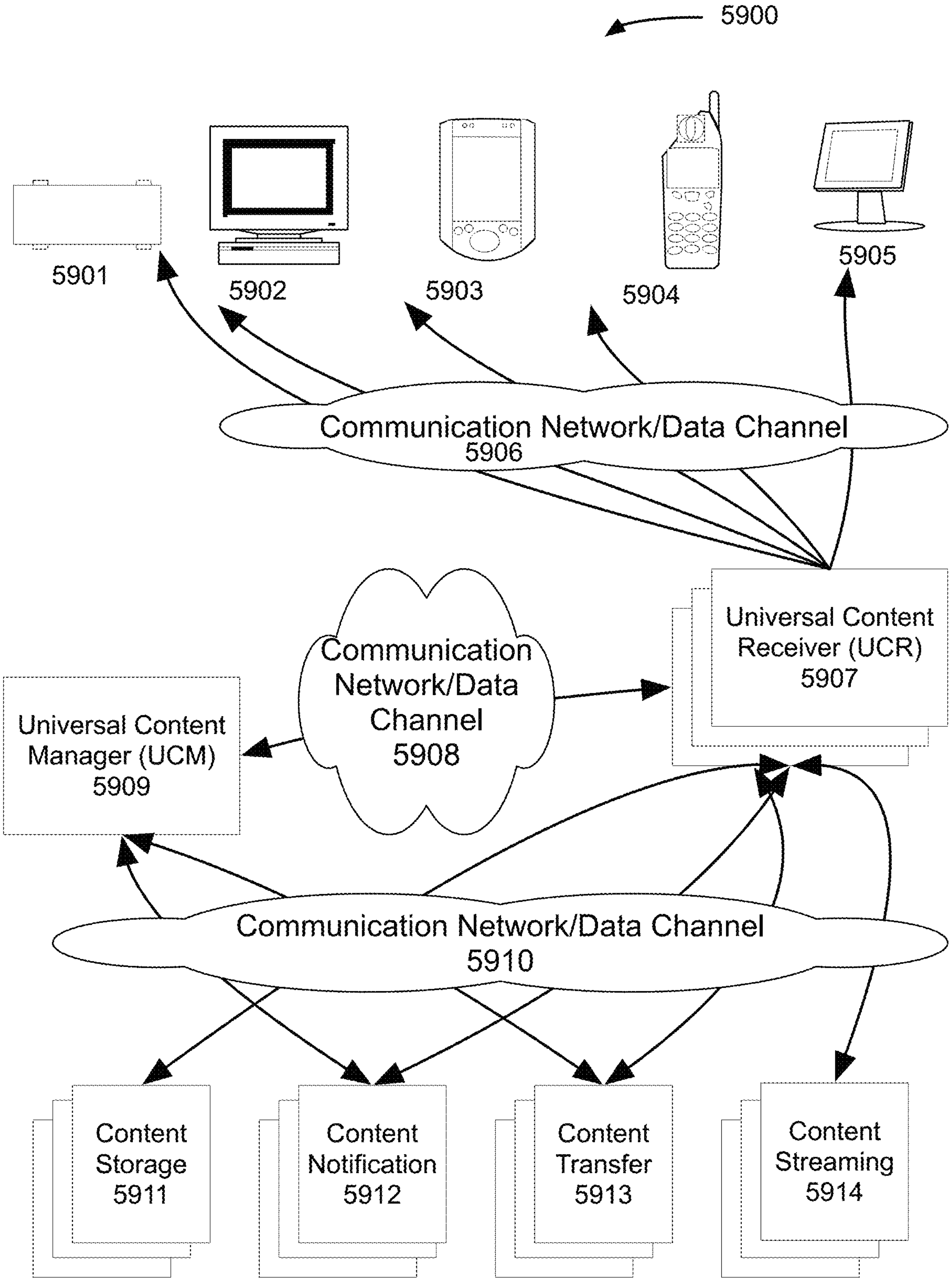
FIG. 59 is a high-level block diagram of a system for automatic content retrieval and organization according to an embodiment of the present invention.

In addition, FIG. 59 is a high-level block diagram of a system 5900 according to an embodiment of the present invention. System 5900 may include multiple sources of digital information or digital content such as content available on storage (5911), a content notification means (5912), a content transfer means (5913), and a content streaming means (5914). Content storage 5911 may be a repository where content is stored. The content may include text, audio, graphics, or video. Content storage 5911 may provide a plurality of means of access, e.g., directory-mounted access like NTFS (Microsoft's NT File System) or network-based access like FTP (File Transfer Protocol). Access to content storage 5911 may require authentication.

Content notification means 5912 may provide a content notification that is not the intended content of interest, but rather is a notice that some content of interest is available. In one embodiment, a content notification may contain a reference to a location of the content of interest and may also include a means for accessing or retrieving the content of interest. For example, a Uniform Resource Locator (URL)

not only can serve as a reference to the location of the content of interest, but also may serve as a means of accessing that content. A BitTorrent™ seed is another example of a means for accessing or retrieving a content of interest. A content notification may be either active or passive. An active content notification is one that is provided asynchronously, i.e., a user does not have to initiate request for receiving the content notification from content notification means 5912, e.g., a message received via Push e-mail. A passive content notification is one that is served synchronously, i.e., a user has to actively initiate a request for retrieval of content notifications from content notification means 5912, e.g., a message received via a POP server (Post Office Protocol). To receive a content notification, a user may need to have an account. Authentication may be needed in order to retrieve the content notification. In some embodiments, a content notification may include instructions that specify an operation to be performed by a processing entity that receives the notification. For example, a webpage may contain a plurality of pictures or their thumbnails, and there may be instructions in the notification to retrieve pictures from the webpage whose title or name has certain keywords. The resulting content of interest can be a photo show comprising the requested pictures. Similarly, several media clips of the same show could be referenced and combined as a single video show in playback. Furthermore, such instructions may include a series of instructions for accessing an online resource, e.g., a webpage, identifying the location of the content of interest included on the online resource, accessing the location by providing authentication information, and retrieving the content of interest available at the location.

Content transfer means 5913 may provide a mechanism to send content of interest from a content provider to a plurality of content receivers. For example, a POP server (content provider) may deliver a video as an attachment to an email, which may be received by an email client (content receiver). The video in this case is the content of interest, and upon completion of the transfer, the entire video is available for playback or other purposes without further support from the content provider. In some embodiments, multiple instances of transfer may be needed for sending a particular content, e.g., a large video file may be broken into several pieces for ease of transfer. In one instance, each piece of the video file may be transferred from different content providers all of whom may have at least a portion of the video file, e.g., BitTorrent®. Similar to a content notification, an active content transfer is one in which the content is transferred asynchronously and a passive content transfer is one in which the content of interest is transferred synchronously. Authentication may or may not be needed for each session of content transfer.

Content streaming means 5914 may facilitate the process of transmitting content in form of a continuous data stream while allowing a recipient to playback, render, or otherwise access the content as it arrives, without the need for receiving the entire content prior to being accessed. This process may include data buffering and data flow control during content transfer from the content provider to a content receiver. On-request content streaming is one where the streaming process starts upon request by a content receiver, e.g. a media server transmitting a media file in "asf" (Advanced Streaming Format) upon a media player's request. Content streaming in broadcast mode is one where content is streamed without any request from a potential content receiver, e.g., a digital television broadcasting system that transmits content-bearing signals over the air, even if there are no receivers processing the signals.

A content provider may perform various functions. For example, an email server may deliver an email message containing only a subject line and a URI to a streaming content. In this case, the email server is a content provider and the email message is a content notification. When the email server sends an email message containing audio, photo, video, documents or non-content notification text, it is performing a content transfer. In addition, a streaming media server that delivers a scheduled presentation may exhibit an on-request streaming behavior.

Furthermore, a single piece of content may be delivered by more than one content provider. Each content provider may identify the content or a portion of the content by unique metadata or provide a file containing both the metadata and the content or portion of the content. This ensures that the content receiver can properly track and reconstruct the content. For example, BitTorrent™ is a file sharing and retrieval protocol that can deliver a large file using multiple content providers. Its metadata file is called a "torrent" file. A message containing such metadata may be regarded as a content notification since the metadata enables a compatible software client to download a particular content of interest even though the content is being provided by multiple sources.

System 5900 may further include a universal content manager (UCM) 5909 coupled to one or more universal content receivers (UCR) 5907 via a communication network 5908. UCM 5909 and UCR 5907 communicate with the various content sources via a network 5910. UCM 5909 may analyze content notifications and provide instructions to its assigned or otherwise associated UCRs 5907 for retrieving or otherwise receiving content of interest and scheduling its playback. UCR 5907 may accept content from various sources, interact with users for content playback and other allowable operations, and process the content for delivery to a destination device, e.g., a multi-media display 5905, a mobile phone 5904, a portable device 5903, a desktop computer 5902, or a Set-Top Box (STB) 5901, via a communication network and/or data channel 5906. UCR 5907 may also serve as a content provider (e.g., to another UCR). UCM 5909 may perform management functions, while UCR 5907 may act as an instrumentality that carries out the instructions from UCM 5909. In addition, multiple UCMs may be used depending on the nature and amount of content to be managed.

Figure 60:
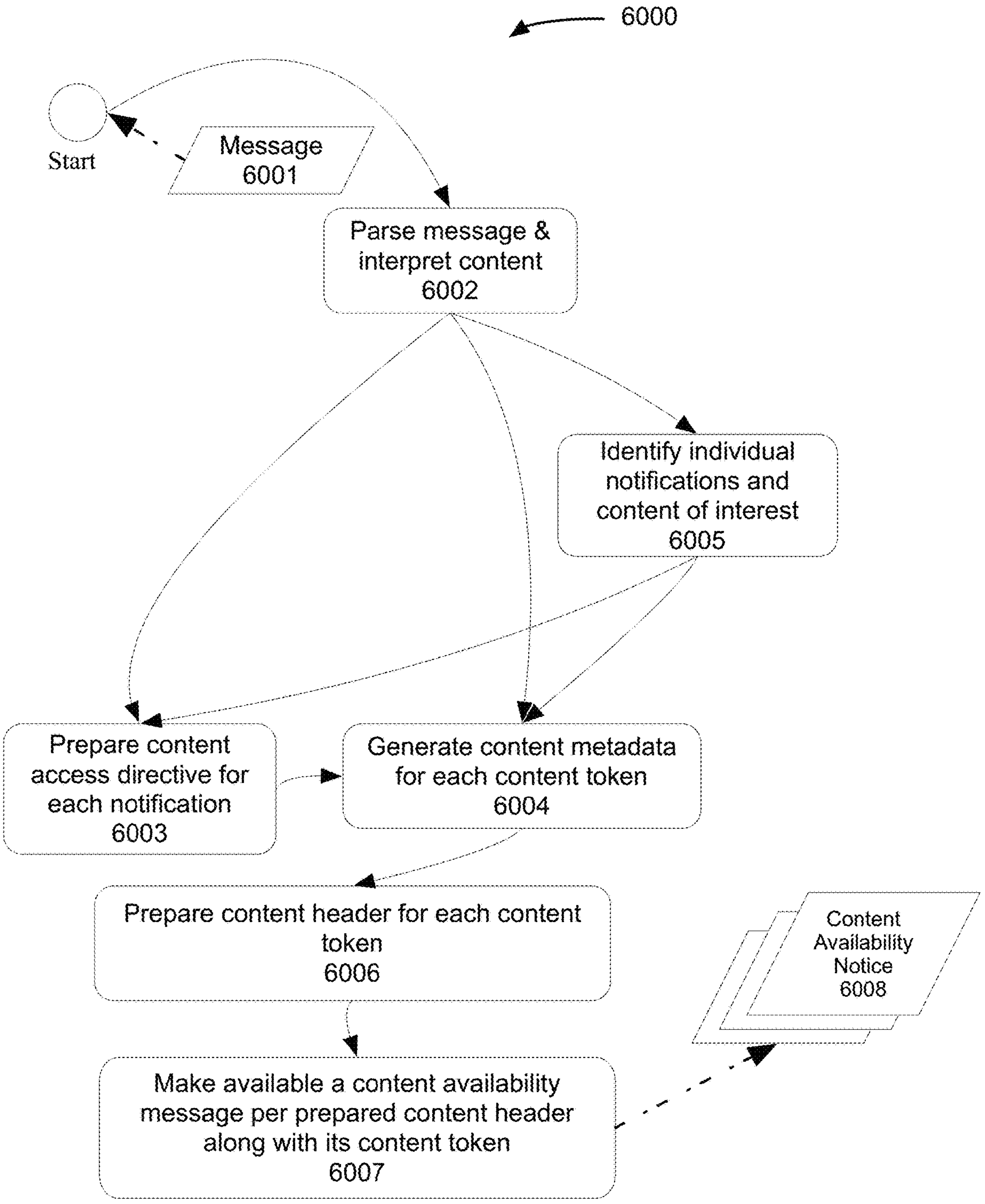
FIG. 60 is high-level flow diagram of a process for processing incoming messages according to an embodiment of the present invention.

Either the UCM or the UCR may process an incoming message. FIG. 60 illustrates a flow diagram of a process 6000 for processing an incoming message according to an embodiment of the present invention. Incoming message 6001 is parsed and its content is interpreted to identify presence of a content notification and/or content of interest (6002). If the message only includes content notifications, then a content access directive, described later, is prepared for each such notification (6003). The message itself is not considered as content of interest. If the message only includes one or more items of content of interest, metadata is generated for each item of content, e.g., media attachments to an email (6004). The primary content of the message, if any, may itself constitute an item of the content, e.g., text message included in an email. If the message contains both content notifications and content of interest, then the content notifications are individually extracted and the items of content of interest are individually identified (6005). Each extracted content notification or identified item of content of interest may be regarded as a content token. A content token is a means for retrieving content for presentation or processing. A content token need not include the actual content of interest, but may simply include a resolvable reference to the content. A content header, described below, is then prepared for each content token (6006). One or more Content Availability Notices 6008 (CAN), each containing the content header and the content token, may be generated for delivery or further processing (6007).

A content access directive (CAD) may include information that may help a UCR access the content of interest. In an embodiment, a CAD may be included in a CAN. FIG. 61 shows an illustrative list of information 6100 that may be included in a CAD. It is to be noted that the types of information shown in FIG. 61 is for illustration purposes only. One skilled in the art will readily recognize that the CAD may include all or some of the information shown. In addition, CAD may include other information not shown in FIG. 61 but which may be useful for accessing and retrieving the content.

It should be appreciated that the specific steps illustrated in FIG. 60 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 60 may include multiple sub-steps that may be performed in various sequences as appropriate to the individual step. Furthermore, additional steps may be added or removed depending on the particular applications. One of ordinary skill in the art would recognize many variations, modifications, and alternatives.

A content header may provide information about the content that is not available through the content token but may be useful for other purposes. For instance, the content header may provide metadata about the content for preview, as well as data useful for operation and maintenance involving both the header and its associated content. A content token may include the actual content of interest and/or a content access directive. FIGS. 62A and 62B illustrate a structure 6200 of a content header according to an embodiment of the present invention. It is to be noted that the various data items identified in structure 6200 are for illustrative purposes only. A content header may have more or less data items than those shown in FIGS. 62A and 62B. In some embodiments, a content header may have different data items than those illustrated.

Header Reference data item 6201 may specify a unique identifier for a content header. Any processing entity wanting to refer to the content header in question may use a Header Reference value to do so. For example, Header Reference value may be derived using the timestamp of header creation, concatenated with delimiters and other relevant data and a sequence number so that an identifier so generated would be unique within a system or application. Secondary Reference data item 6202 provides distinction among different pieces of content of interest sharing the same Header Reference value. In an embodiment, an individual content header may be identified using both Header Reference and Secondary Reference if the Secondary Reference has a valid value. Referrer data item 6203 may identify the sender of content notification (e.g., the name or email address of the person sending the notification) or its provider (e.g., the name or URI—Uniform Resource Identifier of the person or organization that offers the content, as in the case of content from a subscription service). In addition, Referrer data item 6203 may notify the content recipients about the referrer of the content and allow the content recipients to perform content selection and filtering.

Addressee data item 6204 may identify the messaging account or a user's aliases from which a content notification is received or the messaging account that receives the content notification. For example, a user of UCR may have multiple email accounts and contact numbers associated with his designated UCR. The user therefore may be able to select and filter content based on his different recipient addresses. Content Type data item 6205 may identify the primary media type of the content of interest associated with the content header. A primary media type may identify an operational profile in relation to the content in question e.g., a primary media type of "text" means a user would be able to view the content as a series of pages. In some embodiments, a textual content could also include zooming and text-to-voice operations. A primary media type of "photo" may include any graphical presentation along with optional audio annotation, such as a power-point presentation involving a series of slides and audio annotation per slide and/or background music. The present invention is not limited to any particular media types nor dictates their supported features.

Content Privacy data item 6206 may specify whether the content of interest may be shared with other UCRs or users of UCRs for whom the content was not originally sent. For example, a piece of content retrieved from a public website may be designated by default as "public". In this instance, a system may make the content available to other UCRs or users of UCRs even if they are neither the addressees nor related to the addressees in any way. Content Privacy data item 6206 may be used to protect content privacy while allowing public content to be made available or recommended to other UCRs or their users based on some criteria. The criteria may be system-defined or user-specified, e.g., interest matching, popularity rating, and so on. Content of uncertain privacy level may be kept private until the system or the content notification sender provides a content rating. For example, a content notification sender may use certain indication, e.g., "privacy—make public" or "privacy—make group" markup tag in his content notification message. The system may then ascertain the intended privacy level of the content in the notification by analyzing the tag.

Content Primary Title data item 6207 may provide a title to the content. In the absence of data for the Content Secondary Title data item 6208, it may serve as the only title. In instances where content primary title 6207 is insufficient to provide a full title, Content Secondary Title 6208 may be used. For example, a piece of content may be fetched as part of a standing retrieval order as specified in a content access directive. The content may therefore be one of many that are retrieved under the directive. As such, the primary titles of all these pieces of content may share the same description denoting a collection (e.g., "My Blog"). Individual pieces would then have different secondary titles (e.g., "1-1-2008 Happy", "1-8-2008 Gloomy" and so on).

Content Availability data item 6209 and Availability Expiry data item 6210 may specify the time and date of the availability of the content for playback or streaming. The availability time may be different from the retrieval availability and expiry specified in a content access directive. Content Availability data item 6209 is concerned with availability for playback or some other processing while the retrieval availability and expiry is associated with the availability of the constituent file(s) that make up the content of interest for retrieval. For example, a UCR may only permit the playback of a piece of content a day or two after its retrieval availability time. In addition, content Availability 6209 may also specify a content delivery mode. For example, on-demand delivery means the content may be available for playback or some other processing after the date and time of availability until some expiry time and data. Broadcast delivery, on the other hand, indicates that the content may only be available at the specified date and time, and not any time after.

Retrieval Mode data item 6211 may specify a method for obtaining the content once it is available. In some embodiments, a UCR may download the content in its entirety before its scheduled presentation or based on a user request. In other embodiments, the UCR may record the content while receiving the streaming data for the content, and later present the content for playback based on a schedule or upon user request.

Operational Capabilities data item 6212 may specify user operations that may be applied to the content through a UCR or some other means. For example, a user may not be allowed to save a piece of content of interest, or to fast-forward a broadcast show. The restrictions may be administrative or technical in nature. Size data item 6213 may provide information about the length of time or quantity in relation to content playback. For example, a video or audio show may have time as the size, while a photo or textual show may have the number of photos and pages as the size. If the content includes multiple pieces of information having different types of sizes, e.g., time and quantity, then the size for the content may or may not include the sizes of the multiple pieces of information.

Playback Schedule data item 6214 may specify the schedule for playback in calendar or relative time. Calendar-time scheduling is similar to what one may specify in Video Cassette Recorder (VCR) to record shows of interest. Relative-time scheduling may allow a first piece of content of interest to be shown in relation to a second piece of content so that the first content may be played back after lapse of some period of playback of the second content. In some embodiments, the system may suspend the playback of the second content or show it in parallel with the first content, e.g., a split screen or picture-in-picture viewing. In some embodiments, Relative-time scheduling may provide time control for playing secondary content such as independent background music or advertisements in relation to some primary content in playback.

Destination List data item 6215 may specify the content organization list to which the content of interest belongs. In some embodiments, pre-defined content organization lists may include but are not limited to "all", "on-demand", "scheduled", "rental", and "saved." The "all" may list all the contents or shows. The "on-demand" list may group content that may be played upon a user's demand (up to some expiry, if any). The "scheduled" list may group content that is scheduled to play at some specific time. The "rental" list may group content that is available through rental. The "saved" list may group shows that have been saved to some local storage or shows available through a UCR. Other custom lists may be defined by a user or a system. An example piece of content with no destination list value in its content header may be a piece of advertisement.

Pre-Show Content 6216, Post-Show Content 6217, and Intra-Show Content 6218 are data items that may specify the series of header references (as well as secondary references if applicable) of the content to be shown at the beginning of the playback of the current content of interest, at the end of playback, and during its playback respectively. In some embodiments, the timing of these pre-shows, post-shows, and intra-shows may be specified in the content header or using Playback Schedule data item 414 in the content headers of these shows.

Figure 63:
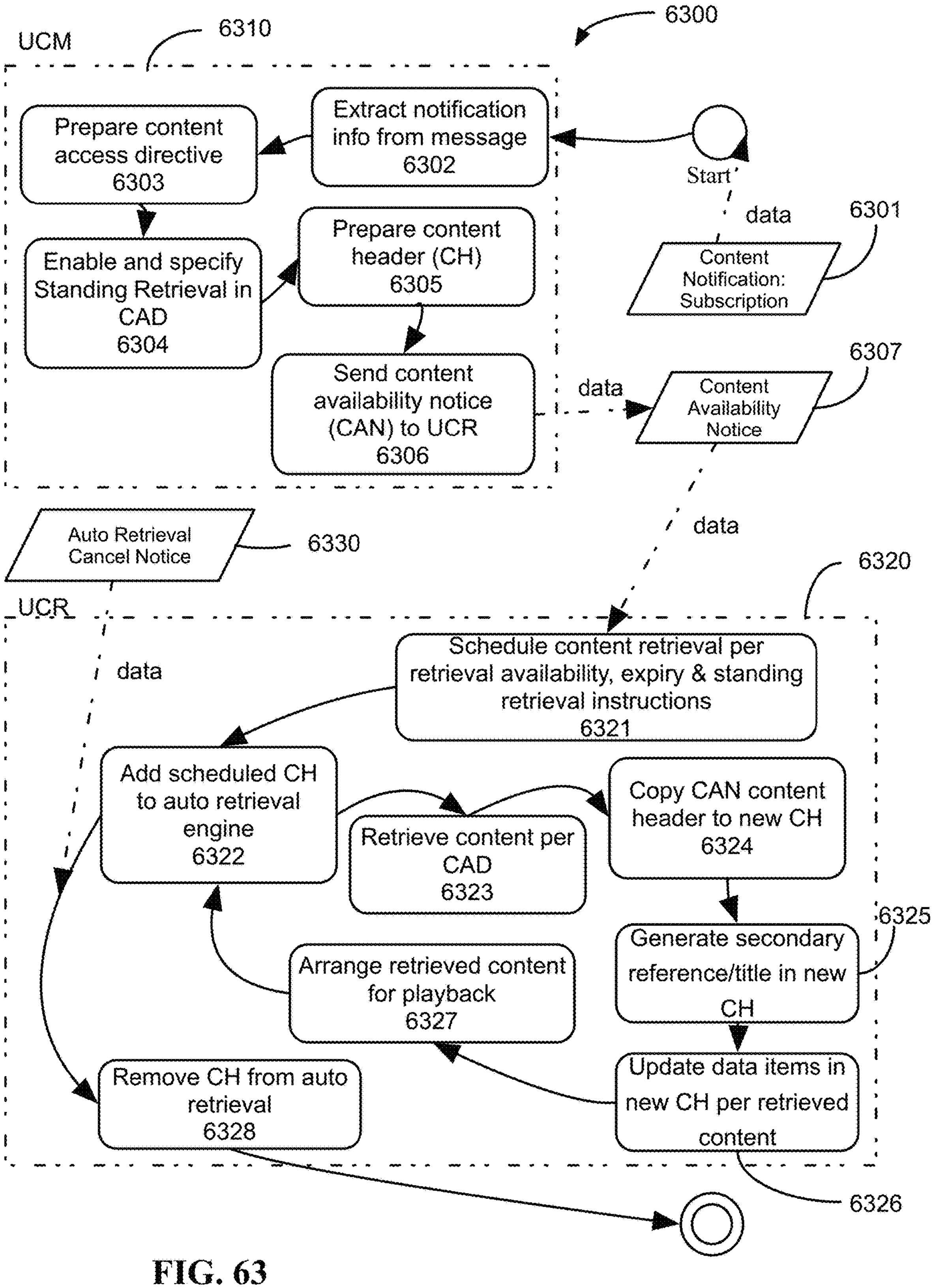
FIG. 63 is a high-level flow diagram illustrating a content retrieval process according to an embodiment of the present invention.

FIG. 63 is a high-level flow diagram of a process 6300 for retrieval of content according to an embodiment of the present invention. In this embodiment, a UCM 6310 is a content notification receiver and a UCR 6320 is a content retriever. In this embodiment, UCM 6310 receives a message containing a content notification (subscription) 6301 (e.g., a URL such as http://rss.cnn.com/rss/cnn_freevideo.rss). UCM 6310 processes the incoming message and determines that there is a content notification and no content of interest (6302). Accordingly, UCM 6310 prepares a content notification in the form of a Content Access Directive (CAD) (6303). In particular, UCM 6310 enables the Standing Retrieval data item in the CAD and specifies the rules and constraints for the retrieval (6304), e.g., the frequency for polling the RSS feed identified by the URL. UCM 6310 prepares a corresponding content header and creates a Content Availability Notice (CAN) 6307 (6305). UCM 6310 sends the resulting CAN to UCR 6320 (6306). In some embodiments, a single CAN may be sent in multiple portions or packets and re-assembled upon arrival at its destination, or may be transferred as a stream of data over a data connection.

Upon receipt of CAN 6307, UCR 6320 schedules content retrieval operations in accordance to retrieval availability, expiry, and the standing retrieval instructions (6321). An auto retrieval engine or some processing entity can be responsible for executing retrieval operations autonomously until expiry, until some schedule change or external request, such as an auto retrieval cancellation notice (6322, 6328, and 6330). For example, an auto retrieval cancellation notice could remove the content header of a standing retrieval from the auto retrieval engine so that the engine would no longer retrieve, per schedule, any subsequent content associated with the content header. At the scheduled retrieval time, UCR 6320 or its auto retrieval engine may retrieve the content of interest in accordance with each CAD of standing retrieval (6323). Each piece of newly retrieved content may include a new content header with initial data item values derived from those in the original CAN (6324). Each new content header may then be updated in accordance with its associated content, e.g., a secondary reference for the new header and a secondary title for the new content (6325, 6326). After the preparation of the metadata for the newly retrieved pieces of content, UCR 6320 may now arrange them for playback (6327), for example, making them available on the "on-demand" content organization list accessible to a user who may later request their playback.

UCR 6320 of standing retrieval may want to report information about the content it retrieves to UCM 6310. UCM 6310 may use this information to maintain a library or catalog of content available at UCR 6320. If the UCR is replaced, the UCM may then simply re-populate the content organization lists at the new UCR. This feedback mechanism may be hard-coded or may be configurable. The feedback request may be sent by UCM 6310 to UCR 6320 as part of Content Availability Notice or as a separate directive. The feedback request may include feedback on an individual piece of content basis, or for content, whose metadata matches some criteria. The feedback request may further include feedback-enabled pieces of content, information about metadata that may be communicated to the UCM (e.g., a MBS, Message Breakdown Summary, which is described below), and decision about whether the actual content is to be delivered to the UCM.

Figure 64:
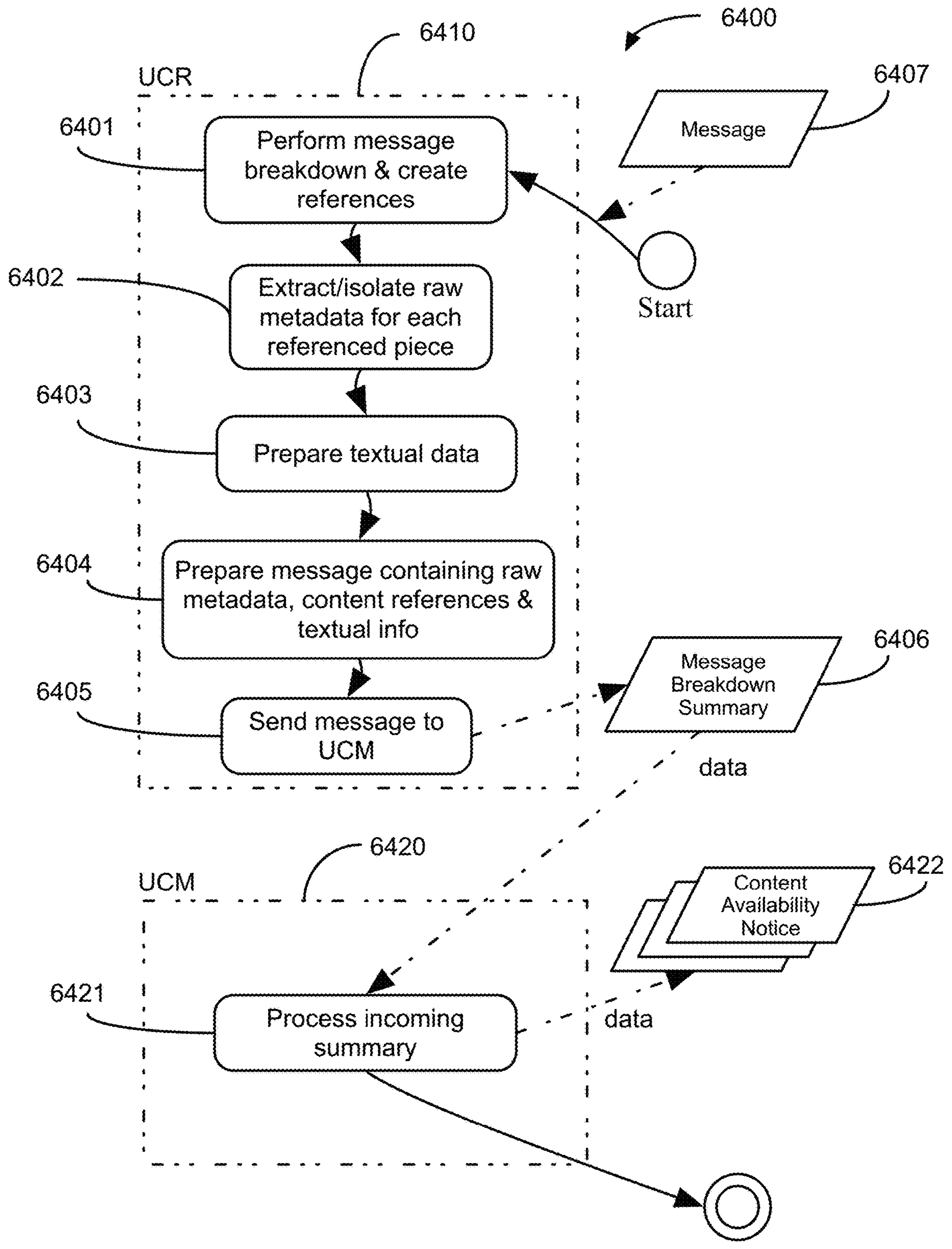
FIG. 64 is a high-level flow diagram illustrating data flow in the instance where a universal content receiver is a primary message receiver according to an embodiment of the present invention.

In some embodiments, a UCR may also serve as a primary message receiver. For example, a UCR may be equipped with a mobile telephony and data communicator or an interface to a telephony system so that the UCR can accept voice, SMS, and multi-media messaging service (MMS) messages directly instead of the messages passing through a UCM first. In some embodiments, non-textual messages such as voice and images suspected of containing content notifications may be converted to text and the parsing of the resultant text may also yield content notification information. FIG. 64 illustrates a scenario where the UCR serves as a primary message receiver.

It should be appreciated that the specific steps illustrated in FIG. 63 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in. FIG. 63 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 64 is a high-level flow diagram of a process 6400 for automated content retrieval according to an embodiment of the present invention. As mentioned above, in this embodiment, UCR 610 acts as a primary message receiver. The UCR performs a breakdown of an incoming message 6407 to identify and isolate individual pieces of content (6401). The UCR creates a reference for each piece of content. It extracts or otherwise isolates raw metadata (e.g., filename for a video file attachment) for each referenced piece of content (6402). For pieces of content that might contain content notifications, e.g., a text body, a photo of barcode, or a voice recording of URL, the UCR can convert the content notification information into textual data (6403). Parsing the message in this manner may produce references to individual pieces of content, metadata associated with the individual pieces of content and textual data representing the content, if any, for content notification extraction (6404). A message containing this information is referred to as a Message Breakdown Summary (MBS) 6406, which the UCR sends to a UCM (6405, 6420) for processing and analysis (6421). After the processing and analysis, the UCM creates a plurality of Content Availability Notices (CANs) (6422). In an embodiment, process 6000 illustrated in FIG. 60 may be used by the UCM to process the MBS. One of the advantages of this embodiment is that the creation of the MBS by the UCR distributes or reduces the workload of the UCM for analyzing messages to extract information about the content. Instead the UCM may refer to the content references in the MBS to create CANs.

It should be appreciated that the specific steps illustrated in FIG. 64 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 64 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 65:
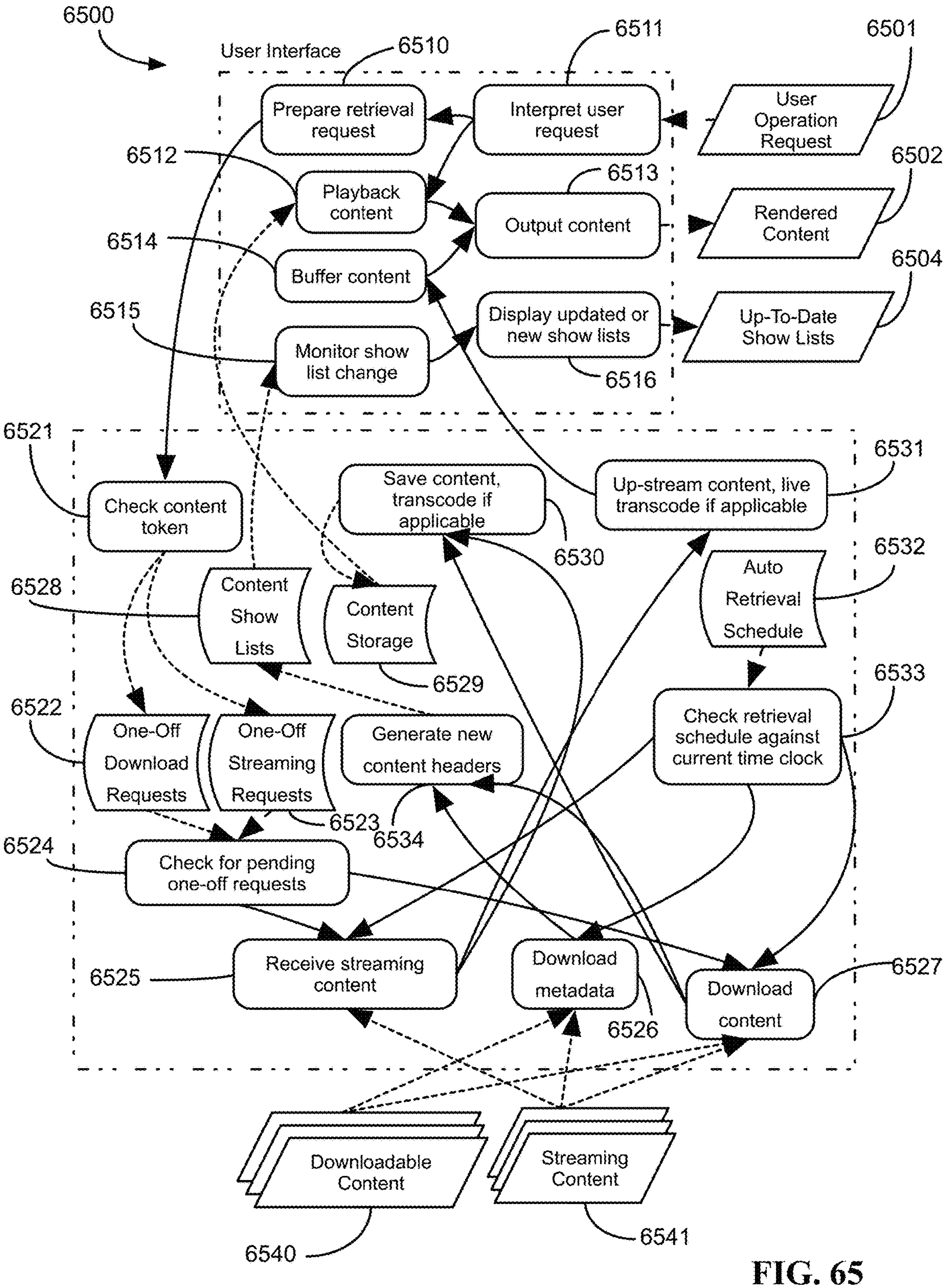
FIG. 65 is a high-level block diagram illustrating a content handling mechanism within a universal content receiver according to an embodiment of the present invention.

FIG. 65 is a high-level flow diagram of a process 6500 that may be implemented in a UCR for processing content of interest, according to an embodiment of the present invention. In this embodiment, the retrieval schedule of the UCR gets populated with retrieval information for one or more pieces of content (6532). In this embodiment the content of interest may be downloadable content 6540 or a streaming content 6541. The retrieval information may be received by the UCR based on content subscriptions mentioned or otherwise derived from messages, direct setup through UCM, or some other means. Depending on the instructions in the Retrieval Mode data item or its equivalent in the content header (6533), for a new piece of content, the UCR may download just the metadata for the new piece of content (6526), download the entire new piece of content (6527), or trigger the delivery of the piece of new content as streaming data (6525). In one embodiment, the UCR may also download and store a small portion of the digital content. The small portion of the content may be used later as initial buffered or cached content during playback of the digital content. One of the advantages realized by this technique is that it eliminates the initial wait time usually associated with receiving a streamed content. The new content metadata so retrieved may generate a new content header (6534), and the relevant content lists 6528 may be updated accordingly. A user interface of the UCR would monitor the changes in the content list (6515). The user interface may display or otherwise make the updated content list available to the user (6516, 6504). A newly downloaded piece of content of interest (6527), which is not yet known to the UCR and the UCM, may also result in a new content header being created (6534). The relevant content list may be updated and the updated content list may be made available to the user as described above. In addition, the downloaded new content may be saved to a content storage (6529) ready for playback upon user request or per playback schedule. The content data may be transcoded to enable presentation of the content on a destination presentation device. For example, the downloaded content may be in MPEG2 format but the output display device can only display analog video. In such instance, the MPEG2 content may be converted to analog video for display on the display device. There are two modes of transcoding, e.g., batch mode and live mode. In the batch mode, the entire content data is transcoded before any of the content is made available to the destination presentation device. In the live mode, the content is immediately made available as soon as there is enough portion transcoded (usually defined by some content buffering criteria). In one embodiment, for downloaded content data, the batch mode transcoding is usually preferred over the live mode.

Furthermore, when the UCR receives a streaming content (6525), the streaming content may be saved in a content storage when the streaming content has been received in its entirety. In one embodiment, the streaming content is saved in the content storage as a plurality of media files making up the content. In an embodiment, an apparatus embodying the UCR may have an external content storage, which may be accessed via a network. These media files can be available for playback similar to those of the downloadable content. In an embodiment, the streaming media may be transferred upstream for live transcoding (6531) and further buffered (6514) to be output (6513) for display (6502) or further processing. In another embodiment, the downloaded content data would also go through transcoding if applicable (6530).

In one embodiment, playback content 712 may be obtained via the content storage 6529 for delivery or presentation through the user interface.

A user may instruct the UCR to either download content, retrieve and play content, or play a content available on a content storage (6501). A user may choose a particular content using the content header. For instance, the user may want to save to a storage device, a copy of content for which there is only metadata available at the UCR (e.g., content with a Content Access Directive as a content token). A user interface of the UCR would receive and interpret this user request (6511), and may prepare a retrieval request to retrieve the chosen content (6510). The UCR may check the content token (e.g., a Content Access Directive (CAD)) of the content of interest for instructions on how to acquire the content (6521). Both the Access Protocol and Content Format data items in the CAD or their equivalent may indicate if the content data is for download or streaming. The resulting retrieval request would trigger the UCR to either download the constituent content file(s) (6522, 6524) or to request and receive a data stream (6523, 6524), based on the CAD. The retrieved content data may be saved to a content storage, with transcoding performed, if applicable. One of the advantages of separating the retrieval requests for download from the retrieval requests for streaming is that in general, retrieval requests for streaming usually have a higher priority than the retrieval requests for download. Hence, a default prioritization can be implemented using this distinction.

It should be appreciated that the specific steps illustrated in FIG. 65 provide a particular method of processing content of interest according to an embodiment of the present invention. Other sequences of steps may also be performed according to alternative embodiments. For example, alternative embodiments of the present invention may perform the steps outlined above in a different order. Moreover, the individual steps illustrated in FIG. 65 may include multiple sub-steps that may be performed in various sequences as appropriate to the individual step. Furthermore, additional steps may be added or removed depending on the particular applications. One of ordinary skill in the art would recognize many variations, modifications, and alternatives.

If the user requests to watch a currently running broadcast, the UCR can request and receive the streaming content per the CAD. The incoming data stream (or the transcoded stream if transcoding is performed) can be output to the user after appropriate content buffering time, if any. The Continuous Feed data item in the CAD or its equivalent may correspond to the broadcast in this instance. In another instance, the user may choose to watch a show, which happens to be already available in the content storage. Assuming the content is already transcoded or otherwise ready to be presented, the UCR can perform playback of the show for the user with the content storage being a means of providing the content source.

It is to be noted that the user need not know which content (or which show) on the content (or show) lists is downloadable and which is of streaming media type, or whether the actual content is already available in the content storage. If the user wants to keep or make a copy of the content of interest within or outside the UCR, he may issue a command or press a "record" button on a device embodying the UCR. The time taken by the saving process may be of secondary concern to the user. As such, when a user requests to play a show that is available on a show list, that show may be downloaded, received as streaming data, or may be played from the local UCR storage. From the user's perspective, he may be more interested in whether a particular show is on-demand or time-bound rather than whether the show is played back from a local storage or from streaming data. As discussed above, streaming content data may still be saved as a downloaded file for later "on-demand" viewing, whereas for a time-bound and specific presentation, the show may be rendered from an incoming data stream through some content buffering should the user want to watch it as soon as it becomes available. In the other words, a UCR (or its controlling UCM or its proxy) may decide to download a particular content file or trigger a series of incoming data streams for reasons other than serving explicit user request.

In an embodiment, the UCR may continually download several pieces of content at any given moment and continuously receive multiple concurrent streams of data (e.g., broadcast channels) without any user request or pre-defined schedule. The choices of such download content and data streams may be based on a user's preference of topics, his channel or content viewing history, or a desire to eliminate or reduce the initial streaming wait. In an embodiment, the system may support only one means of content notification and submission (e.g., email). There are many ways to send a message including the content of interest, content notification, or both to a UCM or UCR. The present invention does not preclude any means of content notification and submission. For example, a UCM may provide a webpage allowing a user to submit such a message. The user may identify a recipient UCR or a group of recipient UCRs (e.g., by its individual ID, group ID, or a registered UCR user or user group), and create a message. The message may be parsed for content notification while being treated as content of interest itself. In addition, a form-based input page may list specific fields for entry by a user, e.g., content location or its metadata location, content availability and expiry, or whether the content is on-demand or time-bound with specific time availability. Furthermore, additional media files may be uploaded as content of interest and associated with the message being submitted. Such uploaded content data would be available to the intended recipient UCRs, similar to the external content data to which a UCR can have access through a Content Access Directive.

In an embodiment, a message may be submitted to the UCM or UCR by any means of, wireless or wire-line communication. The message may be in the form of text, audio, video, or graphics. The message may include the content of interest, or a content notification, or both. In some embodiments, a user interface for the UCM or the UCR may receive user input and process the user input similar to an incoming message. A message including content location (e.g., URL), metadata (e.g., torrent), content name (e.g., a text string or URI), or some other metadata in a content notification may be sufficient for the UCM or the UCR to attempt retrieval of associated content. In some embodiments, only a portion of the information available in a content access directive or a content header may be required by the UCM or the UCR to retrieve or organize the content. For example, if a title for the content to be retrieved is not provided, the content location or some other text such as "no title" may be used instead to designate the content.

In some embodiments, a user sending a message (sender) need not explicitly address a recipient UCM or UCR, e.g., using an IP address or a unique ID of a recipient UCM or UCR. The user sending the message may send an email containing content of interest and content notifications to a regular email address for a recipient user (recipient). The recipient user's email address may be registered with a UCM and associated with a particular UCR. In this instance, the UCM or the UCR may periodically poll the recipient user's email account that is associated with the email address for new email, and analyze the received emails for content of interest and content notifications. In other embodiments, an explicit address or contact number for a UCM or UCR may be used, e.g., a URL or a mobile phone number. In the instance where a message is sent to a UCM or its proxy that has more than one affiliated UCR, then additional information may be specified in the message to identify the intended UCR(s). The sender's email address and/or mobile phone number can be used for authentication purposes. A list of authorized sender's may be in a sender authorization list. The sender authorization list may be maintained per UCR or per UCR group. The sender authorization list may be managed by authorized personnel. In an embodiment, the sender authorization list may be accessed through a dedicated website. In addition, each authorized sender may be given customized permissions for playback, scheduling, and the level of access to the UCR or the UCR for that includes the recipient's existing show lists and schedules. For instance, one authorized sender may be permitted to submit content that would play automatically as soon as possible or at a specific time preempting any show currently in play, while another sender may not be given that same level of access. In an embodiment, an authorized sender may be able to view the existing show schedule on the UCM or UCR of a recipient user, while another authorized sender may only view empty schedule slots, and yet another authorized sender may have no visibility to the schedule.

In some embodiments, a UCR group may be set up so that content notification and content submissions for a member UCR can be visible and available to all members in the group. The setup to enable the sharing among a group of UCR may be accomplished in many ways. In an embodiment, a group email address or an instant messaging group may be set up and given the authority to send messages to each UCR in that UCR group. The group email address or the instant messaging group may include a contact email address or an instant messaging account identity for each UCR in the UCR group. Upon receipt of a content notification or submission by the group email address or upon its availability through the instant messaging group, all the UCRs in the UCR group may receive a copy of such notification or submission via the group distribution mechanism inherent in group emailing and instant messaging services. It is to be noted that the method mentioned above is for illustrative purposes only and one skilled in the art will recognize that other methods are possible to implement this functionality. Such methods are not outside the scope of this invention. Some of the other methods that may be used to implement this functionality may include use of a messaging middleware such as Java Messaging Service (JMS) that may provide a topic for UCRs for subscription. In an embodiment, a JMS client may accept content notifications and content submissions and make them available under the topic so that all subscriber UCRs can receive the content notifications and content submissions.

In an embodiment, a UCR may support a user account along with many aliases associated with that account, e.g., multiple email addresses that belong to the same user account. A single UCR may support several independent user or subscriber accounts and each user or subscriber may have his own private and public content. A user may be authenticated by the UCR, its associated UCM, or some other means before he can have access to the private content destined to the user account. The user may have access to the public content destined to any of the users supported by the UCR. Such public content may be made accessible, by default, to anyone having access to the UCR without any initial authentication.

In an embodiment, a UCR may also support a "guest" and/or "nomad" mode. A guest user may be a UCR user who may have a "home UCR" where content of interest destined to him may be delivered by default. If the guest user attempts to view or otherwise obtain his content of interest through another UCR, that UCR would normally deny him access. A UCR may support such a guest user in a guest mode and (after some authentication) may provide the guest user access to his content while blocking access to all content and metadata of other users supported by that UCR.

A nomad user has no home UCR, but may be authorized to operate a UCR that supports either the guest mode or the nomad mode, e.g., a hotel may provide every suite with a TV set embodying a UCR operating in nomad mode. In a nomad mode, a UCR will store a nomad user's content and metadata only for the current session. When the nomad user logs off or otherwise disconnects from the UCR, the UCR may purge the nomad user's content and metadata after a predetermined time. In an embodiment, the nomad user may interact with a webpage or a web browser associated with a centrally managed UCR to access/retrieve his content. The retrieved content data for presentation may reside on the centrally managed UCR or on the computing host where a centrally managed UCR proxy resides, e.g., the computer where a UCR embodying a Web browser is running on. One or more UCRs may act as a group to provide service to the nomad user. For example, a nomad user who is authenticated as a member of a UCR group may be able to share information with other members of the UCR group.

There are numerous methods for adding content notifications to a UCR. As described above an email message or an SMS message may include information needed to retrieve the content of interest or subscribe to a content broadcast. In some embodiments, the information needed to retrieve the content of interest or subscribe to a content broadcast may be embedded in a barcode referred to herein as Content Notification Embedded (CNE) barcode. The CNE barcode may be displayed to a user and the user may use a portable device to capture a picture of the barcode, the portable device may process the barcode to extract content notification information and send the content notification information as a textual message to an email address or phone number from a messaging account associated with the intended UCR. In an embodiment, the CNE barcode may further contain an online address or phone number for a central registration service. The portable device can scan the barcode and send the embedded information to the central registration service. The central registration service may use the identification information of the sending account, e.g., a phone number of a mobile phone, to identify the intended UCR or UCR group. In addition, a separate CNE barcode may be made available for the removal of content subscription. For example, a CNE barcode along with a "to add" barcode would together constitute an instruction to add a content notification and CNE barcode along with a "to remove" barcode would represent an instruction to remove a content notification. Alternatively, a single CNE barcode would add a content notification, while another single CNE barcode would remove the content notification for the same content.

In another embodiment, the portable device may capture an image of the CNE barcode and send it to the central registration service without first extracting the embedded information. The central registration service may process the image of the CNE barcode to extract the content and/or the content notification information. In this embodiment, the central registration service need not have any optical scanning or capturing capability.

Another method of adding content to a UCR is by use of authorization voucher. An authorization voucher may include text strings, which may be used to identify a UCR, a UCR group, or their users. The voucher may be time-limited, usage-limited or both, e.g., the voucher may expire after a specific date or some time lapse, and/or after certain number of uses, e.g., one-time use. Once the voucher expires, it may not be used anymore. The voucher may enable a content provider or a content notification submitter to submit content to a UCR and/or submit content subscription to a UCR without knowing the credentials of the UCR or its user. In an instance, a content broker or dealer may request a user of the UCR to try a content channel on the user's UCR. The user may provide the content broker with an authorization voucher. The content broker or his organization may use the authorization voucher to subscribe the content channel on behalf of the user. A self-service online system, e.g., a content channels directory website, that may provide one or more content channels, may accept the authorization voucher, enabling the system to provide user-selected content channels to the UCR or UCR group designated in the voucher.

There are many ways for a user of a UCR to obtain the authorization voucher. In an embodiment, the user may receive an authorization voucher every month by mail. In other embodiment, the user may call an automated authorization voucher dispenser, which may give out a one-time authorization voucher upon authentication. In yet other embodiment, the user may receive an authorization voucher in a reply to sending a SMS message from his registered mobile phone. In sum, any means that can identify a requester as an authorized UCR user may be used to deliver the authorization voucher to the user.

An authorization voucher may provide a key that helps to identify an individual UCR or UCR group and may provide a verification code. In one embodiment, both the key and the verification code may coexist in the same string of text as long as one of them is of fixed length or there are delimiters in the text string, or otherwise derived, to isolate the key and the code. The purpose of this verification code is to prove that the holder of this verification code has the temporary authorization to submit content to or subscribe to the content for the UCR(s) in question. There are many approaches and methods in the current state of art for generating a verification code for such a purpose, e.g., one-time password schemes such as Markus Kuhn's OTPW and Lamport's S/KEY. In addition, the key to a UCR or UCR group available in an authorization voucher may be encrypted so that the identity of the UCRs or their users can be protected. Furthermore, the UCR-identifying key may be combined or otherwise embedded into the verification code upon its generation in such a way that the key could later be retrieved when the verification code is being authenticated.

Figure 66:
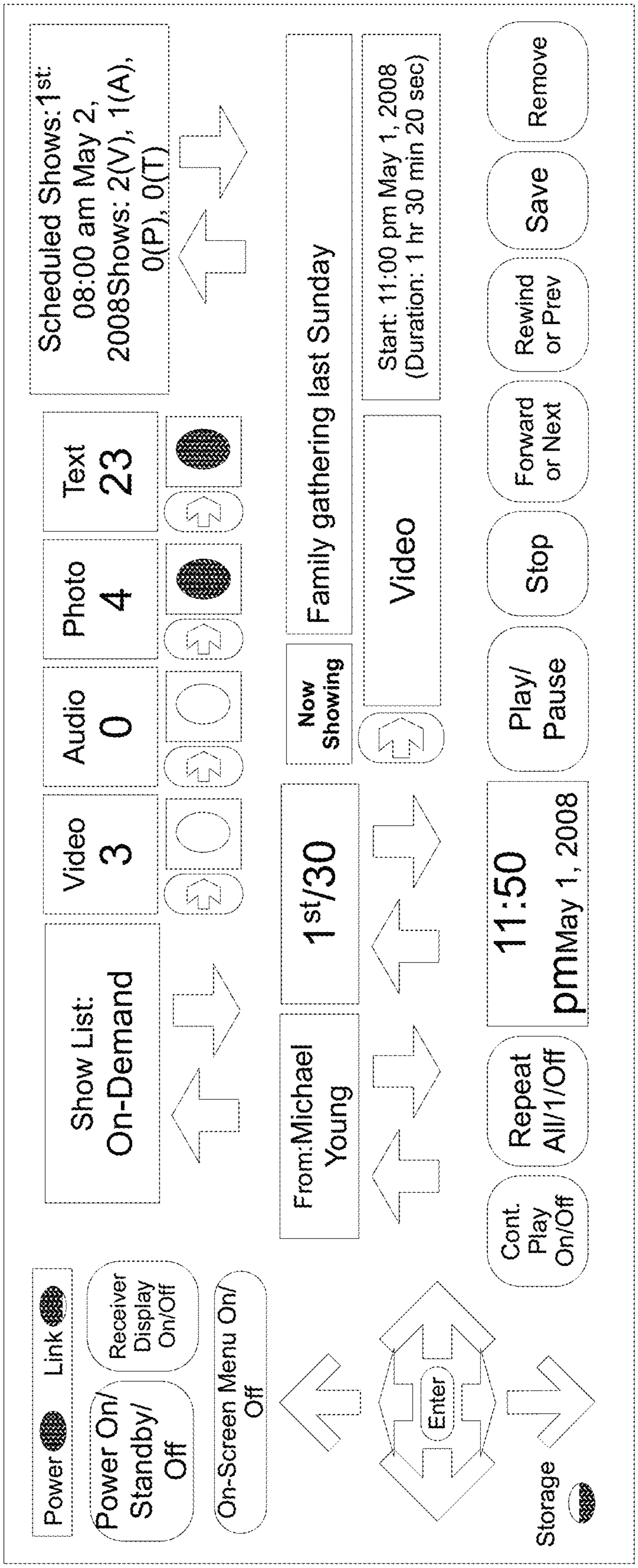
FIG. 66 illustrates a sample user interface screen for a universal content receiver according to an embodiment of the present invention.

The UCM and the UCR may be implemented using a variety of devices. For example, the functionality of a UCR may be implemented on a broadband modem (wireless or otherwise) with analog audio and video output. The UCM may be implemented in a control point (e.g., headend) for a broadband access network with which the broadband modem is associated. The UCM may use the communication infrastructure between the control point and its associated broadband modems to communicate with its associated UCRs, or use a separate communications networks. The audio and video output of the UCR may be connected to an audio/video input of a television (TV) set or a device accepting such connection. The playback control of the UCR may be provided through a web-based control, a remote control with the broadband modem as its receiver, added as a control panel on the modem, or a combination thereof. FIG. 66 shows a sample screen 6600 for a control panel for a UCR according to an embodiment of the present invention. In an embodiment, the UCR may be realized as a set-top box (STB) having a communication interface (e.g., for an internet connection, wireless or otherwise) and a plurality of audio/video interfaces to TV, monitor and other AV (Audio/Video) equipment. In other embodiment, a UCR or its functionality may be realized as part of a TV set equipped with a communication interface (e.g., internet).

In an embodiment, a UCM may be deployed on a dedicated server that exchanges messages and content data with its associated UCRs over a communications network (wireless or otherwise). In another embodiment, the UCR and UCM may be integrated into a single device (e.g., a mobile phone) or appliance (e.g., a TV set) or realize their respective functions on a general-purpose computer. In this instance, there would be one UCM for one UCR, rather than the one UCM for multiple UCRs arrangement and the communication between the UCM and UCR is internal within the device, appliance, or computer. In the instance where the UCM is implemented on the computer or the device or an appliance having a display, the content may be rendered on that display rather than on an external display. The computer, device, or appliance may access external content providers and receive messages (i.e., for content of interest and content notifications) through any data communication means, e.g., Internet connection (wireless or otherwise).

Figure 67:
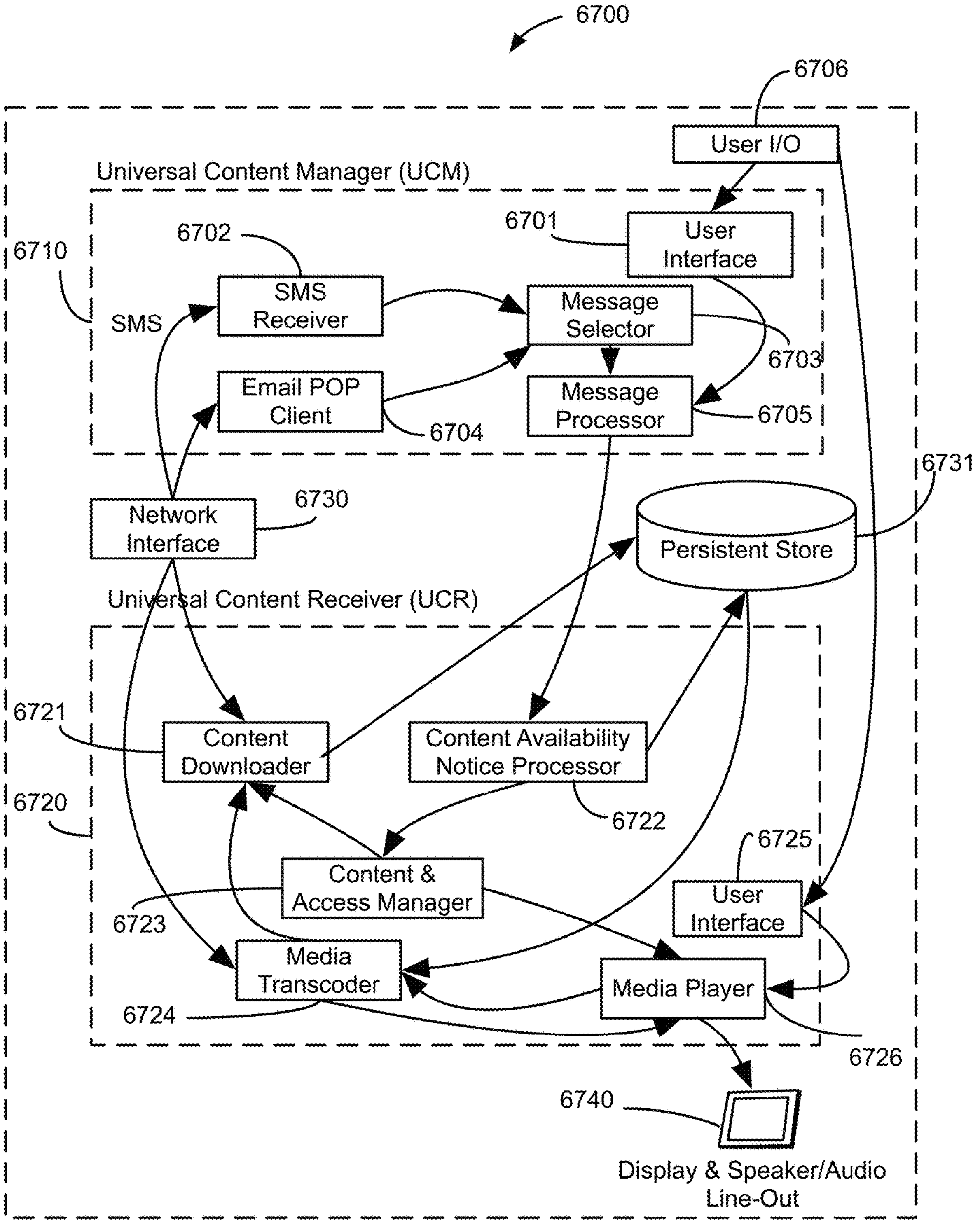
FIG. 67 is a high-level block diagram of an embodiment of the present invention.

FIG. 67 illustrates a device 6700, e.g., a computer or a mobile phone, embodying a UCM 6710 and a UCR 6720 according to an embodiment of the present invention. In this embodiment, UCM 6710 and UCR 6720 are implemented as part of a single device on a network-enabled general-purpose computer. Device 6700 includes a network interface 6730, a persistent store 6731, e.g., a hard drive or a memory card, a user I/O 6706 (Input and Output interface), and a display and audio speaker plus an audio line out 6740. UCM 6710 may include an SMS receiver 6702, email POP client 6704, a message selector 6703, and a message processor 6705. SMS receiver 6702 can accept SMS messages and email POP client 6704 accepts email messages from network interface 6730. Email POP client 6704 may periodically poll an external POP server (not shown) for new email messages. Message selector 6703 may accept both SMS and emails from SMS receiver 6702 and email POP client 6704, respectively. Message selector 6703 may select messages from authorized submitters and pass them onto message processor 6705, which parses and interprets the content of these messages. After message processor 6705 parses the messages, it may generate corresponding Content Availability Notices (CANs), which may be delivered to the UCR.

UCR 6720 may include a content availability notice (CAN) processor 6722, a content downloader 6721, a content and access manager 6723, a media transcoder 6724, and a media player 6726. Upon receiving the CANs, CAN processor 6722 may generate a content locator for each CAN identifying or otherwise referencing a piece of content of interest. A content locator may be an entry comprising title of the content, content type, retrieval type (i.e., download or streaming), content location, content filename, access credential if applicable, and name of the submitter or content referrer. CAN Processor 6722 may also place content submissions available from CANs into persistent store 6731. In an embodiment, the content locations in the corresponding content locators may refer to their locations in the store. For CANs that only include content notification, the corresponding content locations would refer to an external content provider. Content and access manager 6723 may prepare a show list for each set of content locators it receives. Each entry in a show list may contain data that may enable media player 6726 to display a content title and to request the content from media transcoder 6724. In addition, content and access manager 6723 may request content downloader 6721 to retrieve downloadable media files of sizes below a certain threshold. The media files so downloaded may be transferred to persistent store 6731 and the content location information embedded in the corresponding show entry displayed by media player 6726 may be updated by content and access manager 6723. In the event that media player 6726 requests a show entry from a show list, the request may be directed to media transcoder 6724. Media transcoder 6724 may use the content location information embedded in the request to attempt retrieval of the requested content. The source of media file associated with the content may be persistent store 6731 or network interface 6730, e.g., if they are located on an external content provider or an external storage server acting as a persistent store for the UCR. Media transcoder 6724 may not perform any transcoding if the retrieved media files are already in a format supported or requested by media player 6726. In an embodiment, the system may choose to permit only the media formats supported by its media player component and therefore eliminate the need for a media transcoder component or its functionality.

In some embodiments, a user may interact with media player 6726 through a UCR user interface 6725 that may accept input from user I/O 6706 of the device 6700. A user may perform direct submission of content notification and content data through a UCM user interface 6701 that may accept data input from user I/O 6706. UCM user interface 6701 may pass the direct submissions to message processor 6705, which may in turn generate CANs for each of the submissions. It is to be noted that UCM user interface 6701 and UCR user interface 6725 may be realized as a single functional component or as part of another component such as media player 6726.

Figure 68:
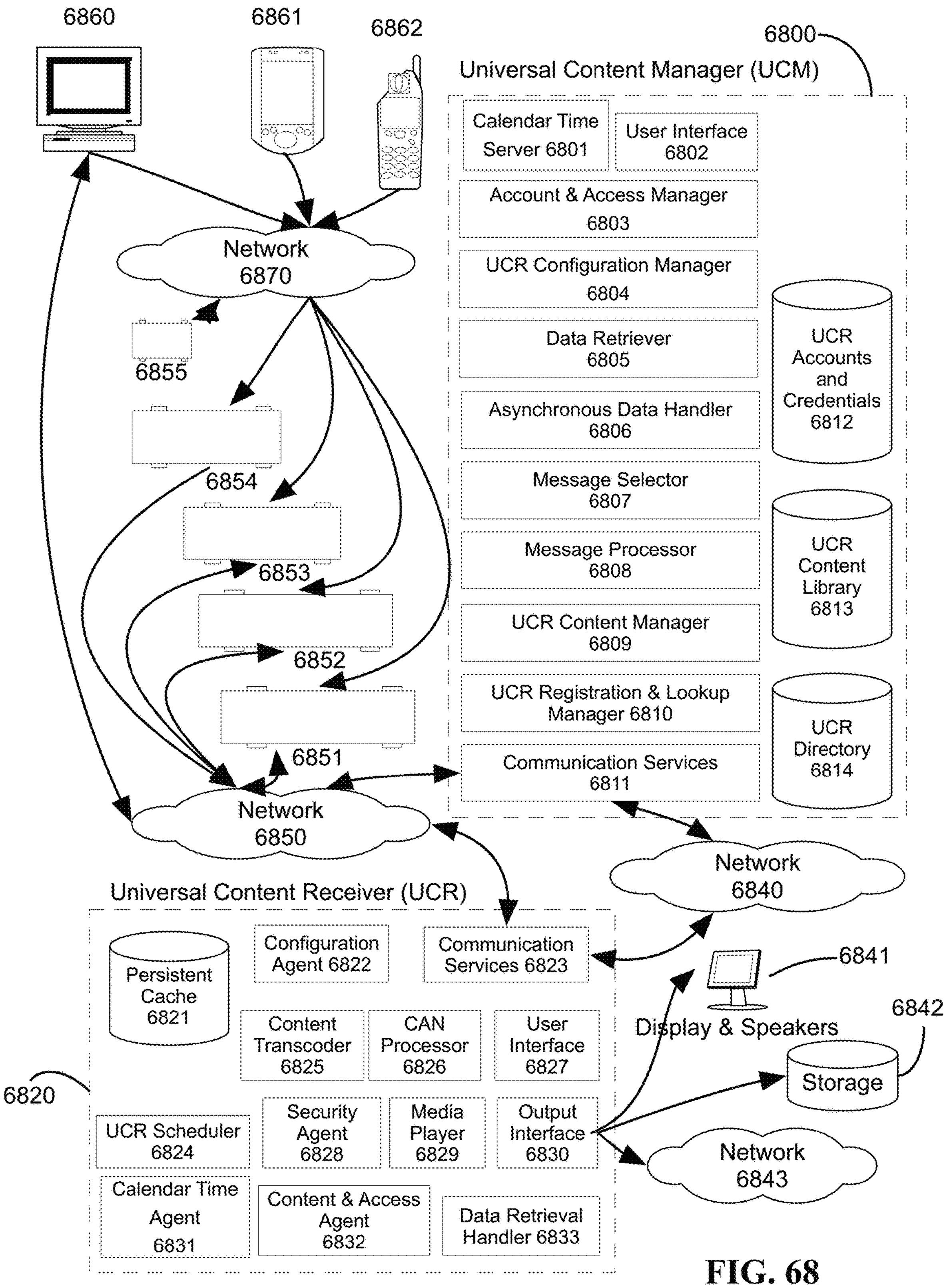
FIG. 68 is a high-level block diagram of another embodiment of the present invention

FIG. 68 illustrates an embodiment where a UCM 6800 and a UCR 6820 are implemented as discrete systems and are communicably coupled to each other via network 6840. In one embodiment, communications network 1070 connecting submitter's devices, e.g., a desktop computer 1060, a handheld computer 1061, and a cell phone 1062, and content providers, e.g., a mobile messaging service 1054, an email server 1053, a storage server 1052, and a media/web server 1051, communications network 1050 connecting the content providers and UCR 6820, communications network 6840, and communications network 6843 may be the same communications network.

In this embodiment, UCM 6800 may include the following functional modules and operational repositories. Calendar Time Server module 6801 may be used for maintaining and providing the current calendar time upon request, e.g., for UCR configuration and scheduling, as well as for periodically synchronizing the calendar times of UCRs, e.g., with the Calendar Time Agent 6831 in a UCR 6820 via a local Configuration Agent 6822. User Interface module 6802 may be used for interacting with a user or his equivalent so that the user can operate UCM 6800. The user operations may include administrative activities, provisioning of UCM 6800 and UCR 6820 that it controls or otherwise manages. For example, a UCM administrator could use User Interface 6802 to add user accounts to UCR 6820. Account and Access Manager module 6803 may be used for managing UCR user accounts, account credentials, aliases, and submission handles and their logon credentials, e.g., email addresses or mobile phone numbers for receiving messages of content notifications and submissions. Account and Access Manager 6803 may also manage authorization and permissions of message submitters, credentials for access to content providers, and security agents at the UCRs through their Configuration Agent.

UCR Configuration Manager module 6804 may be used for configuring and provisioning individual UCRs and managing configuration agents of those UCRs. Data Retriever module 6805 may be used for retrieving data from external content providers. Asynchronous Data Handler module 6806 may be used for processing data sent to UCM 6800 asynchronously, e.g., content submission and notification messages sent via SMS or push email. Message Selector module 6807 may be used for identifying legitimate or valid submitters of content notification or submission. Message Processor module 6808 may be used for parsing and analyzing incoming messages and Message Breakdown Summaries (MBS), and generating CANs. UCR Content Manager module 6809 may be used for maintaining content metadata, show lists and show entries per UCR and managing the Content and Access Agent in the UCR through the local Configuration Agent. UCR Registration and Lookup Manager module 6810 may map a UCR user account to an operational UCR and maintain an inventory of UCRs and their operational statuses.

Communication Services module 6811 may be used for providing communication services (including security) among the various functional modules and operational repositories, and for message exchange and data transfer with UCRs and external content providers (e.g., mobile communication interfaces, POP email retrieval, and HTTP/FTP file download). UCR Accounts and Credentials 6812 may be a persistent repository that may be used for storing, maintaining, and serving data needed by Account and Access Manager module 6803. UCR Content Library 6813 may be a persistent repository that may be used for storing, maintaining, and serving data needed by UCR Content Manager 6809. UCR Directory 6814 may be a persistent repository that may be used for storing, maintaining, and serving data needed by UCR Registration and Lookup Manager 6810.

UCR 6820 may include the following functional modules and storage systems. Configuration Agent module 6822 may be used for configuring and provisioning the UCR to make the UCR operational in response to UCR Configuration Manager 6804 and to users operating the UCR. The setup or change made through Configuration Agent module 6822 may be reported back to UCR Configuration Manager 6804. Communication Services module 6823 may be used for providing communication services (including security) among the various functional modules and storage systems, and for exchanging messages and data with UCMs and external content providers (e.g., mobile communication interfaces, POP email retrieval, and HTTP/FTP file download). Content Transcoder module 6825 may be used for transcoding the retrieved or otherwise received media files that are not in the formats supported or requested by a Media Player 6829. Content Transcoder module 6825 may also handle incoming streaming media data from Communications Services module 6823.

CAN Processor module 6826 may be used for processing incoming Content Availability Notices (CANs), generate content locators, and place submitted content of interest on a local repository (i.e., persistent cache 6821). Content and Access Agent module 6832 may be used for generating and maintaining show lists and entries, periodic data retrieval and content presentation schedules for subsequent content retrieval, and streaming and playback. Content and Access Agent module 6832 may prepare MBS for retrieved content data and send them to UCM 6800, and may check the free storage capacity of persistent cache 6821 for status reporting purposes. User Interface module 6827 may be used for receiving input related to performing administrative functions for UCR 6820. User Interface module 6827 may be implemented as a control panel with an associated on-screen menu configured to accept input. In an embodiment, a change in the UCR settings or data that may be required to be fed back to the UCM, e.g., a change of UCR account password may be fed back to Account and Access Manager module 6803 of the UCM by Configuration Agent module 6822. Configuration Agent module 6822 may receive the change notifications from the local functional modules, e.g., Security Agent module 6828.

Security Agent module 6828 may be used for authenticating users at UCR 6820 and handling security matters locally, e.g., configuring the security parameters of local Communication Services module 6823 for secured communication with UCMs as well as other external entities such as external content providers. Media Player module 6829 may be used for performing playback, streaming and rendering of media data (including text) received from Content Transcoder 6825. Output Interface module 6830 may be used for adapting output from Media Player module 6829 to be transmitted to its intended destinations, e.g., for playback on a video display with audio speakers 6841, for storage as a media file on a local storage 6842, or a portable device or an external content provider through a communications network 6843. Data Retrieval Handler module 6833 may be used for retrieving data from outside of the UCR. If authentication credentials are needed, Data Retrieval Handler module 6833 can query local Security Agent 6828 for obtaining and/or verifying the credentials.

UCR Scheduler module 6824 may be used for activating any periodic and scheduled activities at the UCR, such as automatic content metadata retrieval per content subscription and scheduled presentation of shows per content notification, submission, or user request. Calendar Time Agent module 6831 may be used for obtaining and keeping the current calendar time at the UCR. Persistent Cache 6821 may be a repository for storing, maintaining, and providing data needed by the functional modules in the UCR to perform their respective functions. In one embodiment, the UCR may use an external persistent cache accessible over a communications network.

In some embodiments, when an appliance or device embodying the UCR is provisioned, Configuration Agent module 6822 may send a registration message through Communication Services module 6823 to a pre-configured network address reachable by the UCM. The registration message may include an appliance identifier, e.g., a Media Access Control Address or a serial number, a one-time password, or a current network address of the appliance which may be assigned to the appliance either by the installer (human or otherwise) or by a local network service provider or its proxy. UCR Registration and Lookup Manager 6810 may extract this information from the registration message. Each UCR that is being provisioned may have an entry in UCR Directory 6814. UCR Registration and Lookup Manager 6810 may attempt to locate the entry for a UCR being provisioned in UCR Directory 6814 using the appliance identifier. If the entry is located, UCR Registration and Lookup Manager 6810 may append the entry with information in the registration message.

A UCR user may provide user registration information such as a username, password, and a plurality of user aliases, message retrieval accounts (along with their authentication or access credentials) and messaging addresses or handles of authorized submitters, as well as the appliance identifier and one-time password associated with the UCR. The user may provide the user registration information through an administrator, a self-service website or some other means of interacting with Account and Access Manager 6802 of UCM 6800. Upon successful verification of the one-time password based on the one stored in UCR Directory 6814 by UCR Registration and Lookup Manager 6810, Account and Access Manager 6803 may create an entry including the user registration information in UCR Accounts and Credentials repository 6812. UCR Registration and Lookup Manager 6810 may inform UCR Configuration Manager 6804 about the successful UCR and user registrations. UCR Configuration Manager 6804 may send configuration data, e.g., security parameters for secured communication and the current calendar time, to Configuration Agent 6822 of UCR 6820. Following this, Configuration Agent 6822 may set up UCR 6820 and make it operational. Upon completion of this process, UCM 6800 may process incoming messages on behalf of UCR 6820.

Desktop 1060, handheld computer 1061, and mobile phone 1062 may be used to submit messages and/or content notifications. A mobile messaging server 1054 may accept a message, e.g., SMS and MMS, sent through a mobile communications network and may route the message to its intended destination (i.e., a receiver associated with the destination handle or address such as a phone number). A Simple Mail Transfer Protocol (SMTP) server 1055 may accept email messages from email client software and deliver them to a POP server 1053 where an email recipient may retrieve emails using email client software. A storage server 1052 may provide persistent storage with network access. A media/web server 1051 may provide multi-media content for viewing, downloading, or streaming, in addition to accepting input from a web browser or its equivalent.

In an embodiment, messages from Mobile Messaging Server 1054 that are directed to the UCR may reach the Asynchronous Data Handler (not shown) of the UCR through Communication Services module 6823. The Asynchronous Data Handler may pass the messages to Message Selector 6807 for further processing. Data Retriever module 6805 may periodically logon and check for new email messages on POP server 1053 for each POP account associated with a UCR user and for all active users listed in UCR Accounts and Credentials repository 6812. Data Retriever module 6805 may communicate the new email messages to Message Selector 6807 for further processing.

In some embodiments, Message Selector 6807 may identify the recipient UCR user of each incoming message if the message is not addressed to a specific user account. Such non-specific message may include an SMS message sent to a phone number maintained by UCM 6800 as a common SMS receiver for multiple unrelated UCR users. In an embodiment, the username or its alias associated with the UCR user account may be specified in the first line of the message text. Subsequent lines may contain key-phrases and their attributes recognizable by UCM (e.g., through Message Processor 6807). For example, in "Content 1 Start=May 1, 2008 8 pm EST", the "Content 1 Start" may be a key-phrase and the date and time being its attribute. Other examples include "Content 1 ftp user=abcd", "Content 1 ftp password=efgh", and "Content 1 location=ftp://www.example4534.net/files", all providing instructions about content retrieval. Other conventions or methods may also be adopted for such purpose.

Based on the sender addresses or submitter identification, e.g., email addresses or originating phone numbers, Message Selector module 6807 may identify messages from authorized submitters for each UCR user account as provided by Account and Access Manager module 6803. Message Selector module 6807 may communicate the selected messages to Message Processor module 6808 for further processing. Message Processor module 6808 may generate a plurality of CANs (Content Availability Notices) per selected message. Message Processor module 6808 may communicate the CANs to the targeted UCR, which is the UCR associated with the UCR user. The CAN Processor at the targeted UCR may process the incoming CANs. Message Processor module 6808 also send the CANs to UCR Content Manager 6809, which may extract metadata from the CANs to create entries in UCR Content Library 6813 thereby providing a centralized copy of available content per UCR. UCR Content Library 6813 may or may not keep the actual content submissions. For example, content retrieved from POP Server 1053 may be re-obtained whereas messages from mobile messaging server 1054 may not be re-obtained. UCM 6800 may adopt a policy of not keeping any actual content (i.e., its UCR Content Library is only a library of content metadata).

After UCR 6820 receives CANs through its Communication Services module 6823, CAN Processor module 6826 may generate the corresponding content locators and place any content submission in Persistent Cache 6821. These content locators may enable Content and Access Agent module 6832 to generate show lists, entries, and periodic data retrieval and content presentation schedules for subsequent content retrieval, streaming and playback. Content and Access Agent module 6832 may also manage and maintain the generated data. Content and Access Agent module 6832 may provide the show lists and entries and content presentation schedules to User Interface module 6827 for display and control, and the periodic or time-specific data retrieval and content presentation schedules to UCR Scheduler module 6824 for execution. Content and Access Agent module 6832 may direct Content Transcoder module 6825 to process downloaded content data and incoming streaming data, e.g., the auto play of a scheduled presentation or upon a user request to play a show. In an embodiment, Content and Access Agent module 6832 may direct Media Player module 6829 to fetch or otherwise receive the output of Content Transcoder module 6825 for playback and rendering. Content and Access Agent module 6832 may make download or streaming requests to Data Retrieval Handler module 6805, which may download the requested content data or initiate streaming through Communication Services module 6823. The downloaded content data may be placed in Persistent Store 6821 while the incoming streaming data would go though Content Transcoder module 6825.

UCR Scheduler module 6824 may be used for triggering any periodic, repetitive, or scheduled operation, such as the periodic download of content per content subscription. Similar to Content and Access Agent module 6832, UCR Scheduler module 6824 may use Data Retrieval Handler module 6805 to actually perform the download and initiate the data streaming. A UCR user may also initiate download or streaming of a particular show available on a show list. User Interface 6827 of UCR 6820 may interact with the user and map his operations and commands to specific requests to the appropriate functional module in UCR 6820. Content-related requests, e.g., play a show in a show list, may be sent to Content and Access Agent module 6832, which may coordinate with other functional modules to serve this type of requests.

Many advantages are realized from the architecture of the example embodiment shown in FIG. 68. In one instance, a new appliance embodying UCR 6820 can be easily configured to replace an old or broken appliance. UCM 6800 may be able to configure and provision the new appliance using the centrally maintained UCR data for an existing UCR user of the old appliance. The guest and nomad UCR modes can also be supported. Additionally, software upgrade can be done centrally on UCM 6800, which may also serve as a software and firmware distribution center to its associated UCRs.

Figure 69:
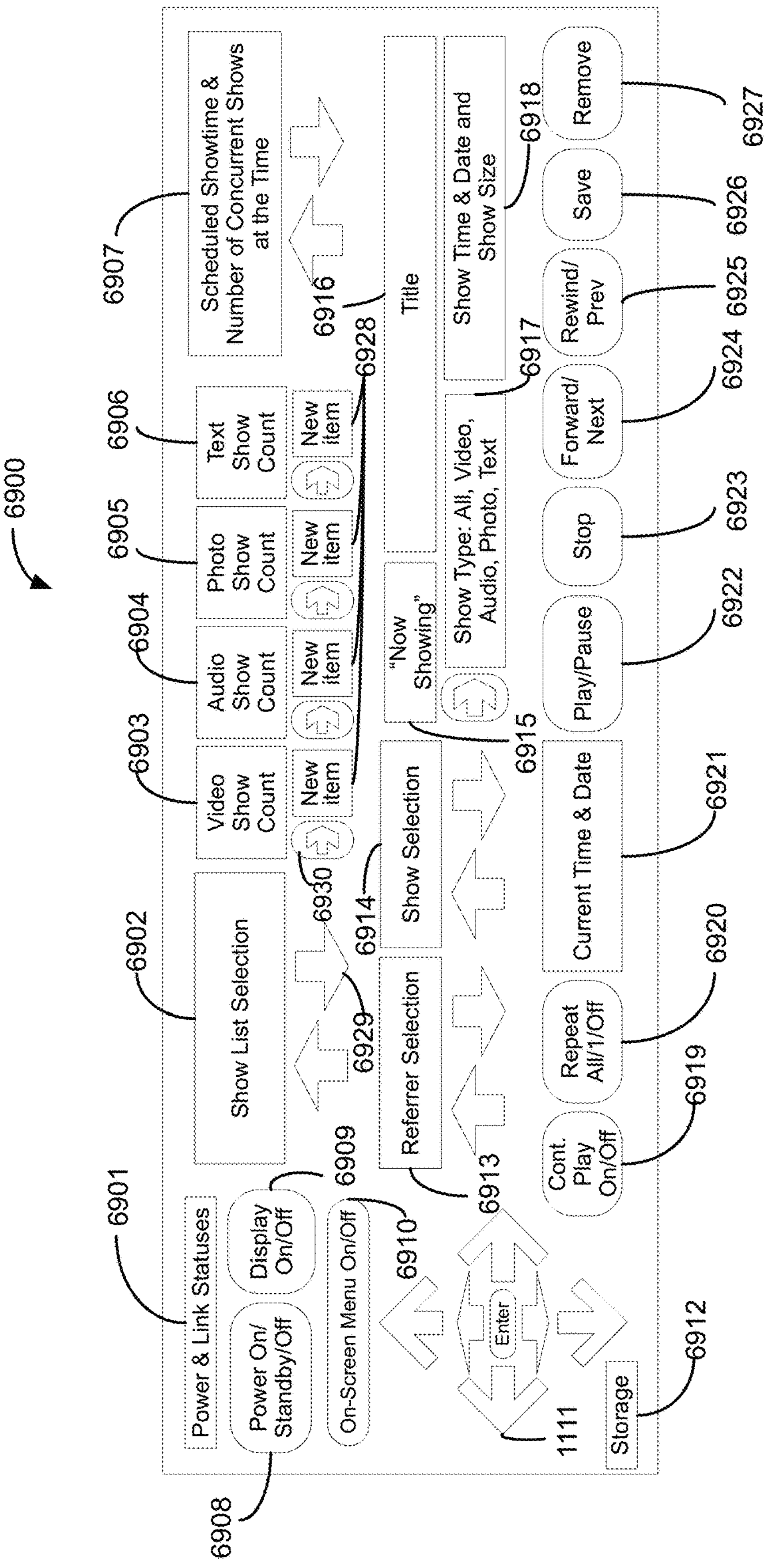
FIG. 69 illustrates another sample user interface according to an embodiment of the present invention.

FIG. 69 illustrates a sample user interface panel 6900 according to an embodiment of the present invention. User interface panel 6900 may be implemented in an appliance or device that may embody a UCR and/or a UCM. Section 6901 may include indicators for the operating status of the appliance, e.g., on, standby, and off, and network connectivity status, e.g., healthy link, limited connectivity, and loss of connectivity. A Power button 6908 may cycle the appliance from "off" to "standby" to "on" operating status. In the "off" operating status, the appliance may not be operational even if the appliance has power. In the "standby" operating status, the appliance may only play scheduled presentations or those authorized for auto play; all other operations may be disabled. In the "on" operating status, the appliance may be operational and all capabilities may be available. Receiver display on/off button 6909 may turn the visual display of the unit on or off except the power & link statuses and the four "new item" indicators 6928 without affecting the appliance's operational capabilities. On-screen menu on/off button 6910 may turn the menu available through the unit's video output on or off. On-screen menu button 6910 may make available all the operation capabilities and settings supported by the appliance, including those not available through the panel illustrated in FIG. 69, e.g., adding and removing a custom show list. The two sets of arrows 6911, namely the four directional ones and the top-down ones, provide navigational control for the on-screen menu and value change control on settings, respectively. The "enter" button in the middle of the two sets of arrows may be used for confirmation of the change.

Storage indicator 6912 may be illuminated with varying colors to indicate a current status of the free storage capacity, e.g., green for 31% to 100% storage availability, yellow for 10% to 30% storage availability, and red for below 10% storage availability. These ranges may be user-configurable through the on-screen menu. A show list display section 6902 may display all available show lists. A pair of up and down arrows 6929 may be used to cycle through the available show lists, including the all-inclusive list called "ALL". A group of four counters 6903, 6904, 6905, and 6906 each with a reset button and a "new item" indicator 6928 below it may show the number of shows available from the displayed list (e.g., ALL or Scheduled) for a specific content type, e.g., video, audio, photo, or text. Each "new item" indicator 6928 may have an associated "ack" (i.e., acknowledge) button 6930. In an embodiment, a newly available show may increment the count on a counter corresponding to the content type. The change in the count value may illuminate the corresponding "new item" indicator. The "new item" indicator would remain illuminated until either the "ack" button is pressed or the count becomes zero. Pressing "ack" button 6930 again can illuminate an indicator that has been off. Display section 6907 may present scheduled show times and the number of concurrent shows at that time. In an embodiment, if the scheduled shows have time conflict with one another, the display may provide the number of concurrent shows in relation to a specific show time of a scheduled show. A number "zero" displayed in this section means there are no conflicting show times. The pair of up-down arrows below display section 6907 may be used to cycle through the list of scheduled show times. In one embodiment, recent show times may appear before future show times.

User interface 6900 may further include a referrer selection display section 6913 (with its pair of navigation arrows below). Referrer selection display section 6913 may list the identity of the referrer of the show being played or being browsed in relation to a chosen show list in show list display section 6907, described above. A referrer may be a person or entity who may provide a show recommendation to the user. The recommendation may be provided using any of the techniques described herein, e.g., by sending a message. The choice may include the all-inclusive aggregate "ALL" when the list is being browsed. In an embodiment, choosing a referrer identity will result in only the shows from that referrer being displayed. Shows from all other referrers will be hidden from view. In this instance, show selection display section 6914 may display the show number and referrer selection display section 6913 may display the referrer identity of the in-play or in-pause show, if any, after some period of user inactivity at the control panel. If a new show is chosen to be played before such time, the new show appears in now showing section 6915. A show selection display section 6914 (with its pair of navigation arrows below) may list the consecutive show number of the show being played or being browsed in relation to the chosen show list in show list display section 6907, described above. Except for scheduled shows, newly arrived shows may be placed ahead of the existing ones. Hence, the show numbers of those existing shows may change. Show selection display section 6914 may revert to showing the show number of the in-play or in-pause show, if any, after some period of user inactivity at the control panel. In an embodiment, playing a chosen show other than the in-play or in-pause show before such time out may set the show as the new "now showing" show. A "now showing" indicator section 6915 may indicate information about the show being played or paused, if any. A title display section 6916 may present the title of the show in-play, the show in-pause, or the show being browsed. A show type display section 6917 (with its one-directional navigation button) may present the current content type of the show being paused, the show being played, or the show being browsed. The choices of show type include the all-inclusive "ALL" when the display is presenting shows being browsed. A show time, show date, and show size display section 6918 may show the start time and date for a scheduled show and the length for a video/audio show and the number of pages for a photo/text show when the show in question is being browsed. In an embodiment, show time, show date, and show size display section 6918 may show the total playing time, elapsed time, or the current page number for the in-play or in-pause show.

User interface 6900 may further include a current calendar time display section 6921. A "Continuous Play On/Off" setting button 6919 may specify whether the next available show, if any, should be automatically played after the current show is finished. A "Repeat All/1/Off" setting button 6920 may specify whether all shows, the current "now playing" show, or no show should be repeated when a next show is due to be played. A "Play/Pause" control button 6922 may enable play or pause of the current show presented in show list display section 6902. Control button 6922 may operate in toggle mode, alternating between playing and pausing the show with each successive depression of the button. A "Stop" button 6923 may terminate the show in play. A "Forward or Next" button 6924 may forward the "now playing" video or audio show while being pressed, or goes to the next page of the "now playing" photo or text show. A "Rewind or Previous" button 6925 may rewind the "now playing" video or audio show while being pressed, or goes to the previous page of the "now playing" photo or text show. A "Save" button 6926 may cause the show being presented in show list display section 6902 to be moved to a default saved show list. A "Remove" button 6927 may cause a show being presented in the show list display section 6902 to be removed from its show list. In some embodiments, the corresponding content data may be deleted from the UCR's persistent cache (while keeping the actual content of the show intact at its source). Alternatively, the show may be moved to a Removed show list which may or may not be visible or accessible from show list display section 6902, and only an explicit cleanup operation request (e.g., through the on-screen menu) may remove the actual content data from the cache. In an embodiment, buttons 6922-6927 may have built-in indicators showing different symbols indicating the current state of these buttons, e.g., on and off, and play and pause.

Figure 70:
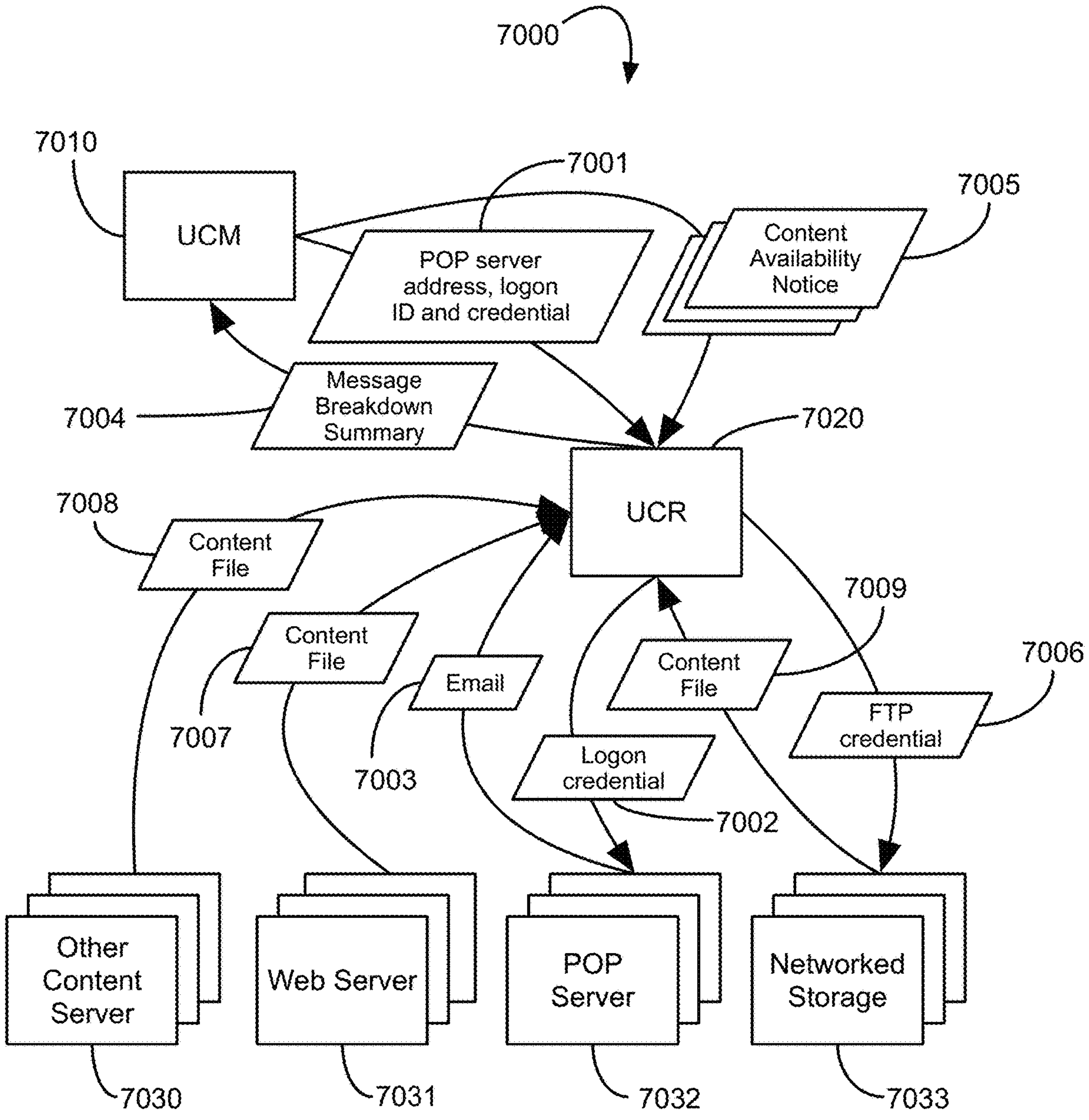
FIG. 70 is a high-level flow diagram of a process for automatic content retrieval according to an embodiment of the present invention.

FIG. 70 illustrates a flow diagram of a process 7000 for retrieving content according to an embodiment of the present invention. In this embodiment, a UCR, instead of or in addition to a UCM, may be responsible for retrieving or otherwise receiving messages (e.g., email, SMS, MMS, instant messages, and so on) including content notification and subscription. The illustration in FIG. 70 uses email as an example for clarifying and explaining the embodiment, but it is to be noted that the same is applicable for all types of messages discussed above. A UCR 7020 may obtain from a UCM 7010 the location or address of a POP server 7032 and a logon ID and credentials associated with a user email account (7001) available or accessible via POP server 7032. UCR 7020 may set up a periodic schedule of automatic retrieval, e.g., through the UCR scheduler, of email messages from the user account (7002, 7003). For each new email message retrieved, UCR 7020 may generate a Message Breakdown Summary (MBS) (7004), e.g., using the Content and Access Agent. The MBS may be identified by, among other data, the POP server location and logon ID. UCR 7020 may send the MBS to UCM 7010 (7004). UCM 7010 may generate a plurality of Content Availability Notices (CANs) for each received MBS (7005), and send them back to UCR 7020. UCR 7020 may retrieve or otherwise receive content data (7007, 7008, and 7009) from various content providers (e.g., a web server 7031, a networked storage 7033, and other content server 7030) in accordance to the instructions specified in the CANs 7005. For instance, CANs 7005 may specify access to networked storage 7033 (e.g., via FTP—File Transfer Protocol) along with additional information needed for the access (e.g., FTP credential 7006). In an embodiment, UCR 7020 may perform the CAN generation instead of UCM 7010. In that instance, UCM 7010 may serve as a central administration controller and backup manager.

A device or appliance embodying UCR 7020 may support a removable storage (e.g., a memory card) so that saved shows would be copied onto the storage for backup, and a new storage can be coupled to the device or appliance when needed. In some embodiments, UCR 7020 may allow its user to reply to a content referrer or arrange an external content provider to provide an advertisement before, during, and after a show with or without the involvement of UCM 7010. UCM 7010 may also accept a rating or comment for a show from a user of UCR 7020. These comments and/or rating may be shared with other UCR users.

In some embodiments, different external content providers may offer content for rent, sales, or subscription to a UCM through UCR(s). The UCM, through the UCR(s), may enforce the playback and download restrictions and conditions, and optionally collect payment from UCR users who rent or purchase the content. For example, the UCM may maintain credit card information, if authorized by the UCR user, as part of a UCR user account. One of the advantages realized by this scheme is that a home STB may be able to receive content from various content providers rather being limited to a single content provider who supplies the home STB to the user. For example, currently a household needs one set-top box for each provider of on-line content. The content provider may represent a single or multiple content sources such as a movie rental company and/or a consortium of content suppliers. Such a set-top box is a closed system where content providers not affiliated with the content provider may not be able to offer their content to the household for rent, sales or subscription. In an embodiment of the present invention, various content providers may be able to offer their content regardless of the STB provider.

In another embodiment, multiple UCRs associated with a single UCM may also be used, e.g., in a shop, a mall or over a geographically dispersed area to display common content (e.g., corporate video, advertisements and public notices) at multiple locations (mobile or otherwise) while having a central control to add, change, remove and interject content via the UCM. The playback of pre-downloaded multi-media content (including text) may be synchronized with the same playback schedule. A content provider with limited network bandwidth or capacity may still be able provide large files to many UCRs for presentation at the same future time with sufficient time to communicate the content to the UCRs. In one embodiment, a downloaded content may be set to play only on a future date and time, automatically or upon user consent, or prevented to play only after a certain date and time. For example, multiple users may enjoy the same show at the same time even though they have downloaded the content at different times and locations. In another embodiment, such a downloaded content, once started playing, cannot be paused, as if they were real-time broadcast. Pausing, if allowed, would simply skip the content to the point when the playback is resumed.

It should be appreciated that the specific steps illustrated in FIG. 70 provide a particular method of processing content retrieval according to an embodiment of the present invention. Other sequences of steps may also be performed according to alternative embodiments. For example, alternative embodiments of the present invention may perform the steps outlined above in a different order. Moreover, the individual steps illustrated in FIG. 70 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 71:
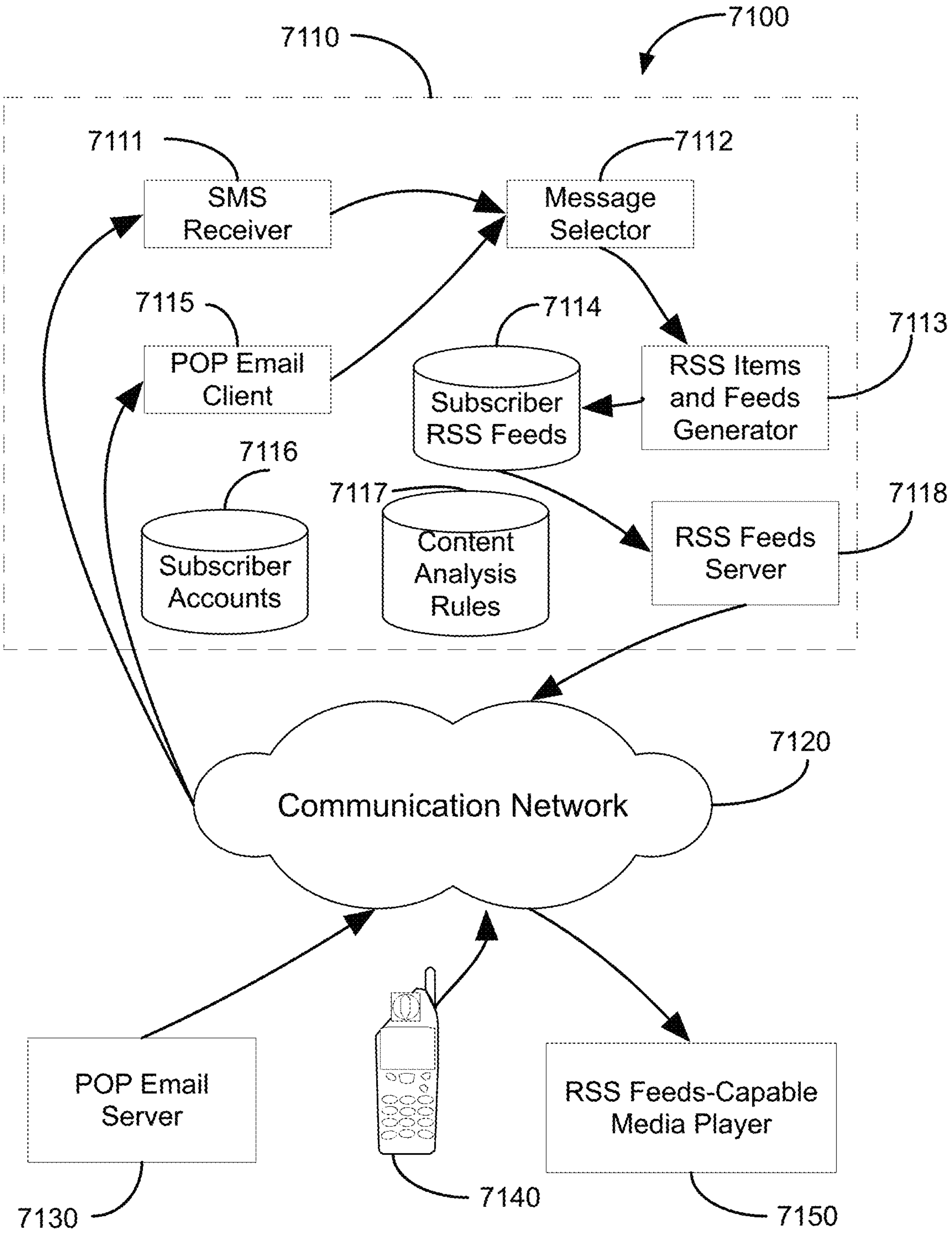
FIG. 71 is a high-level block diagram of yet another embodiment of the present invention.

FIG. 71 illustrates a system 7100 embodying the present invention according to an embodiment of the present invention. An application server 7110 may receive or otherwise obtain SMS and email messages originating from a user cell phone 7140 and a POP email server 7130, respectively, via, for example, a communication network 7120. Application server 7110 may process these messages and generate Really Simple Syndication (RSS) feeds using a RSS feeds generator 7113. RSS feeds are summaries of online content that are published in the RSS format and may be used for retrieval of the online content. Application server 7110 may provide these RSS feeds to a media player 7150, which may download or otherwise retrieve the corresponding online content as digital files or streams from the locations specified in the RSS feeds. In this embodiment, application server 7110 functions as a UCM and media player 7150 functions as a UCR. Application server 7110 receives and obtains SMS and email messages through a SMS Receiver 7111 and a POP Email Client1315, respectively. A Subscriber Accounts database or repository 7116 may maintain the information useful for application server 7110 and its components to perform their functions. For example, repository 7116 manages subscribers' email account names and passwords for accessing their POP email servers, and for mapping incoming SMS messages to specific subscribers. Subscriber Accounts database or repository 7116 also maintains the lists of SMS and email senders' identities from which a SMS or email message may be accepted or rejected. In addition, Subscriber Accounts database or repository 7116 may include information on how media URLs discovered or otherwise derived from message content should be organized or grouped. Message Selector 7112 may consult the repository 7116 to filter out unauthorized messages so that only authorized messages may reach RSS Items and Feeds Generator 7113. RSS Items and Feeds Generator 7113 may consult repository 7116 to decide if RSS items resulting from these media URLs so discovered or derived may belong to a default RSS feed or individual RSS feeds based on the SMS and email sender identities. In short, all subscriber-specific information relevant to the functions and operations of the application server may be maintained at Subscriber Accounts repository. 7116.

Content Analysis Rules database or repository 7117 may manage subscriber-independent information relevant to the functions and operations of application server 7110, such as the analysis of SMS and email messages and their content for generating for each such message a plurality of URLs through which online content may be downloaded or otherwise retrieved. Each URL so generated may become the content of the link element of a RSS item in a RSS feed that may be provided to media player 7150. The RSS feed may be considered as a listing of links or URIs to one or more contents. The other elements of the RSS item may serve to annotate the content of interest associated with the URL, e.g., as a content header to a content token, and hence a RSS item constituting a CAN. Information may be extracted from the message in question to provide content for such annotation. Examples of content analysis rules include but are not limited to patterns for matching URLs with certain keywords and suffixes, e.g., ignoring URLs ending in html or htm while attempting to access those with xml and RSS, patterns for matching domain names with known media content servers and websites, patterns for extracting user names and passwords specified in message content, recipes or algorithms for transforming URLs to a form through which media players can directly download the content of interest, and recipes or procedures for interpreting the content of and extracting media URLs from a webpage whose URL is specified in message content. RSS Items and Feeds Generator 7113 may consult Content Analysis Rules 7117 in its RSS items and feeds generation for generating the RSS feed.

FIG. 72 illustrates two examples of how a RSS item may be derived from an email message. Text blocks 7201 and 7202, show a media URL and a pair of login name and password that appear in a message body. The login name and password may be made available as part of the "link" of the RSS item, e.g., "addmeta:logon" and "addmeta:passwd" elements, respectively. The login name and password may be interpreted as the logon credentials for the FTP (File Transfer Protocol) retrieval of the online content referenced by the link. The other elements of the RSS item may be obtained or otherwise derived from the rest of the message body. The description element of the RSS item may be shortened and noted for the number of words not shown. For example, a subscriber in this case may be able to read the full content by accessing the actual email message at the POP server. In addition, the words "login" and "password" in the message body may be of freeform and the RSS Items and Feeds Generator may try to identify them while parsing the message body. In an embodiment, the text associated with "login" and "password" or their aliases may be regarded as a piece of information relevant to the content retrieval, or they may be explicitly defined keywords that a message sender would use to denote information and communicate it to the application server of FIG. 71.

Blocks 7203 and 7204 together show the difference between a media URL in a message and the resulting link in the corresponding RSS item. In some instances, a URL may not directly reference a media file or a piece of online content of interest in its downloadable form or mode, but rather reference the webpage that is associated with the URL. In order for a media player to download the online content, a simple rule or a set of instructions (which might be website-specific) may be adopted to convert or otherwise follow the URL of a media-carrying webpage to one that directly references the media of interest for download. The "link" element of example RSS item 7204 contains an example URL resulting from such a conversion. The original URL is captured in the "addmeta:originalurl" element. In addition, the email message may itself carry the set of instructions (e.g., as an attachment) which may be stored and re-used by a UCM and/or UCR. Furthermore, the actual URL in the description element may be replaced by a shorthand, e.g., "[*link-1*]", so that more information-carrying words may be displayed or otherwise included in the element. The RSS Items and Feeds Generator shown in FIG. 71 may communicate resultant RSS feeds, each comprising a plurality of RSS items, to Subscriber RSS Feeds database or repository 7114 of FIG. 71. RSS Feeds Server 7118 may respond to media players requesting RSS feeds using information in Subscriber RSS Feeds database or repository 7114. Since the application server may serve multiple media players and multiple subscribers, there may be a desire to keep certain RSS feeds of each subscriber or subscriber group private and prevent unauthorized subscribers from accessing them. In an embodiment, a single RSS feed may be shared by a group of users. The single RSS feed may have RSS items that belong to multiple users. In this instance, Web servers serving the single RSS feed may require authentication of these users at the time of request for the RSS feed. Once the user provides his authentication information, only the RSS items that belong to him may be presented to the user. In the other words, more than one subscriber may share a single URL for the RSS feeds, but they would receive different RSS feeds based on their identity.

In some embodiments, application server 7110 may generate a unique URL for each user or subscriber and link a user or subscriber-specific RSS feed to that URL. In an embodiment, a UCM, e.g., application server 7110, may store in a persistent storage the user credentials useful for authenticating requests for access to RSS feeds or to content associated with the RSS items in the RSS feeds. Whenever a UCR, e.g., a media player 7150, requests or receives a RSS feed, it may or may not be required to provide user authentication information in order to access the RSS feed. For instance, application server 7110 may retrieve user credentials to authorize and enable media player 7150 to access the content associated with the RSS items. This process may be transparent to the user of media player 7150. Note that RSS feeds are only an example of a listing of content notifications. Other formats, e.g., Atom feeds, or mechanisms may be used to provide such a listing.

Figure 73:
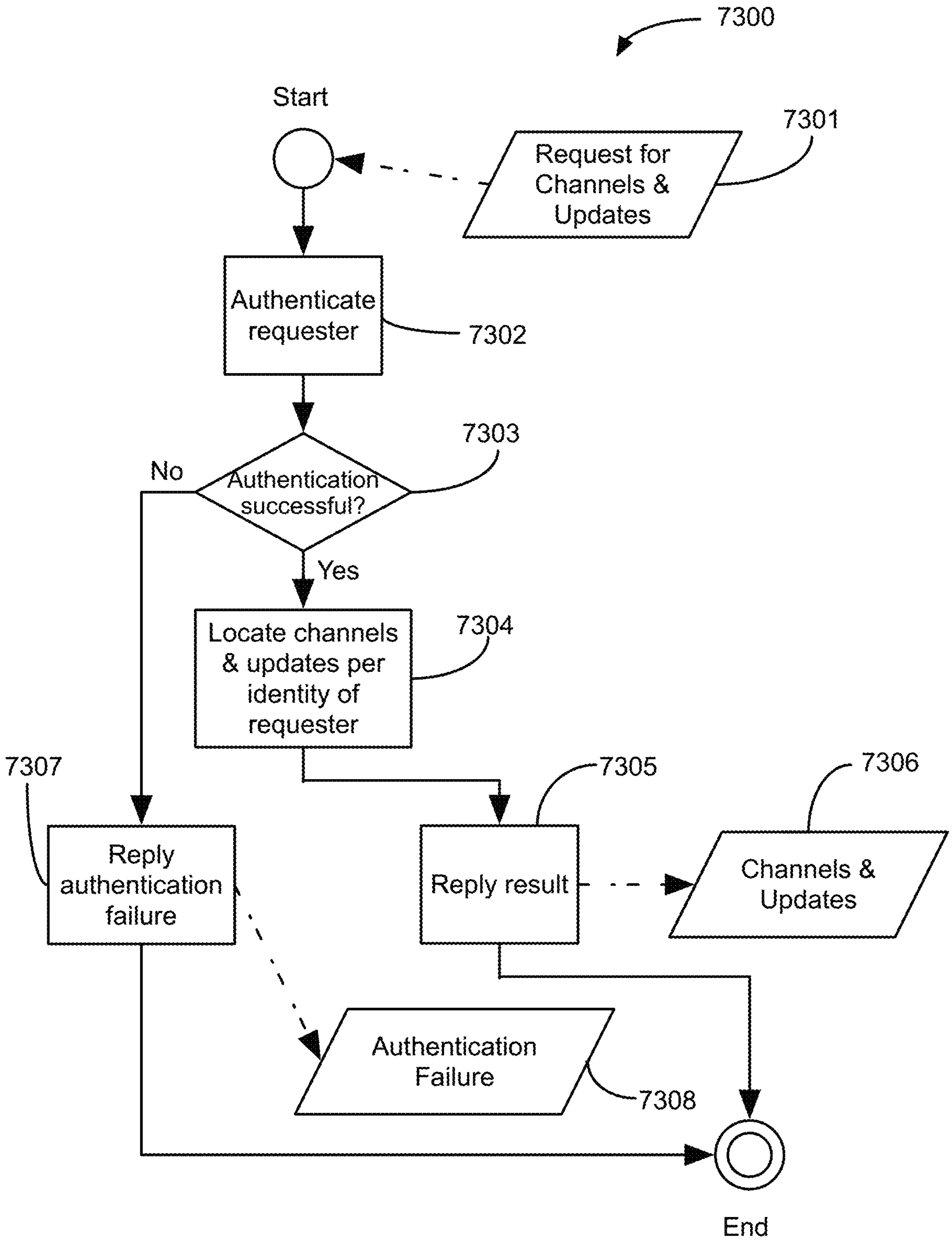
FIG. 73 is a high-level flow diagram illustrating an authentication process for retrieving content according to an embodiment of the present invention.

FIG. 73 shows a high-level flow diagram of a process 7300 for a method of authenticating a subscriber according to an embodiment of the present invention. This embodiment illustrates authentication of a proxy (e.g., a web browser or a media player) of a subscriber acting as a RSS feed requester. Periodically, the proxy may request a copy of a RSS feed (also called channel) and check for new content of interest (i.e., RSS items) that may be available. The proxy may also request some other updates that may be of interest to the subscriber or its proxy, e.g., the rules and instructions for accessing content available at certain websites. The subscriber or its proxy may use the same URL to request its own channels and updates. Such request (7301) may arrive at an application server, e.g. server 7110 of FIG. 71, possibly through a secure communications channel such as SSL. The request may include the subscriber or requester authentication information such as a username and a password, e.g., those provided by a subscriber to access his POP email server. The application server, e.g., through its RSS Feeds Server, may consult the Subscriber Accounts repository to check if the requester is authorized and identify the corresponding subscriber (7302). If the authentication fails at step 7303, the application server may communicate the authentication failure (7308) to the requester at step 7307. If the authentication is successful at step 7303, the application server may retrieve, from the Subscriber RSS Feeds repository, the RSS feeds or channels pertaining to the authenticated subscriber and communicate the RSS feeds or channels (7306) as reply to the requester, at steps 7304 and 7305. Note that a single reply (i.e., a single online resource) may contain more than one RSS feed (e.g., in form of OPML—Outline Processor Markup Language), as long as the requester is able to process such a reply. In an embodiment, RSS feed requesters of different subscribers may get their own private RSS feeds despite using the same URL for RSS feed requests.

It should be appreciated that the specific steps illustrated in FIG. 15 provide a particular method of authenticating a subscriber according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

In other embodiments, a dynamically-generated RSS feed URL for each individual subscriber may be used in which the URL in question may be made up of a part common to all subscribers and a part which is obtained or otherwise derived from some unique subscriber identity (e.g., his email address). In some embodiments, a sequence number may also form part of the URL so that a single RSS feed or group of RSS feeds may be made available per sequenced URL. As such, the server would place for each subscriber his RSS feeds at these individualized URL(s). Upon the logon of a subscriber, a media player would be able to access the corresponding URL(s) to retrieve RSS feeds on behalf of the subscriber. For certain applications, the RSS Feeds Server in question may not require any authentication for RSS feed requests.

In yet another embodiment, the same user or access credentials may be used for both the user message account (e.g. for email retrieval) and the user subscriber account (e.g. for RSS feed retrieval). For example, a RSS feeds-capable media player and the like (such as the one depicted in FIG. 71) may be able to authenticate with a RSS feeds server on behalf of a subscriber who has supplied the media player with the logon credentials for his email account and authorized the media player to save and reuse the logon credentials. Upon successful authentication, the media player may receive a plurality of RSS feeds and be able to automatically download or otherwise retrieve the media content corresponding to the RSS items in those feeds. A user or an administrator may create and update a subscriber account and provide related information through a website or a UCR (e.g., a media player) to the Subscriber Accounts repository. Similarly, a user may help create and suggest rules that are maintained through the Content Analysis Rules repository. An administrator may facilitate and manage these user-created and suggested rules and have the option of creating his own rules.

Further, while the UCM and UCR are described herein with reference to particular modules, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 74:
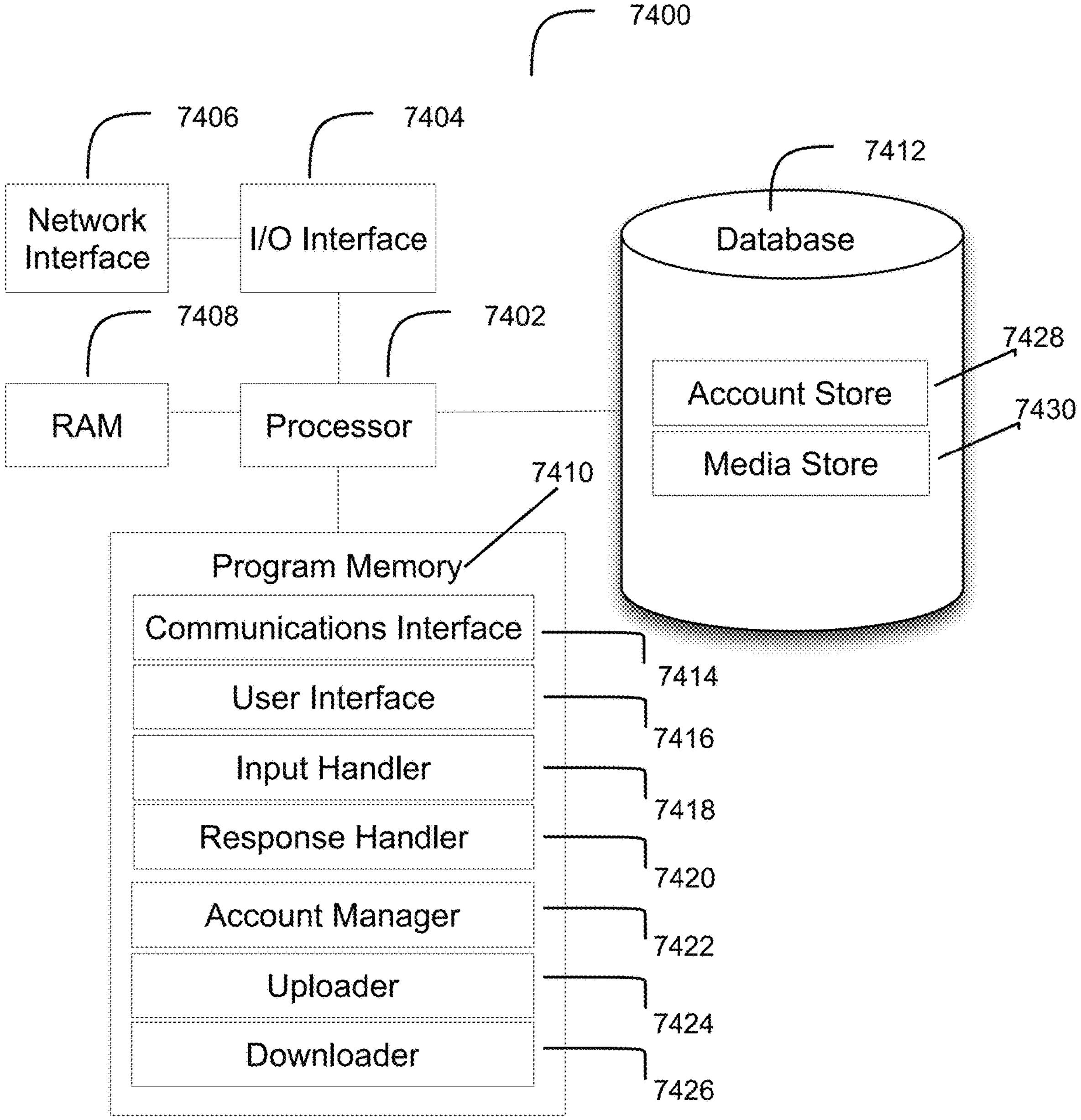
FIG. 74 is a high-level block diagram illustrating a processor system for delivering digital content according to an embodiment of the present invention.

For instance, FIG. 74 is shown a general block diagram of a processor system 7400 implementing in an embodiment a UCM comprising a UCR, such as the example UCM 5909 and the example UCR 5907 shown in FIG. 59. Generally, in the embodiment shown, the processor system 7400 includes a processor circuit comprising a processor 7402, and an input/output (I/O) interface 7404 to which a network interface 7406 is coupled. The processor is also in communication with random access memory (RAM) 7408, program memory 7410 and database memory 7412. The processor 7402 controls the database memory 7412 under the direction of a general database manager (not shown), a specialized database manager (not shown), a combination thereof (herein referred to as a hybrid database manager), or a collection of database managers, implemented in codes stored in the program memory 7410 that direct the processor 7402 to perform database management functions to maintain one or more databases of data records in the database memory 7412.

The term "processor system" has been used to indicate that the processor circuit shown in FIG. 74 is only one of a plurality of implementations and configurations and that, for example, the processor system 7400 may employ a plurality of processors locally or geographically distributed to effect the functions described below that are performed by the processor system 7400. The processor system 7400 may be configured to contain fewer or more components. For example, the RAM 7410 may comprise storage for parts of or the entire database 7412. Or the general database manager, the specialized database manager, the hybrid database manager, or the collection of database managers may include codes that direct the processor 7402 to communication with a database located remotely from the information retrieval system so realized. The remotely located database could be a commercial database, for instance, and the information retrieval system may merely be configured to interact with such database without requiring substantial memory or detailed database management functionality at the information retrieval system. A terminal interface (not shown) may be connected to the I/O interface 7404 for direct interaction with users. Or the I/O interface 7404 may comprise the network interface 7406. The processor system 7400 may comprise a plurality of distributed processors, program memories, and databases coupled over a network. Or it may comprise a plurality of processor subsystems each capable of operating as a standalone processor system To enable such the processor system 7400-based UCM to deliver automatically to a destination (such as the set-top box 5901 shown in FIG. 59) digital content being identified by a message sent to a user account or indicated in a request identifying the user account, the program memory 7410 may include the following components or modules: a communications interface 7414 being operably configured to communicate with devices over a communications medium, such as the devices 5901 to 5905 and 5911 to 5914; a user interface 7416 being operably configured to communicate with a user coupled to a device, such as those being communicably coupled to the UCM 5909 and UCR 5907 shown in FIG. 59; an input handler 7418 being operably configured to process messages or requests identifying the digital content for delivery; a response handler 7420 being operably configured to prepare, direct, or arrange the delivery of digital content from a source to destination; an account manager 7422 being operably configured to maintain and organize user account information; an uploader 7424 being operably configured to upload digital content to an external device or store; and a downloader 7426 being operably configured to download digital content from an external device or store. The database 7412 may include the following stores or repositories of data records: an account store 7428 being operably configured to store user account information; and a media store 7430 being operably configured to store digital content. According to one embodiment, a UCM such as the UCM 5909 shown in FIG. 59 may comprise the communications interface 7414, user interface 7416, input handler 7418, response handler 7420, account manager 7422, and account store 7428, while a UCR such as the UCR 5907 shown in FIG. 59 may comprise the uploader 7424, downloader 7426, and media store 7430. According to another embodiment, a UCR may comprise a UCM, or vice versa, and it may comprise less or more of the components or modules shown in FIG. 74. For example, the response handler 7420 may comprise the uploader 7424 and downloader 7426 or otherwise perform their functionality. The uploader 7424 and/or downloader 7426 may also be omitted, for example, by having the response handler to cause the destination (e.g., a cloud storage) to retrieve the digital content without the use of an intermediary store (e.g., the media store 7430). The functionality of the uploader 7424 and/or downloader 7426 may be performed by a source or destination (e.g., a cloud storage) of the digital content, or by a device (e.g., a user's personal computer or mobile device) serving as an intermediary store. Such a device could also be a destination of the digital content. The user interface 7416 and/or the input handler 7418, or the functionality thereof, may be completely or partially performed by an application running on a device coupled to a user.

In one embodiment, for instance, the communication interface 7414 (e.g., HyperText Transport Protocol (HTTP) interface) may operably be configured to cause the processor system 7400 to send and receive data and messages over a network via the I/O interface 7404 (e.g., Transport Control Protocol (TCP) port interface) coupled to the network interface 7406 (e.g., Internet Protocol (IP) network interface). The user interface 7416 may operably be configured to cause the processor system 7400 to accept messages and requests and present responses and notifications from and to users via devices coupled to the users. Such requests may include user account registrations and device registrations. For example, upon receiving a request for user account registration, the user interface 7416 may cause the account manager 7422 to create a user account record in the account store 7428. One or more devices may be identified in a device registration so that the user interface 7416 may cause the account manager 7422 to associate the location or access to these devices with the user account in the account store. 7428 The input handler 7418 may operably be configured to cause the processor system 7400 to receive or process messages and requests identifying a user account and a location for delivery of digital content in relation to the user account. For example, the input handler 7418 may access a message or request stored in an external repository (e.g., a message server), or it may receive the message or request from the user interface 7416 or from a sending device, terminal, or application. The input handler 7418 may cause the account manager 7422 to identify the device(s) associated with the user account indicated in the message or request. Upon successful device identification, the input handler 7418 may cause the response handler 7420 to initiate or otherwise arrange for delivery of the digital content from a source location as indicated in the message or request, to a destination location on one or more devices associated with the user account. The downloader 7426 may operably be configured to cause the processor system 7400 to download the digital content from the source location to the media store 7430, while the uploader 7424 may operably be configured to cause the processor system 7400 to upload the digital content from the media store 7430 to the destination location.

While the various embodiments described herein may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. For instance, the functionality of the server depicted in FIG. 71 may be incorporated into an individual media player, whether software-based or as hardware appliance, or into some subscriber-specific proxy on the same or different computing host where the media player resides or operates. A subscriber may also specify which individual message senders may provide RSS feed subscriptions for consideration in which a RSS feed subscription URL in a message body from an authorized sender would result in a RSS feeds-capable media player subscribing to the corresponding RSS feed on behalf of the subscriber. Explicitly defined keyword such as one for removing RSS feed subscription may also be employed in a message. The RSS Items and Feeds Generator illustrated in FIG. 71 may also retrieve the content associated with the URLs extracted from a given message and may analyze the content as part of the RSS items and feeds generation processing. For example, the RSS Items and Feeds Generator may retrieve and analyze an online resource per extracted URL. If the retrieved online resource provides a mechanism for RSS feed subscriptions, then the RSS Items and Feeds Generator may decide whether the RSS feed subscriptions should be made available to or automatically subscribed for the subscriber, depending on the sender identity and authorization status. In other instances, instead of RSS, other technologies, schemes and specifications (such as the Atom Syndication Format) may also be used for providing URLs for media retrieval and download. In addition, various other media types other than or in addition to video such as photo, audio and text may also be supported. A supplementary service (e.g., through a self-serve webpage) may also be provided for a content notification sender or submitter to test if a given URL or webpage would result in an actionable URL or webpage, and what the resultant URL(s) would become. The service enables the sender or submitter to test his URLs before including them in his content notifications. In one embodiment, UCM may be a mail server.

In some embodiment, a user sending digital content to another user may indicate to the processor system 7400-based UCM the digital content on a source storage medium (e.g., a cloud storage) and the user account in association with the delivery of the digital content, without the need for the sending user to download the digital content to a local storage (e.g., the sending user's device where the message or request is originated), or to provide an externally-accessible location reference for the digital content. The user interface 7416 (or the input handler 7418) may generate or otherwise make available a location reference (e.g., URL) via which the digital content may be obtained from outside the source storage medium. Such a location reference may be generated, for example, in connection with a service associated with the source storage medium (e.g., a cloud storage service), and/or a service not tied to the source storage medium (e.g., a hyperlinks shortening, sharing, and tracking service).

In one embodiment, the input handler 7418 of the processor system 7400-based UCM may maintain (e.g., in the media store 7430 or on the destination device or storage) source location or identity references (e.g., URLs or URIs) for digital contents already available at the destination device or storage. The input handler 7418 may determine that automatic delivery of certain digital content to a destination would not be necessary based on these location or identity references, for example, by comparing the source location or identity reference in the message or request for such delivery to these location or identity references. Other techniques or information that may be utilized for such comparison includes digital fingerprints and signatures such as MD5 hash code. In some embodiment, the input handler 7418 may cause the user interface 7416 to report to the receiving user that an automatic digital content delivery did not take place, shows the source location or identity reference to that digital content, and identifies the existing digital content in the destination that should correspond to that digital content. The receiving user may also decide if the UCM should go ahead and perform the delivery, or he manually performs the delivery via the source location or identity reference.

In one embodiment, a user may indicate to the processor system 7400-based UCM a proxy device or service for performing the downloading and uploading functions for delivery of digital content to devices associated with his account. (The proxy device or service could also be a destination for the delivery.) The user interface 7416 (or the input handler 7418) may cause the account manager 7422 to maintain in the account store 7428 the access or contact information for the proxy device or service and its purpose and association with the user account. Upon receipt of a message or request by the processor system 7400-based UCM, the response handler 7420 may trigger, notify, or otherwise cause the proxy device or service to copy or otherwise retrieve digital content from a source storage medium to one or more devices associated with the user account, as indicated by the message or request. The proxy device or service may store the digital content in a temporary or intermediary storage, for example, for caching, or when both the source and destination storages are not capable of performing or initiating uploading or downloading functions.

In one embodiment, the user interface 7416 may cause the processor system 7400-based UCM to obtain and maintain in the account store 7428 an authorization from a receiving user, the authorization via which the UCM may access the device(s) or storage(s) associated with the user account of the receiving user. For added security and convenience, the UCM does not need to receive or store the authorization credential (e.g., user ID and password) that the receiving user enters for access to the devices or storages in question. Instead, the UCM may direct the receiving user to individual services for authenticating access to the devices and storages in question, and obtain the authorization codes generated by the services specifically for access to the devices and storages without further intervention with the receiving user. Such authorization codes may be specific to the UCM, for example, when the UCM has registered itself with these authorization services, and obtained a registration code. The authentication of the sending user for access to a device or storage in connection with the registration code may then result in an authorization specifically generated for access of the UCM to the device or storage in question. An example of such an authorization scheme is the OAuth protocol. In another embodiment, access to the source storage or location where the digital content for delivery resides may also require such prior authentication of the sending user. Likewise, access to the proxy device or service for downloading and uploading digital content to a destination storage or location may also require such prior authentication of the receiving user. In another embodiment, a receiving user may register with the USM a device (e.g., a personal computer) to perform the downloading from a source location and uploading to a destination location associated with the user. For instance, the USM may notify the device of an available digital content whose location is provided by an authorized sending user. The USM may provide other information for access, such as authorization code to access the source or destination location. The USM may track and maintain the status of the device and interact with the device in relation to individual content deliveries, e.g., whether the device is turned on or reachable, and what contents have or have not been delivered. The device may then download the digital content from the source location and upload it to the destination location in response to each notification. Advantages of this setup for the receiving user include having performed this content retrieval without any user interaction, and employing computing or network resources that might otherwise be idle (e.g., a desktop computer at home when nobody is using it, or a broadband access, bandwidth or capacity already paid for).

In one embodiment, the account store 7428 maintains a user account associated with a sending user. The user account of the sending user is charged for the delivery of digital content to devices associated with a user account of a receiving user. In another embodiment, the user account of a receiving user is applied a charge for the delivery of digital content to devices associated with the user account of the receiving user, the charge being determined based at least in part on the size of the digital content. In some embodiment, the UCM may remove the digital content from the source medium storage after the delivery of the digital content has been made. The UCM may also notify the sending user and/or receiving user of the delivery. In addition, the UCM may accept an annotation (e.g., text, voice, image, or video) from the sending user in relation to the digital content, and deliver the annotation and the digital content as a package to a destination device or storage. The package may be rendered or presented to the receiving user as a unit, while allowing the receiving user to decouple the annotation from the digital content, for example, so that the receiving user may forward the digital content to another user without the annotation or with his new one.

Figure 75A:
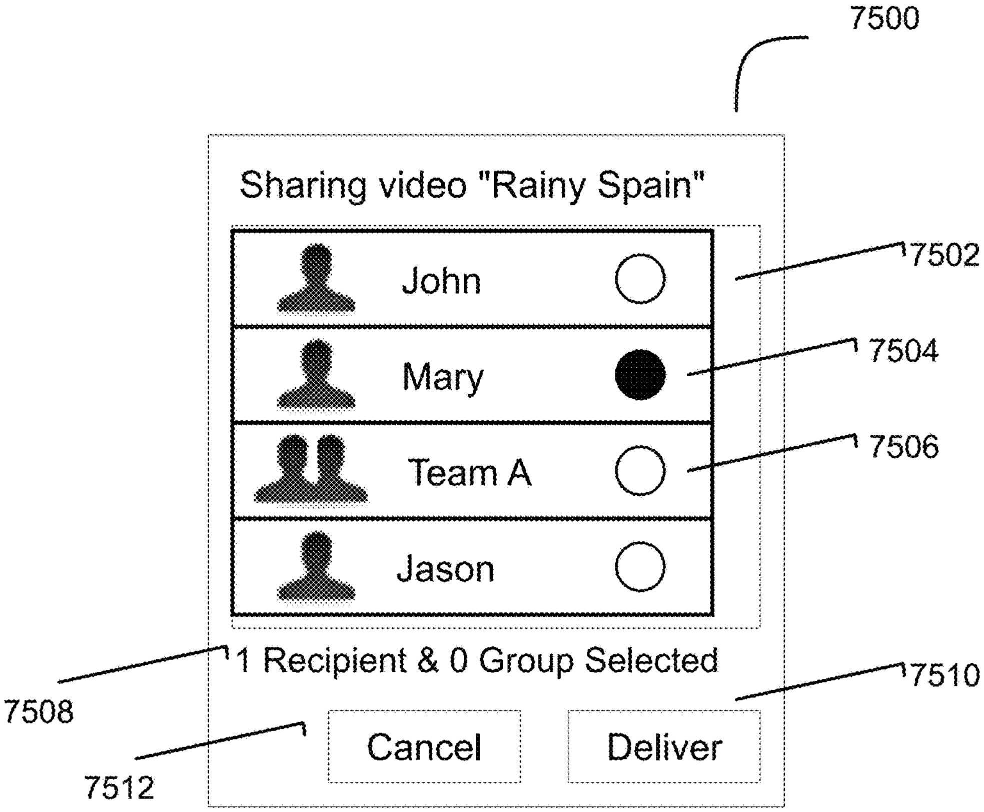
FIG. 75A is an example user interface illustration according to an embodiment of the present invention.
Figure 75B:
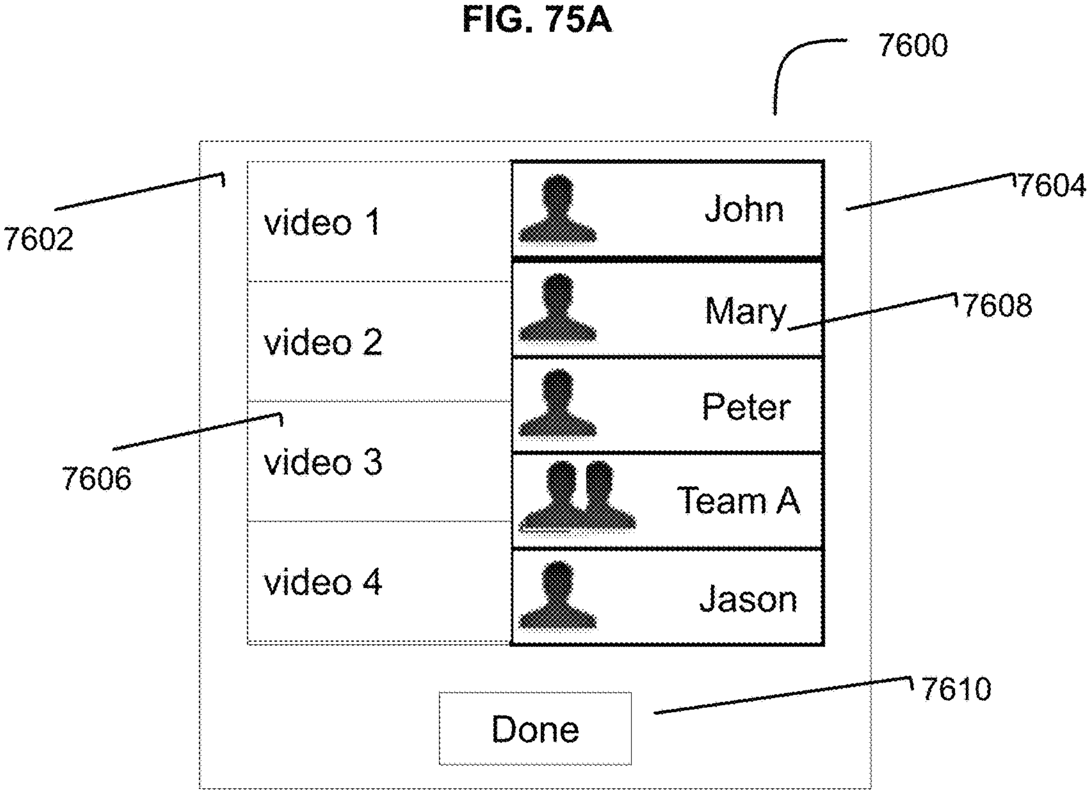
FIG. 75B is another example user interface illustration according to an embodiment of the present invention.

In one embodiment, the user interface 7416 of the UCM may be implemented on, executed on, extended to, or otherwise included in a device coupled to a sending user. For instance, referring to FIG. 75A, an example user interface screen, element or presentation 7500 according to one embodiment is shown. Such a screen, element or presentation may be triggered by a sending user having selected a digital content for further action, e.g., selecting a visual action icon or button, pointing and holding via a finger on a visual icon representing the digital content, or right clicking a pointing device while the corresponding cursor or focus having highlighted or otherwise selected the digital content. The presentation 7500 shows a scrollable list of contacts or user names 7502, whereby the sending user may select one or more users (or user groups, such as the "Team A" 7506) for delivery of the digital content to storages or devices associated with the one or more users. For example, the sending user may select the user "Mary" 7504 among the list of contacts. The user interface 7416 may indicate the numbers of currently selected users and user groups 7508. The sending user may indicate to the user interface 7416 that the selection process is over and the digital content delivery may start, for example, by selecting the "Deliver" button 7510, or the digital content delivery be aborted, for example, by selecting the "Cancel" button 7512. The user interface 7416 may then interact with the rest of the USM accordingly. Referring to FIG. 75B, another example user interface screen, element or presentation 7600 according to another embodiment is shown. Such a screen, element or presentation may be rendered or presented on a device coupled to a sending user via the user interface 7416 or its proxy. The sending user may use a pointing device, a finger, or voice to gesture to a selection of one of elements on the list of digital contents 7602 (e.g., video 1 to video 4) and an association of the selected element with one of the elements on the list of users 7604. For example, such a gesture may include having a finger selecting and holding video 3 (7606), and dragging the selection across to Mary (7608) on the screen of the device. The user interface 7416 may then cause the input handler 7418 to prepare or initiate the transfer of video 3 from a source location (which is not part of the device) to a destination location (which is associated with the user Mary 7608). The element on the list of users 7604 may indicate visually that the digital content is being or has been delivered to the user. (All modes or schemes of gesturing for assigning a digital content to a user for delivery to a storage associated with the user, and of indicating the status of such delivery are within the scope of various embodiments.) The sending user may select the Done button 7610 anytime to stop his communication with the user interface 7416. In one embodiment, if there is no storage or device associated with a recipient user (e.g., one of those on the list of users 7604), the USM may send to a message account associated with the recipient user the URL to the digital content. In another embodiment, the user interface 7416 may retrieve a list of contacts, each having a messaging or contact ID/handle (e.g., email addresses, phone numbers, etc.), available on the device coupled to the sending user, and determine which contacts have user accounts with the USM, or storages associated the contacts, based on the messaging or contact ID/handle. The user interface 7416 may indicate to the sending user this information, so that the sending user may know if a recipient of interest may benefit from the automatic download of the digital content of interest. (On the other hand, a recipient user of USM may indicate to the USM that he wants to keep its membership with the USM private.) The USM may also send a message, for example, via the messaging or contact ID/handle obtain from the device, to a recipient without an account or storage association with the USM, the messaging inviting the recipient to register with the USM for automatic content delivery in the future, as well as indicating a URL to the digital content of interest. The USM is capable of facilitating content delivery to all contacts, whether they have memberships or devices associated with the USM or not. In another embodiment, a recipient user of the USM may indicate to the USM that automatic digital content delivery to devices associated with the recipient user is granted based on the identity and/or other criteria of the sending user (or group of users), digital content of interest, and means of retrieval. For example, a list of users may be granted automatic delivery without any further acknowledgement from the recipient user, and the users on the list may or may not know about this approval. The recipient user may also specify that only photos can be automatically delivered, while videos require acknowledgment or confirmation. The recipient user may also specify that only when the network connectivity of the device is over Wi-Fi may videos be automatically delivered. Other criteria include but not limited to media or file types and sizes.

In one embodiment, a sending user may indicate via a device (e.g., a mobile phone) to the UCM (or a server or service) a receiving user (e.g., a third-party messaging ID such as email address or mobile phone number, or a user ID maintained in the account store 7428), in relation to his message or request for digital content delivery, where the message or request includes a location of the digital content of interest, the location being external to the device (e.g., a cloud storage). The UCM may obtain the digital content from the location; append, attach or otherwise include the digital content in a payload (e.g., an email message), the payload being generated based on the message or request; and deliver the payload to the receiving user, for example, via a messaging account associated with the receiving user. For example, the sending user may prepare on his computer an email message, which includes a URL to a digital content available on a cloud storage. The UCM (or the server or service) may obtain the digital content from the cloud storage via the URL, and make it available as an attachment to the email message, so that the user does not need to manually down the digital content from the cloud storage and attach it to the email message. In some embodiment, the UCM may utilize or recognize a marker or indicator for such automatic digital content packaging whereby the user may use it to indicate to the USM that a URL in a message is to be replaced by the digital content the URL refers to. For instance, such a marker or indicator may be specified in the message (e.g., a markup tag) or outside the message (e.g., as a metadata or command). The UCM may remove the marker, tag, or instruction from the body text of the message once the attachment or packaging has been prepared, so that the message recipient will not see the marker, tag, or instruction on the body text of the message. In another embodiment, a selection by a user of a file stored on an externally accessible storage (e.g., a cloud storage) and gesturing (e.g., drag and drop) the selection to a message being prepared on a device may generate in the message a location reference (e.g., a URL) to the file, and/or a marker, the marker indicating to the USM that the USM is to retrieve the file from the externally accessible storage, with the location reference and/or the marker being generated without interaction with the user. All modes or schemes of such indication are within the scope of various embodiments. In yet another embodiment, the user may receive notification that the retrieval and attachment have been successful.

In one embodiment, a sending user may indicate to the UCM in his message or request for digital content delivery a receiving user that is not associated with any destination device or storage (e.g., a receiving user not having a user account in the account store 7428, or having a user account not being associated with any destination device or storage). The UCM may notify the receiving user via a message. The message may comprise a notice that the auto delivery could not be fulfilled, and/or a location reference to the digital content via which the receiving user may manually retrieve the digital content. In another embodiment, the UCM may perform copying or retrieval of digital content from a source location (e.g., a device or storage associated with the sending user) to a destination location (e.g., a device or storage associated with the receiving user) via an access reference to the digital content in the source location without exposing the access reference to the sending user, the receiving user, or both. For instance, the sending user may indicate to the UCM (e.g., via the user interface 7416) a digital content for delivery and an identification of the receiving user, without explicitly providing an externally accessible location reference to access the digital content. In response to this indication, the UCM may identify one or more storage media associated with the receiving user based on the identification (e.g., via the account manager 7422). The UCM may generate, obtain, or otherwise determine an externally accessible location reference for the digital content by sending a request (e.g., via the input handler 7416) to a server (e.g., a cloud storage service hosting the digital content). For example, the user interface 7416 of the UCM may be operably configured to run as an application on a device of the sending user. The sending user may navigate a source location (e.g., a cloud storage or a local hard drive directly attached to or embedded by the device) to reach and get at the digital content of interest. However, such navigation or its path may not be suitable or available for digital content retrieval. In response to receiving an indication from the sending user that the digital content is to be delivered to the receiving user, the UCM may request a server or service associated with the source location, or do so on its own, to generate an externally accessible location reference to the digital resource. The fulfillment of this request by such a server or service may be conditional on the authorization granted earlier by the sending user for the UCM to access to the source location. The UCM may copy or retrieve the digital content (e.g., via the downloader 7426 and the uploader 7424) from the source location to the one or more storage media associated with the receiving user based on the externally accessible location reference. In some embodiment, such an externally accessible location reference is hidden from the sending user, the receiving user, or both, for example, so to make the user experience with the UCM simple and clean. In another embodiment, the source and destination locations for automatic digital content delivery on behalf of one user to another may belong to or otherwise be associated with the same storage server or service (e.g., the same cloud storage). A location reference generated or utilized for such delivery may not need to be externally accessible or usable outside this storage server or service. In one embodiment, when the source location associated with the sending user and the destination location associated with the receiving user are associated with the same service jurisdiction or membership, the digital content for delivery may be performed or otherwise accomplished without a URL being generated. For example, the service of common jurisdiction or membership may make a copy of the digital content at the destination location without generating a URL corresponding to the digital content. As suggested earlier, the recipient user may or may not receive a notification or otherwise be presented with pending requests for him to explicitly authorize the delivery, e.g., based on sender identities, file sizes, media types, and so on.

In one embodiment, a user of a system embodying the present invention, namely the USM, may capture an image or video using a device (e.g., a mobile phone or camera), which may automatically make available a copy of the image or video on an external storage, e.g., a cloud storage. (The user may also choose to manually initiate such a delivery.) The user may initiate a request to the USM (or its proxy) for sending the image or video to another user (or a group of users), the request, for example, identifying the image or video and the other user. In response to the request, the USM may deliver the image or video to one or more storages or devices associated with the other user based on the copy on the external storage instead of the one on the device, substantially free from interaction with the user and the other user. (The user may also pre-configure with the UCM so that the copying of the digital content copy from the external storage to the one or more storages or devices associated with the other user may happen automatically after the digital content has been made available at the external storage from the user's device, without any further instruction from the user. Such pre-configuration may include having the USM to maintain an authorization list of users and groups of users for the user, or to enable other users to register with or follow the user's digital content captures without need for further authorization from the user. Any mode of scheme of such pre-configuration is within the scope of the present invention.) In some embodiment, the USM may associate the image or video available on the device with the copy of the image or video on the external storage. (For example, the USM may embed in metadata associated with the digital content on the device a location reference to the digital content copy. Example metadata includes Exchange Image File—EXIF. Any mode or scheme of such association is within the scope of various embodiments.)

In one embodiment, a sending user coupled to a device may be associated with a cloud storage. He may indicate to a server or service (e.g., via the device) that a file (e.g., photo or video) stored on or taken by the device be sent to a recipient. In response to this indication, the server or service may copy or upload the file to the cloud storage, before performing the delivery of the file to the recipient (e.g., to a cloud storage or computer associated with the recipient). In another embodiment, the server or service may recognize that the file is already available at the cloud storage (e.g., via location, filename, metadata such as EXIF, and/or digital signature such as MD5), and skip the copying or uploading of the file to the cloud storage. For instance, a user or member of an online digital product store or marketplace may identify a digital product (e.g., a song or a book) and associate it with another user as a gift. A system associated with the online music store or marketplace may determine that the other user already owns or otherwise has access to the song. In one embodiment, the system may associate with the other user more than one instance of or license to the digital product, without making duplicate copies. The other user may gift the digital product to yet another user, thereby decreasing the number of instances or licenses associated with the other user.

In some embodiment, a device may have a local storage whose contents are synchronized with a cloud storage. A user of a system embodying the present invention may cause to generate a new file in the local storage (e.g., taking a video via the device such as a mobile phone or camera). The user may instruct the system (e.g., via the device or an application on the device) to deliver the file to another user, before the file is available in the cloud storage. The system remembers this instruction, and performs the delivery when the file becomes available in the cloud storage, thereby freeing up the user from the need to wait for such availability. One advantage is that the user does not need to wait for the uploading of the file to finish (e.g., to obtain the URL to the resultant file in the cloud storage), and is free from any subsequent steps that might otherwise be involved in delivering the file, such as locating the resultant file in the cloud storage, requesting a URL to the resultant file, and sending the URL to the receiving user. In another embodiment, the sending user and/or the receiving user may receive notification or indication that the file has been delivered to the receiving user (i.e., the file has been received in its entirety in a destination associated with the receiving user). In another embodiment, the sending user and/or the receiving user may receive notification or indication that the file has been opened (e.g., by the receiving user). For example, the file may be associated with a flag, metadata, or indication that the sending user requests for notification when the file is opened, and the application used for opening the file may detect this flag, metadata, or indication, and send such a notification to the sending user via the system. In some embodiment, contents may be added to or associated with the delivery of a file, the delivery being made a system equipped with the present invention, and the contents not being initially associated with the sending and receiving user. For instance, an ad may be delivered in addition to or conjunction with the delivery of the file by the system. When the receiving user opens the file, the application opening the file may present the ad first before the file. Or the ad may be made as part of the file (e.g., a banner ad on one or more pages of a document), either by the system, the application, or some other application associated with the delivery destination. The system, the application, or some other application may determine the choice of ads based on the content of the file or the size of the file. For example, a travel insurance ad may be added to the delivery of the file if the file contains words and phrases indicating a travelling subject matter. A longer video ad may be part of the delivery if the file is a large video. In another embodiment, this additional content may also be a URL with which the application opening the file for delivery may use to fetch the additional content for presentation to the receiving user.

In one embodiment, a receiving user associated with a cloud storage or computer may receive a notification, asynchronously or on-demand, for one or more files to be delivered to his cloud storage or computer. He may receive such a notification on an application or device (e.g., a mobile phone), the application not running on or the device not being the computer. He may then authorize or otherwise indicate to cause the delivery of these files to his cloud storage (e.g., by a server or computer). He may also select individual notifications or files for delivery, while ignoring the rest. Such notifications may comprise partial (e.g., a short clip of a full video) or downsized (e.g., a thumbnail of a photo) content of the original files for delivery. In one embodiment, some files may be delivered without the need for such explicit acknowledgement, e.g., based on criteria such as sender identity, group membership, file type, and/or file size. Such criteria may be based on user and/or system-specified limits. Some cloud storages also impose file size limit and other limits for storage and transmission. In another embodiment, a server or service embodying the present invention may automatically prepare the content for delivery to overcome such limits, such as storing the content as multiple files in the source and/or destination locations, copying constituent parts of the content separately, transferring the content or their constituent parts at different times (e.g., to overcome bandwidth restrictions), and splitting the content into multiple constituent parts (and re-combining the multiple constituent parts) as needed.

In another embodiment, the receiving user may be associated with multiple destination storage locations, each of which may be associated with a different service provider. He may manually select which location for each delivery or batch of delivery. Or the destination location may be determined based on the sender's request, such as sender identity, file type, and/or file size. For instance, a financial institution may send a monthly statement (or a reference such as a URL to a monthly statement) to a user account (e.g., via an email or email address, or an application programming interface), causing the monthly statement to be stored on or otherwise delivered to a file folder or directory in an networked storage associated with the user account, the file folder or directory being identified or otherwise determined based on the sender name (e.g., the name of the financial institution), the file name of the monthly statement, and/or the date of the request or statement. In another embodiment, the file name of the monthly statement in the destination file folder or directory may also be based on data or metadata associated with the request and/or content of interest (e.g., the recipient group name, statement date, subject line). A recipient of the request or a user of the account may choose a template or otherwise specify a rule or scheme for determining or generating the destination file folder or directory, or the file name of the delivered content. For example, a user may choose or otherwise specify a template, rule or scheme for determining a folder path or name based at least in part on the sender name, and a file name based at least in part on the date and subject line of a message. For example, a system that receives or has access to a message (or email) sent on Oct. 1, 2010, from a company "Example Co.", for retrieving a monthly credit card statement (or containing a monthly credit card statement as an attachment), and has access to the storage or storage account associated with the recipient of the message (or email), may determine a folder name "example co" and a file name "Gold Card Statement 2010-10-01", and cause the monthly credit card statement to be stored in a folder named "example co" under the file name "Gold Card Statement 2010-10-01". The "example co" folder may be a subfolder of another folder specified by the user or the system, and the "Gold Card Statement" prefix to the file name may be specified by the user or determined based on the message (e.g., the subject line of an email). In one embodiment, a user may specify a file path or folder in a destination storage (e.g., a cloud storage) and associate the file path or folder with a sender, subject and/or subject matter, so that files from or otherwise associated with the sender, subject and/or subject matter would be delivered to the file path or folder. In another embodiment, a user may choose or otherwise specify which or what information to be omitted, redacted, hidden, or otherwise unavailable from the original content or file, for example, either before the content or file is sent or after it has been received. For example, the user may indicate that the credit card number information to be omitted or redacted (e.g., the card number being masked with the exception to the last four digits). Such omission or removal may be performed, for example, upon either generation or delivery of the content.

In one embodiment, a system embodying the present invention may generate, upon a user's request, a location identifier or reference (e.g., a URL or URI), which is associated with a specific file folder in a networked storage associated with the user, and with which a sender may associate a file or content. For instance, the user may provide a sender such a location identifier, and the sender may indicate to the system or in a message received by the system a file or content and the location identifier, and the system would cause the file or content to be delivered to the file folder based on the location identifier. In one embodiment, files cannot be downloaded or uploaded via such a location identifier except when the location identifier is made available to the system, wherein the system is not a provider of the storage location or destination identified by the location identifier. In another embodiment, the user may limit or otherwise restrict delivery of files or contents to a file folder or via such a location identifier by associating the file folder or location identifier to a specific sender or content provider, whose identity may be verified or ascertained by the system. In one embodiment, the server or computer performing the delivery may be associated with the receiving user. For example, a personal computer at the receiving user's home may receive a directive from a device coupled to the receiving user or another device receiving a request from a sending user, and perform the delivery of the file to its destination (e.g., downloading to the personal computer, or uploading to the cloud storage).

In one embodiment, the copying from a source storage location to a destination storage location may incur costs to the receiving user. Alternatively, the sending user may opt to pay for the costs. For example, a consumer (i.e., the receiving user) may purchase digital contents from a website (i.e., the sending user). After having successfully received the order from the consumer, the website may instruct a server or service embodying the present invention to deliver the purchased content to the consumer via an email address, e.g., the email address being provided by the consumer as part of the ordering or his account information at the website. The website may provide the server or service a URL to the purchased content, without the need to know whether there is any computer or cloud storage associated with the consumer's email address. The server or service may then download the purchased content via the URL to the storage location associated with the email address. The website may be responsible for charges associated with delivery of the file to the destination storage location. In one embodiment, the consumer may not have any storage locations associated with his email address, or an account with the server or service. The server or service may instead send the consumer an email comprising the URL to the purchased content. In another embodiment, the server or service may provide confirmation to the consumer and/or website of successful file delivery, and charge the website for the delivery cost and/or the consumer for the purchase price only after the delivery was successful. In one embodiment, a receiving user may receive a message (e.g., email) comprising a URL to a file from a sending user even there is a storage location associated with the receiving user, e.g., when the sending user is not on the pre-authorized sender list associated with the receiving user, or the file fails or satisfies certain criteria, such as exceeding the maximum file size.

In one embodiment, a recipient may specify a file size reduction percentage for incoming contents or files, for example, when they exceed a certain limit. The reduction or alternative size may be performed or generated, for example, by the system that makes available the content or file on the destination account or storage. In another embodiment, multiple sizes pertaining to the same content may be available so that size reduction needs not be performed upon delivery of the specific content to the destination. In yet another embodiment, a recipient may choose a lower or higher resolution or size of a digital content for saving or storage, for example, after having viewed or watched the digital content.

In one embodiment, a request for delivery of file to a destination location may be accompanied or otherwise qualified with a "Do Not Sync" option or indication, so that a cloud storage service that provides automatic synchronization with its users' devices may refrain from automatically making a copy available to the receiving user's device(s) when the cloud storage is a destination location for the file. For example, the cloud storage service may place the file in a folder, directory or location that does not automatically synchronize with the receiving user's device(s). In another embodiment, a server or service embodying the present invention may track and identify URLs that it has received for content delivery to a particular receiving user or destination location, and notify the receiving user of any duplicates that occur over a period of time. In yet another embodiment, a destination location may be an output device, such as a printer or fax machine. In one embodiment, the URL that identifies the file to be retrieved or delivered is not visible to the receiving and/or sending users. For example, a sending user may identify a photo and indicate that the photo to be delivered to a receiving user. This instruction may cause a system equipped with the present invention to generate an intermediary URL with which the photo may be downloaded. The system, however, does not make the URL available or visible to the sending user. The system may then deliver the photo to a destination associated with the receiving user, without revealing the URL to the receiving user. In cases where the delivery is not made or attempted immediately after the sending user's instruction (e.g., the destination being temporarily unavailable or the delivery being subject to the receiving user's confirmation or approval), the system may need to obtain or generate a new URL for later delivery (e.g., the validity of the URL has timed out) or send a notification to the receiving user. In such cases, the system still does not involve the receiving user in getting the URL or revealing the URL to him. One advantage is that it prevents inadvertent advertising of URLs to other people, either by the sending user or receiving user.

In one embodiment, a system equipped with the present invention may copy a file from a device (e.g., a network-attached storage) associated with a sending user to another device associated with a receiving user. In some embodiment, a system equipped with the present invention may copy a file from a device associated with a sending user to another device associated with a receiving user without any intermediary storage (e.g., a cloud storage). For example, the system may cause the device of the receiving user to download the file from the device of the sending user, or the latter to upload the file to the former.

While the embodiment(s) described above may make reference to specific hardware and software components, methods, and structures, as well as organizations and arrangements thereof, those skilled in the art will appreciate that different modifications, adaptations, combinations, variations, and distributions of hardware components, software components, methods, and/or structures may also be used, and that particular operations described as being implemented in hardware might also be implemented in software or vice versa. All such modifications, adaptations, combinations, variations, and distributions that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiment(s) illustrated. For instance, method steps described herein may be performed in alternative orders or in parallel. Various embodiments of the invention include logic stored on non-transitory computer readable media, the logic configured to perform methods of the invention. The examples provided herein are exemplary and are not meant to be exclusive.

In addition, embodiments of the present invention may be realized using any combination of dedicated components and/or programmable processors and/or other programmable devices. Furthermore, while the various embodiments have been described in relation to email message accounts and SMS message accounts, the various content retrieval techniques described above are also applicable to mobile telephony accounts, fixed line telephony accounts, cloud computing and/or storage accounts, social networking accounts, productivity/utility application accounts, website/web service accounts, and user or group memberships.

Computer programs incorporating various features of the present invention may be encoded on various non-transitory computer readable media for storage and/or communication; suitable media include magnetic disk or tape, optical storage media such as compact disk (CD) or DVD (digital versatile disk), flash memory, hard drive, and any other computer readable medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

Thus, although the invention has been described with respect to specific embodiments, it will be appreciated that the invention is intended to cover all modifications and equivalents within the scope of any relevant claims.

What is claimed:

1. A system, comprising:

one or more processors; and one or more memories communicatively coupled to the one or more processors when the system is operational, the one or more memories bearing computer-readable instructions that, when executed by the one or more processors, cause the system at least to:

activate a protocol interface associated with the system, wherein the protocol interface comprises at least one entity in at least one of the following categories: network ports, communication endpoints, and communication protocols, and wherein a standards document identifies shopping information as payload available via the protocol interface;

receive an indication of request from a device via the protocol interface;

send at least one response to the device, wherein the at least one response comprises an indication of information;

receive from the device an indication of non-compliance in relation to the indication of information; and identify a digital resource provider in relation to the indication of non-compliance, wherein the digital resource provider is associated with the information.

2. The system of claim 1, wherein the protocol interface comprises a uniform resource identifier (URI) scheme and a network port, the network port is associated with a port number, and the URI scheme is associated with shopping.

3. The system of claim 1, wherein the protocol interface comprises a communication protocol, and the communication protocol is predefined as providing shopping information as payload, independently of applications and data available on the system, and independently of prior requests to the system.

4. The system of claim 1, wherein the instructions that, when executed by the one or more processors, cause the system at least to receive the indication of non-compliance, further cause the system at least to:

receive the indication of non-compliance from the device, wherein the indication of non-compliance is generated by the device in relation to determining that payload associated with the at least one response is not associated with shopping information.

5. The system of claim 1, wherein the one or more memories further bear computer-readable instructions that, when executed by the one or more processors, cause the system at least to:

receive another indication of request from another device via the protocol interface, wherein the other indication of request comprises one or more search terms;

determine from one or more databases that at least one digital resource matches the one or more search terms;

determine that the at least one digital resource is not associated with shopping; and send another response to the other device, wherein the other response does not comprise the at least one digital resource.

6. The system of claim 1, wherein the one or more memories further bear computer-readable instructions that, when executed by the one or more processors, cause the system at least to:

receive another indication of request from another device via the protocol interface, wherein the other indication of request comprises one or more search terms;

determine from one or more databases that one or more digital resources match the one or more search terms;

determine that the one or more digital resources are not associated with shopping; and send another response to the other device, wherein the other response comprises at least one digital resource from among the one or more digital resources, and an indication that the at least one digital resource is not associated with shopping.

7. The system of claim 1, wherein the standards document is published by an organization, and the organization is a third party to an operator of the system.

8. The system of claim 1, further comprising:

wherein the system comprises one or more servers;

wherein the protocol interface is associated with a first server from among the one or more servers;

wherein the indication of request is received by the first server;

wherein the at least one response is sent by the first server; and wherein the indication of non-compliance is received and the digital resource provider is identified by at least one server from among the one or more servers.

9. The system of claim 1, further comprising:

wherein the system comprises a first collection of servers and a second collection of servers, the first collection of servers and the second collection of servers each comprising one or more servers;

wherein the protocol interface is associated with at least one server from among the first collection of servers;

wherein the indication of request is received by the at least one server from among the first collection of servers;

wherein the at least one response is sent by the at least one server from among the first collection of servers; and wherein the indication of non-compliance is received and the digital resource provider is identified by one or more servers from among the second collection of servers.

10. The system of claim 1, wherein the one or more memories further bear computer-readable instructions that, when executed by the one or more processors, cause the system at least to:

receive the information via the protocol interface, wherein the information is associated with the digital resource provider.

11. The system of claim 1, wherein the one or more memories further bear computer-readable instructions that, when executed by the one or more processors, cause the system at least to:

refusing to accept another indication of content in relation to the indication of non-compliance, wherein the content is associated with the digital resource provider.

12. The system of claim 1, wherein the one or more memories further bear computer-readable instructions that, when executed by the one or more processors, cause the system at least to:

receive the information via another protocol interface, wherein the information is associated with the digital resource provider, and wherein the standards document identifies shopping information as payload available via the other protocol interface.

13. The system of claim 1, wherein the information is delivered to the device independently of compliance.

14. The system of claim 13, wherein the non-compliance is determined in relation to the information after the information is delivered to the device, and the device requests and receives the information from the system.

15. One or more non-transitory computer-readable storage media for enabling an online system to provide more reliably context-relevant information, bearing computer-readable instructions that, when executed on one or more computers, cause the one or more computers to perform operations comprising:

activating a protocol interface associated with the online system, wherein the protocol interface comprises at least one of a network port, or at least one of a communication endpoint, or at least one of a communication protocol, and wherein a standards document identifies shopping information as payload available via the protocol interface;

receiving an indication of request from a device via the protocol interface;

sending at least one response to the device, wherein the at least one response comprises an indication of information;

receiving an indication of non-compliance in relation to the indication of information; and identifying a digital resource provider in relation to the indication of non-compliance, wherein the digital resource provider is associated with the information.

16. The one or more non-transitory computer-readable storage media of claim 15, wherein the standards document is an Internet Engineering Task Force (IETF) Request for Comment (RFC), the protocol interface comprises a network port, the network port is associated with a port number, and the IETF RFC associates the network port with receiving one or more requests for shopping information.

17. The one or more non-transitory computer-readable storage media of claim 15, further bearing computer-readable instructions that, when executed on the one or more computers, cause the one or more computers to perform operations further comprising:

refusing to accept another indication of content in relation to the indication of non-compliance, wherein the other indication of content is destined to the protocol interface, and the content is associated with the digital resource provider.

18. The one or more non-transitory computer-readable storage media of claim 15, wherein the standards document is published by an organization, and the organization is a third party to an operator of the online system.

19. The one or more non-transitory computer-readable storage media of claim 15, wherein the information is delivered to the device independently of compliance.

20. The one or more non-transitory computer-readable storage media of claim 19, wherein the non-compliance is determined in relation to the information after the information is delivered to the device, and the device requests and receives the information from the online system.

21. A computer-implemented method for providing more reliably context-relevant information, comprising:

activating, by a computer system, a protocol interface associated with the computer system, wherein the protocol interface comprises at least one entity chosen from network ports, communication endpoints, and communication protocols, and wherein a standards document identifies shopping information as payload available via the protocol interface;

receiving, by the computer system, an indication of request from a device via the protocol interface;

sending, by the computer system, at least one response to the device, wherein the at least one response comprises an indication of information;

receiving, by the computer system, an indication of non-compliance in relation to the indication of information; and identifying, by the computer system, a digital resource provider in relation to the indication of non-compliance, wherein the digital resource provider is associated with the information.

22. The method of claim 21, wherein the standards document is an Internet Engineering Task Force (IETF) Request for Comment (RFC), the protocol interface comprises a communication protocol, and the communication protocol is identified in the IETF RFC as providing shopping information as payload, independently of applications and data available on the server, and independently of prior requests to the server.

23. The method of claim 21, wherein the standards document is published by an organization, and the organization is a third party to an operator of the computer system.

24. The method of claim 21, further comprising:

refusing to accept another indication of content in relation to the indication of non-compliance, wherein the content is associated with the digital resource provider.

25. The method of claim 21, wherein the information is delivered to the device independently of compliance.

26. The method of claim 25, wherein the non-compliance is determined in relation to the information after the information is delivered to the device, and the device requests and receives the information from the computer system.

* * * * *